United States Patent
Swain et al.

(10) Patent No.: US 12,492,174 B2
(45) Date of Patent: Dec. 9, 2025

(54) MORPHOLINE-3-CARBOXAMIDE DERIVATIVES AS PROSTAGLANDIN E2 RECEPTOR 4 (EP4) AGONISTS FOR THE TREATMENT OF GASTROINTESTINAL AND PULMONARY DISEASES

(71) Applicant: NXERA PHARMA UK LIMITED, Cambridge (GB)

(72) Inventors: Nigel Alan Swain, Cambridge (GB); Benjamin Whitehurst, Cambridge (GB); Miles Stuart Congreve, Cambridge (GB); Giles Albert Brown, Cambridge (GB)

(73) Assignee: Nxera Pharma UK Limited (GB)

( * ) Notice: Subject to any disclaimer, the term of this patent is extended or adjusted under 35 U.S.C. 154(b) by 0 days.

(21) Appl. No.: 19/042,986

(22) Filed: Jan. 31, 2025

(65) Prior Publication Data
US 2025/0179036 A1   Jun. 5, 2025

Related U.S. Application Data

(63) Continuation of application No. PCT/GB2023/052050, filed on Aug. 2, 2023.

(30) Foreign Application Priority Data

Aug. 2, 2022 (GB) .................... 2211232

(51) Int. Cl.
| | | |
|---|---|---|
| C07D 265/30 | (2006.01) | |
| A61K 31/5375 | (2006.01) | |
| A61K 31/5377 | (2006.01) | |
| A61K 45/06 | (2006.01) | |
| C07D 413/06 | (2006.01) | |
| C07D 413/12 | (2006.01) | |

(52) U.S. Cl.
CPC ........ C07D 265/30 (2013.01); A61K 31/5375 (2013.01); A61K 31/5377 (2013.01); A61K 45/06 (2013.01); C07D 413/06 (2013.01); C07D 413/12 (2013.01)

(58) Field of Classification Search
CPC .. C07D 265/30; C07D 413/06; C07D 413/12; A61K 31/5375; A61K 31/5377; A61K 45/06
See application file for complete search history.

(56) References Cited

U.S. PATENT DOCUMENTS

| | | |
|---|---|---|
| 6,197,824 B1 | 3/2001 | Schromm et al. |
| 7,169,807 B2 | 1/2007 | Donde |
| 7,402,605 B2 | 7/2008 | Tani et al. |
| 7,534,914 B2 | 5/2009 | Koike et al. |
| 8,314,147 B2 | 11/2012 | Gaiba et al. |
| 8,394,844 B2 | 3/2013 | Murata et al. |
| 9,120,824 B2 | 9/2015 | Borriello et al. |
| 9,926,276 B2 | 3/2018 | Virgili Bernado et al. |
| 10,111,907 B2 | 10/2018 | Shoemaker et al. |
| 11,718,582 B2 | 8/2023 | Pucci et al. |
| 11,872,226 B2 | 1/2024 | Palomino Laria et al. |
| 2008/0124402 A1 | 5/2008 | Kim et al. |
| 2008/0132543 A1 | 6/2008 | Im et al. |
| 2022/0242893 A1 | 8/2022 | Thévenin et al. |
| 2023/0074179 A1 | 3/2023 | Zhang et al. |
| 2024/0082263 A1 | 3/2024 | Kim et al. |

FOREIGN PATENT DOCUMENTS

| | | | | |
|---|---|---|---|---|
| CA | 2454584 A1 | 7/2002 | | |
| CA | 2792403 A1 | 9/2011 | | |
| CN | 104650070 A | * | 5/2015 | ........... C07D 413/14 |
| EP | 1431267 A1 | 6/2004 | | |
| EP | 1756043 B1 | 7/2009 | | |

(Continued)

OTHER PUBLICATIONS

Buckley, James, et al. "EP4 receptor as a new target for bronchodilator therapy." Thorax. 2011. 66: 1029-1035.

(Continued)

*Primary Examiner* — Joseph K McKane
*Assistant Examiner* — Meghan C Heasley
(74) *Attorney, Agent, or Firm* — Barnes & Thornburg; Marley A. Brimberry

(57) ABSTRACT

The disclosures herein relate to novel compounds of formula I:

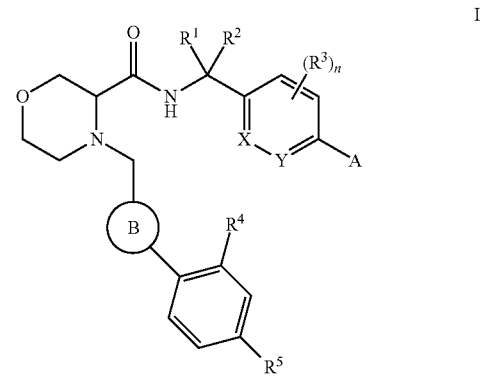

and salts thereof, wherein X, Y, A, Ring B, $R^1$, $R^2$, $R^3$, $R^4$ and $R^5$ are defined herein, and their use in treating, preventing, ameliorating, controlling or reducing the risk of disorders associated with $EP_4$ receptors.

29 Claims, No Drawings

(56) References Cited

FOREIGN PATENT DOCUMENTS

| | | |
|---|---|---|
| EP | 1563846 B1 | 8/2012 |
| EP | 1586564 B1 | 11/2012 |
| EP | 1847533 B1 | 8/2013 |
| EP | 3307747 A1 | 4/2018 |
| EP | 3785767 A1 | 3/2021 |
| EP | 3889134 A1 | 10/2021 |
| JP | 2005104836 A | 4/2005 |
| JP | 2009173556 A | 8/2009 |
| JP | 5734952 B2 | 6/2015 |
| JP | 2018118965 A | 8/2018 |
| KR | 100826866 B1 | 5/2008 |
| WO | 2002019967 A2 | 3/2002 |
| WO | 2002024647 A1 | 3/2002 |
| WO | 2003008377 A1 | 1/2003 |
| WO | 2003035064 A1 | 5/2003 |
| WO | 2003077910 A1 | 9/2003 |
| WO | 2004037786 A2 | 5/2004 |
| WO | 2004037813 A1 | 5/2004 |
| WO | 2006052630 A1 | 5/2006 |
| WO | 2007067511 A2 | 6/2007 |
| WO | 2008021933 A2 | 2/2008 |
| WO | 2008092860 A1 | 8/2008 |
| WO | 2008092861 A1 | 8/2008 |
| WO | 2008092862 A1 | 8/2008 |
| WO | 2012103071 A2 | 8/2012 |
| WO | 2013004290 A1 | 1/2013 |
| WO | 2013004291 A1 | 1/2013 |
| WO | 2014004229 A1 | 1/2014 |
| WO | 2014179263 A1 | 11/2014 |
| WO | 2015094902 A1 | 6/2015 |
| WO | 2020012305 A1 | 1/2020 |
| WO | 2021064189 A2 | 4/2021 |
| WO | 2022111222 A1 | 6/2022 |
| WO | 2023122289 A1 | 6/2023 |

OTHER PUBLICATIONS

Honda, A., et al. "Cloning and expression of a cDNA for mouse prostaglandin E receptor EP2 subtype." Journal of Biological Chemistry 268.11 (1993): 7759-7762.

Honda, Atsushi, et al. "Effects of a prostagrandin EP4-receptor agonist ONO-AE1-329 on the left ventricular pressure-volume relationship in the halothane-anesthetized dogs." European Journal of Pharmacology. 2016. 775: 130-137.

International Search Report for International Application No. PCT/GB2023/052050, dated Oct. 2, 2023.

Kabashima, Kenji, et al. "The prostaglandin receptor EP4 suppresses colitis, mucosal damage and CD4 cell activation in the gut." The Journal of clinical investigation. 2002. 109(7): 883-893.

Miyoshi, Hiroyuki, et al. "Prostaglandin E2 promotes intestinal repair through an adaptive cellular response of the epithelium." The EMBO journal. 2017. 36(1): 5-24.

Nakase, Hiroshi, et al. "Effect of EP4 agonist (ONO-4819CD) for patients with mild to moderate ulcerative colitis refractory to 5-aminosalicylates: a randomized phase II, placebo-controlled trial." Inflammatory bowel diseases. 2010. 16(5): 731-733.

Nitta, M., et al. "Expression of the EP4 prostaglandin E2 Receptor Subtype with Rat Dextran Sodium Sulphate Colitis: Colitis Suppression by a Selective Agonist, ONO-AE1-329." SScan J Immunol. 2002. 56(1): 66-75.

Watanabe, Yusuke, et al. "KAG-308, a newly-identified EP4-selective agonist shows efficacy for treating ulcerative colitis and can bring about lower risk of colorectal carcinogenesis by oral administration." European journal of pharmacology 754 (2015): 179-189.

International Search Report for International Application No. PCT/GB2023/052049, dated Oct. 5, 2023.

International Search Report for International Application No. PCT/GB2023/052046, dated Oct. 5, 2023.

\* cited by examiner

MORPHOLINE-3-CARBOXAMIDE DERIVATIVES AS PROSTAGLANDIN E2 RECEPTOR 4 (EP4) AGONISTS FOR THE TREATMENT OF GASTROINTESTINAL AND PULMONARY DISEASES

RELATED APPLICATIONS

This application is a continuation application of International Application No. PCT/GB2023/052050, filed Aug. 2, 2023, which claims priority under 35 U.S.C. § 119 to United Kingdom Patent Application No. 2211232.0, filed Aug. 2, 2022, each of which is incorporated herein in its entirety.

TECHNICAL FIELD OF THE INVENTION

This application relates to novel compounds and their use as prostaglandin $E_2$ receptor 4 ($EP_4$) agonists. Compounds described herein may be useful in the treatment or prevention of diseases in which $EP_4$ receptors are involved. The application is also directed to pharmaceutical compositions comprising these compounds and the manufacture and use of these compounds and compositions in the prevention or treatment of such diseases in which $EP_4$ receptors are involved.

BACKGROUND OF THE INVENTION

Prostanoids including prostaglandins and thromboxanes are metabolite derivatives of arachidonic acid that play key roles in cellular physiological function. Arachidonic acid is an integral component of membrane phospholipids which is released via the activity of phospholipase A2 ($PLA_2$). The biosynthesis of prostaglandins is mediated via cyclooxygenase (COX) which catalyses conversion of arachidonic acid to an unstable intermediate ($PGH_2$) and leads to the generation of prostaglandins including $PGE_2$. $PGE_2$ represents the most widely produced prostanoid whose activity is mediated through action at 4 functionally distinct subtypes of receptors, EP1-4.

EP receptors belong to a family of G protein coupled receptors (GPCR) which are integral membrane proteins with seven-transmembrane domains. This receptor class can broadly be classified according to their signaling pathways: i) Gs coupled receptors (adenylate cyclase activation and cyclic adenosine monophosphate (cAMP) production), EP2 and EP4 ii) Gq coupled receptor (PLC activation), EP1 and iii) Gi coupled receptor (inhibition of adenylate cyclase), EP3.

EP4 receptor signals through Gs and couples positively to adenylate cyclase to increase cAMP levels. The receptor was originally described in 1993 with the identification of an EP2 like receptor which couples positively to adenylate cyclase but does not bind butaprost (A Honda et al. *J. Biol. Chem.* 1993, 268, 7759-7762).

The EP4 receptor plays key roles in diverse physiological functions including gastrointestinal homeostasis, regulation of vascular tone, renal function, inflammation, fever and carcinogenesis. The potent biological action of PGE2 has fueled interest in developing subtype selective EP4 agonists and antagonists for the treatment of a broad range of indications.

Functional gastrointestinal diseases (FGIDs), including chronic constipation, are common gastrointestinal conditions encountered by primary care physicians and gastroenterologists. The prevalence of chronic constipation ranges from 1% to 8% and can negatively impact the quality of life (QoL), resulting in major social and economic burden. Chronic constipation can bring discomfort to patients and affect their daily lives. Symptoms include hard and lumpy stools, straining during defecation and a sensation of incomplete evacuation. The use of laxatives and stool softeners remains high, despite many patients not obtaining substantial benefit. There remains a need for treatments that can provide complete and sustainable symptomatic relief.

The intestinal mucosa plays an important role in the homeostasis of anion and body fluid maintenance. These functions are mediated through coordinated ion transport via membrane bound transporters and channels localized on the apical and basolateral membrane of intestinal epithelial cells. PGE2 is a well-established secretagogue that may directly promote chloride secretion from intestinal epithelial cells. The secretory effects of PGE2 are in part mediated via the EP4 receptor which can stimulate anion chloride secretion across the gut mucosa. Lubiprostone, a bicyclic fatty acid derivative of PGE1 clinically approved for the treatment of chronic constipation and IBS-C has been shown to promote fluid secretion and gastrointestinal tract motility through the activation of prostaglandin (EP4) receptors. EP4 selective agonists may have therapeutic value in promoting intestinal fluid homeostasis in chronic constipation conditions.

Inflammatory bowel disease (IBD) is a chronic debilitating gastrointestinal disorder that includes ulcerative colitis and Crohn's disease. Patients with IBD commonly present with symptoms that include diarrhoea, abdominal pain, weight loss, rectal bleeding and fever. Clinical management involves strategies to control the abnormal dysregulated immune response in the intestinal mucosa. A wide range of agents are employed to induce and maintain remission, depending on the severity of the disease. These include aminosalicylates, corticosteroids, immunosuppressive agents, antibiotics and biologic agents. This may be given in a stepwise approach, with intensification of therapy according to the severity and progression of the disease. It is clear, however, that some patients are refractory to medical therapy or fail to tolerate it due to systemic side effects. Only a subset of patients achieve long term remission with current therapeutic strategies, suggesting the need for improved therapies.

Intestinal barrier dysfunction plays a key pathogenic role in IBD and there is emerging interest in the development of agents that restore barrier function (mucosal healing). EP4 is expressed in a number of cell types including gastrointestinal (GI) epithelial cells, lamina propria mononuclear cells and colon innervating sensory neurones and may offer benefits in dampening the inappropriate mucosal immune response as well as protecting the GI mucosal barrier. PGE2 signalling through EP4 promotes cellular differentiation to a wound-associated epithelial cell phenotype which is important for wound repair (Miyoshi, H. et al. *EMBO J.* 2017, 36, 5-24). Administration of EP4 agonists provide benefit in chemically induced colitis models (Kabashima, K. et al. *J. Clin. Invest.* 2002, 109, 883-893; Watanabe, Y. et al. *Eur. J. Pharmacol.* 2015, 754, 179-189; Nitta, M. et al. *Scand. J. Immunol.* 2002, 56, 66-75) while mutant mice lacking EP4 develop severe dextran sodium sulfate induced colitis characterised by impaired mucosal barrier function, increased epithelial cell loss, crypt damage and increased immune cell infiltration (Kabashima, K. et al. *J. Clin. Invest.* 2002, 109, 883-893). In a small PhII study, the EP4 agonist, ONO-4819CD was evaluated in patients with mild to moderate ulcerative colitis refractory to 5-ASA (Nakase, H. et al. *Inflamm. Bowel Dis.* 2010, 16, 731-733). Although the study was not powered for efficacy, patients treated with ONO-4819CD showed signs of improved disease activity index (DAI) score and histological scores. These data support a potential clinical benefit of EP4 agonist therapy in IBD.

Asthma and chronic obstructive pulmonary disease are inflammatory diseases of the airway characterised by limitations in airflow. It is estimated that approximately 300 million people have asthma and represents the most common chronic disease in children. Despite the advances in the management of asthma, a significant proportion of patients have uncontrolled disease which can lead to mortality and morbidity. Therapies that can achieve effective control of asthma symptoms and reduce risk of future exacerbations for long term management are still needed. PGE2 is known to have bronchodilator and anti-inflammatory effects in rodent and human isolated airway smooth muscle. Inhaled PGE2 has been shown to be beneficial on inflammation and airway calibre in patients with chronic bronchitis and asthma. PGE2 however, also induces a reflex cough, potentially via EP3 receptor mediated irritancy of the upper airway. This has led to efforts to discover EP receptor selective agents for the treatment of airway disorders. Interestingly, key species differences have been reported in the receptor subtype responsible for mediating airway smooth muscle relaxation. In guinea pig, monkey and mouse, EP2 agonists could induce relaxation of airway smooth muscle, whilst in human, this is mediated via the EP4 receptor (Buckley, J. et al. *Thorax* 2011, 66, 1029-1035). Selective EP4 receptor agonists may have potential therapeutic value in airway diseases.

EP4 receptor has been shown to exert roles in the regulation of blood pressure. EP4 is expressed on smooth muscle and endothelial cells and may induce vasodilatory effects via endothelial nitric oxide synthase (eNOS) mediated nitric oxide (NO) production. PGE2 has been shown to dose dependently relax smooth muscle in aortic rings, an effect that is abolished in EP4 knockout mouse. In halothane anesthetised dogs, the EP4 selective agonist, ONO-AE1-329 induces a vasodepressor response (Honda, A. et al. *Eur. J. Pharmacol.* 2016, 775, 130-137) and similarly, hypotension was reported as one of the adverse drug reactions in IBD patients receiving ONO-4819CD (Nakase, H. et al. *Inflamm. Bowel Dis.* 2010, 16, 731-733).

EP4 agonists that can be used for the treatment of a range of gastrointestinal and airway disorders without cardiovascular systemic side effects may have potential therapeutic value. In particular, EP4 agonists that can be used for the treatment of a range of gastrointestinal disorders without cardiovascular systemic side effects may have potential therapeutic value. The discovery of safe and effective EP4 selective agents are needed.

SUMMARY OF THE INVENTION

The present invention provides compounds having activity as prostaglandin $E_2$ receptor 4 ($EP_4$) agonists.

Provided herein is a compound of the Formula I:

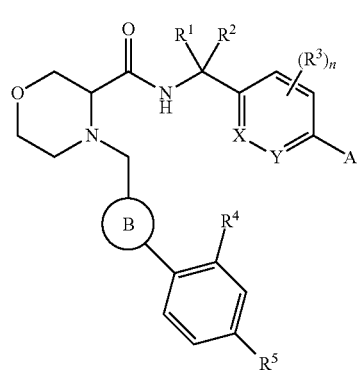

or a pharmaceutically acceptable salt, solvate, hydrate, tautomer or optical isomer thereof, wherein;

A is OR', C(O)R', CO$_2$R', C(O)N(R')$_2$, C(O)N(R')S(O)$_2$R', S(O)$_2$R', S(O)$_2$OR', SO$_2$N(R')$_2$, C$_{1-8}$ alkyl, cycloalkyl, heterocycloalkyl, aryl, or heteroaryl;

Ring B is aryl or heteroaryl;

X and Y are each independently CR" or N, wherein at least one of X and Y is CH;

$R^1$ and $R^2$ are each independently H, C$_{1-6}$ alkyl, C$_{1-6}$ alkoxy, or $R^1$ and $R^2$, together with the carbon atom to which they are attached, form a C$_{3-6}$ cycloalkane-1,1-diyl;

each $R^3$ is independently selected from H, OR', COOR', C(O)R', halo, or C$_{1-6}$ alkyl;

$R^4$ is H, C$_{1-6}$ alkyl, C$_{1-3}$ alkoxy optionally substituted with 1-3 fluorine atoms, halo, CN, NO$_2$, OR', CO$_2$R', or C(O)R';

$R^5$ is OR', OC(O)R', OC(O)OR', CO$_2$R', CON(R')$_2$, SO$_2$N(R')$_2$, SO$_2$R', OSO$_2$R', or OSO$_2$N(R')$_2$;

each R' is independently H, C$_{1-6}$ alkyl, or C$_{3-6}$ cycloalkyl;

each R" is H, C$_{1-6}$ alkyl, halo, or OR'; and n is 0, 1, 2, or 3;

wherein at each occurrence, alkyl and cycloalkyl are each optionally and independently substituted with up to 3 instances of OH, SH, CN, NO$_2$, CO$_2$H, halo, or COOC$_{1-4}$ alkyl;

wherein heterocycloalkyl, aryl, and heteroaryl are each optionally and independently substituted with up to 3 instances of OR', SR', CN, NO$_2$, CO$_2$R', halo, C$_{1-4}$ alkyl, or oxo.

In another aspect, the invention includes a pharmaceutical composition comprising a compound described herein, and a pharmaceutically acceptable excipient.

In another aspect, the invention includes a kit comprising a compound described herein and at least one additional therapeutic agent selected from the group consisting of aminosalicylates, corticosteroids, immunomodulators and combinations thereof.

In another aspect, the invention includes a compound described herein, a composition described herein, or a kit described herein for use as a medicament.

In another aspect, the invention includes a compound described herein, a composition described herein, or a kit described herein for use in the treatment of an EP4 receptor mediated disease.

In another aspect, the invention includes a method of modulating EP4 receptor agonist activity in a biological sample, the method comprising contacting said EP4 receptor with a compound or composition described herein.

In another aspect, the invention includes a method of treating an EP4 receptor mediated disease, the method comprising administering to a patient in need thereof a compound or composition described herein.

The compounds herein may be used as $EP_4$ receptor agonists. The compounds herein may selectively act at $EP_4$ receptor. The compounds may be used in the manufacture of compositions or medicaments. The compounds, compositions or medicaments may be used in treating, preventing, ameliorating, controlling or reducing the risk of diseases or disorders in which $EP_4$ receptors are involved. The compounds, compositions or medicaments may be used in treating, preventing, ameliorating, controlling or reducing the risk of gastrointestinal disorders and conditions, including but not limited to constipation disorders, constipation-predominant irritable bowel syndrome, mixed type irritable bowel syndrome, chronic idiopathic constipation, gastrointestinal symptoms associated with Parkinson's disease, gastrointestinal symptoms associated with cystic fibrosis, intestinal dysmotility, postoperative ileus, food allergy or food intolerance, celiac disease, gastrointestinal motility disorders, functional gastrointestinal disorders, drug induced enteropathy, NSAID induced gastric and intestinal injury, chemotherapy induced mucositis, gastroesophageal reflux disease (GERD), duodenogastric reflux, diarrhoeal diseases, immune mediated gastrointestinal diseases, Crohn's disease, ulcerative colitis, inflammatory bowel disease and ischemic colitis.

The compounds, compositions or medicaments may also be used in treating, preventing, ameliorating, controlling or reducing the risk of pulmonary diseases and conditions such as chronic obstructive pulmonary diseases, asthma, chronic bronchitis, cystic fibrosis, emphysema, chronic idiopathic cough, hyperactive airway disorder and idiopathic pulmonary fibrosis.

DETAILED DESCRIPTION OF THE INVENTION

The invention relates to novel compounds. The invention also relates to the use of novel compounds as agonists of the $EP_4$ receptor. The invention further relates to the use of novel compounds in the manufacture of medicaments for use as $EP_4$ receptor agonists and methods of treatment comprising administering a compound of the invention as an $EP_4$ receptor agonist.

The compounds of Formula I may be used in treating, preventing, ameliorating, controlling or reducing the risk of diseases or disorders in which $EP_4$ receptors are involved. The compounds of Formula I may be used in treating, preventing, ameliorating, controlling or reducing the risk of gastrointestinal disorders and conditions, including but not limited to constipation disorders, constipation-predominant irritable bowel syndrome, mixed type irritable bowel syndrome, chronic idiopathic constipation, gastrointestinal symptoms associated with Parkinson's disease, gastrointestinal symptoms associated with cystic fibrosis, intestinal dysmotility, postoperative ileus, food allergy or food intolerance, celiac disease, gastrointestinal motility disorders, functional gastrointestinal disorders, drug induced enteropathy, NSAID induced gastric and intestinal injury, chemotherapy induced mucositis, gastroesophageal reflux disease (GERD), duodenogastric reflux, diarrhoeal diseases, immune mediated gastrointestinal diseases, Crohn's disease, ulcerative colitis, inflammatory bowel disease and ischemic colitis.

The compounds of Formula I may also be used in treating, preventing, ameliorating, controlling or reducing the risk of pulmonary diseases and conditions such as chronic obstructive pulmonary diseases, asthma, chronic bronchitis, cystic fibrosis, emphysema, chronic idiopathic cough, hyperactive airway disorder and idiopathic pulmonary fibrosis.

Certain novel compounds of the invention show particularly high activities as $EP_4$ receptor agonists.

The compounds of the invention have been demonstrated to have activity as $EP_4$ receptor agonists. Compounds of the invention also possess low gastrointestinal permeability, as demonstrated by Caco-2 studies. It is therefore believed that the compounds of the invention exhibit low systemic bioavailability when administered orally. Functional agonism of $EP_4$ receptors expressed in the gastrointestinal tract has the potential to treat a range of gastrointestinal disorders. The combination of $EP_4$ receptor agonist activity and low gastrointestinal permeability suggests that compounds of the invention are useful for the treatment of a range of gastrointestinal disorders without cardiovascular side effects arising from systemic distribution.

In one aspect, the invention provides a compound of the Formula I:

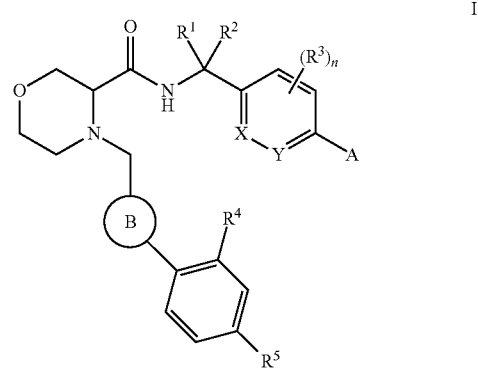

I or a pharmaceutically acceptable salt, solvate, hydrate, tautomer or optical isomer thereof, wherein;

A is OR', C(O)R', $CO_2R'$, $C(O)N(R')_2$, C(O)N(R') $S(O)_2R'$, $S(O)_2R'$, $S(O)_2OR'$, $SO_2N(R')_2$, $C_{1-8}$ alkyl, cycloalkyl, heterocycloalkyl, aryl, or heteroaryl;

Ring B is aryl or heteroaryl;

X and Y are each independently CR" or N, wherein at least one of X and Y is CH;

$R^1$ and $R^2$ are each independently H, $C_{1-6}$ alkyl, $C_{1-6}$ alkoxy, or $R^1$ and $R^2$, together with the carbon atom to which they are attached, form a $C_{3-6}$ cycloalkane-1,1-diyl;

each $R^3$ is independently selected from H, OR', COOR', C(O)R', halo, or $C_{1-6}$ alkyl;

$R^4$ is H, $C_{1-6}$ alkyl, $C_{1-3}$ alkoxy optionally substituted with 1-3 fluorine atoms, halo, CN, $NO_2$, OR', $CO_2R'$, or C(O)R';

$R^5$ is OR', OC(O)R', OC(O)OR', $CO_2R'$, $CON(R')_2$, $SO_2N(R')_2$, $SO_2R'$, $OSO_2R'$, or $OSO_2N(R')_2$;

each R' is independently H, $C_{1-6}$ alkyl, or $C_{3-6}$ cycloalkyl;

each R" is H, $C_{1-6}$ alkyl, halo, or OR'; and n is 0, 1, 2, or 3;

wherein at each occurrence, alkyl and cycloalkyl are each optionally and independently substituted with up to 3 instances of OH, SH, CN, $NO_2$, $CO_2H$, halo, or $COOC_{1-4}$ alkyl;

wherein heterocycloalkyl, aryl, and heteroaryl are each optionally and independently substituted with up to 3 instances of OR', SR', CN, NO$_2$, CO$_2$R', halo, C$_{1-4}$ alkyl, or oxo.

In some embodiments, the compound is a compound of the Formula I:

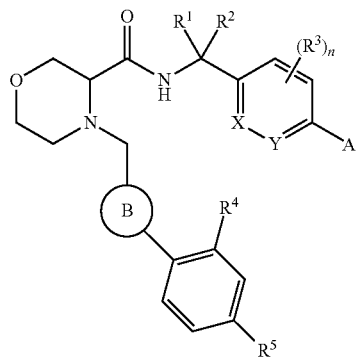

or a pharmaceutically acceptable salt, solvate, hydrate, tautomer or optical isomer thereof, wherein;

A is OR', C(O)R', CO$_2$R', C(O)N(R')$_2$, C(O)N(R')S(O)$_2$R', S(O)$_2$R', S(O)$_2$OR', SO$_2$N(R')$_2$, C$_{1-8}$ alkyl, cycloalkyl, heterocycloalkyl, aryl, or heteroaryl;

Ring B is aryl or heteroaryl;

X and Y are each independently CR" or N, wherein at least one of X and Y is CH;

R$^1$ and R$^2$ are each independently H, C$_{1-6}$ alkyl, C$_{1-6}$ alkoxy, or R$^1$ and R$^2$, together with the carbon atom to which they are attached, form a C$_{3-6}$ cycloalkane-1,1-diyl ring;

each R$^3$ is independently selected from H, OR', COOR', C(O)R', halo, or C$_{1-6}$ alkyl;

R$^4$ is H, C$_{1-6}$ alkyl, halo, CN, NO$_2$, OR', CO$_2$R', or C(O)R';

R$^5$ is OR', OC(O)R', OC(O)OR', CO$_2$R', CON(R')$_2$, SO$_2$N(R')$_2$, SO$_2$R', OSO$_2$R', or OSO$_2$N(R')$_2$;

each R' is independently H, C$_{1-6}$ alkyl, or C$_{3-6}$ cycloalkyl;

each R" is H, C$_{1-6}$ alkyl, halo, or OR'; and n is 0, 1, 2, or 3;

wherein at each occurrence, alkyl and cycloalkyl are each optionally and independently substituted with up to 3 instances of OH, SH, CN, NO$_2$, CO$_2$H, halo, or COOC$_{1-4}$ alkyl;

wherein heterocycloalkyl, aryl, and heteroaryl are each optionally and independently substituted with up to 3 instances of OR', SR', CN, NO$_2$, CO$_2$R', halo, C$_{1-4}$ alkyl, or oxo.

In some embodiments, the compound is a compound of Formula I, Formula (1), Formula (Ia), Formula (Ib), Formula (2), Formula (2a), Formula (2b), Formula 3, Formula (3a), Formula (3b), Formula (4), Formula (4a), Formula (4b), Formula IIa, IIb, IIc, IId, or IIe or a pharmaceutically acceptable salt or tautomer thereof.

In some embodiments, the compound is a compound of Formula I, Formula (1), Formula (Ia), Formula (Ib), Formula (2), Formula (2a), Formula (2b), Formula 3, Formula (3a), Formula (3b), Formula (4), Formula (4a), Formula (4b), Formula IIa, IIb, IIc, IId, or IIe or a pharmaceutically acceptable salt thereof.

In some embodiments, provided herein is a compound of Formula IIa, IIb, IIc, IId, or IIe:

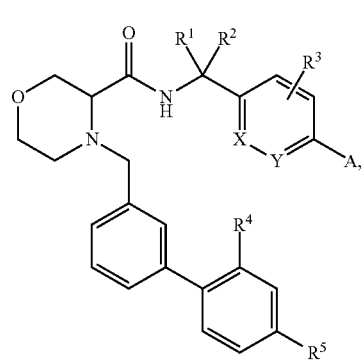

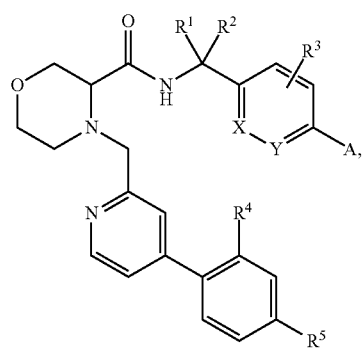

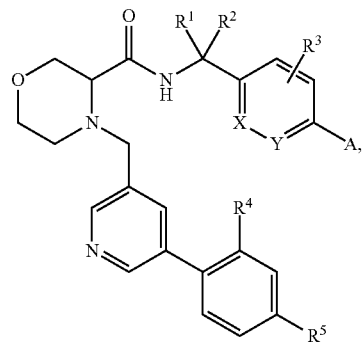

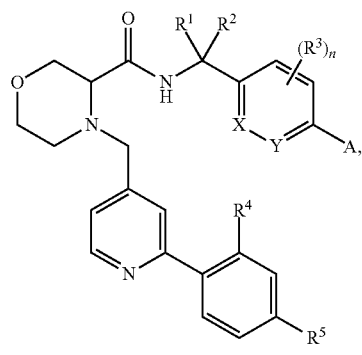

-continued

IIe or a pharmaceutically acceptable salt, solvate, hydrate, tautomer or optical isomer thereof, wherein A, X, Y, $R^1$, $R^2$, $R^3$, $R^4$, and $R^5$ are as defined above.

In some embodiments, A is $CO_2R'$, $C(O)N(R')S(O)_2R'$, $S(O)_2R'$, or heteroaryl.

In some embodiments, A is COOH or 5-membered heteroaryl, optionally substituted with OR' or SR'.

In some embodiments, Ring B is a 5-6 membered aryl or a 5-6 membered heteroaryl, each of which is optionally and independently substituted with up to 3 instances of OR', SR', CN, $NO_2$, $CO_2R'$, halo, $C_{1-4}$ alkyl, or oxo.

In some embodiments, Ring B is a 5-6 membered aryl or a 5-6 membered heteroaryl.

In some embodiments, Ring B is phenyl, which is optionally substituted with up to three instances of OH.

In some embodiments, Ring B is a 6 membered heteroaryl comprising one or two nitrogen atoms, and each nitrogen is optionally substituted with oxo.

In some embodiments, Ring B is a phenyl, pyridine, or pyridine-N-oxide ring, each of which is optionally substituted with OR'.

In some embodiments, each $R^3$ is independently selected from OR', halo, or $C_{1-6}$ alkyl.

In some embodiments, each $R^3$ is independently selected from OR' or alkyl; and n is 1.

In some embodiments, n is 0, 1 or 2.

In some embodiments, n is 0 or 1.

In some embodiments, n is 0.

In some embodiments, $R^4$ is H, $C_{1-6}$ alkyl, halo, or OR'.

In some embodiments, $R^4$ is H, methyl, or OH.

In some embodiments, $R^5$ is OR', OC(O)R', $CO_2R'$, $CON(R')_2$, $SO_2N(R')_2$, $SO_2R'$, or $OSO_2N(R')_2$.

In some embodiments, $R^5$ is OR', $CO_2R'$, $CON(R')_2$, $SO_2N(R')_2$, or $OSO_2N(R')_2$.

In some embodiments, $R^5$ is OH, $CO_2H$, $CONH_2$, $SO_2NH_2$, or $OSO_2NH_2$.

In some embodiments, $R^5$ is $CONH_2$ or $SO_2NH_2$.

In some embodiments, $R^5$ is $CONH_2$.

In some embodiments, the compound is a compound of Formula (1):

(1)

or a pharmaceutically acceptable salt, solvate, hydrate, tautomer or optical isomer thereof, wherein U, V, W, and Z are each independently selected from the group consisting of CH, COH, N or $N^+$—$O^-$, wherein at least three of U, V, W and Z are CH; X, Y, $R^1$, $R^2$, $R^3$, $R^4$ and $R^5$ are as described herein.

In some embodiments, the compound is a compound of Formula (1):

(1)

or a pharmaceutically acceptable salt, solvate, hydrate, tautomer or optical isomer thereof, wherein;

A is selected from the group consisting of:

-continued

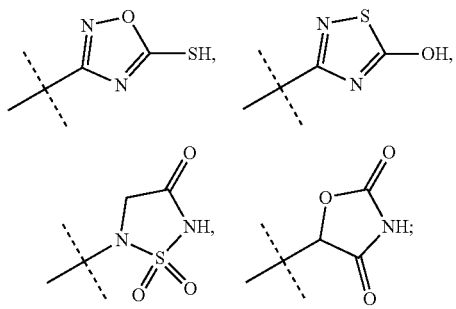

U, V, W, and Z are each independently selected from the group consisting of CH, COH, N or $N^+$—$O^-$, wherein at least three of U, V, W and Z are CH; and X and Y are each independently selected from the group consisting of CH, CF, COH or N;

$R^1$ and $R^2$ are independently H, $C_{1-3}$ alkyl optionally substituted with 1-3 fluorine atoms or is joined to $R^2$ to form a $C_{3-6}$ cycloalkyl ring which is optionally substituted with 1-3 fluorine atoms;

$R^3$ is H, OH or F;

$R^4$ is H, OH, CN, halo, $C_{1-3}$ alkoxy optionally substituted with 1-3 fluorine atoms or $C_{1-3}$ alkyl optionally substituted with 1-3 fluorine atoms;

$R^5$ is OH, $CO_2H$, $CONH_2$, $SO_2NH_2$ or $OSO_2NH_2$; and $R^6$ is $C_{1-3}$ alkyl or a $C_{3-6}$ cycloalkyl ring.

In some embodiments, A is selected from the group consisting of:

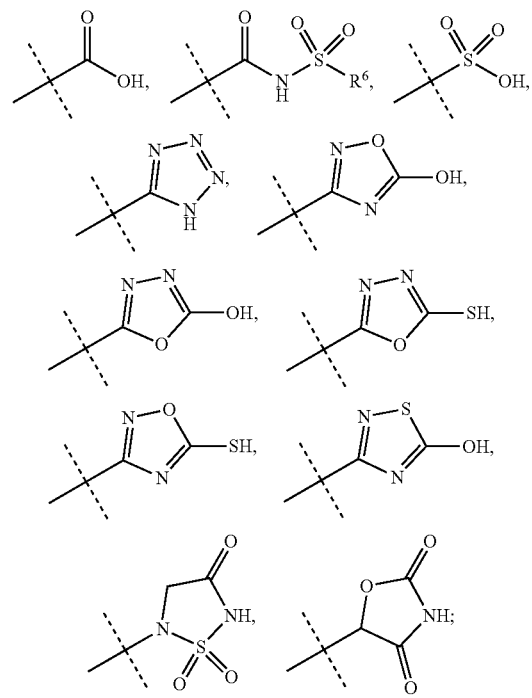

and $R^6$ is $C_{1-3}$ alkyl or a $C_{3-6}$ cycloalkyl ring.

In some embodiments, A is:

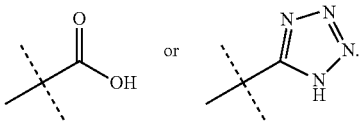

In some embodiments, $R^3$ is halo or OR'. In another embodiment, $R^3$ is F or OH, and n is 0, 1, or 2.

In some embodiments, X and Y are each independently selected from the group consisting of CH, CF, COH or N.

In some embodiments, at least one of X and Y is CH.

In some embodiments, X and Y are both CH.

In some embodiments, provided herein is a compound of Formula IIa, IIb, IIc, IId, or IIe In some embodiments, $R^1$ and $R^2$ are each independently H, $C_{1-6}$ alkyl, halo, or hydroxy, or $R^1$ and $R^2$, together with the carbon atom to which they are attached, form a $C_{3-6}$ membered cycloalkyl.

In some embodiments, $R^1$ and $R^2$ are each independently selected from the group consisting of H, $C_{1-3}$ alkyl optionally substituted with 1-3 fluorine atoms or $R^1$ is joined to $R^2$ to form a $C_{3-6}$ cycloalkyl ring which is optionally substituted with 1-3 fluorine atoms.

In some embodiments, $R^1$ and $R^2$ are each independently H or methyl, or $R^1$ and $R^2$, together with the carbon atom to which they are attached, form a cyclopropyl.

In some embodiments, $R^4$ is H, OH, halo, $C_{1-6}$ alkoxy, or $C_{1-6}$ alkyl, wherein the alkyl and alkoxy are each optionally and independently substituted with halo. In a further embodiment, $R^4$ is H, OH, or methyl.

In some embodiments, $R^5$ is OR', $CO_2R'$, $CON(R')_2$, $SO_2N(R')_2$ or $OSO_2N(R')_2$. In a further embodiment, $R^5$ is OH, $CO_2H$, $CONH_2$, $SO_2NH_2$ or $OSO_2NH_2$.

In some embodiments, the invention includes a pharmaceutical composition comprising a compound, pharmaceutically acceptable salt, solvate, hydrate, tautomer or optical isomer described herein and a pharmaceutically acceptable excipient.

In some embodiments, the invention includes a pharmaceutical composition comprising a compound or salt described herein and a pharmaceutically acceptable excipient.

In some embodiments, the pharmaceutical composition further comprises at least one additional therapeutic agent selected from the group consisting of aminosalicylates, corticosteroids, immunomodulators and combinations thereof.

In another aspect, the invention includes a method of modulating EP4 receptor agonist activity in a biological sample, the method comprising contacting said EP4 receptor with a compound or salt or composition described herein.

In still another aspect, the invention includes a method of treating an EP4 receptor mediated disease, the method comprising administering to a patient in need thereof a compound or salt or composition described herein.

In one embodiment of this aspect, the EP4 receptor mediated disease is a gastrointestinal disorder.

In a further embodiment, the gastrointestinal disorder is selected from the group consisting of constipation disorders, constipation-predominant irritable bowel syndrome, mixed type irritable bowel syndrome, chronic idiopathic constipation, gastrointestinal symptoms associated with Parkinson's disease, gastrointestinal symptoms associated with cystic fibrosis, intestinal dysmotility, postoperative ileus, food allergy or food intolerance, celiac disease, gastrointestinal motility disorders, functional gastrointestinal disorders, drug induced enteropathy, NSAID induced gastric and intestinal injury, chemotherapy induced mucositis, gastroesophageal reflux disease (GERD), duodenogastric reflux, diarrhoeal diseases, immune mediated gastrointestinal diseases, Crohn's disease, ulcerative colitis, inflammatory bowel disease and ischemic colitis, or pulmonary diseases and conditions such as chronic obstructive pulmonary diseases, asthma, chronic bronchitis, cystic fibrosis, emphysema, chronic idiopathic cough, hyperactive airway disorder and idiopathic pulmonary fibrosis.

In some embodiments, provided herein is a compound of Formula (1a) or Formula (1b):

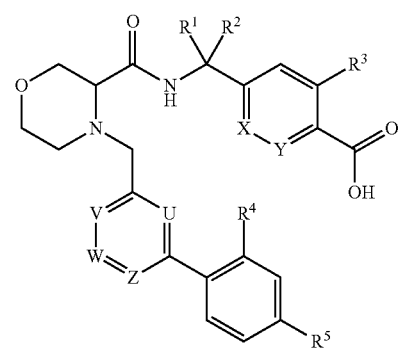
(1a)

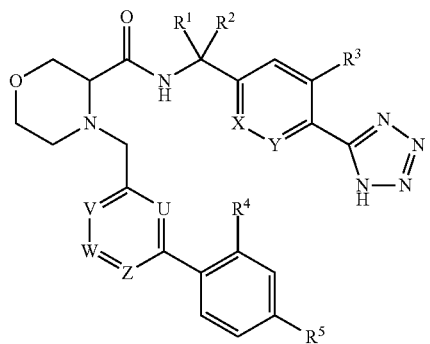
(1b)

or a pharmaceutically acceptable salt, solvate, hydrate, tautomer or optical isomer thereof, wherein U, V, W, X, Y, Z, $R^1$, $R^2$, $R^3$, $R^4$ and $R^5$ are as described herein.

In some embodiments, provided herein is a compound of Formula (2), (2a) or (2b):

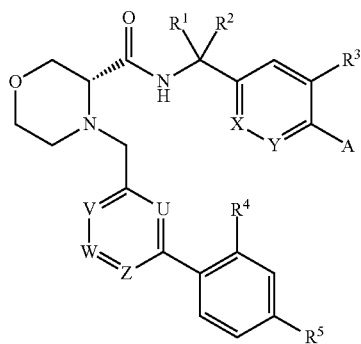
(2)

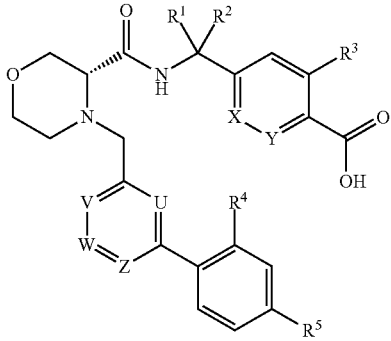
(2a)

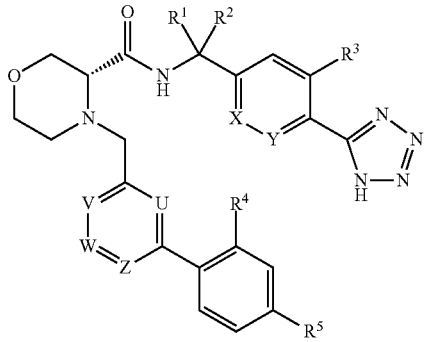
(2b)

or a pharmaceutically acceptable salt, solvate, hydrate or tautomer thereof, wherein A, U, V, W, X, Y, Z, $R^1$, $R^2$, $R^3$, $R^4$ and $R^5$ are as described herein.

In some embodiments, provided herein is a compound of Formula (2a) or (2b):

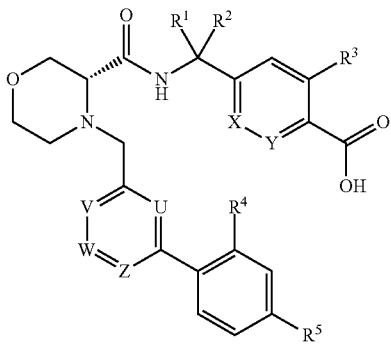
(2a)

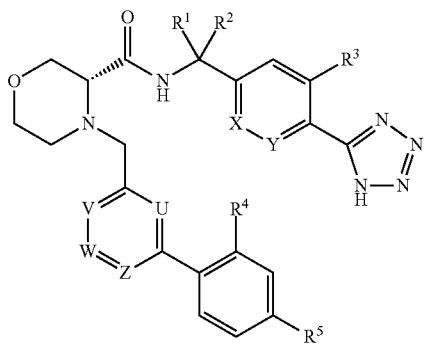
(2b)

or a pharmaceutically acceptable salt, solvate, hydrate or tautomer thereof, wherein;

U, V, W, and Z are each independently selected from the group consisting of CH, COH, N or $N^+$—$O^-$, wherein at least three of U, V, W and Z are CH; and X and Y are each independently selected from the group consisting of CH, CF, COH or N;

$R^1$ and $R^2$ are independently H, $C_{1-3}$ alkyl optionally substituted with 1-3 fluorine atoms or is joined to $R^2$ to form a $C_{3-6}$ cycloalkyl ring which is optionally substituted with 1-3 fluorine atoms;

$R^3$ is H, OH or F;

$R^4$ is H, OH, CN, halo, $C_{1-3}$ alkoxy optionally substituted with 1-3 fluorine atoms or $C_{1-3}$ alkyl optionally substituted with 1-3 fluorine atoms; and $R^5$ is OH, $CO_2H$, $CONH_2$, $SO_2NH_2$ or $OSO_2NH_2$.

In some embodiments, provided herein is a compound of Formula (3), (3a), or (3b):

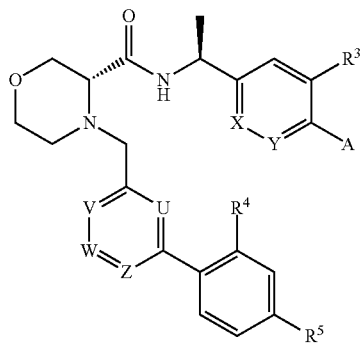

(3)

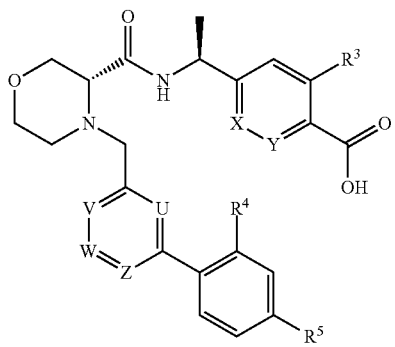

(3a)

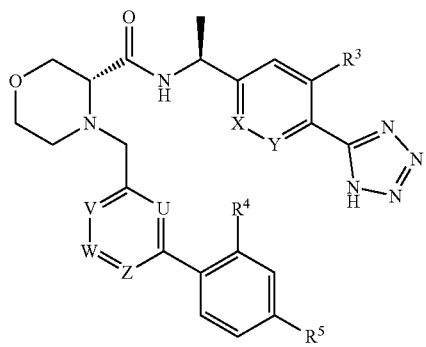

(3b)

or a pharmaceutically acceptable salt, solvate, hydrate or tautomer thereof, wherein A, U, V, W, X, Y, Z, $R^3$, $R^4$ and $R^5$ are as described herein.

In some embodiments, provided herein is a compound of Formula (3a), or (3b):

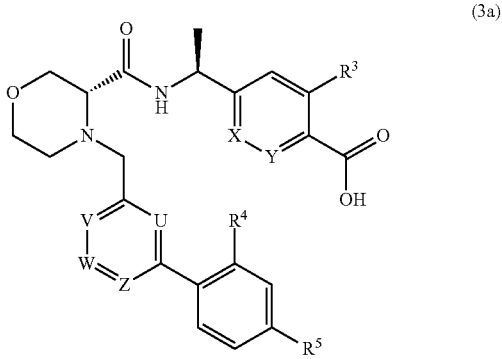

(3a)

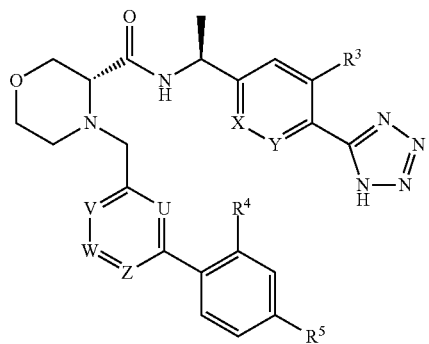

(3b)

or a pharmaceutically acceptable salt, solvate, hydrate or tautomer thereof, wherein;

U, V, W, and Z are each independently selected from the group consisting of CH, COH, N or $N^+$—$O^-$, wherein at least three of U, V, W and Z are CH;

X and Y are each independently selected from the group consisting of CH, CF, COH or N;

$R^3$ is H, OH or F;

$R^4$ is H, OH, CN, halo, $C_{1-3}$ alkoxy optionally substituted with 1-3 fluorine atoms or $C_{1-3}$ alkyl optionally substituted with 1-3 fluorine atoms; and $R^5$ is OH, $CO_2H$, $CONH_2$, $SO_2NH_2$ or $OSO_2NH_2$.

In some embodiments, provided herein is a compound of Formula (4), (4a), or (4b):

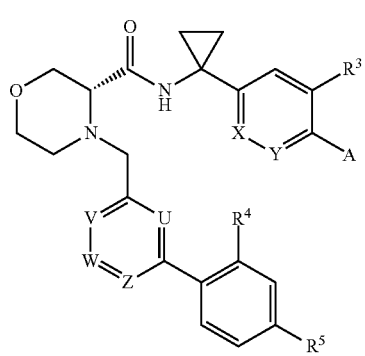

(4)

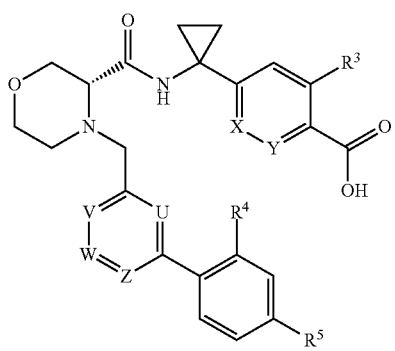

(4a)

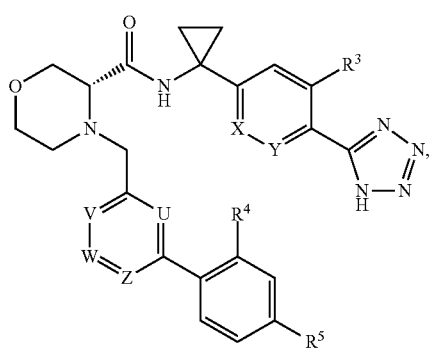

(4b)

or a pharmaceutically acceptable salt, solvate, hydrate or tautomer thereof, wherein A, U, V, W, X, Y, Z, R³, R⁴ and R⁵ are as described herein.

In some embodiments, the compound is a compound of Formula (1):

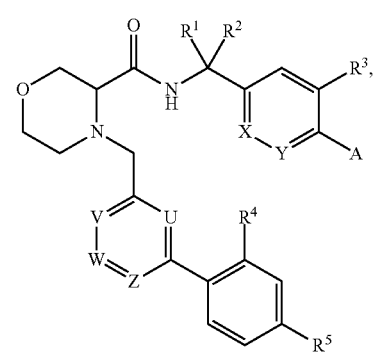

(1)

or a pharmaceutically acceptable salt, solvate, hydrate, tautomer or optical isomer thereof, wherein;

A is

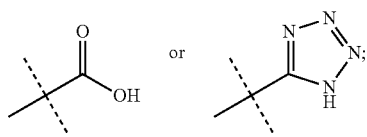

U is CH or N;
V is CH or N;
W is selected from the group consisting of CH, COH, N or N⁺—O⁻;
Z is selected from the group consisting of CH, COH or N;
X is CH or N;
Y is CH, CF, COH or N;
R¹ and R² are each independently selected from the group consisting of H or methyl, or R¹ and R² together with the carbon atom to which they are attached form cyclopropyl;
R³ is H, OH or F;
R⁴ is selected from the group consisting of H, methyl or OH; and
R⁵ is selected from the group consisting of OH, CONH₂, SO₂NH₂ or OSO₂NH₂.

In some embodiments, the compound is a compound of Formula (1a):

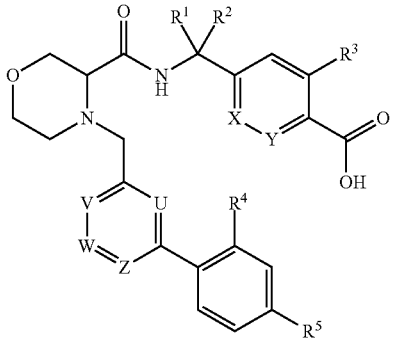

(1a)

or a pharmaceutically acceptable salt, solvate, hydrate, tautomer or optical isomer thereof, wherein;

U is CH or N;
V is CH or N;
W is selected from the group consisting of CH, COH, N or N⁺—O⁻;
Z is selected from the group consisting of CH, COH or N;
X is CH or N;
Y is CH, CF, COH or N;
R¹ and R² are each independently selected from the group consisting of H or methyl, or R¹ and R² together with the carbon atom to which they are attached form cyclopropyl;
R³ is H, OH or F;
R⁴ is selected from the group consisting of H, methyl or OH; and
R⁵ is selected from the group consisting of OH, CONH₂, SO₂NH₂ or OSO₂NH₂.

In some embodiments, the compound is a compound of Formula (2), (2a) or (2b) and U, V and Z can be CH and W can be COH.

In some embodiments, A can be selected from the group consisting of: CO₂H, tetrazole, 1,2,4-oxadiazol-5(2H)-one, 1,3,4-oxadiazol-2(3H)-one, CONHSO₂R⁶, CONHSO₂Me, SO₃H, 1,3,4-oxadiazole-2(3H)-thione, 1,2,4-oxadiazole-5(2H)-thione, 1,2,4-thiadiazol-5(2H)-one, 1,2,5-thiadiazolidin-3-one 1,1-dioxide and 2,4-oxazolidinedione.

In one embodiment, A can be selected from:

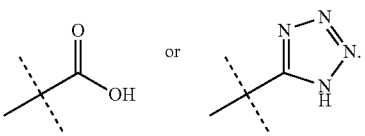

In some embodiments, A can be selected from CO$_2$H and a tetrazole ring. In a further embodiment, A can be CO$_2$H. In another further embodiment, A can be a tetrazole ring.

In some embodiments, U can be CH. In another embodiment, U can be COH. In another embodiment, U can be N. In another embodiment, U can be N$^+$—O$^-$.

In some embodiments, U is CH or N.

In some embodiments, V can be CH. In another embodiment, V can be COH. In another embodiment, V can be N. In another embodiment, V can be N$^+$—O$^-$.

In some embodiments, V is CH or N.

In some embodiments, W can be CH. In another embodiment, W can be COH. In another embodiment, W can be N. In another embodiment, W can be N$^+$—O$^-$.

In some embodiments, W is selected from the group consisting of CH, COH, N or N$^+$—O$^-$.

In some embodiments, Z can be CH. In another embodiment, Z can be COH. In another embodiment, Z can be N. In another embodiment, Z can be N$^+$—O$^-$.

In some embodiments, Z is selected from the group consisting of CH, COH or N.

In some embodiments, at least three of U, V, W and Z are CH. In another embodiment, U, V and W can be CH. In another embodiment, U, V and Z can be CH. In another embodiment, U, W and Z can be CH. In another embodiment, V, W and Z can be CH. In another embodiment, U, V, W and Z can be CH. In another embodiment, U, V and Z can be CH and W can be COH.

In some embodiments, X can be CH. In another embodiment, X can be CF. In another embodiment, X can be COH. In another embodiment, X can be N.

In some embodiments, X can be CH or N.

In some embodiments, Y can be CH. In another embodiment, Y can be CF. In another embodiment, Y can be COH. In another embodiment, Y can be N.

In some embodiments, Y can be CH, CF, COH or N.

In some embodiments, at least one of X and Y is CH. In another embodiment, X and Y can both be CH.

In some embodiments, X can be CH or N and Y can be CH, CF, COH or N.

In some embodiments, R$^1$ can be H or C$_{1-3}$ alkyl optionally substituted with 1-3 fluorine atoms. In another embodiment, R$^1$ can be H. In another embodiment, R$^1$ can be C$_{1-3}$ alkyl optionally substituted with 1-3 fluorine atoms. In another embodiment, R$^1$ can be C$_{1-3}$ alkyl. In another embodiment, R$^1$ can be joined to R$^2$ to form a C$_{3-6}$ cycloalkyl ring which is optionally substituted with 1-3 fluorine atoms. In another embodiment, R$^1$ can be joined to R$^2$ to form a C$_{3-6}$ cycloalkyl ring. In another embodiment, R$^1$ can be H or methyl or can be joined to R$^2$ to form a cyclopropane ring. In another embodiment, R$^1$ can be methyl optionally substituted with 1-3 fluorine atoms. In another embodiment, R$^1$ can be methyl. In another embodiment, R$^1$ can be joined to R$^2$ to form a cyclopropane ring which is optionally substituted with 1-3 fluorine atoms.

In another embodiment, R$^1$ can be joined to R$^2$ to form a cyclopropane ring.

In some embodiments, R$^2$ can be H. In another embodiment, R$^2$ can be C$_{1-3}$ alkyl optionally substituted with 1-3 fluorine atoms. In another embodiment, R$^2$ can be C$_{1-3}$ alkyl. In another embodiment, R$^2$ can be joined to R$^1$ to form a C$_{3-6}$ cycloalkyl ring which is optionally substituted with 1-3 fluorine atoms. In another embodiment, R$^2$ can be joined to R$^1$ to form a C$_{3-6}$ cycloalkyl ring. In another embodiment, R$^2$ can be joined to R$^1$ to form a cyclopropane ring which is optionally substituted with 1-3 fluorine atoms. In another embodiment, R$^2$ can be joined to R$^1$ to form a cyclopropane ring.

In some embodiments, R$^3$ can be H. In another embodiment, R$^3$ can be OH. In another embodiment, R$^3$ can be F.

In some embodiments, R$^3$ can be H, OH or F.

In some embodiments, R$^3$ can be H or F.

In some embodiments, R$^4$ and R$^5$ together with the ring to which they are attached can be selected from the group consisting of:

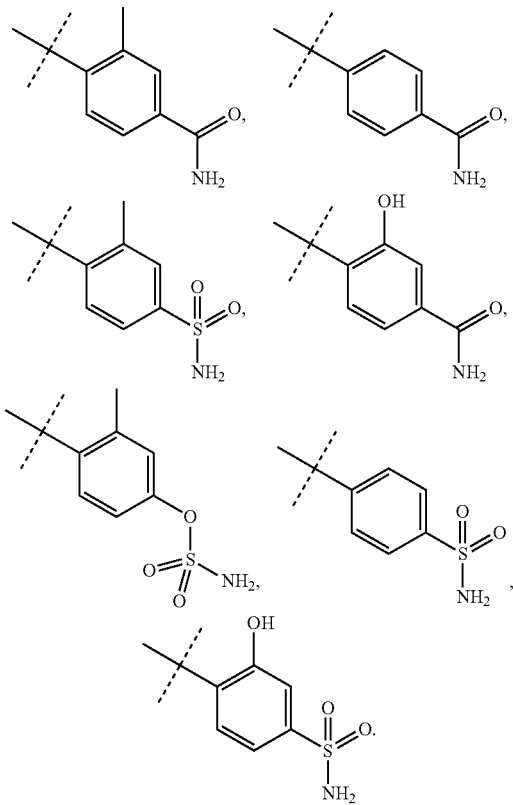

In some embodiments, R$^4$ can be H. R$^4$ can be OH. In another embodiment, R$^4$ can be CN. In another embodiment, R$^4$ can be halo. In another embodiment, R$^4$ can be F. In another embodiment, R$^4$ can be Cl. In another embodiment, R$^4$ can be Br. In another embodiment, R$^4$ can be C$_{1-3}$ alkoxy optionally substituted with 1-3 fluorine atoms. In another embodiment, R$^4$ can be C$_{1-3}$ alkoxy. In another embodiment, R$^4$ can be methoxy optionally substituted with 1-3 fluorine atoms. In another embodiment, R$^4$ can be methoxy. In another embodiment, R$^4$ can be C$_{1-3}$ alkyl optionally substituted with 1-3 fluorine atoms. In another embodiment, R$^4$ can be C$_{1-3}$ alkyl. In another embodiment, R$^4$ can be H or methyl. In another embodiment, R$^4$ can be methyl optionally substituted with 1-3 fluorine atoms. In another embodiment, R$^4$ can be methyl.

In some embodiments, R$^4$ is selected from the group consisting of H, OH, CN, halo, C$_{1-3}$ alkoxy optionally substituted with 1-3 fluorine atoms or C$_{1-3}$ alkyl optionally substituted with 1-3 fluorine atoms.

In some embodiments, R$^5$ can be OH. In another embodiment, R$^5$ can be CO$_2$H. In another embodiment, R$^5$ can be CONH$_2$. In another embodiment, R$^5$ can be SO$_2$NH$_2$. In another embodiment, R$^5$ can be OSO$_2$NH$_2$.

In some embodiments, $R^5$ can be OH, $CONH_2$, $SO_2NH_2$ or $OSO_2NH_2$.

In some embodiments, $R^6$ can be $C_{1-3}$ alkyl. In another embodiment, $R^6$ can be a $C_{3-6}$ cycloalkyl ring. In another embodiment, $R^6$ can be methyl.

In some embodiments, the compound or pharmaceutically acceptable salt disclosed herein possesses EP4 receptor agonist activity.

In some embodiments, disclosed herein is a method of treating an EP4 receptor mediated disease, the method comprising administering to a patient in need thereof a compound or pharmaceutically acceptable salt disclosed herein.

In some embodiments, the method of treating an EP4 receptor mediated disease is a gastrointestinal disorder.

In some embodiments, the gastrointestinal disorder is selected from the group consisting of constipation disorders, constipation-predominant irritable bowel syndrome, mixed type irritable bowel syndrome, chronic idiopathic constipation, gastrointestinal symptoms associated with Parkinson's disease, gastrointestinal symptoms associated with cystic fibrosis, intestinal dysmotility, postoperative ileus, food allergy or food intolerance, celiac disease, gastrointestinal motility disorders, functional gastrointestinal disorders, drug induced enteropathy, NSAID induced gastric and intestinal injury, chemotherapy induced mucositis, gastroesophageal reflux disease (GERD), duodenogastric reflux, diarrhoeal diseases, immune mediated gastrointestinal diseases, Crohn's disease, ulcerative colitis, inflammatory bowel disease and ischemic colitis, or pulmonary diseases and conditions such as chronic obstructive pulmonary diseases, asthma, chronic bronchitis, cystic fibrosis, emphysema, chronic idiopathic cough, hyperactive airway disorder, and idiopathic pulmonary fibrosis.

In some embodiments, the compound of Formula I or Formula (1) is the compounds listed in Table 1 or a pharmaceutically acceptable salt, solvate, hydrate or tautomer thereof.

In some embodiments, the compound of Formula I or Formula (1) is the compounds listed in Table 1, or a pharmaceutically acceptable salt thereof.

TABLE 1

Example compounds of Formula (I)

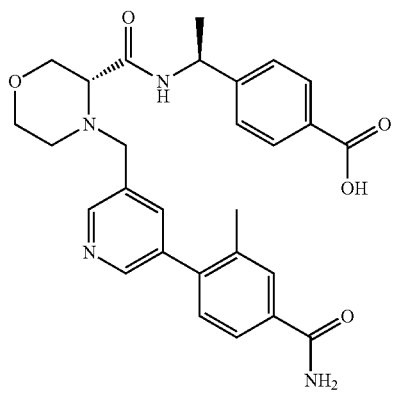

1

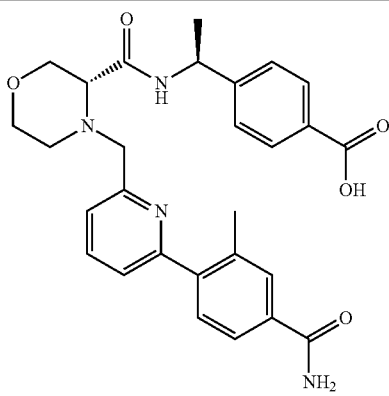

2

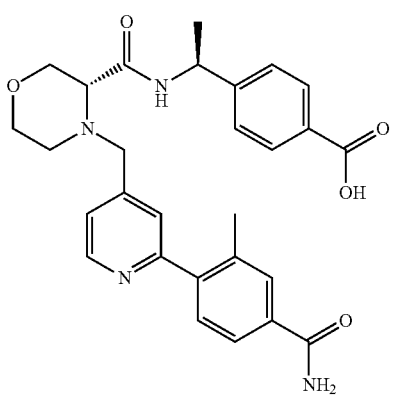 [SMILES: Cc1cc(C(N)=O)ccc1-c1cc(CN2CCOC[C@@H]2C(=O)N[C@@H](C)c2ccc(C(=O)O)cc2)ccn1]

3

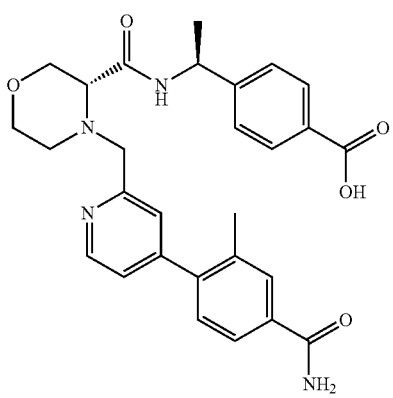

4

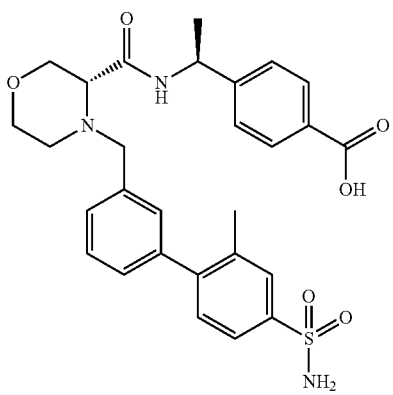

5

TABLE 1-continued
Example compounds of Formula (I)
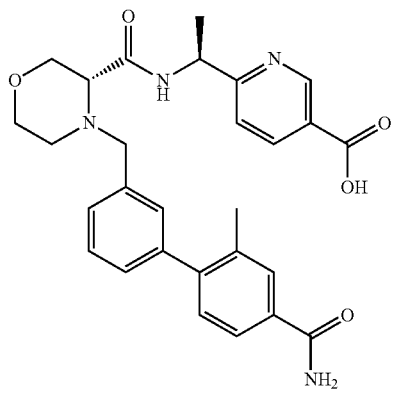
6
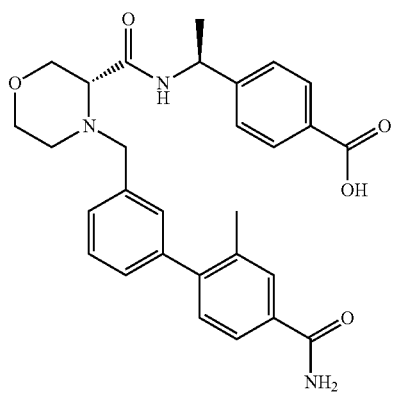
7
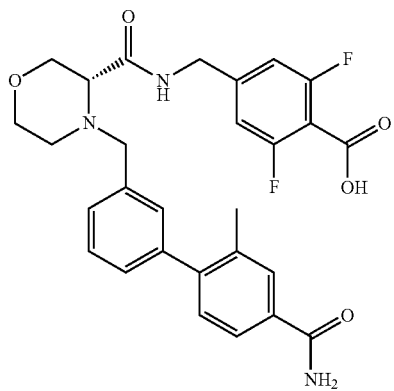
8
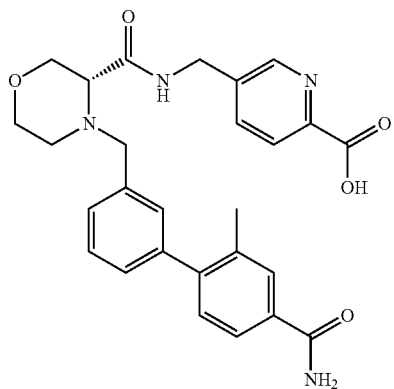
9
TABLE 1-continued
Example compounds of Formula (I)
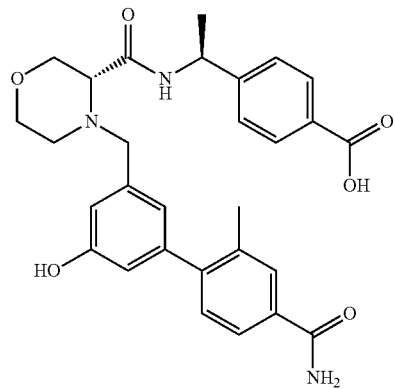 [SMILES: Cc1cc(C(N)=O)ccc1-c1cc(O)cc(CN2CCOC[C@@H]2C(=O)N[C@@H](C)c2ccc(C(=O)O)cc2)c1]
10
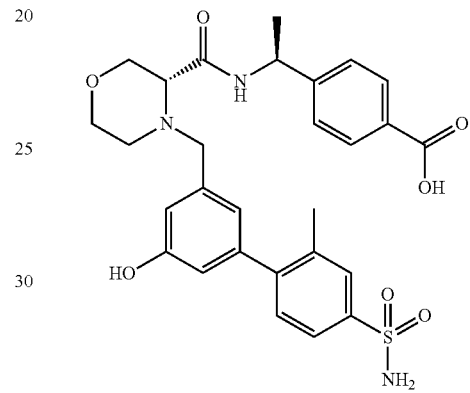
11
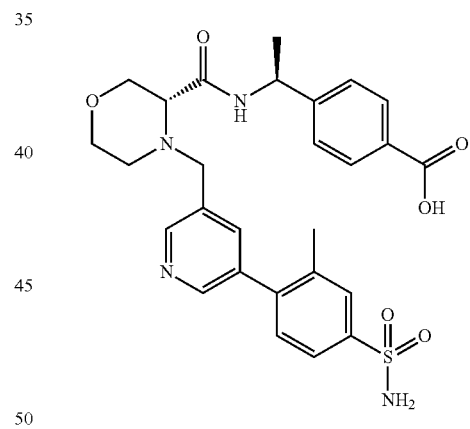
12
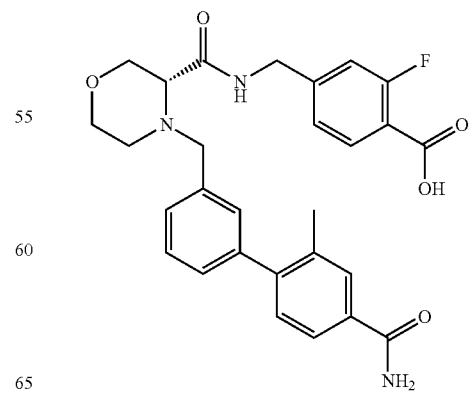
13

TABLE 1-continued
Example compounds of Formula (I)
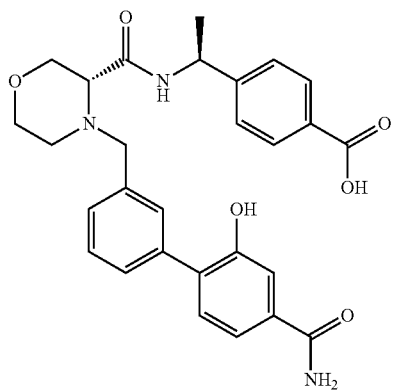 [SMILES: C[C@H](NC(=O)[C@H]1COCCN1Cc1cccc(-c2ccc(C(N)=O)cc2O)c1)c1ccc(C(=O)O)cc1]
14
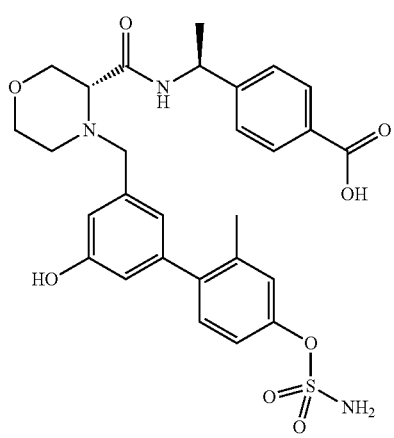 [SMILES: Cc1cc(OS(N)(=O)=O)ccc1-c1cc(O)cc(CN2CCOC[C@@H]2C(=O)N[C@@H](C)c2ccc(C(=O)O)cc2)c1]
15
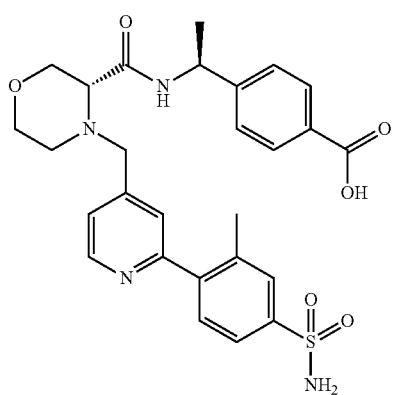 [SMILES: Cc1cc(S(N)(=O)=O)ccc1-c1cc(CN2CCOC[C@@H]2C(=O)N[C@@H](C)c2ccc(C(=O)O)cc2)ccn1]
16
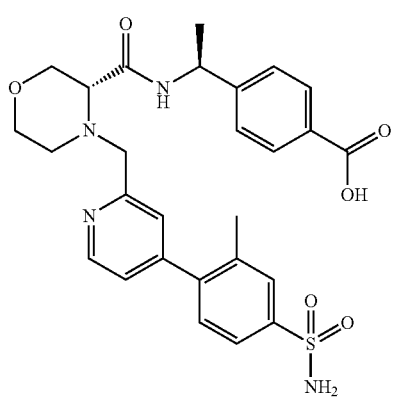 [SMILES: Cc1cc(S(N)(=O)=O)ccc1-c1ccnc(CN2CCOC[C@@H]2C(=O)N[C@@H](C)c2ccc(C(=O)O)cc2)c1]
17
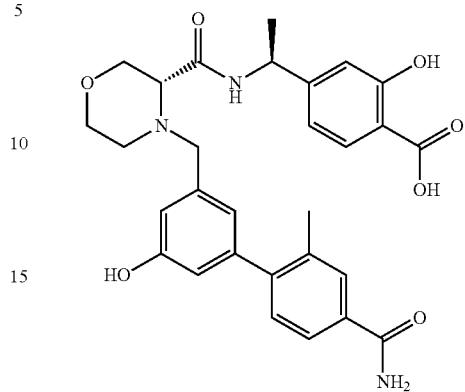
18
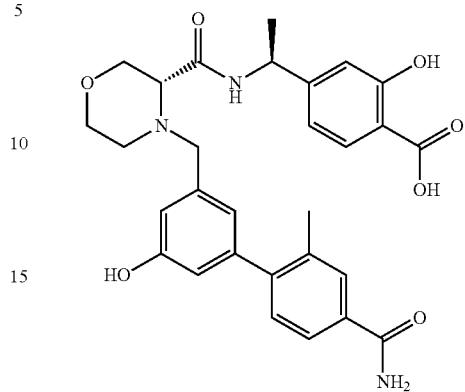
Example compounds of Formula (I) continued below:
19
20

TABLE 1-continued
Example compounds of Formula (I)
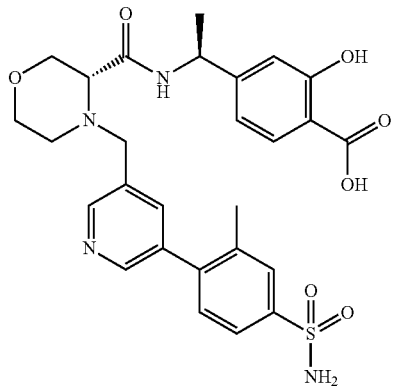 [SMILES: Cc1cc(S(N)(=O)=O)ccc1-c1cncc(CN2CCOC[C@@H]2C(=O)N[C@@H](C)c2ccc(C(=O)O)c(O)c2)c1]
21
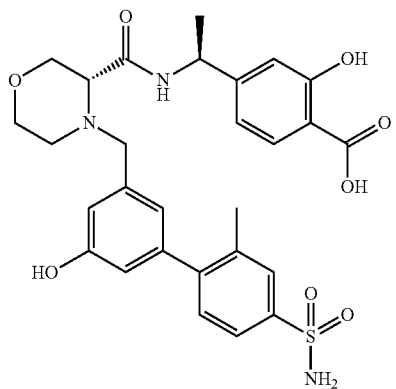 [SMILES: Cc1cc(S(N)(=O)=O)ccc1-c1cc(O)cc(CN2CCOC[C@@H]2C(=O)N[C@@H](C)c2ccc(C(=O)O)c(O)c2)c1]
22
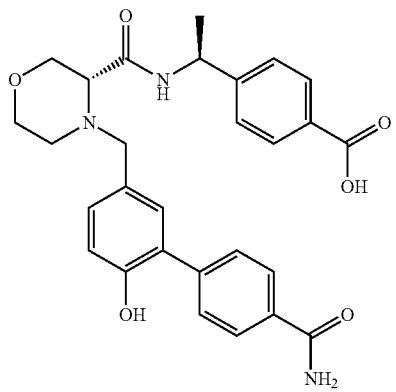 [SMILES: C[C@H](NC(=O)[C@H]1COCCN1Cc1ccc(O)c(-c2ccc(C(N)=O)cc2)c1)c1ccc(C(=O)O)cc1]
23
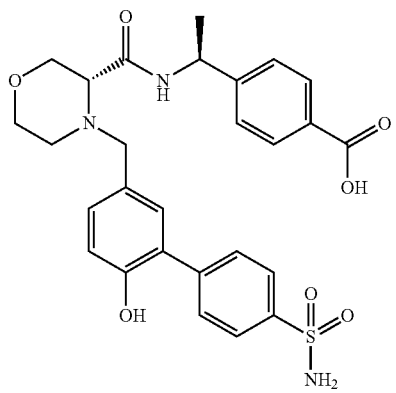 [SMILES: C[C@H](NC(=O)[C@H]1COCCN1Cc1ccc(O)c(-c2ccc(S(N)(=O)=O)cc2)c1)c1ccc(C(=O)O)cc1]
24
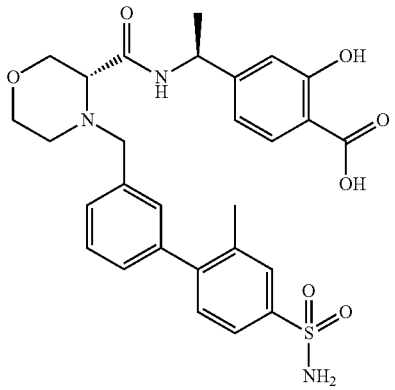 [SMILES: Cc1cc(S(N)(=O)=O)ccc1-c1cccc(CN2CCOC[C@@H]2C(=O)N[C@@H](C)c2ccc(C(=O)O)c(O)c2)c1]
25
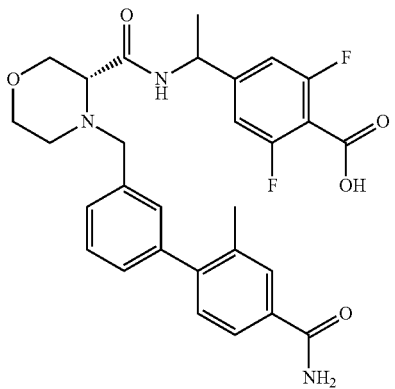 [SMILES: Cc1cc(C(N)=O)ccc1-c1cccc(CN2CCOC[C@@H]2C(=O)NC(C)c2cc(F)c(C(=O)O)c(F)c2)c1]
26
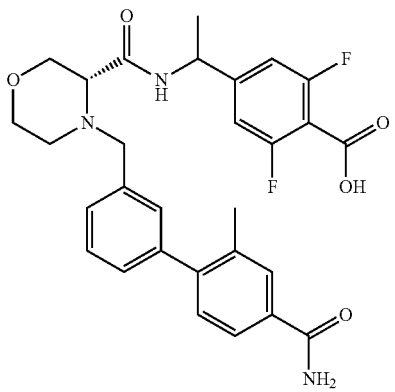 [SMILES: Cc1cc(C(N)=O)ccc1-c1cccc(CN2CCOC[C@@H]2C(=O)NC(C)c2cc(F)c(C(=O)O)c(F)c2)c1]
27
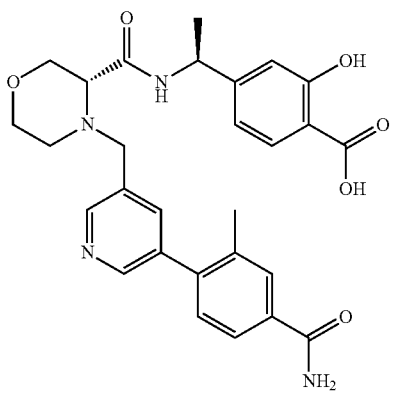 [SMILES: Cc1cc(C(N)=O)ccc1-c1cncc(CN2CCOC[C@@H]2C(=O)N[C@@H](C)c2ccc(C(=O)O)c(O)c2)c1]
28

TABLE 1-continued
Example compounds of Formula (I)
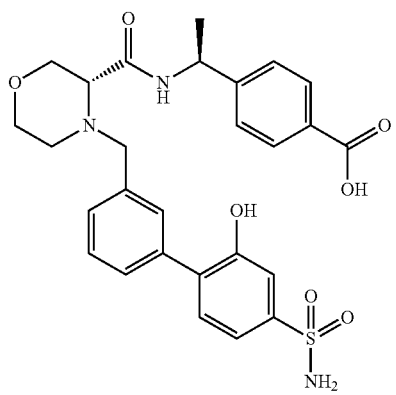 [SMILES: C[C@H](NC(=O)[C@H]1COCCN1Cc1cccc(-c2ccc(S(N)(=O)=O)cc2O)c1)c1ccc(C(=O)O)cc1]
29
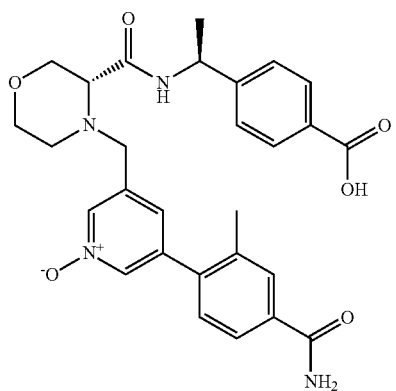
30
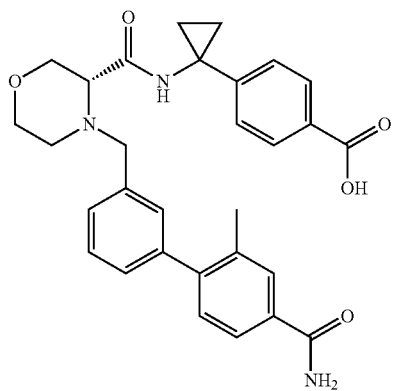 [SMILES: Cc1cc(C(N)=O)ccc1-c1cccc(CN2CCOC[C@@H]2C(=O)NC2(c3ccc(C(=O)O)cc3)CC2)c1]
31
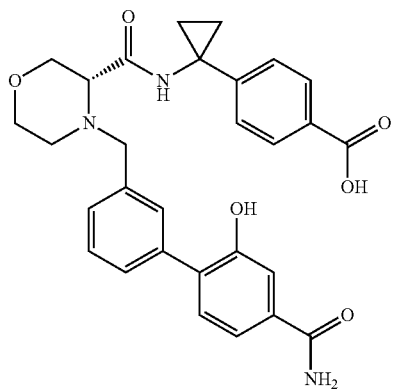
32
TABLE 1-continued
Example compounds of Formula (I)
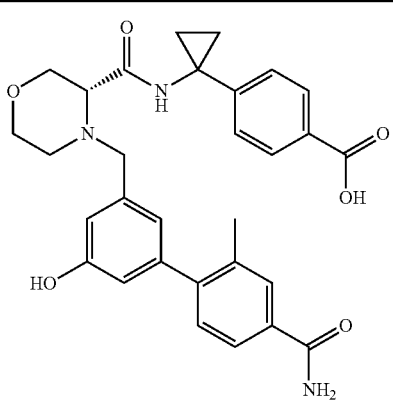
33
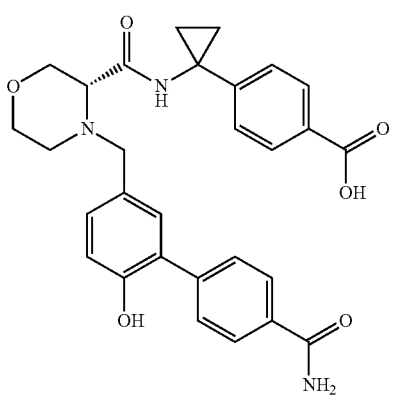
34
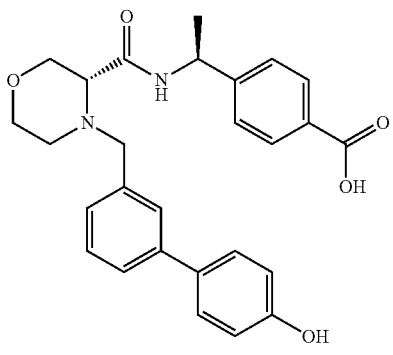
35
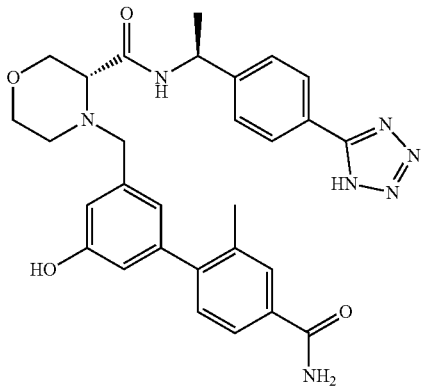
36

TABLE 1-continued

Example compounds of Formula (I)

| | |
|---|---|
| Compound 37 — structure: morpholine-3-carboxamide linked via N-CH to 4-carboxyphenyl (with (S)-methyl stereocenter), N-benzyl substituent bearing 3-hydroxy-5-(2-methyl-4-carbamoylphenyl)phenyl group | 37 |
| Compound 38 — analogous structure | 38 |
| Compound 39 — analogous structure | 39 |

ABBREVIATIONS

| | |
|---|---|
| aq | aqueous |
| Bn | benzyl |
| DCM | dichloromethane |
| DMA | dimethylacetamide |
| DMF | dimethylformamide |
| dppf | 1,1'-bis(diphenylphosphino)ferrocene |
| EDCI | 1-ethyl-3-(3-dimethylaminopropyl)carbodiimide |
| EtOAc | ethyl acetate |
| HATU | 1-[Bis(dimethylamino)methylene]-1H-1,2,3-triazolo[4,5-b]pyridinium 3-oxide hexafluorophosphate, |
| HOBt | hydroxybenzotriazole |
| HPLC | high performance liquid chromatography |
| hr | hour |
| hrs | hours |
| LC/MS | liquid chromatography mass spectrometry |
| M | molar |
| MeCN | acetonitrile |
| MeOH | methanol |
| N | normal |
| prep HPLC | preparative high-performance liquid chromatography |
| RT | room temperature |
| sat | saturated |
| THF | tetrahydrofuran |
| UPLC | ultra performance liquid chromatography |

Definitions

In this application, the following definitions apply, unless indicated otherwise.

The term "treatment", in relation to the uses of any of the compounds described herein, including those of Formula I, (1), (1a), (1b), (2), (2a), (2b), (3), (3a), (3b), (4), (4a) and (4b) is used to describe any form of intervention where a compound is administered to a subject suffering from, or at risk of suffering from, or potentially at risk of suffering from the disease or disorder in question. Thus, the term "treatment" covers both preventative (prophylactic) treatment and treatment where measurable or detectable symptoms of the disease or disorder are being displayed.

The term "effective therapeutic amount" (for example in relation to methods of treatment of a disease or condition) refers to an amount of the compound which is effective to produce a desired therapeutic effect. For example, if the condition is pain, then the effective therapeutic amount is an amount sufficient to provide a desired level of pain relief. The desired level of pain relief may be, for example, complete removal of the pain or a reduction in the severity of the pain.

As used herein, the term "hydroxyl" or "hydroxy" refers to an —OH moiety.

As used herein, an "alkyl" group refers to a saturated aliphatic hydrocarbon group containing 1-12 (e.g., 1-8, 1-6, or 1-4) carbon atoms. An alkyl group can be straight or branched. Examples of alkyl groups include, but are not limited to, methyl, ethyl, propyl, isopropyl, butyl, isobutyl, sec-butyl, tert-butyl, n-pentyl, n-heptyl, or 2-ethylhexyl. An alkyl group can be substituted (i.e., optionally substituted) with one or more substituents such as halo, phospho, cycloaliphatic [e.g., cycloalkyl or cycloalkenyl], heterocycloaliphatic [e.g., heterocycloalkyl or heterocycloalkenyl], aryl, heteroaryl, alkoxy, aroyl, heteroaroyl, acyl [e.g., (aliphatic) carbonyl, (cycloaliphatic)carbonyl, or (heterocycloaliphatic) carbonyl], nitro, cyano, amido [e.g., (cycloalkylalkyl)carbonylamino, arylcarbonylamino, aralkylcarbonylamino, (heterocycloalkyl)carbonylamino, (heterocycloalkylalkyl) carbonylamino, heteroarylcarbonylamino, heteroaralkylcarbonylamino alkylaminocarbonyl, cycloalkylaminocarbonyl, heterocycloalkylaminocarbonyl, arylaminocarbonyl, or heteroarylaminocarbonyl], amino [e.g., aliphaticamino, cycloaliphaticamino, or heterocycloaliphaticamino], sulfonyl [e.g., aliphatic-$SO_2$-], sulfinyl, sulfanyl, sulfoxy, urea, thiourea, sulfamoyl, sulfamide, oxo, carboxy, carbamoyl, cycloaliphaticoxy, heterocycloaliphaticoxy, aryloxy, heteroaryloxy, aralkyloxy, heteroarylalkoxy, alkoxycarbonyl, alkylcarbonyloxy, or hydroxy. Without limitation, some examples of substituted alkyls include carboxyalkyl (such as HOOC-alkyl, alkoxycarbonylalkyl, and alkylcarbonyloxyalkyl), cyanoalkyl, hydroxyalkyl, alkoxyalkyl, acylalkyl, aralkyl, (alkoxyaryl)alkyl, (sulfonylamino)alkyl (such as (alkyl-SO$_2$-amino)alkyl), aminoalkyl, amidoalkyl, (cycloaliphatic)alkyl, or haloalkyl.

As used herein, an "alkylene" or "cycloalkane" group refers to a bivalent branched, straight, or cyclic alkyl group that contains 2-12 (e.g. 2-8, 2-6, or 2-4) carbon atoms, and serves to connect two chemical moieties. Examples of alkylene groups include, but are not limited to methylene, ethylene, propylene, butylene, isopropylene (methylethylene), and isobutylene (2-methylpropylene). An alkylene or cycloalkane group can be substituted (i.e., optionally substituted) with one or more substituents as defined in the alkyl group.

As used herein, an "amido" encompasses both "aminocarbonyl" and "carbonylamino." These terms when used alone or in connection with another group refer to an amido group such as —N(R$^X$)—C(O)—R$^Y$ or —C(O)—N(R$^X$)$_2$, when used terminally, and —C(O)—N(R$^X$)— or —N(R$^X$)—C(O)— when used internally, wherein R$^X$ and R$^Y$ can be aliphatic, cycloaliphatic, aryl, araliphatic, heterocycloaliphatic, heteroaryl or heteroaraliphatic. Examples of amido groups include alkylamido (such as alkylcarbonylamino or alkylaminocarbonyl), (heterocycloaliphatic)amido, (heteroaralkyl)amido, (heteroaryl)amido, (heterocycloalkyl)alkylamido, arylamido, aralkylamido, (cycloalkyl)alkylamido, or cycloalkylamido.

As used herein, an "amino" group refers to —NR$^X$R$^Y$ wherein each of R$^X$ and R$^Y$ is independently hydrogen, aliphatic, cycloaliphatic, (cycloaliphatic)aliphatic, aryl, araliphatic, heterocycloaliphatic, (heterocycloaliphatic)aliphatic, heteroaryl, carboxy, sulfanyl, sulfinyl, sulfonyl, (aliphatic)carbonyl, (cycloaliphatic)carbonyl, ((cycloaliphatic)aliphatic)carbonyl, arylcarbonyl, (araliphatic)carbonyl, (heterocycloaliphatic)carbonyl, ((heterocycloaliphatic)aliphatic)carbonyl, (heteroaryl)carbonyl, or (heteroaraliphatic)carbonyl, each of which being defined herein and being optionally substituted. Examples of amino groups include alkylamino, dialkylamino, or arylamino. When the term "amino" is not the terminal group (e.g., alkylcarbonylamino), it is represented by —NR$^X$—, where R$^X$ has the same meaning as defined above.

As used herein, an "aryl" group used alone or as part of a larger moiety as in "aralkyl," "aralkoxy," or "aryloxyalkyl" refers to monocyclic (e.g., phenyl); bicyclic (e.g., indenyl, naphthalenyl, tetrahydronaphthyl, tetrahydroindenyl); and tricyclic (e.g., fluorenyl tetrahydrofluorenyl, or tetrahydroanthracenyl, anthracenyl) ring systems in which the monocyclic ring system is aromatic or at least one of the rings in a bicyclic or tricyclic ring system is aromatic. The bicyclic and tricyclic groups include benzofused 2-3 membered carbocyclic rings. For example, a benzofused group includes phenyl fused with two or more C$_{4-8}$ carbocyclic moieties. An aryl is optionally substituted with one or more substituents including aliphatic [e.g., alkyl, alkenyl, or alkynyl]; cycloaliphatic; (cycloaliphatic)aliphatic; heterocycloaliphatic; (heterocycloaliphatic)aliphatic; aryl; heteroaryl; alkoxy; (cycloaliphatic)oxy; (heterocycloaliphatic)oxy; aryloxy; heteroaryloxy; (araliphatic)oxy; (heteroaraliphatic)oxy; aroyl; heteroaroyl; amino; oxo (on a non-aromatic carbocyclic ring of a benzofused bicyclic or tricyclic aryl); nitro; carboxy; amido; acyl [e.g., (aliphatic)carbonyl; (cycloaliphatic)carbonyl; ((cycloaliphatic)aliphatic)carbonyl; (araliphatic)carbonyl; (heterocycloaliphatic)carbonyl; ((heterocycloaliphatic)aliphatic)carbonyl; or (heteroaraliphatic)carbonyl]; sulfonyl [e.g., aliphatic-SO$_2$— or amino-SO$_2$—]; sulfinyl [e.g., aliphatic-S(O)— or cycloaliphatic-S(O)—]; sulfanyl [e.g., aliphatic-S—]; cyano; halo; hydroxy; mercapto; sulfoxy; urea; thiourea; sulfamoyl; sulfamide; or carbamoyl. Alternatively, an aryl can be unsubstituted.

Non-limiting examples of substituted aryls include haloaryl [e.g., mono-, di (such as p,m-dihaloaryl), and (trihalo)aryl]; (carboxy)aryl [e.g., (alkoxycarbonyl)aryl, ((aralkyl)carbonyloxy)aryl, and (alkoxycarbonyl)aryl]; (amido)aryl [e.g., (aminocarbonyl)aryl, (((alkylamino)alkyl)aminocarbonyl)aryl, (alkylcarbonyl)aminoaryl, (arylaminocarbonyl)aryl, and (((heteroaryl)amino)carbonyl)aryl]; aminoaryl [e.g., ((alkylsulfonyl)amino)aryl or ((dialkyl)amino)aryl]; (cyanoalkyl)aryl; (alkoxy)aryl; (sulfamoyl)aryl [e.g., (aminosulfonyl)aryl]; (alkylsulfonyl)aryl; (cyano)aryl; (hydroxyalkyl)aryl; ((alkoxy)alkyl)aryl; (hydroxy)aryl, ((carboxy)alkyl)aryl; (((dialkyl)amino)alkyl)aryl; (nitroalkyl)aryl; (((alkylsulfonyl)amino)alkyl)aryl; ((heterocycloaliphatic)carbonyl)aryl]; ((alkylsulfonyl)alkyl)aryl]; (cyanoalkyl)aryl; (hydroxyalkyl)aryl; (alkylcarbonyl)aryl; alkylaryl; (trihaloalkyl)aryl; p-amino-m-alkoxycarbonylaryl; p-amino-m-cyanoaryl; p-halo-m-aminoaryl; or (m-(heterocycloaliphatic)-o-(alkyl))aryl.

As used herein, a "cycloalkyl" group refers to a saturated carbocyclic mono- or bicyclic (fused or bridged) ring of 3-10 (e.g., 5-10) carbon atoms. Examples of cycloalkyl groups include cyclopropyl, cyclobutyl, cyclopentyl, cyclohexyl, cycloheptyl, adamantyl, norbornyl, cubyl, octahydroindenyl, decahydro-naphthyl, bicyclo[3.2.1]octyl, bicyclo[2.2.2]octyl, bicyclo[3.3.1]nonyl, bicyclo[3.3.2.]decyl, bicyclo[2.2.2]octyl, adamantyl, or ((aminocarbonyl)cycloalkyl)cycloalkyl.

A cycloalkyl group can be optionally substituted with one or more substituents such as phospho, aliphatic [e.g., alkyl, alkenyl, or alkynyl], cycloaliphatic, (cycloaliphatic) aliphatic, heterocycloaliphatic, (heterocycloaliphatic) aliphatic, aryl, heteroaryl, alkoxy, (cycloaliphatic)oxy, (heterocycloaliphatic)oxy, aryloxy, heteroaryloxy, (araliphatic)oxy, (heteroaraliphatic)oxy, aroyl, heteroaroyl, amino, amido [e.g., (aliphatic)carbonylamino, (cycloaliphatic)carbonylamino, ((cycloaliphatic)aliphatic)carbonylamino, (aryl)carbonylamino, (araliphatic)carbonylamino, (heterocycloaliphatic)carbonylamino, ((heterocycloaliphatic)aliphatic)carbonylamino, (heteroaryl)carbonylamino, or (heteroaraliphatic)carbonylamino], nitro, carboxy [e.g., HOOC—, alkoxycarbonyl, or alkylcarbonyloxy], acyl [e.g., (cycloaliphatic)carbonyl, ((cycloaliphatic) aliphatic)carbonyl, (araliphatic)carbonyl, (heterocycloaliphatic)carbonyl, ((heterocycloaliphatic)aliphatic)carbonyl, or (heteroaraliphatic)carbonyl], cyano, halo, hydroxy, mercapto, sulfonyl [e.g., alkyl-SO$_2$— and aryl-SO$_2$—], sulfinyl [e.g., alkyl-S(O)—], sulfanyl [e.g., alkyl-S-], sulfoxy, urea, thiourea, sulfamoyl, sulfamide, oxo, or carbamoyl.

As used herein, a "heterocycloalkyl" group refers to a 3-10 membered mono- or bicylic (fused or bridged) (e.g., 5- to 10-membered mono- or bicyclic) saturated ring structure, in which one or more of the ring atoms is a heteroatom (e.g., N, O, S, or combinations thereof). Examples of a heterocycloalkyl group include piperidyl, piperazyl, tetrahydropyranyl, tetrahydrofuryl, 1,4-dioxolanyl, 1,4-dithianyl, 1,3-dioxolanyl, oxazolidyl, isoxazolidyl, morpholinyl, thiomorpholyl, octahydrobenzofuryl, octahydrochromenyl, octahydrothiochromenyl, octahydroindolyl, octahydropyrindinyl, decahydroquinolinyl, octahydrobenzo[b]thiopheneyl, 2-oxa-bicyclo[2.2.2]octyl, 1-aza-bicyclo[2.2.2]octyl, 3-aza-bicyclo[3.2.1]octyl, and 2,6-dioxa-tricyclo[3.3.1.0$^{3,7}$]nonyl. A monocyclic heterocycloalkyl group can be fused with a phenyl moiety to form structures, such as tetrahydroisoquinoline, that would be categorized as heteroaryls.

A heterocycloalkyl group can be optionally substituted with one or more substituents such as phospho, aliphatic [e.g., alkyl, alkenyl, or alkynyl], cycloaliphatic, (cycloaliphatic)aliphatic, heterocycloaliphatic, (heterocycloaliphatic)aliphatic, aryl, heteroaryl, alkoxy, (cycloaliphatic)oxy, (heterocycloaliphatic)oxy, aryloxy, heteroaryloxy, (araliphatic)oxy, (heteroaraliphatic)oxy, aroyl, heteroaroyl, amino, amido [e.g., (aliphatic)carbonylamino, (cycloaliphatic)carbonylamino, ((cycloaliphatic) aliphatic)carbonylamino, (aryl)carbonylamino, (araliphatic)carbonylamino, (heterocycloaliphatic)carbonylamino, ((heterocycloaliphatic) aliphatic)carbonylamino, (heteroaryl)carbonylamino, or (heteroaraliphatic)carbonylamino], nitro, carboxy [e.g., HOOC—, alkoxycarbonyl, or alkylcarbonyloxy], acyl [e.g., (cycloaliphatic)carbonyl, ((cycloaliphatic) aliphatic)carbonyl, (araliphatic)carbonyl, (heterocycloaliphatic)carbonyl, ((heterocycloaliphatic)aliphatic)carbonyl, or (heteroaraliphatic)carbonyl], nitro, cyano, halo, hydroxy, mercapto, sulfonyl [e.g., alkylsulfonyl or arylsulfonyl], sulfinyl [e.g., alkylsulfinyl], sulfanyl [e.g., alkylsulfanyl], sulfoxy, urea, thiourea, sulfamoyl, sulfamide, oxo, or carbamoyl.

A "heteroaryl" group, as used herein, refers to a monocyclic, bicyclic, or tricyclic ring system having 4 to 15 ring atoms wherein one or more of the ring atoms is a heteroatom (e.g., N, O, S, or combinations thereof) and in which the monocyclic ring system is aromatic or at least one of the rings in the bicyclic or tricyclic ring systems is aromatic.

A heteroaryl group includes a benzofused ring system having 2 to 3 rings. For example, a benzofused group includes benzo fused with one or two 4 to 8 membered heterocycloaliphatic moieties (e.g., indolizyl, indolyl, isoindolyl, 3H-indolyl, indolinyl, benzo[b]furyl, benzo[b]thiophene-yl, quinolinyl, or isoquinolinyl). Some examples of heteroaryl are azetidinyl, pyridyl, 1H-indazolyl, furyl, pyrrolyl, thienyl, thiazolyl, oxazolyl, imidazolyl, tetrazolyl, benzofuryl, isoquinolinyl, benzthiazolyl, xanthene, thioxanthene, phenothiazine, dihydroindole, benzo[1,3]dioxole, benzo[b]furyl, benzo[b]thiophenyl, indazolyl, benzimidazolyl, benzthiazolyl, puryl, cinnolyl, quinolyl, quinazolyl, cinnolyl, phthalazyl, quinazolyl, quinoxalyl, isoquinolyl, 4H-quinolizyl, benzo-1,2,5-thiadiazolyl, or 1,8-naphthyridyl.

A heteroaryl group includes N-oxide heteroaryl compounds, such as pyridine, pyrimidine, pyrazine, pyrrole, imidazole, thizaole, quinoline, or isoquinoline, which is oxidized at the nitrogen atom. Example of an N-oxide heteroaryl is pyridine-N-oxide with the formula $C_5H_5N\rightarrow O^+$.

Without limitation, monocyclic heteroaryls include furyl, thiophene-yl, 2H-pyrrolyl, pyrrolyl, oxazolyl, thazolyl, imidazolyl, pyrazolyl, isoxazolyl, isothiazolyl, 1,3,4-thiadiazolyl, 2H-pyranyl, 4-H-pranyl, pyridyl, pyridazyl, pyrimidyl, pyrazolyl, pyrazyl, or 1,3,5-triazyl. Monocyclic heteroaryls are numbered according to standard chemical nomenclature.

Without limitation, bicyclic heteroaryls include indolizyl, indolyl, isoindolyl, 3H-indolyl, indolinyl, benzo[b]furyl, benzo[b]thiophenyl, quinolinyl, isoquinolinyl, indolizyl, isoindolyl, indolyl, benzo[b]furyl, bexo[b]thiophenyl, indazolyl, benzimidazyl, benzthiazolyl, purinyl, 4H-quinolizyl, quinolyl, isoquinolyl, cinnolyl, phthalazyl, quinazolyl, quinoxalyl, 1,8-naphthyridyl, or pteridyl. Bicyclic heteroaryls are numbered according to standard chemical nomenclature.

A heteroaryl is optionally substituted with one or more substituents such as aliphatic [e.g., alkyl, alkenyl, or alkynyl]; cycloaliphatic; (cycloaliphatic)aliphatic; heterocycloaliphatic; (heterocycloaliphatic)aliphatic; aryl; heteroaryl; alkoxy; (cycloaliphatic)oxy; (heterocycloaliphatic)oxy; aryloxy; heteroaryloxy; (araliphatic)oxy; (heteroaraliphatic)oxy; aroyl; heteroaroyl; amino; oxo (on a non-aromatic carbocyclic or heterocyclic ring of a bicyclic or tricyclic heteroaryl); carboxy; amido; acyl [e.g., aliphaticcarbonyl; (cycloaliphatic)carbonyl; ((cycloaliphatic)aliphatic)carbonyl; (araliphatic)carbonyl; (heterocycloaliphatic)carbonyl; ((heterocycloaliphatic)aliphatic)carbonyl; or (heteroaraliphatic)carbonyl]; sulfonyl [e.g., aliphaticsulfonyl or aminosulfonyl]; sulfinyl [e.g., aliphaticsulfinyl]; sulfanyl [e.g., aliphaticsulfanyl]; nitro; cyano; halo; hydroxy; mercapto; sulfoxy; urea; thiourea; sulfamoyl; sulfamide; or carbamoyl. Alternatively, a heteroaryl can be unsubstituted.

Non-limiting examples of substituted heteroaryls include (halo)heteroaryl [e.g., mono- and di-(halo)heteroaryl]; (carboxy)heteroaryl [e.g., (alkoxycarbonyl)heteroaryl]; cyanoheteroaryl; aminoheteroaryl [e.g., ((alkylsulfonyl)amino)heteroaryl and ((dialkyl)amino)heteroaryl]; (amido)heteroaryl [e.g., aminocarbonylheteroaryl, ((alkylcarbonyl)amino)heteroaryl, ((((alkyl)amino)alkyl)aminocarbonyl)heteroaryl, (((heteroaryl)amino)carbonyl)heteroaryl, ((heterocycloaliphatic)carbonyl)heteroaryl, and ((alkylcarbonyl)amino)heteroaryl]; (cyanoalkyl)heteroaryl; (alkoxy)heteroaryl; (sulfamoyl)heteroaryl [e.g., (aminosulfonyl)heteroaryl]; (sulfonyl)heteroaryl [e.g., (alkylsulfonyl)heteroaryl]; (hydroxyalkyl)heteroaryl; (alkoxyalkyl)heteroaryl; (hydroxy)heteroaryl; ((carboxy)alkyl)heteroaryl; (((dialkyl)amino)alkyl]heteroaryl; (heterocycloaliphatic)heteroaryl; (cycloaliphatic)heteroaryl; (nitroalkyl)heteroaryl; (((alkylsulfonyl)amino)alkyl)heteroaryl; ((alkylsulfonyl)alkyl)heteroaryl; (cyanoalkyl)heteroaryl; (acyl)heteroaryl [e.g., (alkylcarbonyl)heteroaryl]; (alkyl)heteroaryl; or (haloalkyl)heteroaryl [e.g., trihaloalkylheteroaryl].

As used herein, an "alkoxy" group refers to an alkyl-O— group where "alkyl" has been defined previously.

As used herein, a "carboxy" group refers to —COOH, —COOR$^X$, —OC(O)H, —OC(O)R$^X$, when used as a terminal group; or —OC(O)— or —C(O)O— when used as an internal group.

As used herein, a "mercapto" group refers to —SH.

As used herein, a "sulfo" group refers to —SO$_3$H or —SO$_3$R$^X$ when used terminally or —S(O)$_3$— when used internally.

As used herein, a "sulfamide" group refers to the structure —NR$^X$—S(O)$_2$—NR$^Y$R$^Z$ when used terminally and —NR$^X$—S(O)$_2$—NR$^Y$— when used internally, wherein R$^X$, R$^Y$, and R$^Z$ have been defined above.

As used herein, a "sulfamoyl" group refers to the structure —O—S(O)$_2$—NR$^Y$R$^Z$ wherein R$^Y$ and R$^Z$ have been defined above.

As used herein, a "sulfonamide" group refers to the structure —S(O)$_2$—NR$^x$R$^y$ or —NR$^x$—S(O)$_2$—R$^z$ when used terminally; or —S(O)$_2$—NR$^x$— or —NR$^x$—S(O)$_2$— when used internally, wherein R$^x$, R$^y$, and R$^z$ are defined above.

As used herein a "sulfanyl" group refers to —S—R$^X$ when used terminally and —S— when used internally, wherein R$^X$ has been defined above. Examples of sulfanyls include aliphatic-S—, cycloaliphatic-S—, aryl-S—, or the like.

As used herein, a "halogen" or "halo" group refers to fluorine, chlorine, bromine or iodine.

As used herein, an "oxo" refers to =O.

As used herein, the term "vicinal" generally refers to the placement of substituents on a group that includes two or more carbon atoms, wherein the substituents are attached to adjacent carbon atoms.

As used herein, the term "geminal" generally refers to the placement of substituents on a group that includes two or more carbon atoms, wherein the substituents are attached to the same carbon atom.

The terms "terminally" and "internally" refer to the location of a group within a substituent. A group is terminal when the group is present at the end of the substituent not further bonded to the rest of the chemical structure. Carboxyalkyl, i.e., $R^xO(O)C$-alkyl, is an example of a carboxy group used terminally. A group is internal when the group is present in the middle of a substituent of the chemical structure. Alkylcarboxy (e.g., alkyl-C(O)O— or alkyl-OC(O)—) and alkylcarboxyaryl (e.g., alkyl-C(O)O-aryl- or alkyl-O(CO)-aryl-) are examples of carboxy groups used internally.

As used herein, an "aliphatic chain" refers to a branched or straight aliphatic group (e.g., alkyl groups, alkenyl groups, or alkynyl groups). A straight aliphatic chain has the structure —[$CH_2$]$_v$—, where v is 1-12. A branched aliphatic chain is a straight aliphatic chain that is substituted with one or more aliphatic groups. A branched aliphatic chain has the structure —[CQQ]$_v$- where Q is independently a hydrogen or an aliphatic group; however, Q shall be an aliphatic group in at least one instance. The term aliphatic chain includes alkyl chains, alkenyl chains, and alkynyl chains, where alkyl, alkenyl, and alkynyl are defined above.

The phrase "optionally substituted" is used herein interchangeably with the phrase "substituted or unsubstituted." As described herein, compounds of the invention can optionally be substituted with one or more substituents, such as are illustrated generally above, or as exemplified by particular classes, subclasses, and species of the invention. Unless otherwise noted, each of the specific groups for the variables recited herein can be optionally substituted with one or more substituents described herein. Each substituent of a specific group is further optionally substituted with one to three of halo, cyano, oxo, alkoxy, hydroxy, amino, nitro, aryl, cycloaliphatic, heterocycloaliphatic, heteroaryl, haloalkyl, and alkyl. For instance, an alkyl group can be substituted with alkylsulfanyl and the alkylsulfanyl can be optionally substituted with one to three of halo, cyano, oxo, alkoxy, hydroxy, amino, nitro, aryl, haloalkyl, and alkyl. As an additional example, the cycloalkyl portion of a (cycloalkyl)carbonylamino can be optionally substituted with one to three of halo, cyano, alkoxy, hydroxy, nitro, haloalkyl, and alkyl. When two alkoxy groups are bound to the same atom or adjacent atoms, the two alkoxy groups can form a ring together with the atom(s) to which they are bound.

As used herein, the term "substituted," whether preceded by the term "optionally" or not, refers generally to the replacement of hydrogen atoms in a given structure with the radical of a specified substituent. Specific substituents are described above in the definitions and below in the description of compounds and examples thereof. Unless otherwise indicated, an optionally substituted group can have a substituent at each substitutable position of the group, and when more than one position in any given structure can be substituted with more than one substituent selected from a specified group, the substituent can be either the same or different at every position. A ring substituent, such as a heterocycloalkyl, can be bound to another ring, such as a cycloalkyl, to form a spiro-bicyclic ring system, e.g., both rings share one common atom. As one of ordinary skill in the art will recognize, combinations of substituents envisioned by this invention are those combinations that result in the formation of stable or chemically feasible compounds.

As used herein, the phrase "stable or chemically feasible" refers to compounds that are not substantially altered when subjected to conditions to allow for their production, detection, and preferably their recovery, purification, and use for one or more of the purposes disclosed herein. In some embodiments, a stable compound or chemically feasible compound is one that is not substantially altered when kept at a temperature of 40° C. or less, in the absence of moisture or other chemically reactive conditions, for at least a week.

To the extent that any of the compounds described have chiral centres, the present invention extends to all optical isomers of such compounds, whether in the form of racemates or resolved enantiomers. The invention described herein relates to all crystal forms, solvates and hydrates of any of the disclosed compounds however so prepared.

To the extent that any of the compounds disclosed herein have acid or basic centres such as carboxylates or amino groups, then all salt forms of said compounds are included herein. The invention described herein further relates to all tautomers of the compounds presented herein. In the case of pharmaceutical uses, the salt should be seen as being a pharmaceutically acceptable salt.

Salts or pharmaceutically acceptable salts that may be mentioned include acid addition salts and base addition salts. Such salts may be formed by conventional means, for example by reaction of a free acid or a free base form of a compound with one or more equivalents of an appropriate acid or base, optionally in a solvent, or in a medium in which the salt is insoluble, followed by removal of said solvent, or said medium, using standard techniques (e.g. in vacuo, by freeze-drying or by filtration). Salts may also be prepared by exchanging a counter-ion of a compound in the form of a salt with another counter-ion, for example using a suitable ion exchange resin.

Examples of pharmaceutically acceptable salts include acid addition salts derived from mineral acids and organic acids, and salts derived from metals such as sodium, magnesium, potassium and calcium.

Examples of acid addition salts include acid addition salts formed with acetic, 2,2-dichloroacetic, adipic, alginic, aryl sulfonic acids (e.g. benzenesulfonic, naphthalene-2-sulfonic, naphthalene-1,5-disulfonic and p-toluenesulfonic), ascorbic (e.g. L-ascorbic), L-aspartic, benzoic, 4-acetamidobenzoic, butanoic, (+) camphoric, camphor-sulfonic, (+)-(1S)-camphor-10-sulfonic, capric, caproic, caprylic, cinnamic, citric, cyclamic, dodecylsulfuric, ethane-1,2-disulfonic, ethanesulfonic, 2-hydroxyethanesulfonic, formic, fumaric, galactaric, gentisic, glucoheptonic, gluconic (e.g. D-gluconic), glucuronic (e.g. D-glucuronic), glutamic (e.g. L-glutamic), a-oxoglutaric, glycolic, hippuric, hydrobromic, hydrochloric, hydriodic, isethionic, lactic (e.g. (+)-L-lactic and (±)-DL-lactic), lactobionic, maleic, malic (e.g. (−)-L-malic), malonic, (±)-DL-mandelic, metaphosphoric, methanesulfonic, 1-hydroxy-2-naphthoic, nicotinic, nitric, oleic, orotic, oxalic, palmitic, pamoic, phosphoric, propionic, L-pyroglutamic, salicylic, 4-amino-salicylic, sebacic, stearic, succinic, sulfuric, tannic, tartaric (e.g. (+)-L-tartaric), thiocyanic, undecylenic and valeric acids.

Also encompassed are any solvates of the compounds and their salts. Preferred solvates are solvates formed by the incorporation into the solid state structure (e.g. crystal structure) of the compounds of the invention of molecules of a non-toxic pharmaceutically acceptable solvent (referred to below as the solvating solvent). Examples of such solvents include water, alcohols (such as ethanol, isopropanol and butanol) and dimethylsulfoxide. Solvates can be prepared by recrystallising the compounds of the invention with a solvent or mixture of solvents containing the solvating solvent. Whether or not a solvate has been formed in any given instance can be determined by subjecting crystals of the compound to analysis using well known and standard techniques such as thermogravimetric analysis (TGA), differential scanning calorimetry (DSC) and X-ray crystallography.

The solvates can be stoichiometric or non-stoichiometric solvates. Particular solvates may be hydrates, and examples of hydrates include hemihydrates, monohydrates and dihydrates.

For a more detailed discussion of solvates and the methods used to make and characterise them, see Bryn et al, Solid-State Chemistry of Drugs, Second Edition, published by SSCI, Inc of West Lafayette, IN, USA, 1999, ISBN 0-967-06710-3.

The term "pharmaceutical composition" in the context of this invention means a composition comprising an active agent and comprising additionally one or more pharmaceutically acceptable carriers or pharmaceutically acceptable excipients. The composition may further contain ingredients selected from, for example, diluents, adjuvants, excipients, vehicles, preserving agents, fillers, disintegrating agents, wetting agents, emulsifying agents, suspending agents, sweetening agents, flavouring agents, perfuming agents, antibacterial agents, antifungal agents, lubricating agents and dispersing agents, depending on the nature of the mode of administration and dosage forms. The compositions may take the form, for example, of tablets, dragees, powders, elixirs, syrups, liquid preparations including suspensions, sprays, inhalants, tablets, lozenges, emulsions, solutions, cachets, granules, capsules and suppositories, as well as liquid preparations for injections, including liposome preparations.

The compounds of the invention may contain one or more isotopic substitutions, and a reference to a particular element includes within its scope all isotopes of the element. For example, a reference to hydrogen includes within its scope $^1H$, $^2H$ (D), and $^3H$ (T). Similarly, references to carbon and oxygen include within their scope respectively $^{12}C$, $^{13}C$ and $^{14}C$ and $^{16}O$ and $^{18}O$. In an analogous manner, a reference to a particular functional group also includes within its scope isotopic variations, unless the context indicates otherwise. For example, a reference to an alkyl group such as an ethyl group or an alkoxy group such as a methoxy group also covers variations in which one or more of the hydrogen atoms in the group is in the form of a deuterium or tritium isotope, e.g. as in an ethyl group in which all five hydrogen atoms are in the deuterium isotopic form (a perdeuteroethyl group) or a methoxy group in which all three hydrogen atoms are in the deuterium isotopic form (a trideuteromethoxy group). The isotopes may be radioactive or non-radioactive.

Therapeutic dosages may be varied depending upon the requirements of the patient, the severity of the condition being treated, and the compound being employed. Determination of the proper dosage for a particular situation is within the skill of the art. Generally, treatment is initiated with the smaller dosages which are less than the optimum dose of the compound. Thereafter the dosage is increased by small increments until the optimum effect under the circumstances is reached. For convenience, the total daily dosage may be divided and administered in portions during the day if desired.

The magnitude of an effective dose of a compound will, of course, vary with the nature of the severity of the condition to be treated and with the particular compound and its route of administration. The selection of appropriate dosages is within the ability of one of ordinary skill in this art, without undue burden. In general, the daily dose range may be from about 10 g to about 30 mg per kg body weight of a human and non-human animal, preferably from about 50 g to about 30 mg per kg of body weight of a human and non-human animal, for example from about 50 g to about 10 mg per kg of body weight of a human and non-human animal, for example from about 100 g to about 30 mg per kg of body weight of a human and non-human animal, for example from about 100 g to about 10 mg per kg of body weight of a human and non-human animal and most preferably from about 100 g to about 1 mg per kg of body weight of a human and non-human animal.

Combination Therapy

An effective amount can be achieved in the method or pharmaceutical composition of the invention employing a compound of the invention (including a pharmaceutically acceptable salt or solvate (e.g., hydrate)) alone or in combination with an additional suitable therapeutic agent, for example, an antiviral agent or a vaccine. When "combination therapy" is employed, an effective amount can be achieved using a first amount of a compound of the invention and a second amount of an additional suitable therapeutic agent.

In another embodiment of this invention, a compound of the invention and the additional therapeutic agent, are each administered in an effective amount (i.e., each in an amount which would be therapeutically effective if administered alone). In another embodiment, a compound of the invention and the additional therapeutic agent, are each administered in an amount which alone does not provide a therapeutic effect (a sub-therapeutic dose). In yet another embodiment, a compound of the invention can be administered in an effective amount, while the additional therapeutic agent is administered in a sub-therapeutic dose. In still another embodiment, a compound of the invention can be administered in a sub-therapeutic dose, while the additional therapeutic agent, for example, a suitable cancer-therapeutic agent is administered in an effective amount.

As used herein, the terms "in combination" or "co-administration" can be used interchangeably to refer to the use of more than one therapy (e.g., one or more prophylactic and/or therapeutic agents). The use of the terms does not restrict the order in which therapies (e.g., prophylactic and/or therapeutic agents) are administered to a subject.

Co-administration encompasses administration of the first and second amounts of the compounds of the co-administration in an essentially simultaneous manner, such as in a single pharmaceutical composition, for example, capsule or tablet having a fixed ratio of first and second amounts, or in multiple, separate capsules or tablets for each. In addition, such co-administration also encompasses use of each compound in a sequential manner in either order.

In one embodiment, a compound of the invention and an additional therapeutic agent are administered separately, sequentially or simultaneously to the subject.

When co-administration involves the separate administration of the first amount of a compound of the invention and a second amount of an additional therapeutic agent, the compounds are administered sufficiently close in time to have the desired therapeutic effect. For example, the period of time between each administration which can result in the desired therapeutic effect, can range from minutes to hours and can be determined taking into account the properties of each compound such as potency, solubility, bioavailability, plasma half-life and kinetic profile. For example, a compound of the invention and the second therapeutic agent can be administered in any order within 24 hours of each other, within 16 hours of each other, within 8 hours of each other, within 4 hours of each other, within 1 hour of each other or within 30 minutes of each other.

More, specifically, a first therapy (e.g., a prophylactic or therapeutic agent such as a compound of the invention) can be administered prior to (e.g., 5 minutes, 15 minutes, 30 minutes, 45 minutes, 1 hour, 2 hours, 4 hours, 6 hours, 12 hours, 24 hours, 48 hours, 72 hours, 96 hours, 1 week, 2 weeks, 3 weeks, 4 weeks, 5 weeks, 6 weeks, 8 weeks, or 12 weeks before), concomitantly with, or subsequent to (e.g., 5 minutes, 15 minutes, 30 minutes, 45 minutes, 1 hour, 2 hours, 4 hours, 6 hours, 12 hours, 24 hours, 48 hours, 72 hours, 96 hours, 1 week, 2 weeks, 3 weeks, 4 weeks, 5 weeks, 6 weeks, 8 weeks, or 12 weeks after) the administration of a second therapy (e.g., a prophylactic or therapeutic agent such as an anti-cancer agent) to a subject.

It is understood that the method of co-administration of a first amount of a compound of the invention and a second amount of an additional therapeutic agent can result in an enhanced or synergistic therapeutic effect, wherein the combined effect is greater than the additive effect that would result from separate administration of the first amount of a compound of the invention and the second amount of an additional therapeutic agent.

As used herein, the term "synergistic" refers to a combination of a compound of the invention and another therapy (e.g., a prophylactic or therapeutic agent), which is more effective than the additive effects of the therapies. A synergistic effect of a combination of therapies (e.g., a combination of prophylactic or therapeutic agents) can permit the use of lower dosages of one or more of the therapies and/or less frequent administration of said therapies to a subject. The ability to utilize lower dosages of a therapy (e.g., a prophylactic or therapeutic agent) and/or to administer said therapy less frequently can reduce the toxicity associated with the administration of said therapy to a subject without reducing the efficacy of said therapy in the prevention, management or treatment of a disorder. In addition, a synergistic effect can result in improved efficacy of agents in the prevention, management or treatment of a disorder. Finally, a synergistic effect of a combination of therapies (e.g., a combination of prophylactic or therapeutic agents) may avoid or reduce adverse or unwanted side effects associated with the use of either therapy alone.

The presence of a synergistic effect can be determined using suitable methods for assessing drug interaction. Suitable methods include, for example, the Sigmoid-Emax equation (Holford, N. H. G. and Scheiner, L. B., Clin. Pharmacokinet. 6: 429-453 (1981)), the equation of Loewe additivity (Loewe, S. and Muischnek, H., Arch. Exp. Pathol Pharmacol. 114: 313-326 (1926)) and the median-effect equation (Chou, T. C. and Talalay, P., Adv. Enzyme Regul. 22: 27-55 (1984)). Each equation referred to above can be applied with experimental data to generate a corresponding graph to aid in assessing the effects of the drug combination. The corresponding graphs associated with the equations referred to above are the concentration-effect curve, isobologram curve and combination index curve, respectively.

In one aspect the invention provides a pharmaceutical composition comprising a compound, pharmaceutically acceptable salt, solvate, hydrate, tautomer or optical isomer of the invention, a pharmaceutically acceptable excipient and at least one additional therapeutic agent. In some embodiments the compound, pharmaceutically acceptable salt, solvate, hydrate, tautomer or optical isomer of the invention and the at least one additional therapeutic agent are co-formulated. In some embodiments the compound, pharmaceutically acceptable salt, solvate, hydrate, tautomer or optical isomer of the invention and the at least one additional therapeutic agent are formulated separately.

In another aspect the invention provides a kit comprising a compound, pharmaceutically acceptable salt, solvate, hydrate, tautomer or optical isomer of the invention and at least one additional therapeutic agent. The kit may comprise instructions to administer the compound, pharmaceutically acceptable salt, solvate, hydrate, tautomer or optical isomer of the invention and the at least one additional therapeutic agent to a subject in need thereof.

In another aspect the invention provides a combination therapy for use as a medicament, wherein the combination therapy comprises administering a compound, pharmaceutically acceptable salt, solvate, hydrate, tautomer or optical isomer of the invention to a subject in need thereof and administering an additional therapeutic agent to the subject in need thereof.

The compound, pharmaceutically acceptable salt, solvate, hydrate, tautomer or optical isomer of the invention and the additional therapeutic agent may be administered to the subject separately, sequentially or simultaneously.

The pharmaceutical composition, kit and/or combination therapy may be for use in the treatment of a gastrointestinal disorder or a pulmonary disease or condition. The gastrointestinal disorder may be selected from the group consisting of constipation disorders, constipation-predominant irritable bowel syndrome, mixed type irritable bowel syndrome, chronic idiopathic constipation, gastrointestinal symptoms associated with Parkinson's disease, gastrointestinal symptoms associated with cystic fibrosis, intestinal dysmotility, postoperative ileus, food allergy or food intolerance, celiac disease, gastrointestinal motility disorders, functional gastrointestinal disorders, drug induced enteropathy, NSAID induced gastric and intestinal injury, chemotherapy induced mucositis, gastroesophageal reflux disease (GERD), duodenogastric reflux, diarrhoeal diseases, immune mediated gastrointestinal diseases, Crohn's disease, ulcerative colitis, inflammatory bowel disease, and ischemic colitis. The pulmonary disease or condition may be selected from the group consisting of chronic obstructive pulmonary diseases, asthma, chronic bronchitis, cystic fibrosis, emphysema, chronic idiopathic cough, hyperactive airway disorder, and idiopathic pulmonary fibrosis.

The at least one additional therapeutic agent may be selected from the group consisting of aminosalicylates, corticosteroids, immunomodulators and combinations thereof. Aminosalicylates are also known as 5-aminosalicylates (5-ASAs). The at least one additional therapeutic agent may be an aminosalicylate. The aminosalicylate may be mesalamine. The aminosalicylate may be sulfasalazine. The at least one additional therapeutic agent may be a corticosteroid. The corticosteroid may be budesonide. The at least one additional therapeutic agent may be an immunomodulator. The immunomodulator may be thiopurine. The immunomodulator may be methotrexate.

Pharmaceutical Compositions

While it is possible for the active compound to be administered alone, it is preferable to present it as a pharmaceutical composition (e.g. formulation).

Accordingly, in another embodiment of the invention, there is provided a pharmaceutical composition comprising at least one compound of Formula I as defined above together with at least one pharmaceutically acceptable excipient.

When the pharmaceutical composition comprises at least one additional therapeutic agent, the compound of the invention and the at least one additional therapeutic agent may be co-formulated or the compound of the invention and the at least one additional therapeutic agent may be formulated separately.

The composition may be a tablet composition.

The composition may be a capsule composition.

The pharmaceutically acceptable excipient(s) can be selected from, for example, carriers (e.g. a solid, liquid or semi-solid carrier), adjuvants, diluents (e.g solid diluents such as fillers or bulking agents; and liquid diluents such as solvents and co-solvents), granulating agents, binders, flow aids, coating agents, release-controlling agents (e.g. release retarding or delaying polymers or waxes), binding agents, disintegrants, buffering agents, lubricants, preservatives, anti-fungal and antibacterial agents, antioxidants, buffering agents, tonicity-adjusting agents, thickening agents, flavouring agents, sweeteners, pigments, plasticizers, taste masking agents, stabilisers or any other excipients conventionally used in pharmaceutical compositions.

The term "pharmaceutically acceptable" as used herein means compounds, materials, compositions, and/or dosage forms which are, within the scope of sound medical judgment, suitable for use in contact with the tissues of a subject (e.g. a human subject) without excessive toxicity, irritation, allergic response, or other problem or complication, commensurate with a reasonable benefit/risk ratio. Each excipient must also be "acceptable" in the sense of being compatible with the other ingredients of the formulation.

Pharmaceutical compositions containing compounds of the Formula I can be formulated in accordance with known techniques, see for example, Remington's Pharmaceutical Sciences, Mack Publishing Company, Easton, PA, USA.

The pharmaceutical compositions can be in any form suitable for oral, parenteral, topical, intranasal, intrabronchial, sublingual, ophthalmic, otic, rectal, intra-vaginal, or transdermal administration.

Pharmaceutical dosage forms suitable for oral administration include tablets (coated or uncoated), capsules (hard or soft shell), caplets, pills, lozenges, syrups, solutions, powders, granules, elixirs and suspensions, sublingual tablets, wafers or patches such as buccal patches.

Tablet compositions can contain a unit dosage of active compound together with an inert diluent or carrier such as a sugar or sugar alcohol, eg; lactose, sucrose, sorbitol or mannitol; and/or a non-sugar derived diluent such as sodium carbonate, calcium phosphate, calcium carbonate, or a cellulose or derivative thereof such as microcrystalline cellulose (MCC), methyl cellulose, ethyl cellulose, hydroxypropyl methyl cellulose, and starches such as corn starch. Tablets may also contain such standard ingredients as binding and granulating agents such as polyvinylpyrrolidone, disintegrants (e.g. swellable crosslinked polymers such as crosslinked carboxymethylcellulose), lubricating agents (e.g. stearates), preservatives (e.g. parabens), antioxidants (e.g. BHT), buffering agents (for example phosphate or citrate buffers), and effervescent agents such as citrate/bicarbonate mixtures. Such excipients are well known and do not need to be discussed in detail here.

Tablets may be designed to release the drug either upon contact with stomach fluids (immediate release tablets) or to release in a controlled manner (controlled release tablets) over a prolonged period of time or with a specific region of the GI tract.

The pharmaceutical compositions typically comprise from approximately 1% (w/w) to approximately 95%, preferably % (w/w) active ingredient and from 99% (w/w) to 5% (w/w) of a pharmaceutically acceptable excipient (for example as defined above) or combination of such excipients. Preferably, the compositions comprise from approximately 20% (w/w) to approximately 90% (w/w) active ingredient and from 80% (w/w) to 10% of a pharmaceutically excipient or combination of excipients. The pharmaceutical compositions comprise from approximately 1% to approximately 95%, preferably from approximately 20% to approximately 90%, active ingredient. Pharmaceutical compositions according to the invention may be, for example, in unit dose form, such as in the form of ampoules, vials, suppositories, pre-filled syringes, dragées, powders, tablets or capsules.

Tablets and capsules may contain, for example, 0-20% disintegrants, 0-5% lubricants, 0-5% flow aids and/or 0-99% (w/w) fillers/or bulking agents (depending on drug dose). They may also contain 0-10% (w/w) polymer binders, 0-5% (w/w) antioxidants, 0-5% (w/w) pigments. Slow release tablets would in addition typically contain 0-99% (w/w) release-controlling (e.g. delaying) polymers (depending on dose). The film coats of the tablet or capsule typically contain 0-10% (w/w) polymers, 0-3% (w/w) pigments, and/or 0-2% (w/w) plasticizers.

Parenteral formulations typically contain 0-20% (w/w) buffers, 0-50% (w/w) cosolvents, and/or 0-99% (w/w) water for Injection (WFI) (depending on dose and if freeze dried). Formulations for intramuscular depots may also contain 0-99% (w/w) oils.

The pharmaceutical formulations may be presented to a patient in "patient packs" containing an entire course of treatment in a single package, usually a blister pack.

The compounds of the Formula I will generally be presented in unit dosage form and, as such, will typically contain sufficient compound to provide a desired level of biological activity. For example, a formulation may contain from 1 nanogram to 2 grams of active ingredient, e.g. from 1 nanogram to 2 milligrams of active ingredient. Within these ranges, particular sub-ranges of compound are 0.1 milligrams to 2 grams of active ingredient (more usually from 10 milligrams to 1 gram, e.g. 50 milligrams to 500 milligrams), or 1 microgram to 20 milligrams (for example 1 microgram to 10 milligrams, e.g. 0.1 milligrams to 2 milligrams of active ingredient).

For oral compositions, a unit dosage form may contain from 1 milligram to 2 grams, more typically 10 milligrams to 1 gram, for example, 50 milligrams to 1 gram, e.g. 100 milligrams to 1 gram, of active compound.

The active compound will be administered to a patient in need thereof (for example a human or animal patient) in an amount sufficient to achieve the desired therapeutic effect (effective amount). The precise amounts of compound administered may be determined by a supervising physician in accordance with standard procedures.

Methods for the Preparation of Compounds of Formula (I)

Additional embodiments are disclosed in further detail in the following examples, which are not in any way intended to limit the scope of the claims.

General Synthetic Schemes

Compounds of formula I can be prepared in accordance with synthetic methods well known to the skilled person and as described herein.

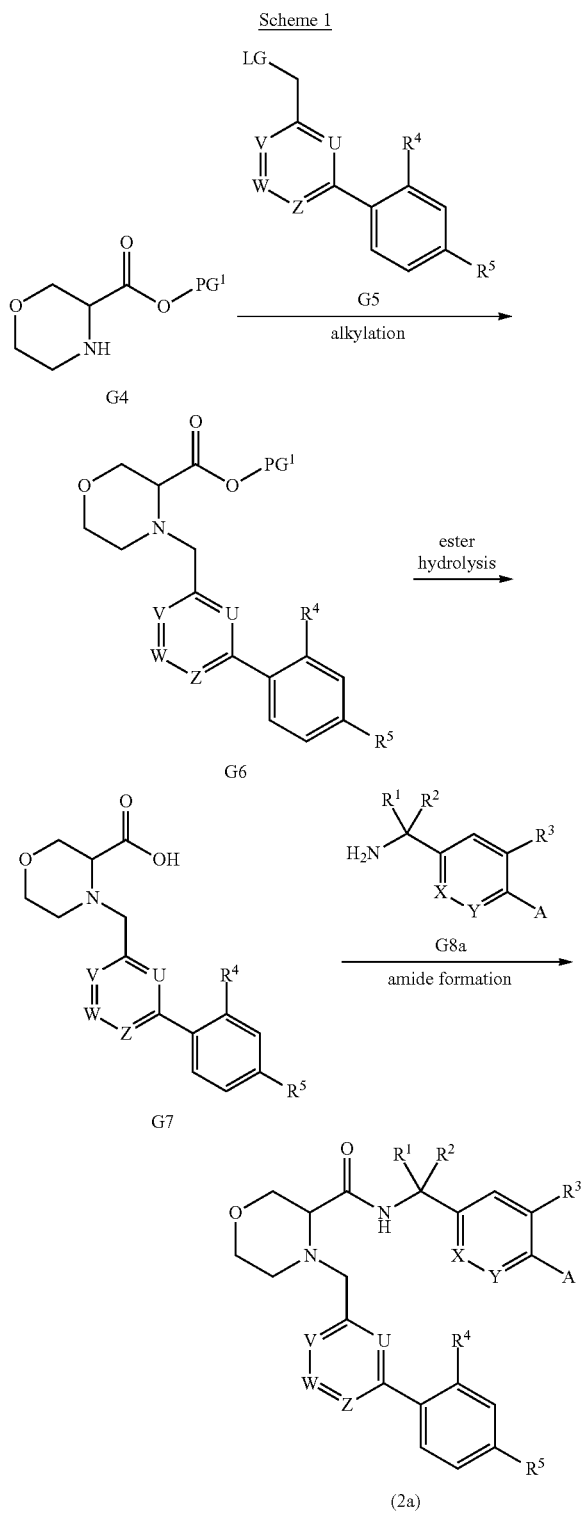

Scheme 1

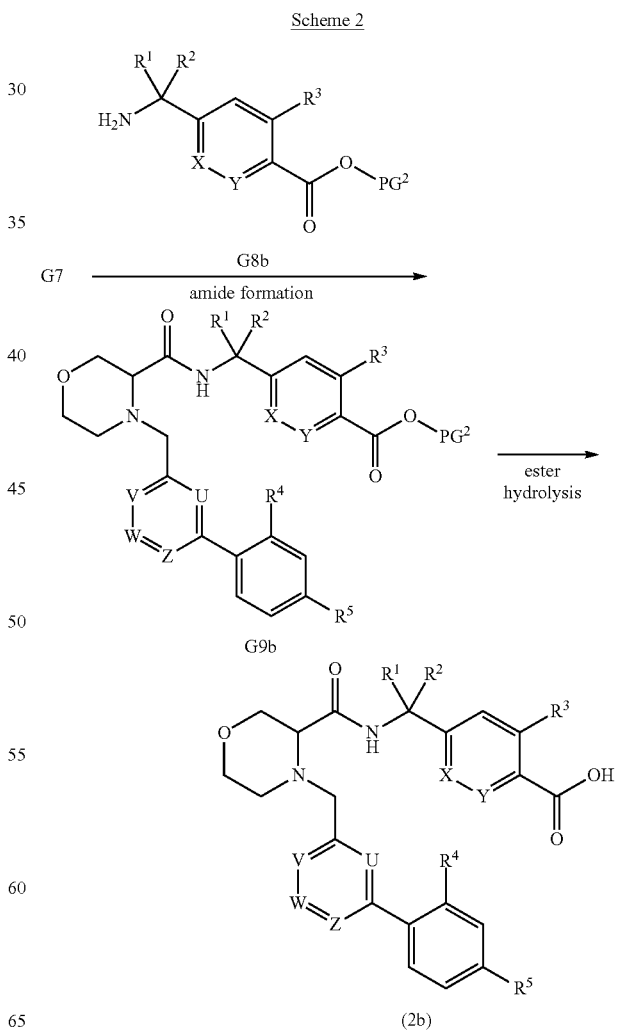

Scheme 2

In Scheme 1, compounds of formula (2a) can be prepared as outlined in Scheme 1. Alkylation of an amine of formula G4, whereby PG$^1$ represents a suitable acid protecting group such as a methyl ester, with an alkylating agent of formula G5, whereby LG represents a suitable leaving group, typically bromide. Typically, the alkylation reaction is carried out in the presence of a base, such as NaHCO$_3$, and in a solvent such as MeCN at temperatures ranging from room temperature to 70° C. to afford a tertiary amine of formula G6. The resulting ester can be deprotected using conditions pertinent to the nature of the protecting group PG$^1$, typically hydrolysis of a methyl ester functionality in the presence of a nucleophilic base such as lithium hydroxide in solvents such as MeOH, to afford an acid of formula (7). An amide bond forming reaction between an acid of formula G7 and an amine of formula G8a, in the presence of an amide coupling reagent, such as HOBt or EDCI, and a base, such as triethylamine, in a solvent such as DCM affords a compound of formula 2a.

In compounds where A is a protected carboxylic acid group, whereby PG$^2$ represents a suitable acid protecting group such as a methyl ester, the coupling produces an amide of formula G9b. Amide G9b can be further deprotected using conditions pertinent to the nature of the protecting group PG$^2$. Typically hydrolysis of a methyl ester functionality in the presence of a nucleophilic base such as lithium hydroxide in solvents such as MeOH, affords compounds of the formula 2b, see Scheme 2.

Alternatively, in Scheme 3, compounds of formula 2a may be synthesized via a compound of formula G12, as described in Scheme 3 and Scheme 4. In accordance with Scheme 3, a compound of formula G12 may be provided by a process wherein an acid of formula G10, whereby PG³ represents a suitable amine protecting group such as BOC, and an amine of formula G8a are coupled in the presence of a suitable coupling agent, such as HATU, and a base such as N,N-diisopropylethylamine, in solvents such as MeCN or DMF to yield the desired amide of formula G11. Subsequent deprotection using conditions pertinent to the nature of the protecting group PG³, typically BOC deprotection in the presence of an acid, such as HCl in a suitable solvent, such as 1,4-dioxane, provides the desired amine intermediate of formula G12.

Alternatively, an amine of formula G12 can be generated by the coupling of amino acid G13 and amine of formula G8a using amide bond formation conditions as described above.

borohydride in the presence or absence of promoters such as glacial acetic acid or zinc chloride, at temperatures varying from room temperature to 70° C., in solvents such as DCM or methanol. Alternatively, the tertiary amine of formula 16 may be prepared via alkylation of an amine of formula G12 with an alkylating agent of formula G15, whereby LG represents a suitable leaving group, such as a halide, typically bromide. Typical alkylation conditions utilize a suitable base, such as potassium carbonate, N,N-diisopropylethylamine or sodium hydrogen carbonate, in the presence or absence of sodium iodide, in solvents such as acetonitrile or DMF, at temperatures ranging from room temperature to 80° C. The resulting compound of formula G16, whereby Hal is a suitable halide, typically bromide, can be subjected to a Suzuki coupling reaction with a boronic acid or ester, whereby R is alkyl, such as methyl of formula G17 for conversion into a compound of formula 2a. This cross coupling reaction is carried out in the presence of a catalyst, such as tetrakistriphenylphosphinepalladium 0 or

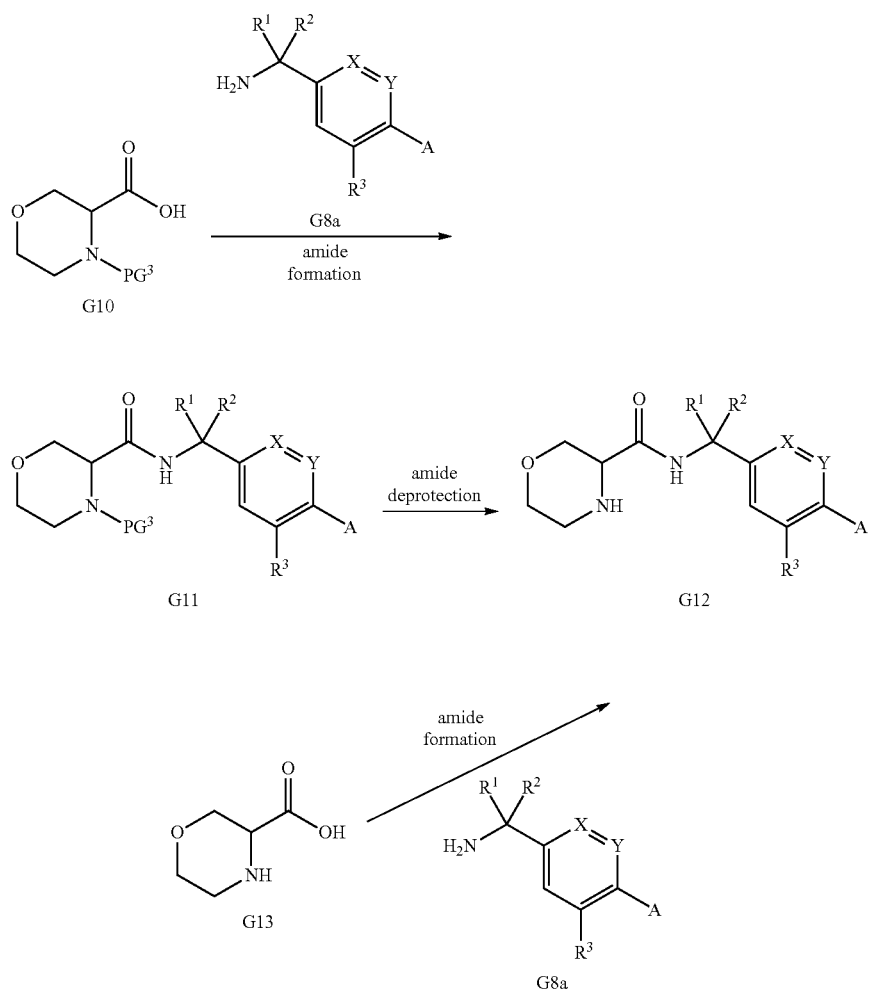

Scheme 3

Subsequently, an amine of formula G12 can be benzylated through reductive amination with an aldehyde of formula G14 to give the corresponding tertiary amine of formula G16. Typical reductive amination conditions utilize reagents such as sodium triacetoxyborohydride or sodium cyano- PdCl₂dppf·DCM, together with a base such as potassium carbonate and typically in solvent combinations such as 1,4-dioxane and water, with reactions temperatures from room temperature to 100° C. with or without microwave irradiation.

Scheme 4

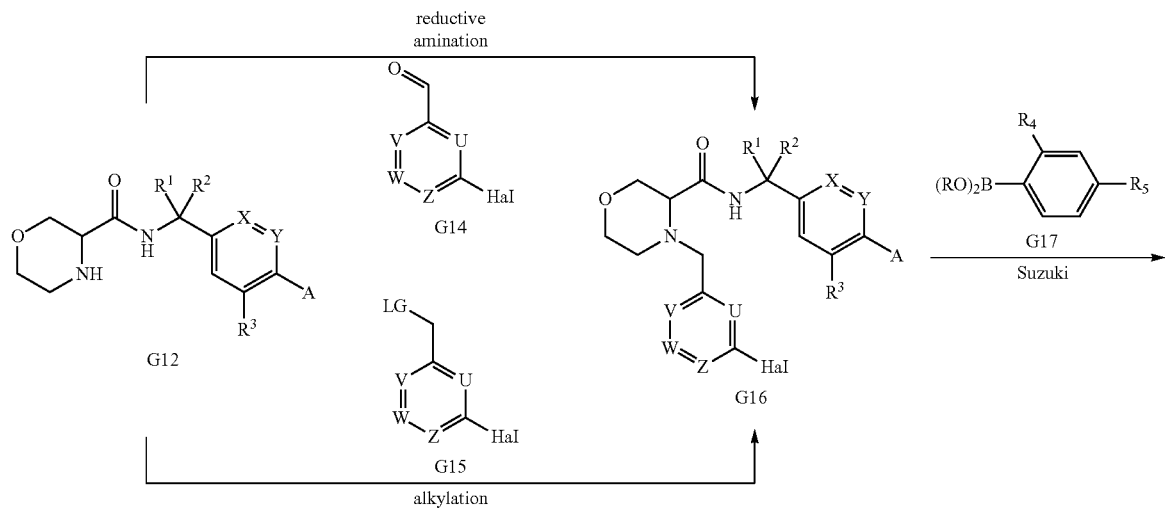

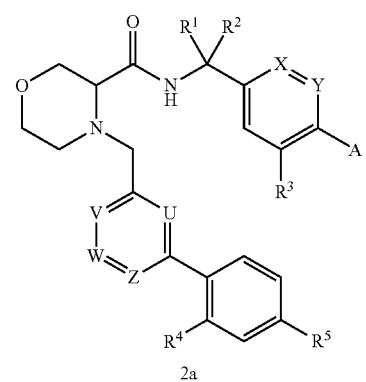

2b

In compounds of Schemes 3 and 4, wherein A is a protected carboxylic acid group, whereby PG² represents a suitable acid protecting group such as a methyl ester, a compound of formula G16 and G17 are coupled to produce a compound of formula G9b, according to Scheme 5. Compounds of formula G9b can be deprotected using conditions pertinent to the nature of the protecting group PG², typically hydrolysis of a methyl ester functionality in the presence of a nucleophilic base such as lithium hydroxide in solvents such as MeOH, affords carboxylic acid compounds of formula 2b.

Scheme 5

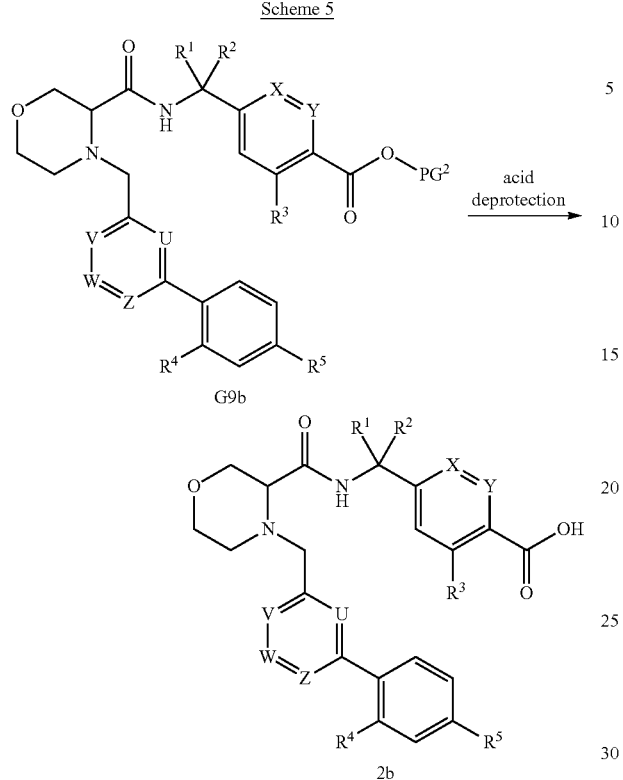

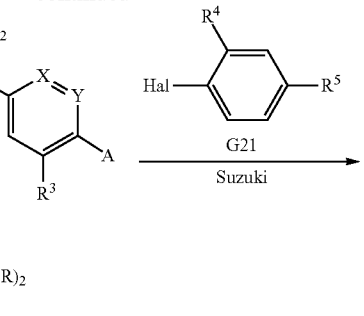

The skilled person will understand that the reaction steps depicted in Schemes 3-5 may be combined in different ways as required to successfully prepare the desired compound of formula 2a. This may include additional steps, for example, functional group modification, protection and/or deprotection steps into the overall synthetic sequence. For example, compounds of the formula 2a may be prepared as shown in Scheme 6. A reductive amination reaction between a secondary amine of formula G12 and an aldehyde of formula G19 under conditions previously outlined in Scheme 4 affords the desired tertiary amine of formula G20. A subsequent Suzuki reaction, using conditions described in Scheme 4, with appropriate aryl halides of formula G21, whereby Hal is typically bromide, provide a compound of formula 2a. Subsequent deprotection of the ester of formula 18, as described in Scheme 2, affords compounds of the formula 2a.

Scheme 6

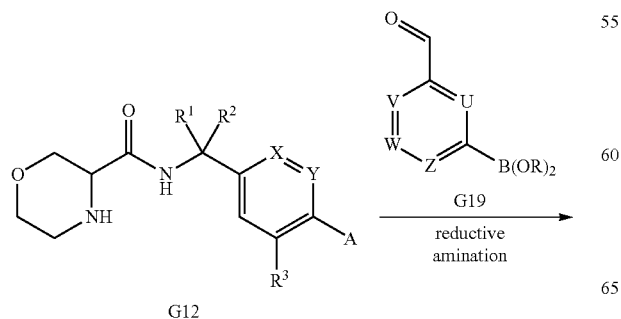

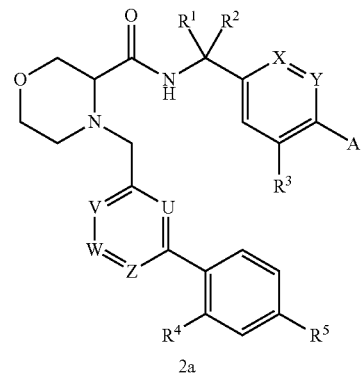

In compounds of Scheme 6, wherein A is a protected carboxylic acid group, whereby $PG^2$ represents a suitable acid protecting group such as a methyl ester, a compound of formula G20 and G21 are coupled to produce a compound of formula G9b, according to Scheme 7. Compounds of formula G9b can be deprotected using conditions pertinent to the nature of the protecting group $PG^2$, typically hydrolysis of a methyl ester functionality in the presence of a nucleophilic base such as lithium hydroxide in solvents such as MeOH, affords carboxylic acid compounds of formula 2b.

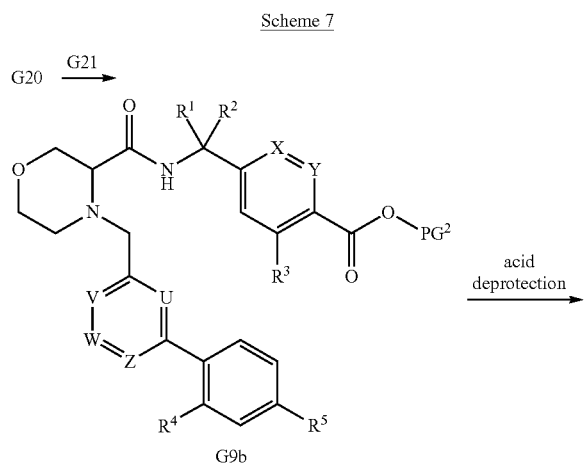

Scheme 7

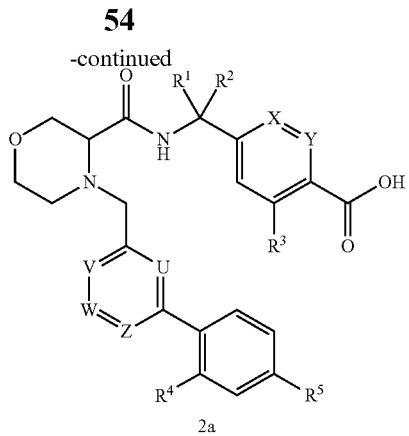

In another synthetic variation, compounds of formula 2a and 2b may be prepared as described in Scheme 8. A morpholine of formula G12 is converted directly into a compound of formula 2a via a reductive amination or alkylation reaction with corresponding aldehydes of formula G22 or electrophiles of formula G5 respectively, under conditions described for Scheme 4. In compounds of Scheme 8, wherein A is a protected carboxylic acid group, whereby $PG^2$ represents a suitable acid protecting group such as a methyl ester, subsequent deprotection of the ester of formula 2a can provide a compound of the formula 2b.

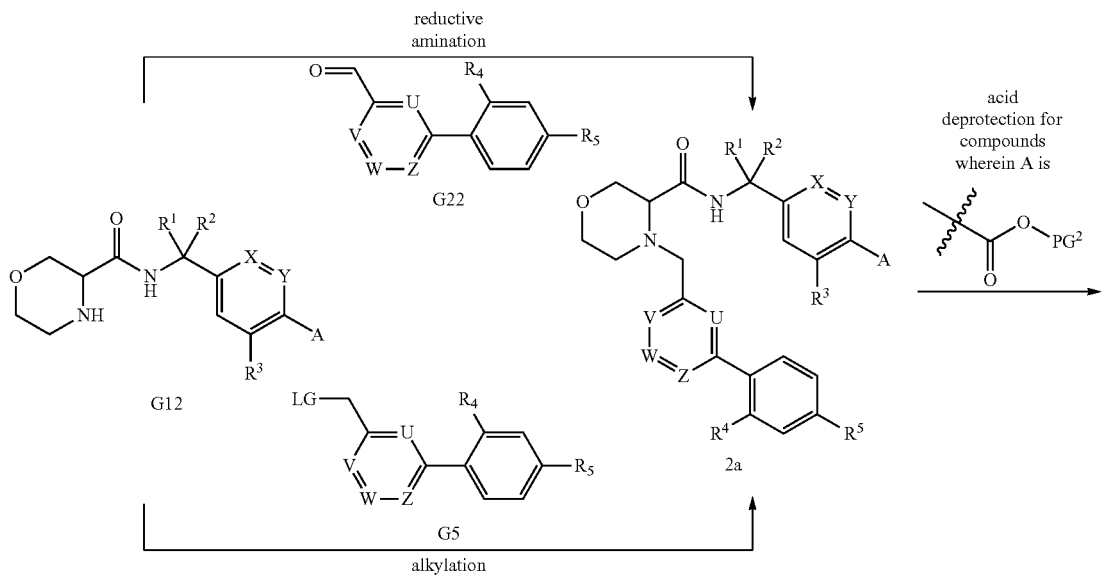

Scheme 8

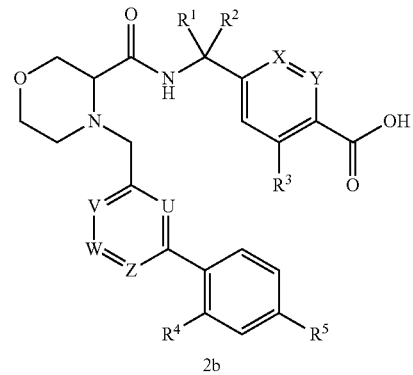

2b

Intermediate aldehydes of formula G22 and alkylating agents of formula G5 can be prepared as described in Scheme 9. Coupling of boronic acid or ester whereby R is alkyl, such as methyl of formula G17 and an aldehyde of formula G14 under Suzuki conditions, as described in Scheme 2, provide an aldehyde intermediate of formula G22. Reduction of the aldehyde moiety of formula G22 by reagents such as sodium borohydride in solvents such as methanol provide an alcohol of formula G23. Alternatively, the alcohol of formula G23 can be prepared via reaction of a boronic acid or ester of formula G17 with an aromatic halide of formula G24, whereby Hal is typically bromide, in a palladium catalyzed Suzuki reaction as described above. The alcohol of formula G23 can be converted to a suitable alkylating agent of formula G5, whereby the leaving group LG is pertinent to the nature of the subsequent alkylation reaction, typically bromide. Typical bromination conditions involve treatment with 33% HBr in acetic acid at room temperature, $PBr_3$ in DCM at room temperature, or $SOCl_2$ in DCM at room temperature. It will be understood by the skilled person that alternative leaving groups can be formed including but not limited to chloride, mesylate and tosylate and alternative conditions will be required to synthesize such intermediates of formula G5.

Scheme 9

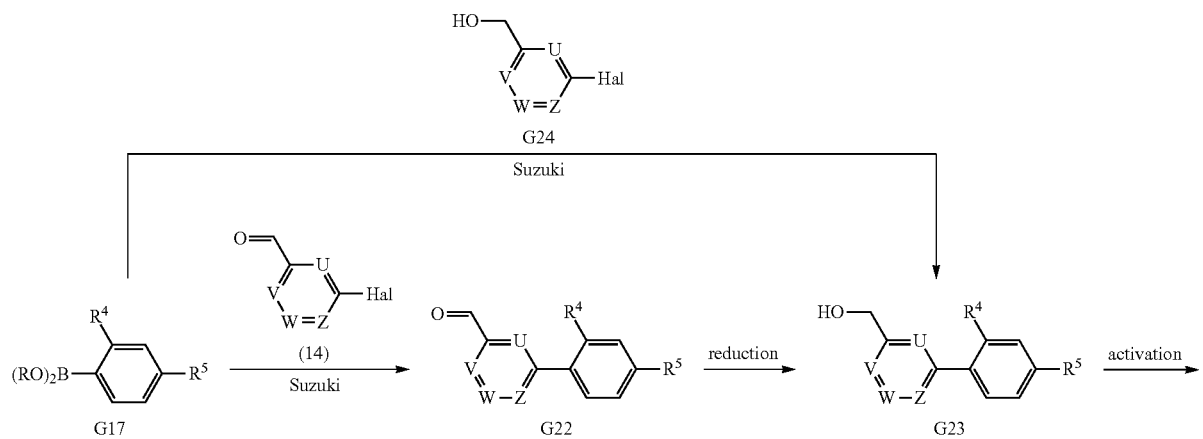

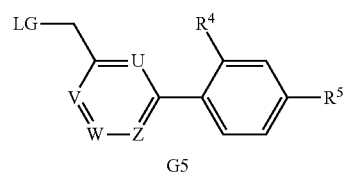

G5

In other variations of Compound 2a wherein U, V, W or Z is COH, a compound of formula G27 may be synthesized as described in Scheme 10. A phenol protected compound of formula G25, whereby PG is a suitable protecting group, typically methyl or benzyl, can be synthesized from a morpholine of formula G12, as described in Scheme 4. A Suzuki reaction between an aryl halide of formula G25, whereby Hal is typically bromide, and boronic acid or esters of formula G17 under conditions described for Scheme 4, afford a bi-aryl molecule of formula G26. Deprotection of the phenol moiety and the protected acid moieties, in a compound where A is a protected carboxylic acid group and $PG^2$ represents a suitable acid protecting group, yield a compound of formula G27. The protecting groups are typically methoxy and methyl ester groups respectively, and typical methoxy deprotection conditions are boron tribromide in solvents such as DCM at temperatures ranging from −78° C. to room temperature. Hydrolysis conditions using a hydroxide base are typically used to deprotect the ester moiety.

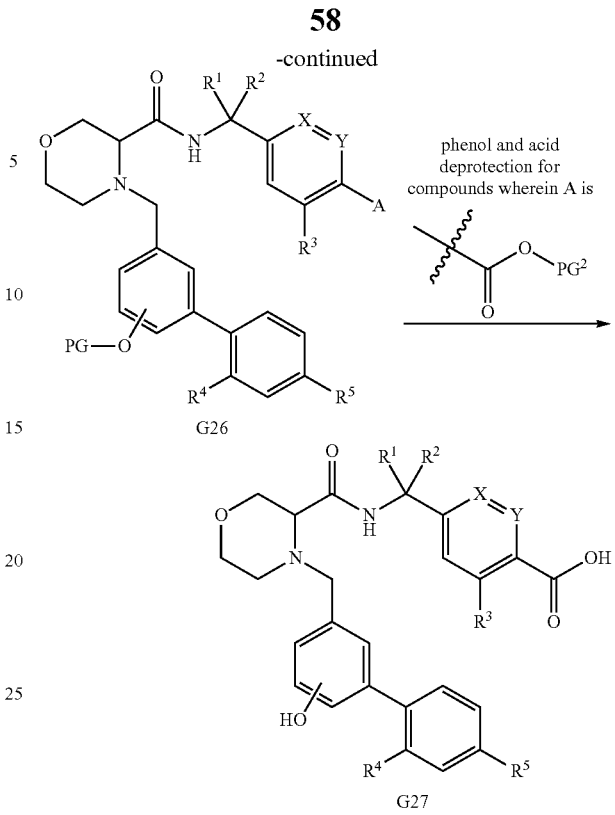

In other variations of Compound 2a wherein $R^5$ is $OSO_2NH_2$ and U, V, W or Z is H or COH, compounds of formula 29 or 32 may be prepared as described in Scheme 11. A phenol intermediate of formula G28 is first synthesized from a morpholine intermediate of formula G12 as described herein. Sulfamoylation of the phenol group of formula G28 can be achieved under appropriate conditions, typically via treatment with excess sulfamoyl chloride in DMA to afford a final compound of formula G29. Alternatively, a phenol protected intermediate compound of formula G30 whereby PG is a suitable protecting group, typically benzyl, can be synthesized from a morpholine of formula G12 as described herein. A sulfamoylation step as described above is carried out to convert a compound of formula G28 to G29. Removal of the phenol protecting group of a compound of formula G31, typically hydrogenation of a benzyl group, in the presence of a catalyst such as palladium on carbon, in solvents such as ethanol, then affords a final compound of the formula G32.

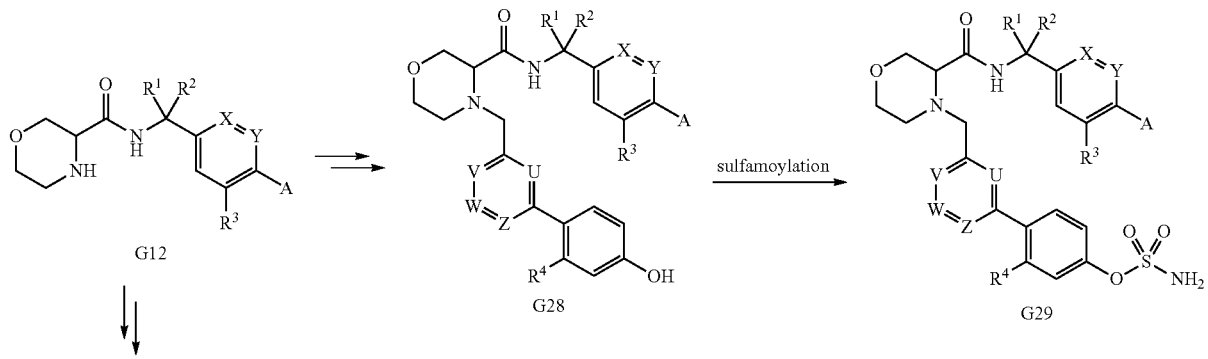

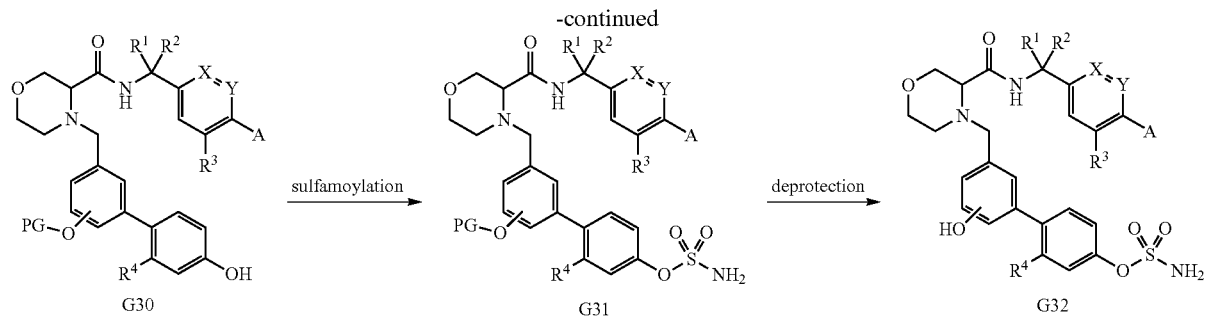

It will be understood that the above schemes and procedures are not meant to be limiting in any way. Indeed the above schemes and procedures can also be used to prepare compounds of the invention where, for example, A is a carboxylic acid isostere group. Methods and protecting groups appropriate for the "A group" are well known to those skilled in the art, e.g. a trityl group can be used for protecting a tetrazole group. Additionally, one compound of the formula 1 can be converted into another compound of the invention by methods well known to the skilled person. Examples of synthetic procedures for converting one functional group into another functional group are set out in standard texts such as March's Advanced Organic Chemistry: Reactions, Mechanisms, and Structure, 7th Edition, Michael B. Smith, John Wiley, 2013, (ISBN:978-0-470-46259-1), Organic Syntheses, OnlineEdition, www.orgsyn.org, (ISSN 2333-3553) and Fiesers' Reagents for Organic Synthesis, Volumes 1-17, John Wiley, edited by Mary Fieser (ISBN: 0-471-58283-2).

In many of the reactions described above, it may be necessary to protect one or more groups to prevent reaction from taking place at an undesirable location on the molecule. Examples of protecting groups, and methods of protecting and deprotecting functional groups, can be found in Greene's Protective Groups in Organic Synthesis, Fifth Edition, Editor: Peter G. M. Wuts, John Wiley, 2014, (ISBN: 9781118057483).

Compounds made by the foregoing methods may be isolated and purified by any of a variety of methods well known to those skilled in the art and examples of such methods include recrystallisation and chromatographic techniques such as column chromatography (e.g. flash chromatography) under normal or reversed-phase conditions, HPLC and SFC.

EXAMPLES

The invention will now be illustrated, but not limited, by reference to the following examples.

General Procedures

Where no preparative routes are included, the relevant intermediates are commercially available. Data available for the intermediates in Table 2. Commercial reagents were utilized without further purification. Final compounds and intermediates are named using ChemDraw Professional, Version 17.0.0.206 (121). Room temperature (RT) refers to approximately 20-27° C. 1H NMR spectra were recorded at 400 or 500 MHz on either a Bruker, Varian or Jeol instrument. Chemical shift values are expressed in parts per million (ppm), i.e. (δ)-values relative to the following solvents: chloroform-d=7.26 ppm, DMSO-d6=2.50 ppm, methanol-d4=3.31 ppm. The following abbreviations are used for the multiplicity of the NMR signals: s=singlet, br=broad, d=doublet, t=triplet, q=quartet, m=multiplet. Coupling constants are listed as J values, measured in Hz. NMR and mass spectroscopy results were corrected to account for background peaks. Chromatography refers to column chromatography performed using 60-120 mesh or 40-633 m, 60 A silica gel and executed under nitrogen pressure (flash chromatography) conditions. Microwave-mediated reactions were performed in Biotage Initiator or CEM Discover microwave reactors.

LC/MS Analysis

LC/MS analysis of compounds was performed under electrospray conditions using the instruments and methods given below:

LC/MS Method A

Instruments: Acquity UPLC with Photodiode Array Detector and QDA mass detector; Column: Acquity C-18, 1.6 micron, 50×1.6 mm; Gradient [time (min)/solvent B in A (%)]: 0.00/10, 0.75/10, 2.80/90, 4.50/100, 4.60/100, 4.70/10, 6.00/10; Solvents: solvent A=0.1% formic acid in water; solvent B=0.1% formic acid in water/acetonitrile (10:90); column temperature 35° C.; Flow rate 0.8 mL/min.

LC/MS Methods B & C

Instruments: HP 1100 with G1315A DAD, Waters Micromass ZQ; Column: Phenomenex Gemini-NX C-18, 3 micron, 2.0×30 mm; Method B Gradient [time (min)/solvent B in A (%)]: 0.00/2, 0.10/2, 2.50/95, 3.50/95; Method C Gradient [time (min)/solvent B in A (%)]: 0.00/2. 0.01/2. 8.40/95, 10.00/95; Solvents: solvent A=2.5 L $H_2O$+2.5 mL 28% ammonia in $H_2O$ solution; solvent B=2.5 L MeCN+135 mL $H_2O$+2.5 mL 28% ammonia in $H_2O$ solution. Injection volume 1 μL; UV detection 230 to 400 nm; Mass detection 130 to 800 AMU; column temperature 45° C.; Flow rate 1.5 mL/min.

LC/MS Method D

Instruments: HP 1100 with G1315A DAD, Waters Micromass ZQ; Column: Phenomenex Kinetex C-18, 5 micron, 2.1×50 mm; Gradient [time (min)/solvent B in A (%)]: 0.00/2. 0.01/2. 8.40/95, 10.00/95; Solvents: solvent A=0.1% formic acid in 10 mM aqueous ammonium formate solution; solvent B=acetonitrile/water/formic acid (95:4.9:0.1). Injection volume 1 μL; UV detection 230 to 400 nm; Mass detection 130 to 800 AMU; column temperature 45° C.; Flow rate 1.5 mL/min.

LC/MS Method E

Instruments: Acquity UPLC with Photodiode Array Detector and QDA mass detector; Column: Acquity C-18, 1.6 micron, 50×1.6 mm; Gradient [time (min)/solvent B in A (%)]: 0.00/3, 0.20/3, 2.70/98, 3.00/100, 3.50/100, 3.51/3, 4.00/3; Solvents: solvent A=0.1% formic acid in water; solvent B=0.1% formic acid in water/acetonitrile (10:90); column temperature 35° C.; Flow rate 0.8 mL/min.

LC/MS Methods F & G

Instruments: Acquity H-Class with Photodiode Array Detector and QDA mass detector; Column: Acquity C-18, 1.6 micron, 50×1.6 mm; Method F Gradient [time (min)/solvent B in A (%)]: 0.00/5. 0.20/5, 1.80/98. 2.00/100, 2.50/100, 2.51/5, 3.00/5; Method G Gradient [time (min)/solvent B in A (%)]: 0.00/3, 0.20/3, 2.70/98, 3.00/100, 3.50/100, 3.51/3, 4.00/3; Solvents: solvent A=0.1% formic acid in water; solvent B=0.1% formic acid in water/acetonitrile (10:90); column temperature 35° C.; Flow rate 0.9 mL/min.

LC/MS Method H

Instruments: Agilent 1260 Infinity LC with Diode Array Detector, Agilent 6120B Single Quadrupole MS with API-ES Source; Column: Restek Penta Fluoro Phenyl Propyl, 3 micron, 2.1×30 mm. Gradient [time (min)/solvent B in A (%)]: 0.00/2, 0.1/2, 8.4/95, 10/95, 10.1/2, 12/2; Solvents: solvent A=water (2.5 L) with 2.5 mL Formic acid; Solvent B=MeCN (2.5 L) with 125 mL water and 2.5 mL Formic acid. Injection volume 0.5 μL; UV detection 190 to 400 nm; Mass detection 130 to 800 AMU; column temperature 40° C.; Flow rate 1.5 mL/min.

LC/MS Method I

Instruments: Shimadzu 2020 series with diode array detector; Column: Agilent Poroshell 120 EC C-18, 2.7 micron, 4.6×50 mm; Gradient [time (min)/solvent B in A (%)]: 0.00/15, 1.00/15, 4.00/100, 4.50/100, 4.51/15, 5.00/15; Solvents: solvent A=0.05% formic acid in water; solvent B=0.05% formic acid in acetonitrile; column temperature 35° C.; Flow rate 1.0 mL/min.

HPLC Purification

Where stated, intermediates or final compounds were purified by reversed phase preparative HPLC conditions using the instruments and methods given below:

HPLC Purification method A

Gilson Semi Preparative HPLC System—including a 321 Pump, a 171 Diode Array Detector and a GX-271 Liquid Handler with Gilson Trilution software.

Prep HPLC: [reversed phase (Phenomenex Kinetix C18, 100×30 mm, 5 μm, 30 mL per min, gradient of Solvent B in Solvent A: 5% to 35% Solvent B (over 10 min), 100% Solvent B (for 2 min); Solvent A: water with 0.1% of TFA. Solvent B: MeCN].

HPLC Purification Method B

Gilson Semi Preparative HPLC System—including a 321 Pump, a 171 Diode Array Detector and a GX-271 Liquid Handler with Gilson Trilution software.

prep HPLC: [reversed phase (Gemini-NX C18, 100×30 mm, 5 μm, 30 mL per min, gradient of Solvent B in Solvent A: 5% to 35% Solvent B (over 10 min), 100% Solvent B (for 2 min); Solvent A: water with 0.2% of 28% ammonia. Solvent B: MeCN].

HPLC Purification Method C

Gilson Semi Preparative HPLC system—including Dual Piston Pumps 331 and 332, a 171 Diode Array Detector and a GX-271 Liquid Handler with Gilson Trilution software.

prep HPLC: [reversed phase (Gemini-NX C18, 100×30 mm, 5 μm, 30 mL per min, gradient of Solvent B in Solvent A: 5% to 35% Solvent B (over 10 min), 100% Solvent B (for 2 min); Solvent A: Water with 0.2% of 28% ammonia. Solvent B: MeCN].

HPLC Purification Method D

Gilson Semi Preparative HPLC system—including Dual Piston Pumps 331 and 332, a 171 Diode Array Detector and a GX-271 Liquid Handler with Gilson Trilution software.

prep HPLC: [reversed phase (Phenomenex Kinetix C18, 100×30 mm, 5 μm, 30 mL per min, gradient of Solvent B in Solvent A: 5% to 35% Solvent B (over 10 min), 100% Solvent B (for 2 min); Solvent A: water with 0.1% of TFA. Solvent B: MeCN].

HPLC Purification Method E

Shimadzu Prep HPLC with LC-20 Ap pump, SPD-20 A Diode Array Detector and CBM-20 A Controller.

prep HPLC: [reversed phase (Agilent Zorbax, 10 mL/min, gradient of Solvent B in Solvent A: 0% to 23% Solvent B (over 14 min), 98% Solvent B (for 2 min); Solvent A: Water with 0.1% TFA. Solvent B: MeCN].

HPLC Purification Method F

Shimadzu Prep HPLC with LC-20 Ap pump, SPD-20 A Diode Array Detector with Labsolutions software.

Prep HPLC: [reversed phase (Agilent 10C18, 250×21 mm, 20 mL/min, gradient of Solvent B in Solvent A: 5% to 80% Solvent B; Solvent A: water with 0.1% TFA. Solvent B: MeCN].

HPLC Purification Method G

Shimadzu Prep HPLC with LC-20 Ap pump, SPD-20 A Diode Array Detector and CBM-20 A Controller.

prep HPLC: [reversed phase (Agilent, 250×9.4 mm, 55 μm, 9 mL/min, gradient of Solvent B in Solvent A: 28% to 45% Solvent B (over 18 min), 45% to 98% Solvent B (for 2 min), 28% Solvent B (for 2 min); Solvent A: 5 mM aq. ammonium bicarbonate. Solvent B: MeCN].

Synthetic Procedures for Intermediates

Route 1, as Exemplified by the Preparation of Intermediate 1: Methyl 4-((S)-1-((R)-morpholine-3-carboxamido)ethyl)benzoate hydrochloride (Intermediate 1)

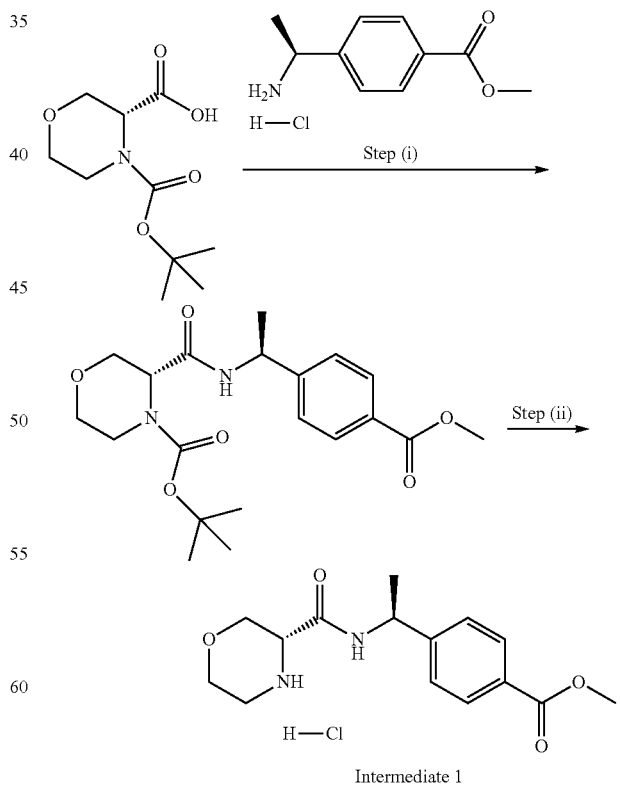

Intermediate 1

Step (i): To a solution of (R)-4-(tert-butoxycarbonyl)morpholine-3-carboxylic acid (5.10 g, 22.1 mmol) and methyl (S)-4-(1-aminoethyl)benzoate hydrochloride (3.95 g, 22.1 mmol) in MeCN (70 mL) was added HATU (12.6 g, 33.1 mmol) and the mixture was stirred at RT for 30 mins. After this, the mixture was cooled to 0° C. and N,N-diisopropylethylamine (11.9 mL, 66.2 mmol) was added. The mixture was warmed to RT and stirred for 24 hrs after which it was partitioned between EtOAc and water. The organic layer was separated, and the aqueous layer was further extracted with EtOAc (×2). The combined organics were dried over $Na_2SO_4$ and concentrated. The crude material was purified by flash column chromatography (normal phase, silica) under a gradient of EtOAc (0% to 72%) in hexane to afford tert-butyl (R)-3-(((S)-1-(4-(methoxycarbonyl)phenyl) ethyl)carbamoyl) morpholine-4-carboxylate (5.50 g, 14.0 mmol, 63%) as a sticky solid. (LC/MS Method A): m/z 293 [M+H−Boc]$^+$ (ES$^+$), at 2.17 min, UV active.

Step (ii): To a solution of tert-butyl (R)-3-(((S)-1-(4-(methoxycarbonyl)phenyl) ethyl)carbamoyl) morpholine-4-carboxylate (6.30 g, 16.1 mmol) in 1,4-dioxane (30 mL) under an atmosphere of nitrogen was added 4 N HCl in 1,4-dioxane (40 mL) at RT. The mixture was stirred for 3 hrs, after which the solvent was removed under reduced pressure. The crude material was triturated from $Et_2O$ to give Intermediate 1, methyl 4-((S)-1-((R)-morpholine-3-carboxamido)ethyl)benzoate hydrochloride (5.30 g, 16.1 mmol, 100%) as an off-white solid. (LC/MS Method A): m/z 293 [M+H−HCl]$^+$ (ES$^+$), at 2.17 min, UV active.

Route 2, as Exemplified by the Preparation of Intermediate 2: 3-Methyl-4-(4,4,5,5-tetramethyl-1,3,2-dioxaborolan-2-yl)benzamide (Intermediate 2)

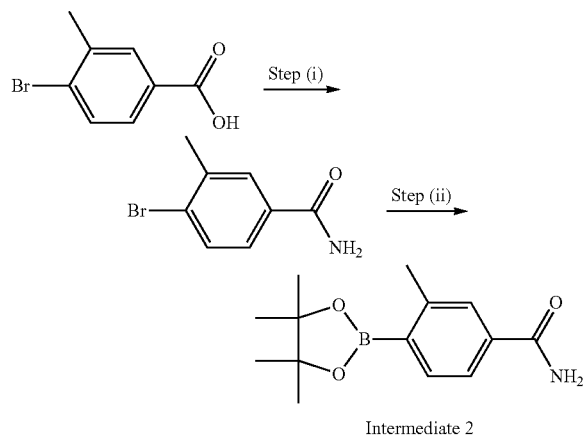

Intermediate 2

Step (i): A solution of 4-bromo-3-methylbenzoic acid (30 g, 0.14 mol) in $SOCl_2$ (250 mL) was stirred at 70° C. for 15 hrs. The mixture was cooled to RT and concentrated under vacuum. The residue was dissolved in DCM (50 mL), cooled to 0° C. and aq. ammonium hydroxide (40 mL) was added dropwise. The mixture was stirred RT for 30 minutes, after which the solid was filtered and recrystallized from EtOH (250 mL) to afford 4-bromo-3-methylbenzamide (21.0 g, 0.10 mol, 70% yield) as a yellow solid. (LC/MS Method I): m/z 214 [M+H]$^+$ (ES$^+$), at 2.76 min, UV active.

Step (ii): A mixture of 4-bromo-3-methylbenzamide (7.20 g, 33.6 mmol), bis(pinacolato)diboron (10.3 g, 40.4 mmol), potassium acetate (6.60 g, 67.3 mmol) and Pd(dppf)Cl$_2$ (700 mg, 0.96 mmol) in 1,4-dioxane (150 mL) was heated to 105° C. under an atmosphere of nitrogen for 15 hrs. The mixture was cooled to RT and the solvent was removed under vacuum. The crude material was purified by flash column chromatography (normal phase, silica) under a gradient of EtOAc (10% to 30%) in pet. ether to afford Intermediate 2, 3-methyl-4-(4,4,5,5-tetramethyl-1,3,2-dioxaborolan-2-yl)benzamide (8.40 g, 32.2 mmol, 96% yield) as a yellow solid. (LC/MS Method I): m/z 262 [M+H]$^+$ (ES$^+$), at 4.84 min, UV active.

Route 3, as Exemplified by the Preparation of Intermediate 3: methyl 4-((S)-1-((R)-morpholine-3-carboxamido)ethyl)benzoate (Intermediate 3)

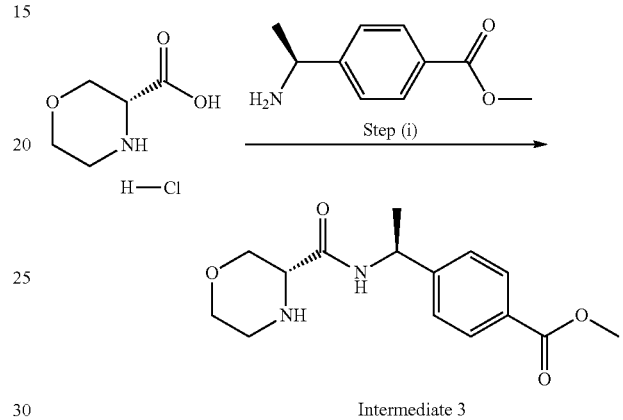

Intermediate 3

Step (i): To a solution of (R)-morpholine-3-carboxylic acid hydrochloride (1.02 g, 6.13 mmol) and (S)-4-(1-aminoethyl)benzoate (1.0 g, 5.58 mmol) in MeCN (5 mL) was added HATU (3.18 g, 8.37 mmol) and the mixture was stirred at RT for 15 minutes. The mixture was cooled to 0° C. and N,N-diisopropylethylamine (3.0 mL, 16.7 mmol) was added. The mixture was stirred at RT for 6 hrs after which it was partitioned between EtOAc and water. The organics were separated, and the aqueous layer was further extracted with EtOAc (×1). The combined organics were dried over $Na_2SO_4$ and concentrated. The crude material was purified by flash column chromatography (normal phase, silica) under a gradient of EtOAc (0% to 52%) in hexane to afford Intermediate 3, methyl 4-((S)-1-((R)-morpholine-3-carboxamido)ethyl)benzoate (0.80 g, 2.74 mmol, 49% yield) as a sticky liquid. (LC/MS Method A): m/z 293 [M+H]$^+$ (ES$^+$), at 1.33 min, UV active.

Route 4, as Exemplified by the Preparation of Intermediate 4: 3-methyl-4-(4,4,5,5-tetramethyl-1,3,2-dioxaborolan-2-yl)benzenesulfonamide (Intermediate 4)

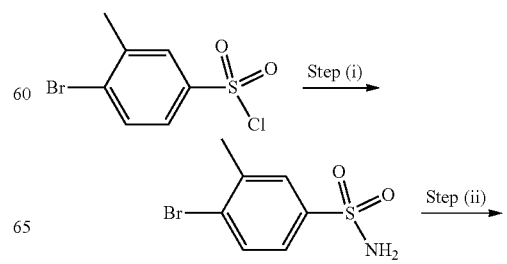

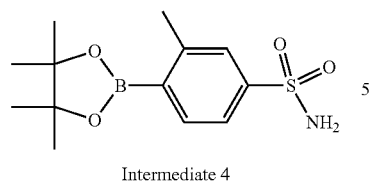

Intermediate 4

Step (i): To a solution of 4-bromo-3-methylbenzenesulfonyl chloride (10.0 g, 37.1 mmol) in THF (75 mL) at 0° C. was added aqueous ammonia (75 mL). The mixture was stirred at the same temperature for 5 hrs, after which it was quenched by the addition of 1 N HCl. The mixture was extracted with DCM (×2) and the combined organics were concentrated to afford 4-bromo-3-methylbenzenesulfonamide (9.15 g, 36.6 mmol, 99% yield) as a white powder. (LC/MS Method I): m/z 250 [M+H]$^+$ (ES$^+$), at 3.27 min, UV active.

Step (ii): A mixture of 4-bromo-3-methylbenzenesulfonamide (9.29 g, 37.2 mmol), bis(pinacolato)diboron (11.3 g, 44.6 mmol), potassium acetate (5.47 g, 55.8 mmol) and Pd(dppf)Cl$_2$ (900 mg, 1.23 mmol) in 1,4-dioxane (100 mL) was heated to 105° C. under an atmosphere of nitrogen for 15 hrs. The mixture was cooled to RT and the solvent was removed under vacuum. The crude material was purified by flash column chromatography (normal phase, silica) under a gradient of EtOAc (20% to 25%) in pet. ether to afford Intermediate 4, 3-methyl-4-(4,4,5,5-tetramethyl-1,3,2-dioxaborolan-2-yl)benzenesulfonamide (6.32 g, 21.3 mmol, 57% yield) as a white solid. (LC/MS Method I): m/z 298 [M+H]$^+$ (ES$^+$), at 3.64 min, UV active.

Route 5, as Exemplified by the Preparation of Intermediate 5: methyl 5-[[[(3R)-morpholine-3-carbonyl]amino]methyl]pyridine-2-carboxylate hydrochloride (Intermediate 5)

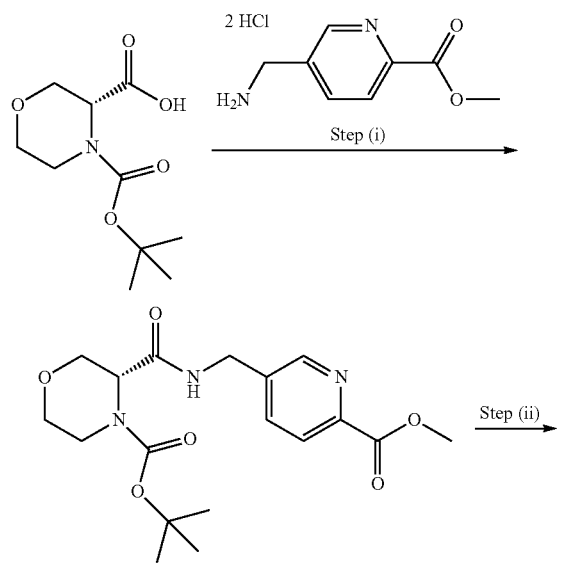

Intermediate 5

Step (i): To a mixture of (R)-4-(tert-butoxycarbonyl)morpholine-3-carboxylic acid (310 mg, 1.34 mmol) in DMF (5.5 mL), were added N,N-diisopropylethylamine (1.16 mL, 6.7 mmol), HATU (613 mg, 1.61 mmol) and methyl 5-(aminomethyl)-2-pyridinecarboxylate dihydrochloride (405 mg, 1.61 mmol). The mixture was stirred at RT for 18 hrs, after which it was diluted with EtOAc and water. The organics were separated, washed with brine (×2), dried via passage through a hydrophobic frit and concentrated. The crude material was purified by flash column chromatography (normal phase, silica) under a gradient of MeOH (0% to 5%) in DCM to afford tert-butyl (R)-3-(((6-(methoxycarbonyl)pyridin-3-yl)methyl)carbamoyl)morpholine-4-carboxylate (537 mg, 1.42 mmol, quant. yield) as a pale orange solid. (LC/MS Method B): m/z 380 [M+H]$^+$ (ES$^+$), at 1.67 min, UV active.

Step (ii): To a solution of tert-butyl (R)-3-(((6-(methoxycarbonyl)pyridin-3-yl)methyl)carbamoyl)morpholine-4-carboxylate (510 mg, 1.34 mmol) in 1,4-Dioxane (5 mL), was added 4 M HCl in dioxane (5 mL, 1.34 mmol). The mixture was stirred at RT for 2 hrs, after which it was concentrated to afford Intermediate 5, methyl 5-[[[(3R)-morpholine-3-carbonyl]amino]methyl]pyridine-2-carboxylate hydrochloride (425 mg, 1.34 mmol, 100% yield) as a white solid. (LC/MS Method B): m/z 280 [M+H—HCl]$^+$ (ES$^+$), at 0.37 min, UV active.

Route 6, as Exemplified by the Preparation of Intermediate 6 and Intermediate 9: 3'-(bromomethyl)-5'-hydroxy-2-methyl-[1,1'-biphenyl]-4-carboxamide (Intermediate 6) and 3'-formyl-5'-hydroxy-2-methyl-[1,1'-biphenyl]-4-carboxamide (Intermediate 9)

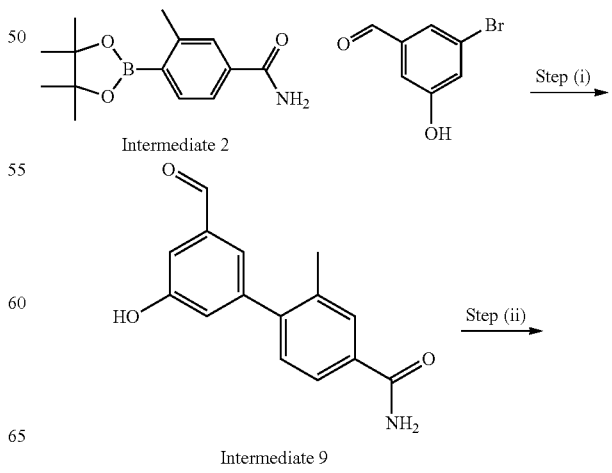

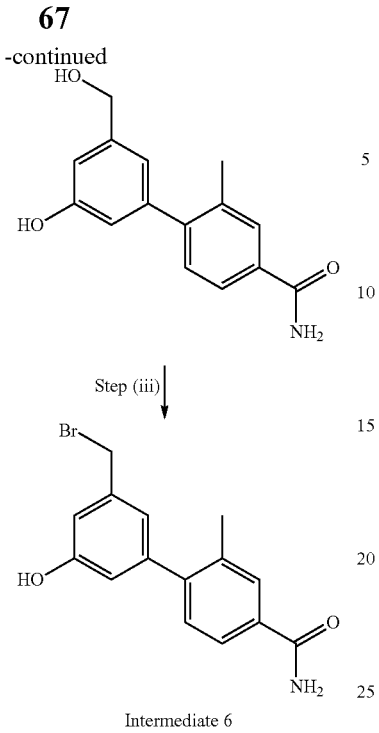

Intermediate 6

Step (i): 3-bromo-5-hydroxybenzaldehyde (4.00 g, 20.0 mmol), Intermediate 2, 3-methyl-4-(4,4,5,5-tetramethyl-1,3,2-dioxaborolan-2-yl)benzamide (5.74 g, 22.0 mmol) and potassium carbonate (3.20 g, 60.0 mmol) were dissolved in 1,4-dioxane (15 mL) and water (15 mL) and the mixture was purged with nitrogen gas for 30 minutes at RT. After this, $PdCl_2(dppf) \cdot DCM$ (1.63 g, 2.00 mmol) was added and the reaction mixture was heated to 80° C. for 2 hrs. The mixture was cooled and partitioned between EtOAc and water. The organics were separated, and the aqueous layer was further extracted with EtOAc. The combined organics were dried over $Na_2SO_4$ and concentrated. The residue was purified by flash column chromatography (reversed phase, C18) under a gradient of MeCN (0-35%) in water to afford Intermediate 9, 3'-formyl-5'-hydroxy-2-methyl-[1,1'-biphenyl]-4-carboxamide (3.60 g, 14.1 mmol, 71% yield) as a brown solid. (LC/MS Method F): m/z 256 [M+H]$^+$ (ES$^+$), at 1.09 min, UV active Step (ii): To a solution of 3'-formyl-5'-hydroxy-2-methyl-[1,1'-biphenyl]-4-carboxamide (1.50 g, 5.88 mmol) in methanol (15 mL) at 0° C. was added sodium borohydride (440 mg, 11.8 mmol). The reaction mixture was stirred at RT for 2 hrs, after which it was partitioned between EtOAc and sat. aq. $NaHCO_3$. The organics were separated, and the aqueous layer was further extracted with EtOAc (×2). The combined organics were dried over $Na_2SO_4$ and concentrated to afford 3'-hydroxy-5'-(hydroxymethyl)-2-methyl-[1,1'-biphenyl]-4-carboxamide (1.36 g, 5.29 mmol, 90% yield) as an off-white solid. (LC/MS Method F): m/z 258 [M+H]$^+$ (ES$^+$), at 0.94 min, UV active.

Step (iii): 3'-hydroxy-5'-(hydroxymethyl)-2-methyl-[1,1'-biphenyl]-4-carboxamide (1.36 g, 5.29 mmol) was dissolved in 33% HBr in acetic acid (12 mL) at RT. The mixture was stirred at RT for 16 hrs, after which it was partitioned between sat. aq. $NaHCO_3$ and EtOAc. The organics were separated, and the aqueous layer was further extracted with EtOAc (×2). The combined organics were dried over $Na_2SO_4$ and concentrated to afford Intermediate 6, 3'-(bromomethyl)-5'-hydroxy-2-methyl-[1,1'-biphenyl]-4-carboxamide (1.59 g, 4.97 mmol, 94% yield) as a red-brown solid. (LC/MS Method F): m/z 321 [M+H]$^+$ (ES$^+$), at 1.23 min, UV active.

Route 7, as Exemplified by the Preparation of Intermediate 7: 3-benzyloxy-5-bromo-benzaldehyde (Intermediate 7)

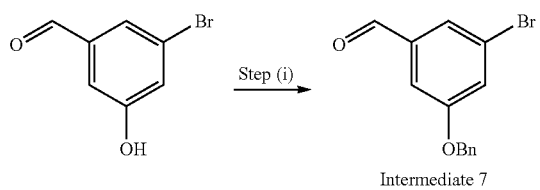

Intermediate 7

Step (i): To a suspension of 3-bromo-5-hydroxybenzaldehyde (500 mg, 2.49 mmol) and potassium carbonate (1.03 g, 7.46 mmol) in DMF (6.5 mL) was added benzyl bromide (0.38 mL, 3.23 mmol). The mixture was stirred at RT for 18 hrs after which it was partitioned between EtOAc and water. The organics were separated, washed with sequentially water and brine, dried via passage through a hydrophobic frit and concentrated. The residue was purified by flash column chromatography (normal phase, silica) under a gradient of $Et_2O$ (0% to 10%) in iso-hexane to afford Intermediate 7, 3-benzyloxy-5-bromo-benzaldehyde (736 mg, 2.53 mmol, quant. yield) as a thick red oil. (LC/MS Method B): m/z 292 [M+H]$^+$ (ES$^+$), at 2.43 min, UV active.

Route 8, as Exemplified by the Preparation of Intermediate 8: methyl 2-hydroxy-4-((S)-1-((R)-morpholine-3-carboxamido)ethyl)benzoate (Intermediate 8)

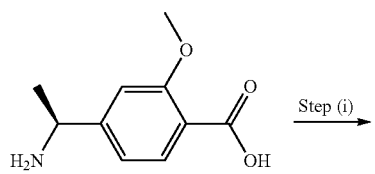

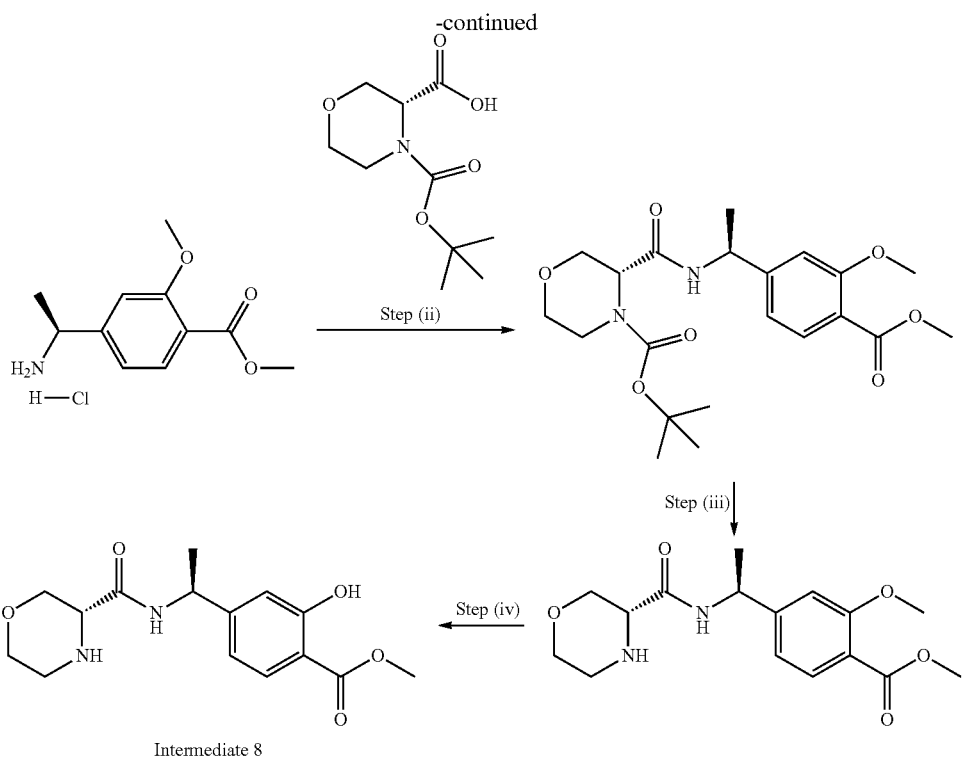

Intermediate 8

Step (i): (S)-4-(1-aminoethyl)-2-methoxybenzoic acid (2.00 g, 10.3 mmol) was dissolved in MeOH (20 mL) at RT. 4 N HCl in 1,4-dioxane (10 mL) was added and the reaction mixture was heated to reflux for 8 hrs. The mixture was cooled, concentrated and the obtained residue was triturated from diethyl ether to afford methyl (S)-4-(1-aminoethyl)-2-methoxybenzoate hydrochloride (2.10 g, 8.6 mmol, 83% yield) as a white solid. $^1$H NMR (400 MHz, DMSO) δ 1.53 (d, J=6.7 Hz, 3H), 3.78 (s, 3H), 3.85 (s, 3H), 4.37-4.46 (m, 1H), 7.13 (dd, J=7.9, 1.6 Hz, 1H), 7.48 (d, J=1.6 Hz, 1H), 7.66 (d, J=7.9 Hz, 1H), 8.75 (br.s, 3H).

Step (ii): To a solution of (R)-4-(tert-butoxycarbonyl) morpholine-3-carboxylic acid (3.60 g, 15.5 mmol) and methyl (S)-4-(1-aminoethyl)-2-methoxybenzoate hydrochloride (3.25 g, 15.5 mmol) in DMF (35 mL) was added HATU (8.87 g, 23.3 mmol) and the mixture was stirred at RT for 15 mins. The mixture was cooled to 0° C. and N,N-diisopropylethylamine (8.12 mL, 46.6 mmol) was added. The mixture was stirred at RT for 4 hrs after which it was partitioned between EtOAc and water. The organics were separated, and the aqueous layer was further extracted with EtOAc (×2). The combined organics were dried over Na$_2$SO$_4$ and concentrated. The crude material was purified by flash column chromatography (normal phase, silica) under a gradient of EtOAc (0% to 48%) in hexane to afford tert-butyl (R)-3-(((S)-1-(3-methoxy-4-(methoxycarbonyl) phenyl)ethyl)carbamoyl)morpholine-4-carboxylate (6.20 g, 14.7 mmol, 95% yield) as a sticky solid. (LC/MS Method E): m/z 445 [M+Na]$^+$ (ES$^+$), at 1.78 min, UV active.

Step (iii): To a solution of tert-butyl (R)-3-(((S)-1-(3-methoxy-4-(methoxycarbonyl)phenyl)ethyl)carbamoyl) morpholine-4-carboxylate (6.20 g, 14.7 mmol) in 1,4-dioxane (60 mL) at RT was added 4 M HCl in 1,4-dioxane (60 mL) and the mixture was stirred at RT for 2 hrs. After this time, the mixture was partitioned between EtOAc and sat. aq. NaHCO$_3$. The organics were separated, and the aqueous layer was further extracted with EtOAc (×2). The combined organics were dried over Na$_2$SO$_4$ and concentrated to afford methyl 2-methoxy-4-((S)-1-((R)-morpholine-3-carboxamido)ethyl)benzoate (3.20 g, 9.93 mmol, 68% yield) as a white solid. (LC/MS Method E): m/z 323 [M+H]$^+$ (ES$^+$), at 0.99 min, UV active.

Step (iv): To a solution of methyl 2-methoxy-4-((S)-1-((R)-morpholine-3-carboxamido)ethyl)benzoate (3.20 g, 9.93 mmol) in DCM at −78° C. was added dropwise BBr$_3$ (1 M in DCM, 32 mL) and the mixture was stirred at the same temperature for 1 hr. After this, the mixture was partitioned between EtOAc and sat. aq. NaHCO$_3$. The organics were separated, and the aqueous layer was further extracted with EtOAc (×2). The combined organics were dried over Na$_2$SO$_4$ and concentrated. The residue was purified by flash column chromatography (reversed phase, C18) under a gradient of MeCN (0-33%) in water to afford Intermediate 8, methyl 2-hydroxy-4-((S)-1-((R)-morpholine-3-carboxamido)ethyl)benzoate (2.30 g, 7.46 mmol, 75% yield) as a white solid. (LC/MS Method E): m/z 309 [M+H]$^+$ (ES$^+$), at 1.34 min, UV active.

Route 9, as Exemplified by the Preparation of Intermediate 11: 3'-(bromomethyl)-2-methyl-[1,1'-biphenyl]-4-carboxamide (Intermediate 11)

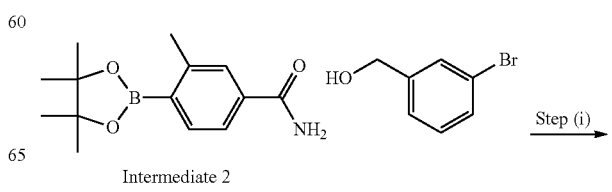

Intermediate 2

71
-continued

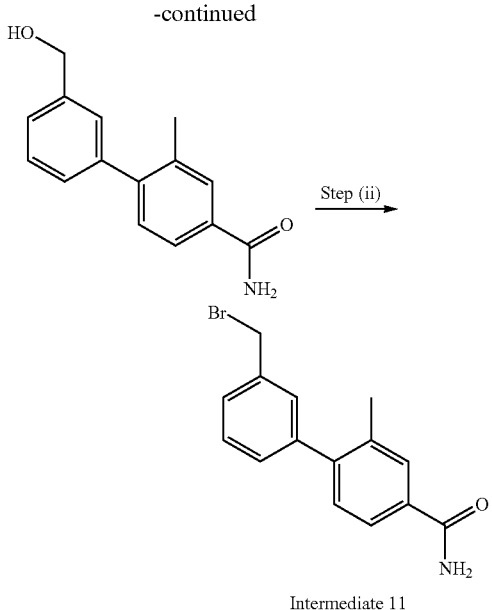

Intermediate 11

Step (i): To a solution of Intermediate 2, 3-methyl-4-(4,4,5,5-tetramethyl-1,3,2-dioxaborolan-2-yl)benzamide (800 mg, 3.06 mmol) in 1,4-dioxane (26 mL) and water (6 mL) under an atmosphere of nitrogen were added (3-bromophenyl)methanol (632 mg, 3.37 mmol), potassium acetate (900 mg, 9.18 mmol) and Pd(dppf)Cl$_2$ (224 mg, 0.306 mmol). The mixture was heated to 85° C. for 2.5 hrs, after which it was concentrated under reduced pressure. The residue was partitioned between EtOAc and water, the organics were separated, dried over Na$_2$SO$_4$ and concentrated. The crude material was purified by flash column chromatography (normal phase, silica) under a gradient of EtOAc (5% to 23%) in DCM to afford 3'-(hydroxymethyl)-2-methyl-[1,1'-biphenyl]-4-carboxamide (400 mg, 1.65 mmol, 54% yield) as a brown solid. (LC/MS Method I): m/z 242 [M+H]$^+$ (ES$^+$), at 2.80 min, UV active.

Step (ii): To a solution of 3'-(hydroxymethyl)-2-methyl-[1,1'-biphenyl]-4-carboxamide (300 mg, 1.24 mmol) in DCM (30 mL) at 0° C. was added PBr$_3$ (503 mg, 1.86 mmol) and the mixture was stirred at RT for 2 hrs. After this time, the mixture was poured into ice cold water and extracted with DCM (×1). The organics were dried over Na$_2$SO$_4$ and concentrated to afford Intermediate 11, 3'-(bromomethyl)-2-methyl-[1,1'-biphenyl]-4-carboxamide (300 mg, 0.99 mmol, 80% yield) as a yellow solid. (LC/MS Method I): m/z 305 [M+H]$^+$ (ES$^+$), at 3.60 min, UV active.

Route 10, as Exemplified by the Preparation of Intermediate 12 and Intermediate 30: methyl 4-(1-aminoethyl)-2,6-difluorobenzoate hydrochloride (Intermediate 12 and Intermediate 30 Separated Enantiomers, not Identified)

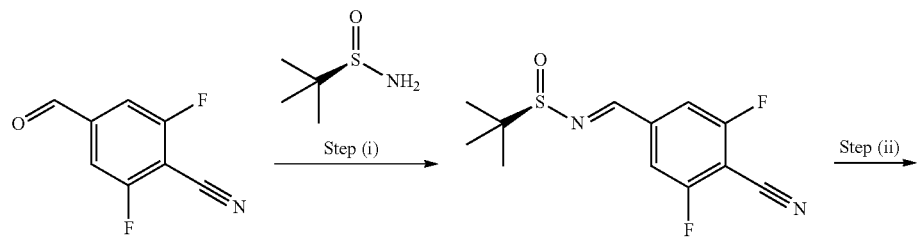

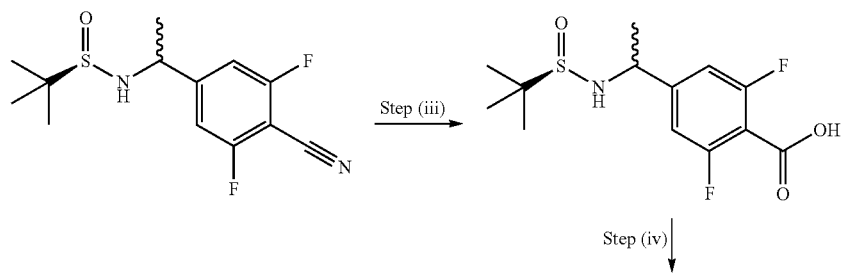

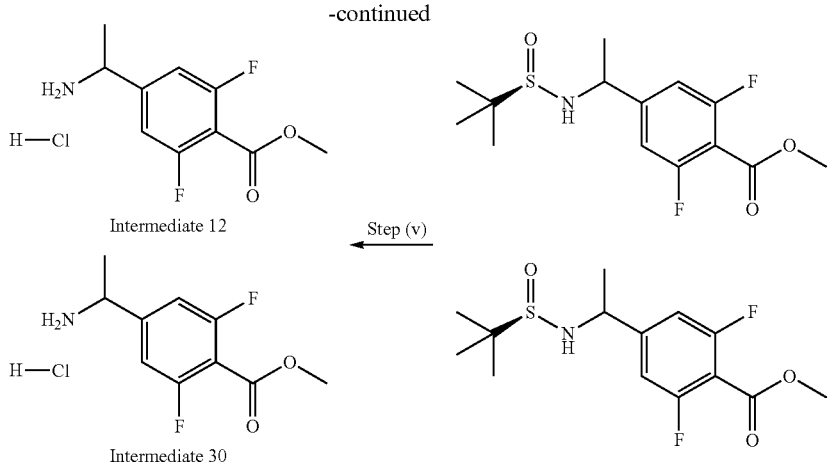

Step (i): To a solution of 2,6-difluoro-4-formylbenzonitrile (5.00 g, 29.9 mmol) and (R)-tert-butanesulfinamide (3.63 g, 29.9 mmol) in dry THF (60 mL) was added dropwise Ti(OEt)$_4$ (12.5 mL, 59.8 mmol). The mixture was stirred at RT for 16 hrs, after which it was poured into brine. The resulting suspension was filtered through Celite, washing through with EtOAc. The filtrate was washed with brine and the organics were separated. The aqueous layer was further extracted with EtOAc (×2) and the combined organics were dried over Na$_2$SO$_4$ and concentrated. The residue was recrystallized from EtOAc/hexane to afford (R)—N-(4-cyano-3,5-difluorobenzylidene)-2-methylpropane-2-sulfinamide (5.00 g, 18.5 mmol, 62% yield) as a white solid. (LC/MS Method I): m/z 271 [M+H]$^+$ (ES$^+$), at 3.93 min, UV active.

Step (ii): To a solution of (R)—N-(4-cyano-3,5-difluorobenzylidene)-2-methylpropane-2-sulfinamide (5.50 g, 20.4 mmol) in dry DCM (100 mL) at −78° C. under an atmosphere of nitrogen was added dropwise methylmagnesium bromide (3 M in Et$_2$O, 13.6 mL). The mixture was stirred at the same temperature for 1 hr then warmed to RT and stirred at RT for 1 hr. The mixture was cooled to 0° C. and quenched by the slow addition of sat. aq. NH$_4$Cl (20 mL). The organics were separated, and the aqueous layer was extracted with EtOAc (×3). The combined organics were dried over Na$_2$SO$_4$, concentrated, and the residue was recrystallized from EtOAc/hexane to afford (R)—N-(1-(4-cyano-3,5-difluorophenyl)ethyl)-2-methylpropane-2-sulfinamide, mixture of diastereomers (5.00 g, 17.5 mmol, 86% yield) as a yellow solid. (LC/MS Method I): m/z 287 [M+H]$^+$ (ES$^+$), at 3.48 min, UV active.

Step (iii): A suspension of (R)—N-(1-(4-cyano-3,5-difluorophenyl)ethyl)-2-methylpropane-2-sulfinamide, mixture of diastereomers (350 mg, 1.22 mmol) and NaOH (147 mg, 3.67 mmol) was heated to 80° C. for 5 hrs, after which it was cooled to RT, diluted with sat. aq. citric acid and extracted with EtOAc (×3). The combined organics were washed with brine, dried over Na$_2$SO$_4$ and concentrated to give 4-(1-(((R)-tert-butylsulfinyl)amino)ethyl)-2,6-difluorobenzoic acid, mixture of diastereomers (350 mg, 1.15 mmol, 94% yield) as a yellow oil that was used without purification. (LC/MS Method I): m/z 306 [M+H]$^+$ (ES$^+$), at 2.60 min, UV active.

Step (iv): To a solution of 4-(1-(((R)-tert-butylsulfinyl)amino)ethyl)-2,6-difluorobenzoic acid, mixture of diastereomers (2.66 g, 8.71 mmol) in MeOH (50 mL) was added N'-ethylcarbodiimide hydrochloride (2.50 g, 13.1 mmol), 1-Hydroxybenzotriazole hydrate (1.76 g, 13.1 mmol) and triethylamine (3.52 g, 34.8 mmol) at 0° C. The mixture was stirred at RT for 15 hrs, after which it was diluted with water and extracted with DCM (×3). The combined organics were washed with brine, dried over Na$_2$SO$_4$ and concentrated. The crude material was purified by flash column chromatography (normal phase, silica) under a gradient of EtOAc (10% to 30%) in petroleum ether to afford a fast-eluting spot, methyl 4-(1-(((R)-tert-butylsulfinyl)amino)ethyl)-2,6-difluorobenzoate, diastereomer 1 (1.00 g, 3.13 mmol, 36% yield) as a yellow oil, and a slow eluting spot, methyl 4-(1-(((R)-tert-butylsulfinyl)amino)ethyl)-2,6-difluorobenzoate, diastereomer 2, (665 mg, 2.08 mmol, 24% yield) as a yellow oil.

Diastereomer 1: (LC/MS Method I): m/z 320 [M+H]$^+$ (ES$^+$), at 3.33 min, UV active.

Diastereomer 2: (LC/MS Method I): m/z 320 [M+H]$^+$ (ES$^+$), at 3.24 min, UV active.

Step (v): To two separate solutions of methyl 4-(1-(((R)-tert-butylsulfinyl)amino)ethyl)-2,6-difluorobenzoate, each being a purified diasteriomer (60 mg, 0.19 mmol) in MeOH (3 mL) was added 4 M HCl in 1,4-dioxane and the mixture was stirred at RT for 1 hr. The solution was concentrated to afford Intermediate 12, (47 mg, 0.19 mmol, 98% yield; (LC/MS Method I): m/z 216 [M+H—HCl]$^+$ (ES$^+$), at 1.66 min, UV active.) as a yellow solid, or Intermediate 30 (45 mg, 0.18 mmol, 94% yield; (LC/MS Method I): m/z 315 [M+H—HCl]$^+$ (ES$^+$), at 1.49 min, UV active.) as a yellow solid.

Route 11, as Exemplified by the Preparation of Intermediate 13:
4-bromo-3-((tert-butyldimethylsilyl)oxy)benzenesulfonamide (Intermediate 13)

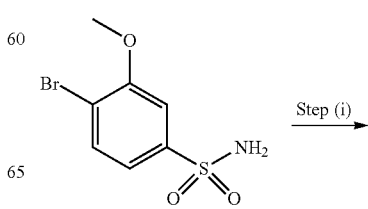

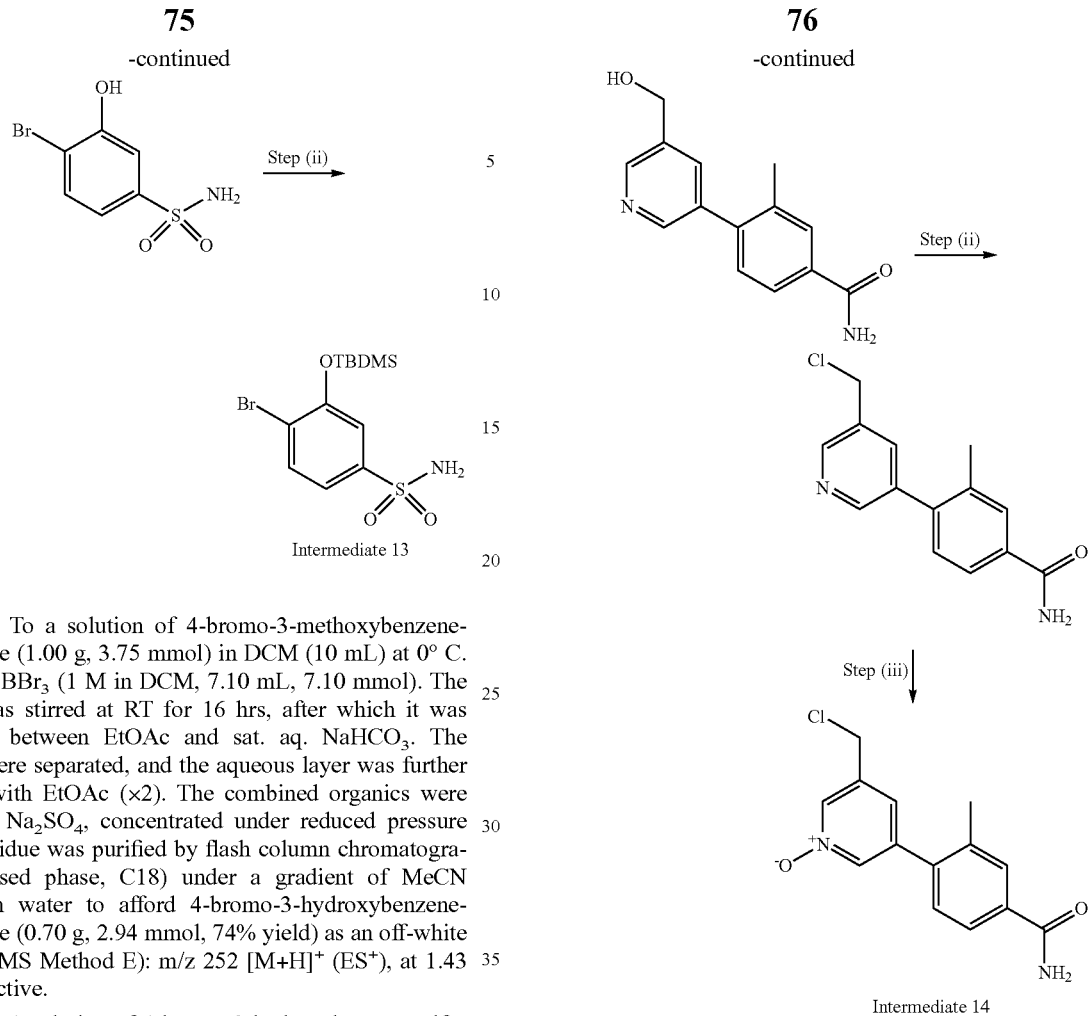

Intermediate 13

Intermediate 14

Step (i): To a solution of 4-bromo-3-methoxybenzenesulfonamide (1.00 g, 3.75 mmol) in DCM (10 mL) at 0° C. was added BBr₃ (1 M in DCM, 7.10 mL, 7.10 mmol). The mixture was stirred at RT for 16 hrs, after which it was partitioned between EtOAc and sat. aq. NaHCO₃. The organics were separated, and the aqueous layer was further extracted with EtOAc (×2). The combined organics were dried over Na₂SO₄, concentrated under reduced pressure and the residue was purified by flash column chromatography (reversed phase, C18) under a gradient of MeCN (0-26%) in water to afford 4-bromo-3-hydroxybenzenesulfonamide (0.70 g, 2.94 mmol, 74% yield) as an off-white solid. (LC/MS Method E): m/z 252 [M+H]⁺ (ES⁺), at 1.43 min, UV active.

Step (ii): A solution of 4-bromo-3-hydroxybenzenesulfonamide (100 mg, 0.39 mmol) and imidazole (81 mg, 1.19 mmol) in THF (2 mL) was stirred at −10° C. for 15 mins, after which tert-butyldimethylsilyl chloride (180 mg, 1.19 mmol) was added at the same temperature. The mixture was warmed to RT and stirred for 1 hr, after which it was partitioned between EtOAc and water. The organics were separated, and the aqueous layer was further extracted with EtOAc (×2). The combined organics were dried over Na₂SO₄ and concentrated to give Intermediate 13, 4-bromo-3-((tert-butyldimethylsilyl)oxy) benzenesulfonamide (160 mg, 0.43 mmol, quant. yield) as an off-white solid that was used without purification. ¹H NMR (400 MHz, DMSO) δ 0.27 (s, 6H), 1.02 (s, 9H), 7.30-7.35 (m, 2H), 7.50 (br.s, 2H), 7.78-7.83 (m, 1H).

Route 12, as Exemplified by the Preparation of Intermediate 14: 3-(4-carbamoyl-2-methylphenyl)-5-(chloromethyl) pyridine 1-oxide (Intermediate 14)

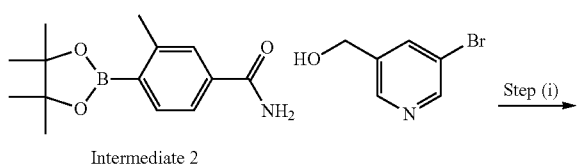

Intermediate 2

Step (i): To a suspension of Intermediate 2, 3-methyl-4-(4,4,5,5-tetramethyl-1,3,2-dioxaborolan-2-yl)benzamide (4.00 g, 15.3 mmol), (5-bromopyridin-3-yl)methanol (2.88 g, 15.3 mmol) and potassium acetate (4.50 g, 45.9 mmol) in 1,4-dioxane (64 mL) and water (16 mL) under an atmosphere of nitrogen was added Pd(dppf)Cl₂ (1.12 g, 1.53 mmol) and the mixture was heated to 85° C. for 16 hrs. The mixture was cooled, filtered and concentrated under reduced pressure. The crude residue was purified by flash column chromatography (normal phase, silica) under a gradient of MeOH (5% to 10%) in DCM to afford 4-(5-(hydroxymethyl)pyridin-3-yl)-3-methylbenzamide (2.50 g, 10.3 mmol, 68% yield), as a yellow solid. (LC/MS Method I): m/z 243 [M+H]⁺ (ES⁺), at 0.80 min, UV active.

Step (ii): To a solution of 4-(5-(hydroxymethyl)pyridin-3-yl)-3-methylbenzamide (1.20 g, 4.9 mmol), in DCM (30 mL) was added SOCl₂ (5.83 g, 49.0 mmol) and the mixture was stirred at RT for 1 hr after which it was filtered and concentrated. The crude residue was purified by flash column chromatography (normal phase, silica) under a gradient of MeOH (5% to 10%) in DCM to afford 4-(5-(chloromethyl)pyridin-3-yl)-3-methylbenzamide (1.0 g, 3.85 mmol, 78% yield) as a yellow solid. (LC/MS Method I): m/z 261 [M+H]⁺ (ES⁺), at 2.73 min, UV active.

Step (iii): To a suspension of 4-(5-(chloromethyl)pyridin-3-yl)-3-methylbenzamide (500 mg, 1.92 mmol) in DCM (15 mL) was added meta-chloroperoxybenzoic acid (664 mg, 3.84 mmol). The mixture was stirred at RT for 1 hr after which it was concentrated under reduced pressure. The crude residue was purified by flash column chromatography (normal phase, silica) under a gradient of MeOH (5% to 7%) in DCM to afford Intermediate 14, 3-(4-carbamoyl-2-methylphenyl)-5-(chloromethyl)pyridine 1-oxide (500 mg, 1.81 mmol, 94% yield) as a light yellow solid. (LC/MS Method I): m/z 277 [M+H]+ (ES+), at 2.30 min, UV active.

Route 13, as Exemplified by the Preparation of Intermediate 18: ethyl 6-[[[(3R)-morpholine-3-carbonyl]amino]methyl]pyridine-3-carboxylate hydrochloride (Intermediate 18)

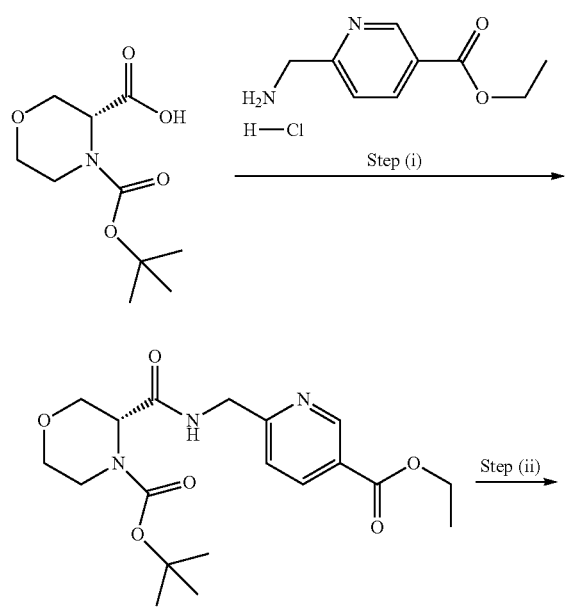

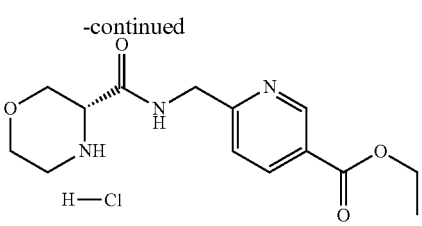

Intermediate 18

Step (i): To a solution of (R)-4-(tert-butoxycarbonyl)morpholine-3-carboxylic acid (220 mg, 0.95 mmol) in DMF (4.5 mL) were added N,N-diisopropylethylamine (0.66 mL, 3.81 mmol), HATU (435.23 mg, 1.14 mmol) and ethyl 6-(aminomethyl)nicotinate hydrochloride (247 mg, 1.14 mmol). The mixture was stirred at RT for 18 hrs, after which it was partitioned between EtOAc and water. The organics were separated, washed with brine, dried via passage through a hydrophobic frit and concentrated. The crude residue was purified by flash column chromatography (normal phase, silica) under a gradient of MeOH (0% to 5%) in DCM to afford tert-butyl (R)-3-(((5-(ethoxycarbonyl)pyridin-2-yl)methyl)carbamoyl)morpholine-4-carboxylate (379 mg, 0.964 mmol, quant yield) as a pale orange gum. (LC/MS Method B): m/z 394 [M+H]+(ES+), at 1.90 min, UV active.

Step (ii): To a solution of tert-butyl (3R)-3-[(5-ethoxycarbonyl-2-pyridyl)methylcarbamoyl]morpholine-4-carboxylate (379 mg, 0.96 mmol) in 1,4-dioxane (4 mL) was added 4 M HCl in 1,4-dioxane (4 mL, 1.34 mmol). The mixture was stirred at RT for 2.5 hrs after which it was concentrated to afford Intermediate 18, ethyl 6-[[[(3R)-morpholine-3-carbonyl]amino]methyl]pyridine-3-carboxylate hydrochloride (330 mg, 1.00 mmol, quant. yield) as a pale brown solid. (LC/MS Method B): m/z 294 [M+H—HCl]+ (ES+), at 1.38 min, UV active.

Route 14, as Exemplified by the Preparation of Intermediate 20: methyl 2,6-difluoro-4-[[[(3R)-morpholine-3-carbonyl]amino]methyl]benzoate hydrochloride (Intermediate 20)

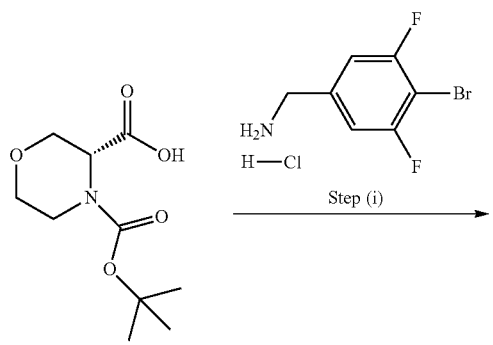

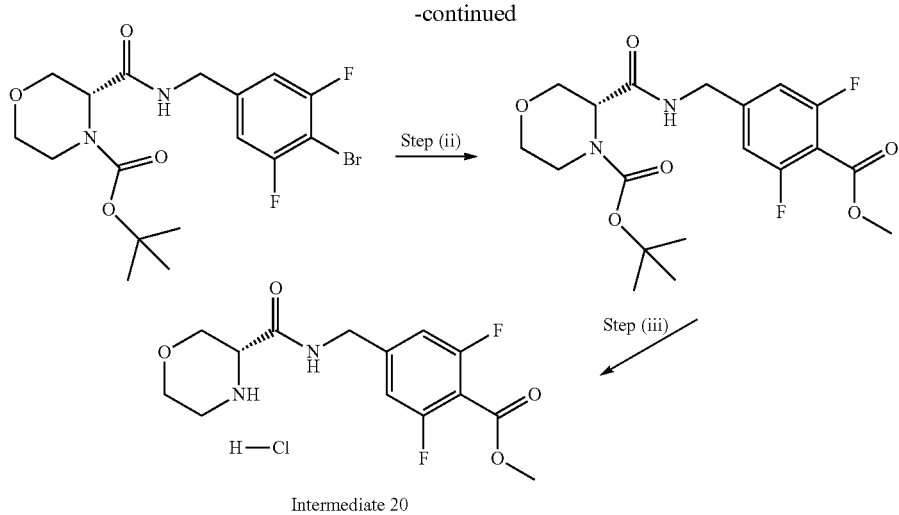

Intermediate 20

Step (i): To a mixture of (R)-4-(tert-butoxycarbonyl)morpholine-3-carboxylic acid (0.96 g, 4.13 mmol) in DMF (15 mL) were added N,N-diisopropylethylamine (2.38 mL, 13.8 mmol), HATU (1.84 g, 4.82 mmol) and (4-bromo-3,5-difluoro-phenyl)methanamine hydrochloride (890 mg, 3.44 mmol). The mixture was stirred at RT for 18 hrs, after which it was partitioned between EtOAc and water. The organics were separated, washed with brine, dried via passage through a hydrophobic frit and concentrated. The crude residue was purified by flash column chromatography (normal phase, silica) under a gradient of EtOAc (20% to 80%) in iso-hexane to afford tert-butyl (R)-3-((4-bromo-3,5-difluorobenzyl)carbamoyl)morpholine-4-carboxylate (1.26 g, 2.89 mmol, 84% yield) as an off-white solid. (LC/MS Method B): m/z 436 [M+H]$^+$ (ES$^+$), at 2.18 min, UV active.

Step (ii): A mixture of tert-butyl (R)-3-((4-bromo-3,5-difluorobenzyl)carbamoyl)morpholine-4-carboxylate (1.24 g, 2.85 mmol), triethylamine (0.48 mL, 3.42 mmol), palladium (II) acetate (64 mg, 0.29 mmol), and 1,1'-bis(diphenylphosphino)ferrocene (316 mg, 0.57 mmol) in MeOH (21 mL) and DMSO (6 mL) was purged with CO gas, then stirred under an atmosphere of CO at 80° C. for 20 hrs. The mixture was filtered through Celite and concentrated. The residue was partitioned between EtOAc and water, and the organics were separated, washed with brine, dried over MgSO$_4$ and concentrated. The crude residue was purified by flash column chromatography (normal phase, silica) under a gradient of MeOH (0% to 10%) in DCM, and then further purified by prep HPLC [purification method B; 40-70% Solvent B in Solvent A] to afford tert-butyl (R)-3-((3,5-difluoro-4-(methoxycarbonyl)benzyl)carbamoyl)morpholine-4-carboxylate (302 mg, 0.73 mmol, 26% yield) as a light brown solid. (LC/MS Method B): m/z 415 [M+H]$^+$ (ES$^+$), at 2.02 min, UV active.

Step (iii): To a stirred solution of tert-butyl (R)-3-((3,5-difluoro-4-(methoxycarbonyl)benzyl)carbamoyl)morpholine-4-carboxylate (302 mg, 0.73 mmol) in 1,4-dioxane (3 mL) was added 4 M HCl in 1,4-dioxane (3 mL). The mixture was stirred at RT for 2.5 hrs after which it was concentrated to afford Intermediate 20, methyl 2,6-difluoro-4-[[[(3R)-morpholine-3-carbonyl]amino]methyl]benzoate hydrochloride (247 mg, 0.71 mmol, 98% yield) as an off-white solid. (LC/MS Method B): m/z 294 [M+H—HCl]$^+$ (ES$^+$), at 1.38 min, UV active.

Route 15, as Exemplified by the Preparation of Intermediate 24: (4-carbamoyl-2-hydroxyphenyl)boronic acid (Intermediate 24)

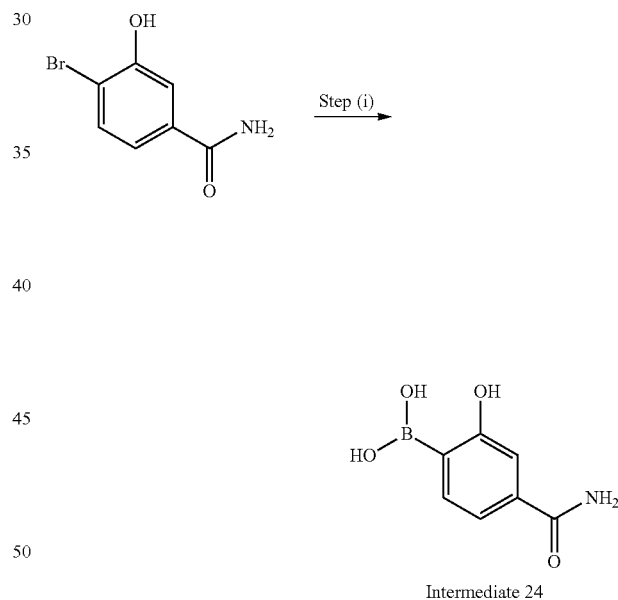

Intermediate 24

Step (i): 4-bromo-3-hydroxybenzamide (1.00 g, 4.65 mmol), bis(pinacolato)diboron (2.36 g, 9.30 mmol) and potassium acetate (1.37 g, 14.0 mmol) were dissolved in 1,4-dioxane (10 mL) the mixture was purged with nitrogen gas for 30 minutes. Pd(dppf)Cl$_2$ (43 mg, 0.05 mmol) was added and the reaction mixture heated to 80° C. for 4 hrs. The mixture was concentrated under reduced pressure and the residue was purified by flash column chromatography (reversed phase, C18) under a gradient of MeCN (0-2%) in water to afford Intermediate 24, (4-carbamoyl-2-hydroxyphenyl)boronic acid (0.51 g, 2.83 mmol, 61% yield) as an off-white solid. (LC/MS Method E): m/z 181 [M+H]$^+$ (ES$^+$), at 0.75 min, UV active.

Route 16, as Exemplified by the Preparation of Intermediate 32 and Intermediate 33: methyl (R)-4-(1-(morpholine-3-carboxamido) cyclopropyl)benzoate hydrochloride (Intermediate 32) and methyl (R)-4-(1-(4-(3-bromo-4-hydroxybenzyl)morpholine-3-carboxamido) cyclopropyl)benzoate (Intermediate 33)

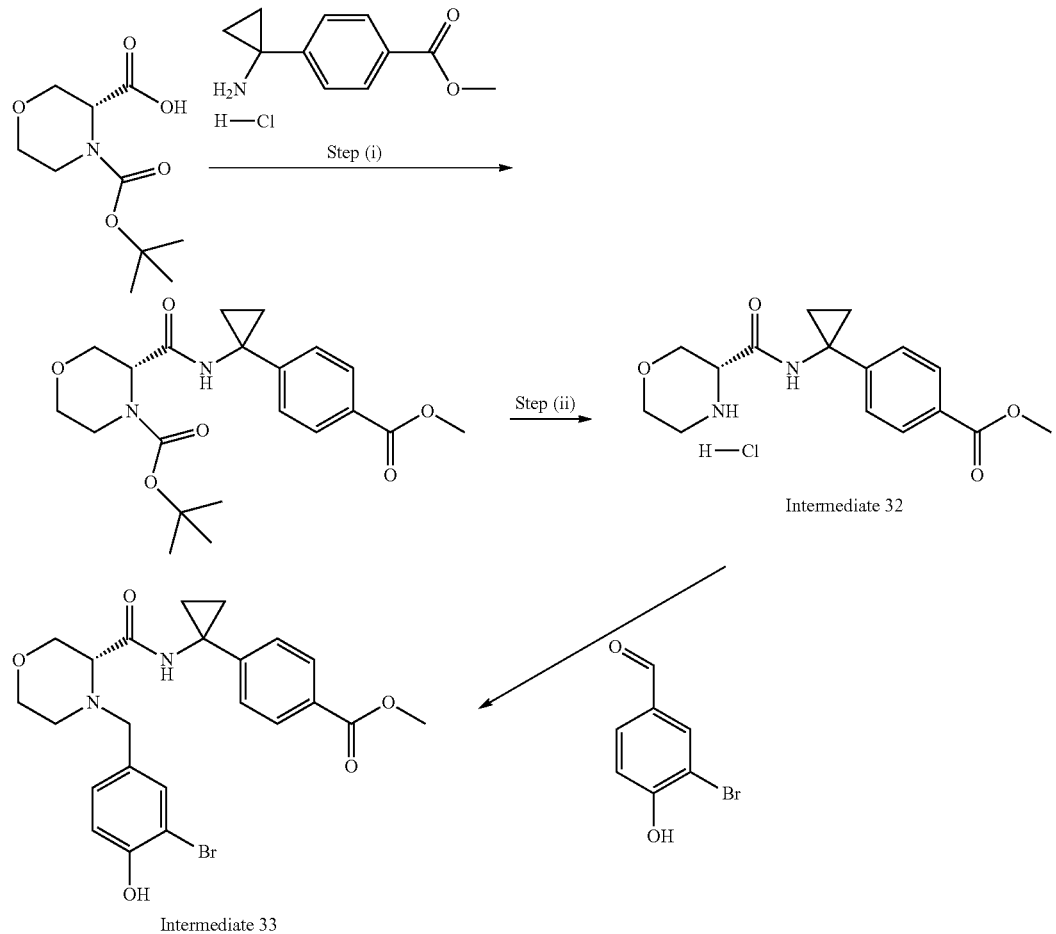

Step (i): To a solution of (R)-4-(tert-butoxycarbonyl) morpholine-3-carboxylic acid (3.50 g, 15.1 mmol) and methyl 4-(1-aminocyclopropyl)benzoate hydrochloride (4.13 g, 18.2 mmol) in DMF (35 mL) was added HATU (8.64 g, 22.7 mmol) and the mixture was stirred at RT for 15 minutes. The mixture was then cooled to 0° C. and N,N-diisopropylethylamine (7.91 mL, 45.4 mmol) was added, then stirred at RT for 6 hrs. The mixture was partitioned between EtOAc and water, and the organics were separated. The aqueous layer was further extracted with EtOAc (×2) and the combined organics were dried over $Na_2SO_4$ and concentrated. The crude residue was purified by flash column chromatography (normal phase, silica) under a gradient of EtOAc (0% to 40%) in hexane to afford tert-butyl (R)-3-((1-(4-(methoxycarbonyl)phenyl)cyclopropyl)carbamoyl)morpholine-4-carboxylate (5.50 g, 13.6 mmol, 90% yield) as a sticky solid. (LC/MS Method E): m/z 305 [M+H−Boc]$^+$ (ES$^+$), at 2.22 min, UV active.

Step (ii): tert-butyl (R)-3-((1-(4-(methoxycarbonyl)phenyl)cyclopropyl) carbamoyl)morpholine-4-carboxylate (5.50 g, 13.6 mmol) was dissolved in 1,4-dioxane (55 mL) under nitrogen atmosphere and 4 N HCl in 1,4-dioxane (55 mL) was added at RT. The mixture was stirred at RT for 8 hrs after which it was concentrated under reduced pressure. The crude material was triturated from $Et_2O$ to give Intermediate 32, methyl (R)-4-(1-(morpholine-3-carboxamido) cyclopropyl)benzoate hydrochloride (4.40 g, 12.9 mmol, 95% yield) as a white solid. (LC/MS Method E): m/z 305 [M+H−HCl]$^+$ (ES$^+$), at 1.07 min, UV active Step (iii): To a solution of Intermediate 32, methyl (R)-4-(1-(morpholine-3-carboxamido)cyclopropyl)benzoate hydrochloride (1.36 g, 4.00 mmol) and 3-bromo-4-hydroxybenzaldehyde (0.80 g, 4.00 mmol) in MeOH (8 mL) at RT was added $ZnCl_2$ (0.27 g, 2.00 mmol) and the mixture was stirred at 70° C. for 16 hrs. The mixture was cooled to 0° C., sodium cyanoborohydride (0.75 g, 12.0 mmol) was added portion-wise and the mixture was stirred at RT for 12 hrs. After this time, the reaction was partitioned between EtOAc and sat. aq.

$NaHCO_3$ and the organics were separated. The aqueous layer was further extracted with EtOAc (×2) and the combined organics were dried over Na₂SO₄ and concentrated. The residue was purified by flash column chromatography (reversed phase, C18) under a gradient of MeCN (0-65%) in water to afford Intermediate 33, methyl (R)-4-(1-(4-(3-bromo-4-hydroxybenzyl) morpholine-3-carboxamido)cyclopropyl)benzoate (0.35 g, 0.72 mmol, 18% yield) as a brown solid. (LC/MS Method E): m/z 490 [M+H]⁺ (ES⁺), at 1.46 min, UV active.

Route 17, as Exemplified by the Preparation of Intermediate 35: (R)—N-((S)-1-(4-cyanophenyl) ethyl)morpholine-3-carboxamide hydrochloride (Intermediate 35)

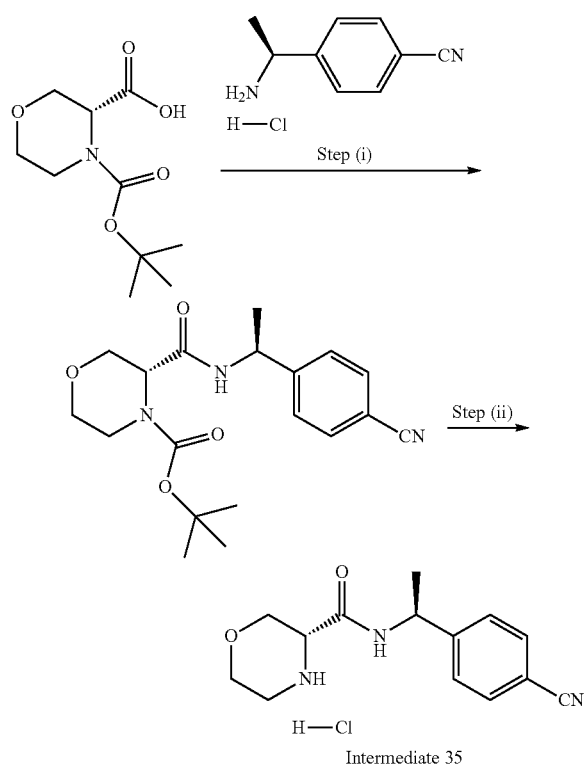

Intermediate 35

Step (i): To a solution of (R)-4-(tert-butoxycarbonyl) morpholine-3-carboxylic acid (0.50 g, 2.16 mmol) in acetonitrile (7 mL) was added (S)-4-(1-aminoethyl)benzonitrile hydrochloride (0.39 g, 2.16 mmol) followed by HATU (1.23 g, 3.24 mmol) and the reaction mixture allowed to stir at room temperature for 30 min. The mixture was then cooled to 0° C. and N, N-diisopropylethylamine (1.13 mL, 6.49 mmol) added, warmed to room temperature with stirring for 4 hrs. The reaction mixture was partitioned between water (30 mL) and EtOAc (30 mL). The aqueous layer was further extracted with EtOAc (3×30 mL) and the combined organic layers dried over Na₂SO₄, and concentrated in vacuo. The crude product was purified by gradient flash column chromatography (reverse phase, C18 silica) product eluted at 0% to 70% acetonitrile in water to afford tert-butyl (R)-3-(((S)-1-(4-cyanophenyl)ethyl) carbamoyl)morpholine-4-carboxylate (0.16 g, 21%) as brown solid. (LC/MS Method E): m/z 260 [M+H-Boc]⁺ (ES⁺), at 2.29 min, UV active.

Step-(ii): To a solution of tert-butyl (R)-3-(((S)-1-(4-cyanophenyl)ethyl)carbamoyl)morpholine-4-carboxylate (0.14 g, 0.40 mmol) in DCM (3 mL) at 0° C. was added 4 N HCl in dioxane (2 mL) and the reaction mixture was warmed and stirred at room temperature for 2 hrs. The mixture was concentrated in vacuo to obtain crude product which was triturated with diethyl ether (3×5 mL) to afford Intermediate 35 (R)—N-((S)-1-(4-cyanophenyl)ethyl)morpholine-3-carboxamide hydrochloride (0.113 g, 98%) as an off-brown solid. (LC/MS Method A): m/z 260 [M+H—HCl]⁺ (ES⁺), at 0.81 min, UV active.

Intermediate 10: 4-((S)-1-((R)-4-((4'-hydroxy-2'-methyl-[1,1'-biphenyl]-3-yl)methyl)morpholine-3-carboxamido) ethyl)benzoic acid (Intermediate 10) Following the procedure described in Example 5 but using Intermediate 3 and (3-methyl-4-(4,4,5,5-tetramethyl-1,3,2-dioxaborolan-2-yl) phenol (Intermediate 25), the title compound is obtained. (LC/MS Method E): m/z 475 [M+H]⁺ (ES⁺), at 1.45 min, UV active.

Synthetic Procedures for Compounds of Formula I

Example 1: Synthesis of 4-((S)-1-((R)-4-((5-(4-carbamoyl-2-methylphenyl)pyridin-3-yl)methyl) morpholine-3-carboxamido)ethyl)benzoic acid (Compound 1)

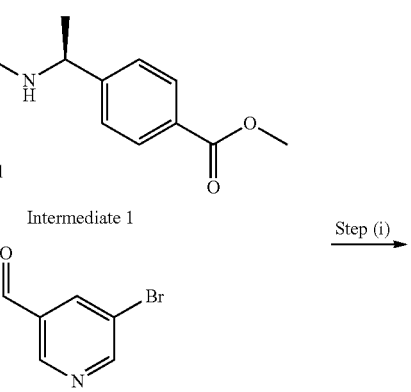

Intermediate 1

Step (i)

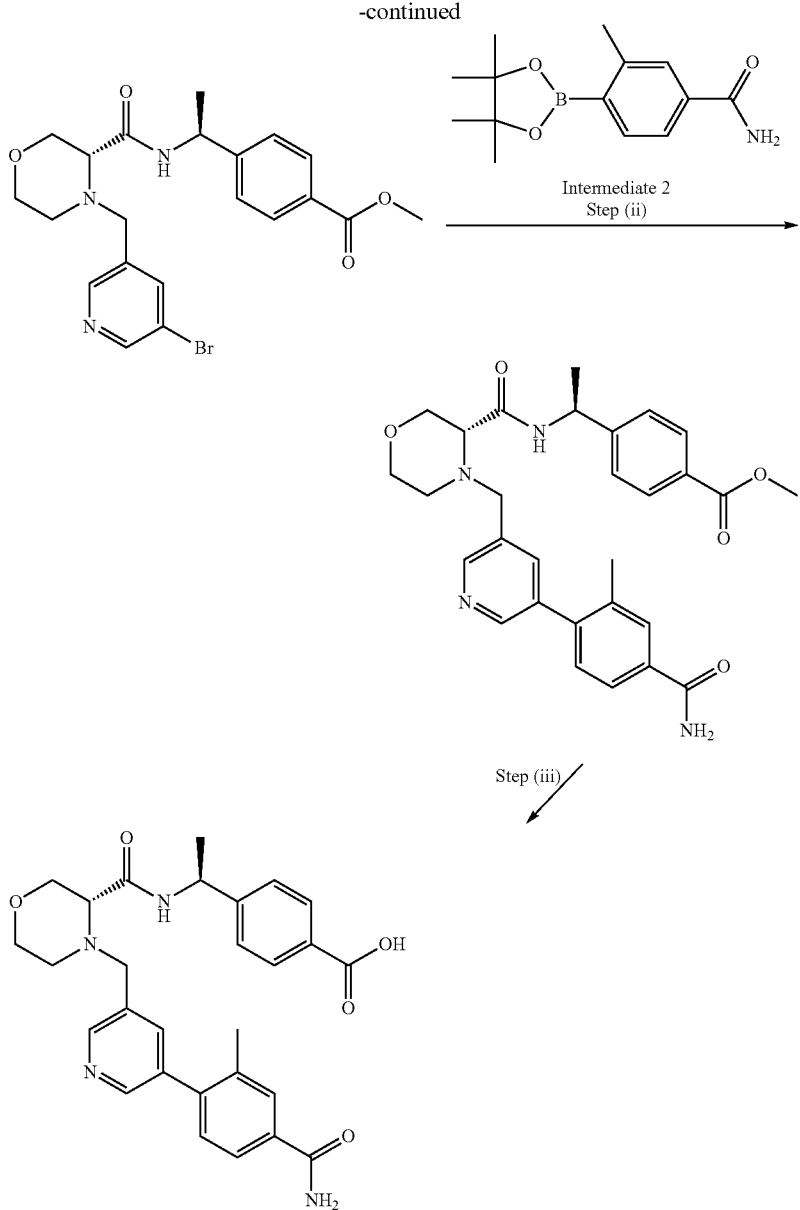

Step (i): To a solution of Intermediate 1, methyl 4-[(1S)-1-[[(3R)-morpholine-3-carbonyl]amino]ethyl]benzoate hydrochloride (250 mg, 0.76 mmol) in DCM (3.5 mL), was added 5-bromonicotinaldehyde (283 mg, 1.52 mmol). The mixture was stirred for 1 hr at RT after which sodium triacetoxyborohydride (338 mg, 1.6 mmol) was added. The mixture was stirred for 17 hrs at RT after which it was partitioned between DCM and 1 M NaOH (aq). The organics were separated, and the aqueous layer was extracted with DCM (3×). The combined organics were washed with water then brine, dried via passage through a hydrophobic frit and concentrated under reduced pressure. The crude material was purified by flash column chromatography (normal phase, silica) under a gradient of EtOAc (30% to 100%) in iso-hexane to afford methyl 4-[(1S)-1-[[(3R)-4-[(5-bromo-3-pyridyl)methyl]morpholine-3-carbonyl]amino]ethyl]benzoate (302 mg, 0.65 mmol, 86% yield) as a white solid. (LC/MS Method B): m/z 463 [M+H]$^+$ (ES$^+$), at 1.97 min, UV active.

Step (ii): A mixture of methyl 4-[(1S)-1-[[(3R)-4-[(5-bromo-3-pyridyl)methyl]morpholine-3-carbonyl]amino]ethyl]benzoate (150 mg, 0.32 mmol), Intermediate 2, 3-Methyl-4-(4,4,5,5-tetramethyl-1,3,2-dioxaborolan-2-yl)benzamide (102 mg, 0.39 mmol), potassium carbonate (90 mg, 0.65 mmol) and tetrakis(triphenylphosphine)palladium (0) (37.5 mg, 0.03 mmol), in 1,4-Dioxane (1.3 mL) and water (0.3 mL) was heated to 100° C. under microwave irradiation for 1 hr. The mixture was diluted with water and EtOAc and the organics were separated, washed with water then brine, dried via passage through a hydrophobic frit and concentrated under reduced pressure. The crude material was purified by flash column chromatography (normal phase, silica) under a gradient of MeOH (0% to 10%) in DCM to afford methyl 4-[(1S)-1-[[(3R)-4-[[5-(4-carbamoyl-2-methyl-phenyl)-3-pyridyl]methyl]morpholine-3-carbonyl]amino]ethyl]benzoate (143.2 mg, 0.27 mmol, 85% yield) as a pale yellow foam. (LC/MS Method B): m/z 517 [M+H]$^+$ (ES$^+$), at 1.81 min, UV active.

Step (iii): A mixture of methyl 4-[(1S)-1-[[(3R)-4-[[5-(4-carbamoyl-2-methyl-phenyl)-3-pyridyl]methyl]morpholine-3-carbonyl]amino]ethyl]benzoate (143 mg, 0.28 mmol) and lithium hydroxide monohydrate (40.7 mg, 0.97 mmol) in 1,4-dioxane (2 mL) and water (2 mL) was stirred at RT for 3 hours. The mixture was concentrated to dryness and the crude material was purified by prep HPLC [purification method A] to afford 4-[(1S)-1-[[(3R)-4-[[5-(4-carbamoyl-2-methyl-phenyl)-3-pyridyl]methyl]morpholine-3-carbonyl]amino]ethyl]benzoic acid (28.5 mg, 0.06 mmol, 20% yield) as a white solid. $^1$H NMR (DMSO, 400 MHz): δ (ppm) 1.34 (d, J=7.0 Hz, 3H), 2.14-2.22 (m, 1H), 2.23 (s, 3H), 2.66-2.72 (m, 1H), 3.02 (dd, J=9.1, 3.5 Hz, 1H), 3.34 (d, J=13.7 Hz, 1H), 3.45-3.56 (m, 2H), 3.64-3.70 (m, 1H), 3.75 (dd, J=11.1, 3.5 Hz, 1H), 3.79 (d, J=13.7 Hz, 1H), 4.91-5.00 (m, 1H), 7.25-7.31 (m, 3H), 7.34 (br s, 1H), 7.75-7.80 (m, 4H), 7.82-7.84 (m, 1H), 8.07 (br s, 1H), 8.44-8.48 (m, 2H), 8.50-8.53 (m, 1H). COO$\underline{H}$ proton not observed. (LC/MS Method D): m/z 503 [M+$\overline{H}$]$^+$ (ES$^+$), at 1.67 min, UV active.

Example 5: Synthesis of 4-((S)-1-((R)-4-((2'-methyl-4'-sulfamoyl-[1,1'-biphenyl]-3-yl)methyl)morpholine-3-carboxamido)ethyl)benzoic acid (Compound 5)

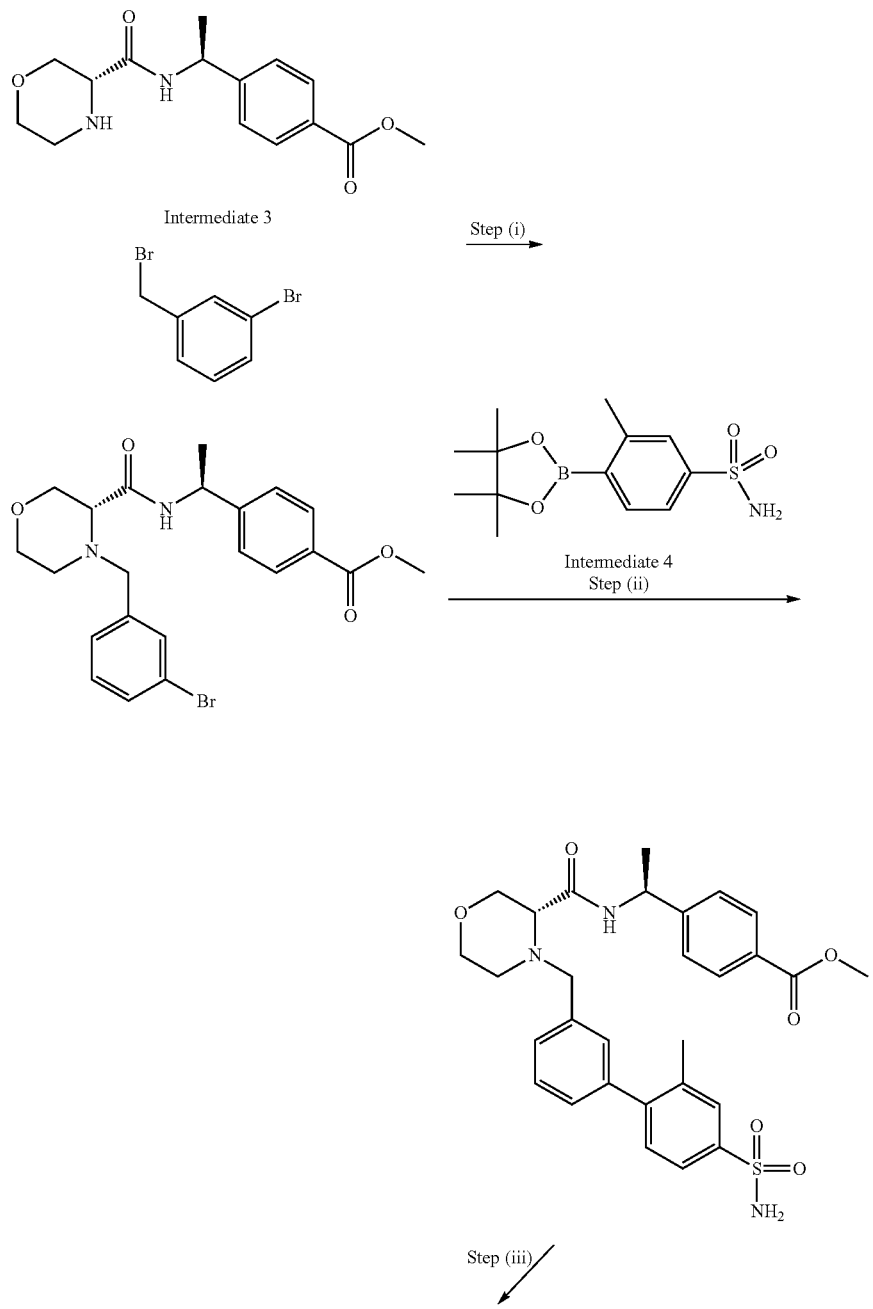

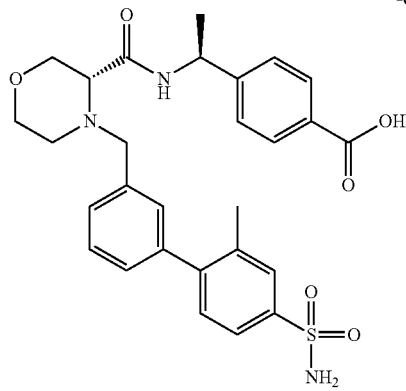

5

Step (i): Intermediate 3, methyl 4-((S)-1-((R)-morpholine-3-carboxamido)ethyl) benzoate (390 mg, 1.33 mmol), potassium carbonate (740 mg, 5.33 mmol) and sodium iodide (20 mg, 0.13 mmol) were dissolved in MeCN (5 mL) at RT. 1-bromo-3-(bromomethyl)benzene (280 mg, 1.12 mmol) was added and the reaction mixture was stirred at 80° C. for 1 hr. The mixture was cooled and partitioned between EtOAc and water. The organics were separated, and the aqueous layer was further extracted with EtOAc. The combined organics were dried over $Na_2SO_4$ and concentrated. The residue was purified by flash column chromatography (normal phase, silica) under a gradient of EtOAc (0-68%) in hexane to afford methyl 4-((S)-1-((R)-4-(3-bromobenzyl)morpholine-3-carboxamido)ethyl)benzoate (400 mg, 0.87 mmol, 78% yield) as an off-white solid. (LC/MS Method A): m/z 461 [M+H]$^+$ (ES$^+$), at 2.16 min, UV active.

Step (ii): methyl 4-((S)-1-((R)-4-(3-bromobenzyl)morpholine-3-carboxamido)ethyl)benzoate (0.20 g, 0.43 mmol), Intermediate 4, 3-methyl-4-(4,4,5,5-tetramethyl-1,3,2-dioxaborolan-2-yl)benzenesulfonamide (0.15 g, 0.52 mmol) and potassium carbonate (0.12 g, 0.86 mmol) were dissolved in mixture of 1,4-Dioxane (2 mL) and water (2 mL) and the mixture was purged with nitrogen gas at RT for 30 minutes. $PdCl_2(dppf)$. DCM (0.07 g, 0.09 mmol) was added and the reaction mixture was heated to 80° C. for 3 hrs. After this, the mixture was cooled and partitioned between EtOAc and water. The organics were separated, and the aqueous layer was further extracted with EtOAc. The combined organics were dried over $Na_2SO_4$ and concentrated. The residue was purified by flash column chromatography (reversed phase, C18) under a gradient of MeCN (0-48%) in water to afford methyl 4-((S)-1-((R)-4-((2'-methyl-4'-sulfamoyl-[1,1'-biphenyl]-3-yl)methyl)morpholine-3-carboxamido)ethyl)benzoate (0.16 g, 0.29 mmol, 67% yield) as an off-white solid. (LC/MS Method A): m/z 552 [M+H]+(ES$^+$), at 1.90 min, UV active.

Step (iii): methyl 4-((S)-1-((R)-4-((2'-methyl-4'-sulfamoyl-[1,1'-biphenyl]-3-yl)methyl)morpholine-3-carboxamido)ethyl)benzoate (0.16 g, 0.29 mmol) was dissolved in 1,4-dioxane (3 mL) and water (1 mL). Lithium hydroxide monohydrate (60 mg, 1.45 mmol) was added at RT and the reaction mixture was stirred for 3 hrs, after which it was partitioned between EtOAc and water. The organic layer was separated, and the aqueous layer was acidified to pH 1 using 4 N HCl (aq.). The acidic aqueous layer was extracted with EtOAc (×2) and these combined organics were dried over $Na_2SO_4$ and concentrated. The residue was purified by flash column chromatography (reversed phase, C18) under a gradient of MeCN (0-38%) in water to afford 4-((S)-1-((R)-4-((2'-methyl-4'-sulfamoyl-[1,1'-biphenyl]-3-yl)methyl)morpholine-3-carboxamido)ethyl)benzoic acid (68 mg, 0.13 mmol, 44% yield) as a white solid. $^1$H NMR (DMSO, 400 MHz): δ (ppm) 1.37 (d, J=7.0 Hz, 3H), 2.09-2.20 (m, 1H), 2.25-2.35 (m, 4H), 2.66-2.73 (m, 1H), 2.96-3.06 (m, 1H), 3.21-3.29 (m, 1H), 3.44-3.59 (m, 2H), 3.65-3.83 (m, 3H), 4.93-5.06 (m, 1H), 7.24-7.28 (m, 1H), 7.35-7.44 (m, 7H), 7.65-7.73 (m, 1H), 7.73-7.78 (m, 1H), 7.84-7.93 (m, 2H), 8.50-8.60 (m, 1H), 12.84 (br.s, 1H). (LC/MS Method A): m/z 538 [M+H]$^+$ (ES$^+$), at 1.65 min, UV active.

Example 9: Synthesis of 5-[[[(3R)-4-[[3-(4-carbamoyl-2-methyl-phenyl)phenyl]methyl]morpholine-3-carbonyl]amino]methyl]pyridine-2-carboxylic acid (Compound 9)

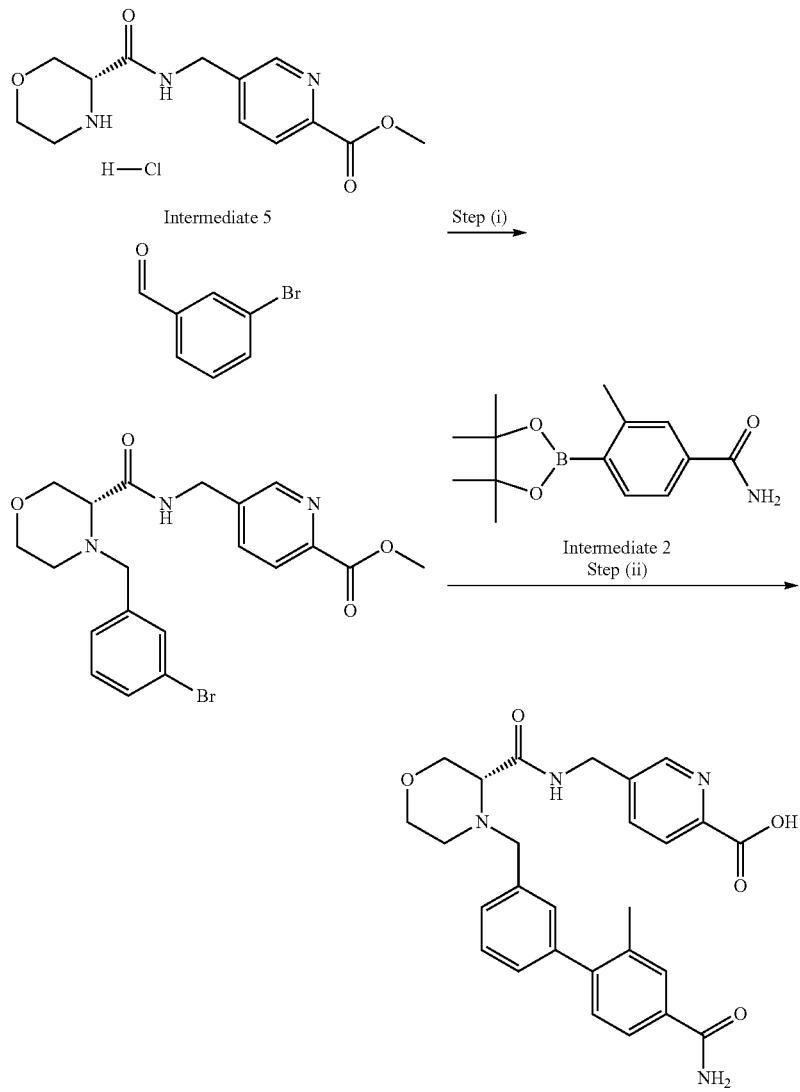

Step (i): To a solution of Intermediate 5, methyl 5-[[[(3R)-morpholine-3-carbonyl]amino]methyl]pyridine-2-carboxylate hydrochloride (218 mg, 0.69 mmol) in DCM (3.2 mL), was added 3-bromobenzaldehyde (0.16 mL, 1.38 mmol). The mixture was stirred at RT for 1 hr before sodium triacetoxyborohydride (307 mg, 1.45 mmol) was added. The mixture was stirred for a further 17 hrs at RT, after which it was concentrated in vacuo. The residue was suspended in sat. NaHCO$_3$(aq) and extracted with EtOAc (×3). The combined organic phases were washed with water and brine, dried via passage through a hydrophobic frit and concentrated in vacuo. The crude material was purified by flash column chromatography (normal phase, silica) under a gradient of MeOH (0% to 10%) in DCM to afford methyl 5-[[[(3R)-4-[(3-bromophenyl)methyl]morpholine-3-carbonyl]amino]methyl]pyridine-2-carboxylate (216 mg, 0.48 mmol, 70% yield) as a colourless gum. (LC/MS Method B): m/z 449 [M+H]$^+$ (ES$^+$), at 1.92 min, UV active.

Step (ii): A mixture of methyl 5-[[[(3R)-4-[(3-bromophenyl)methyl]morpholine-3-carbonyl]amino]methyl]pyridine-2-carboxylate (216 mg, 0.48 mmol), Intermediate 2, 3-methyl-4-(4,4,5,5-tetramethyl-1,3,2-dioxaborolan-2-yl)benzamide (163 mg, 0.63 mmol), potassium carbonate (200 mg, 1.44 mmol) and tetrakis(triphenylphosphine)palladium (0) (56 mg, 0.05 mmol) in 1,4-dioxane (1.6 mL) and water (0.4 mL) was heated to 100° C. in a microwave reactor for 4 hrs. The mixture was diluted with water and EtOAc and the organics were separated. The aqueous layer was adjusted to pH 5 using conc. HCl and then extracted with EtOAc. Both the organic and aq. pH 5 phases were concentrated in vacuo, and the residues were combined and purified by prep HPLC [purification method D] to afford 5-[[[(3R)-4-[[3-(4- carbamoyl-2-methyl-phenyl)phenyl]methyl]morpholine-3-carbonyl]amino]methyl]pyridine-2-carboxylic acid (107 mg, 45%) as a white foam. $^1$H NMR (CD$_3$OD, 400 MHz): δ (ppm) 2.30 (s, 3H), 3.31-3.44 (m, 2H), 3.65-3.78 (m, 2H), 3.99-4.06 (m, 1H), 4.12-4.18 (m, 1H), 4.20-4.28 (m, 2H), 4.53-4.61 (m, 3H), 7.30 (d, J=7.9 Hz, 1H), 7.45-7.57 (m, 4H), 7.71-7.78 (m, 1H), 7.80-7.85 (m, 1H), 7.96-8.03 (m, 1H), 8.11-8.19 (m, 1H), 8.63-8.69 (m, 1H). Exchangeable protons not observed. (LC/MS Method C): m/z 489 [M+H]$^+$ (ES$^+$), at 1.88 min, UV active.

Example 10: 4-((S)-1-((R)-4-((4'-carbamoyl-5-hydroxy-2'-methyl-[1,1'-biphenyl]-3-yl)methyl)morpholine-3-carboxamido)ethyl)benzoic acid (Compound 10)

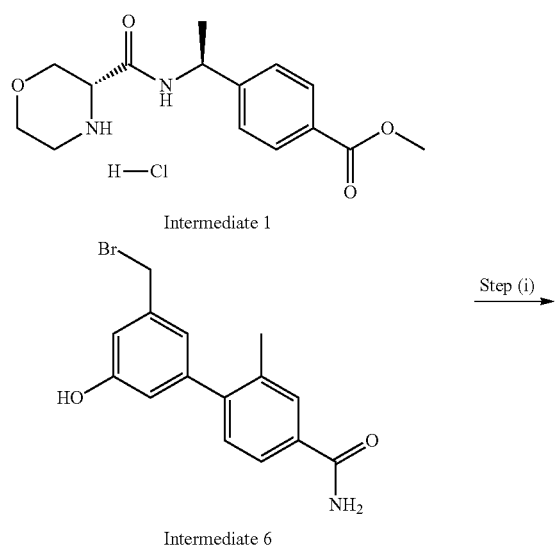

Intermediate 1

Intermediate 6

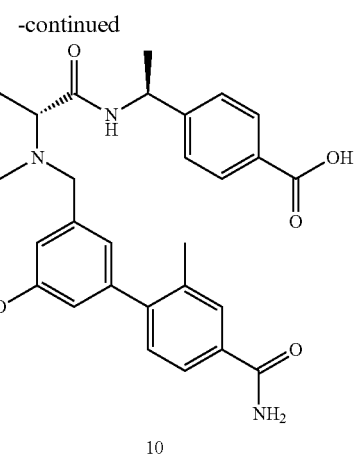

10

Step (i): To a solution of Intermediate 1, methyl 4-((S)-1-((R)-morpholine-3-carboxamido)ethyl)benzoate hydrochloride (1.14 g, 3.47 mmol) and N,N-diisopropylethylamine (1.81 mL, 10.4 mmol) in MeCN (11 mL) at RT was added Intermediate 6, 3'-(bromomethyl)-5'-hydroxy-2-methyl-[1,1'-biphenyl]-4-carboxamide (1.11 g, 3.47 mmol) and the mixture was heated to 70° C. for 5 hrs. After cooling to RT, the mixture was partitioned between water and EtOAc. The aqueous layer was separated and extracted with EtOAc (×2). The combined organic layers were and dried over Na$_2$SO$_4$ and concentrated. The residue was purified by flash column chromatography (reversed phase, C18) under a gradient of MeCN (0-52%) in water to afford methyl 4-((S)-1-((R)-4-((4'-carbamoyl-5-hydroxy-2'-methyl-[1,1'-biphenyl]-3-yl)methyl)morpholine-3-carboxamido)ethyl) benzoate (1.62 g, 3.05 mmol, 88% yield) as a brown solid. (LC/MS Method F): m/z 532 [M+H]$^+$ (ES$^+$), at 1.11 min, UV active.

Step (ii): methyl 4-((S)-1-((R)-4-((4'-carbamoyl-5-hydroxy-2'-methyl-[1,1'-biphenyl]-3-yl)methyl)morpholine-3-carboxamido)ethyl)benzoate (1.60 g, 3.04 mmol) was dissolved in a mixture of 1,4-dioxane (6 mL) and water (4 mL). Lithium hydroxide monohydrate (0.64 g, 15.2 mmol) was added at RT and reaction mixture was stirred for 16 hrs. The mixture was then partitioned between water and EtOAc. The aqueous layer was separated and acidified with 1 N aqueous HCl to pH 2, then extracted with EtOAc (×3). The combined organic layers were dried over Na$_2$SO$_4$ and concentrated. The residue was purified by flash column chromatography (reversed phase, C18) under a gradient of MeCN (0-43%) in water to afford 4-((S)-1-((R)-4-((4'-carbamoyl-5-hydroxy-2'-methyl-[1,1'-biphenyl]-3-yl)methyl)morpholine-3-carboxamido)ethyl) benzoic acid (1.06 g, 2.05 mmol, 68% yield) as an off-white solid. $^1$H NMR (DMSO, 400 MHz): δ (ppm) 1.37 (d, J=7.0 Hz, 3H), 2.09-2.18 (m, 1H), 2.25 (s, 3H), 2.69-2.78 (m, 1H), 2.97-3.03 (m, 1H), 3.13 (d, J=13.1 Hz, 1H), 3.43-3.59 (m, 2H), 3.65-3.82 (m, 3H), 4.88-5.06 (m, 1H), 6.60 (s, 1H), 6.72-6.80 (m, 2H), 7.23 (d, J=7.9 Hz, 1H), 7.34 (s, 1H), 7.42 (d, J=7.9 Hz, 2H), 7.72 (d, J=7.9 Hz, 1H), 7.79 (s, 1H), 7.86 (d, J=7.9 Hz, 2H), 7.95 (s, 1H), 8.49 (d, J=7.8 Hz, 1H), 9.51 (s, 1H), 12.83 (br.s, 1H). (LC/MS Method G): m/z 518 [M+H]$^+$ (ES$^+$), at 1.60 min, UV active.

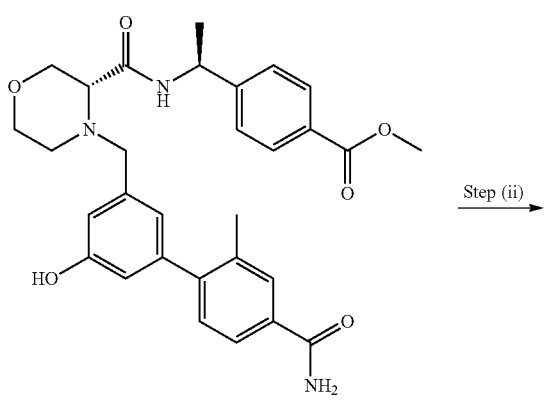

Example 11: 4-[(1S)-1-[[(3R)-4-[[3-hydroxy-5-(2-methyl-4-sulfamoyl-phenyl)phenyl]methyl]morpholine-3-carbonyl]amino]ethyl]benzoic acid (Compound 11)
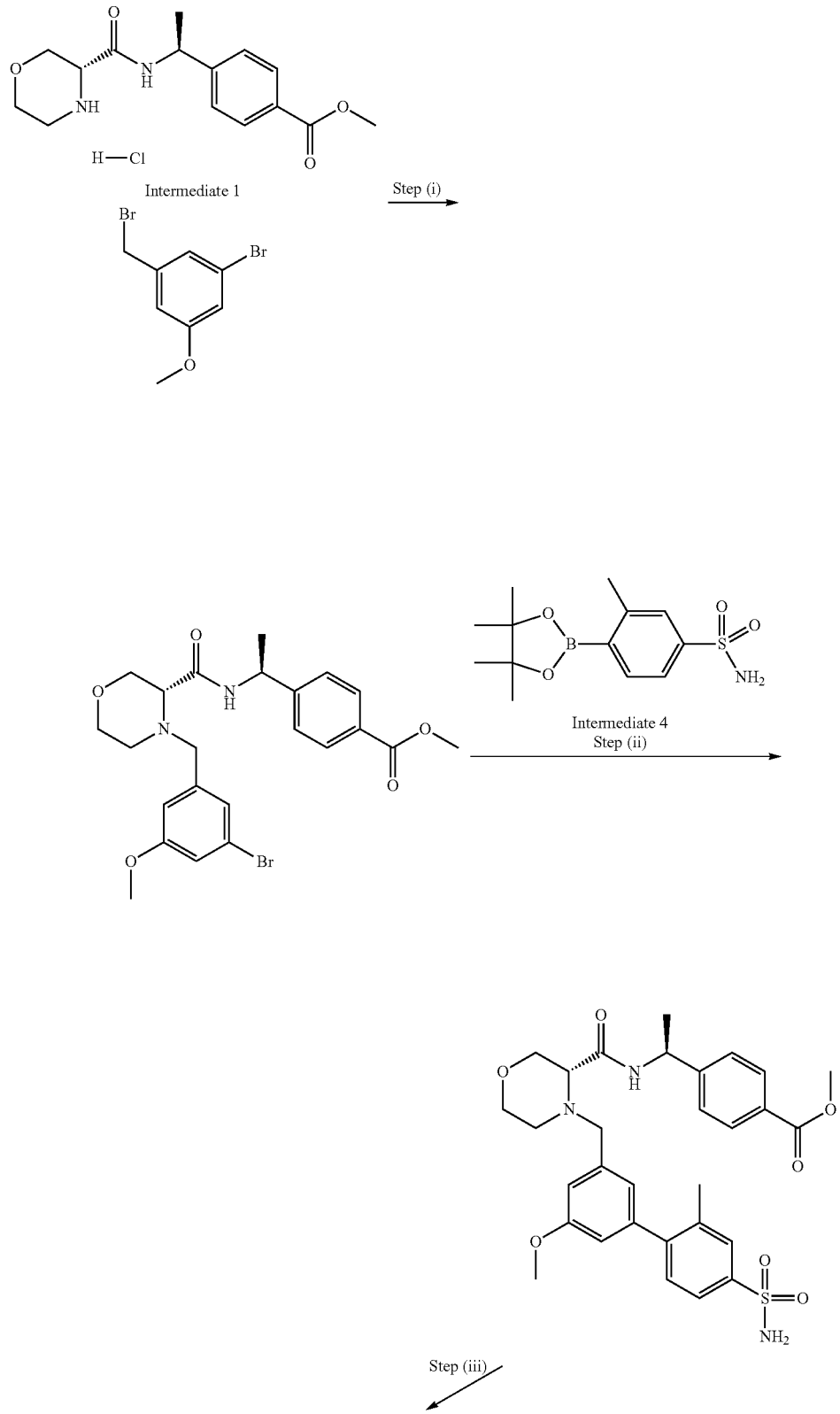

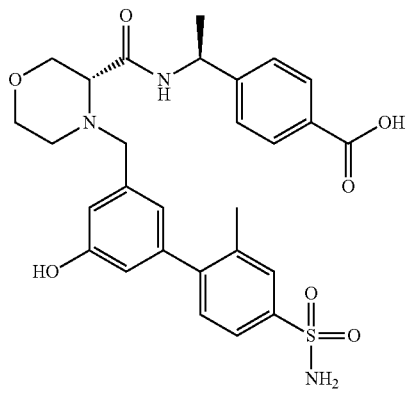

11

Step (i): To a solution of Intermediate 1, methyl 4-[(1S)-1-[[(3R)-morpholine-3-carbonyl]amino]ethyl]benzoate hydrochloride (1.01 g, 3.07 mmol) in MeCN (35 mL), were added 1-bromo-3-(bromomethyl)-5-methoxybenzene (1.72 g, 6.14 mmol) and potassium carbonate (1.06 g, 7.68 mmol). The resulting mixture was heated to 70° C. for 18 hrs, before being cooled to RT, filtered through a phase separator and concentrated. The residue was taken up in EtOAc, washed with water and brine, dried via passage through a hydrophobic frit and concentrated. The residue was purified by flash column chromatography (normal phase, silica) under a gradient of EtOAc (30-90%) in iso-hexane to afford methyl 4-[(1S)-1-[[(3R)-4-[(3-bromo-5-methoxy-phenyl)methyl]morpholine-3-carbonyl]amino]ethyl]benzoate (1.35 g, 2.74 mmol, 89% yield) as a white solid. (LC/MS Method B): m/z 492 [M+H]$^+$ (ES$^+$), at 2.32 min, UV active.

Step (ii): A mixture of Intermediate 4, 3-methyl-4-(4,4,5,5-tetramethyl-1,3,2-dioxaborolan-2-yl)benzenesulfonamide (330 mg, 1.11 mmol), methyl 4-[(1S)-1-[[(3R)-4-[(3-bromo-5-methoxy-phenyl)methyl]morpholine-3-carbonyl]amino]ethyl]benzoate (455 mg, 0.93 mmol), potassium carbonate (256 mg, 1.85 mmol) and tetrakis(triphenylphosphine)palladium (0) (107 mg, 0.09 mmol), in 1,4-dioxane (3.7 mL) and water (0.9 mL) was heated to 100° C. in a microwave reactor for 30 minutes. The mixture was diluted with water and EtOAc and the organics were separated, washed with water and brine, dried via passage through a hydrophobic frit and concentrated. The residue was purified by flash column chromatography (normal phase, silica) under a gradient of EtOAc (30-100%) in iso-hexane to afford methyl 4-[(1S)-1-[[(3R)-4-[[3-methoxy-5-(2-methyl-4-sulfamoyl-phenyl)phenyl]methyl]morpholine-3-carbonyl]amino]ethyl]benzoate (500 mg, 0.86 mmol, 93% yield) as an off-white solid. (LC/MS Method B): m/z 582 [M+H]$^+$ (ES$^+$), at 2.10 min, UV active.

Step (iii): To a solution of methyl 4-[(1S)-1-[[(3R)-4-[[3-methoxy-5-(2-methyl-4-sulfamoyl-phenyl)phenyl]methyl]morpholine-3-carbonyl]amino]ethyl]benzoate (505 mg, 0.87 mmol) in DCM (12 mL) at −78° C. under an atmosphere of nitrogen was added a 1 M solution of boron tribromide in DCM (6.08 mL, 6.08 mmol) dropwise. The mixture was warmed to RT gradually and was stirred at RT for 18 hrs. The mixture was cooled to 0° C. and MeOH/H$_2$O 1:1 (7.6 mL) was added dropwise. The mixture was stirred for 1 hour at RT after which time it was concentrated. The crude residue was purified by prep HPLC [purification method D] to afford 4-[(1S)-1-[[(3R)-4-[[3-hydroxy-5-(2-methyl-4-sulfamoyl-phenyl)phenyl]methyl]morpholine-3-carbonyl]amino]ethyl]benzoic acid (68.1 mg, 0.12 mmol, 14% yield) as an off-white foam. $^1$H NMR (CD$_3$OD, 400 MHz): δ (ppm) 1.51 (d, J=7.1 Hz, 3H), 2.27 (s, 3H), 3.23-3.28 (m, 1H), 3.34-3.35 (m, 1H), 3.36-3.42 (m, 1H), 3.70-3.78 (m, 2H), 3.99-4.10 (m, 2H), 4.20-4.29 (m, 2H), 5.11 (d, J=7.1 Hz, 1H), 6.73-6.75 (m, 1H), 6.83-6.85 (m, 1H), 6.87-6.89 (m, 1H), 7.32 (d, J=8.0 Hz, 1H), 7.44-7.52 (m, 2H), 7.73-7.77 (m, 1H), 7.81-7.82 (m, 1H), 7.94-7.98 (m, 2H). Exchangeable protons not observed. (LC/MS Method D): m/z 554 [M+H]$^+$ (ES$^+$), at 1.63 min, UV active.

Example 15: 4-[(1S)-1-[[(3R)-4-[[3-hydroxy-5-(2-methyl-4-sulfamoyloxy-phenyl)phenyl]methyl]morpholine-3-carbonyl]amino]ethyl]benzoic acid (Compound 15)

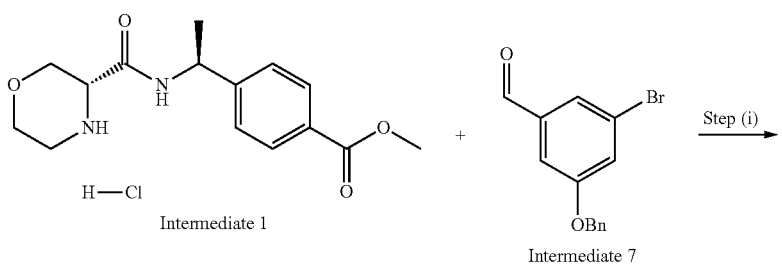

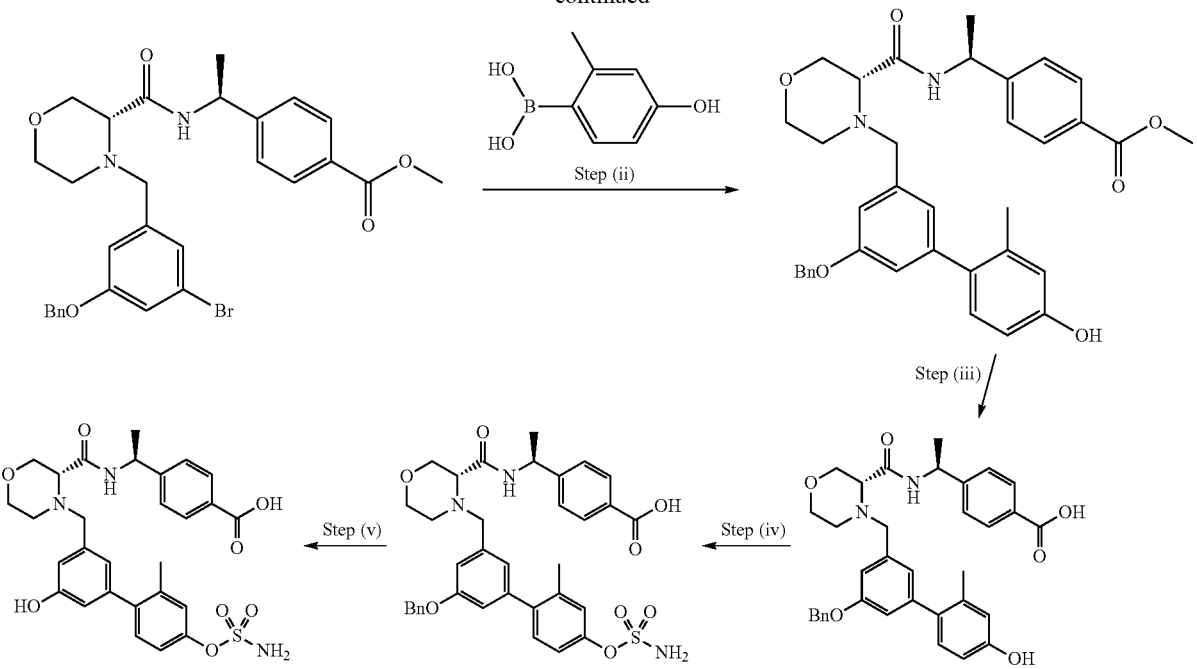

Step (i): To a solution of Intermediate 1, methyl 4-[(1S)-1-[[(3R)-morpholine-3-carbonyl]amino]ethyl]benzoate hydrochloride (300 mg, 0.91 mmol) in DCM (4.2 mL), was added Intermediate 7, 3-benzyloxy-5-bromo-benzaldehyde (531 mg, 1.82 mmol). The mixture was stirred at RT for 1 hr, after which sodium triacetoxyborohydride (406 mg, 1.92 mmol) was added. The mixture was stirred at RT for 19 hrs, after which it was partitioned between 1 M NaOH (aq) and DCM. The organics were separated, and the aqueous layer was further extracted with DCM (3×). The organic phases were combined, washed with water and brine, dried via passage through a hydrophobic frit and concentrated. The crude material was purified by flash column chromatography (normal phase, silica) under a gradient of EtOAc (30% to 80%) in iso-hexane to afford methyl 4-[(1S)-1-[[(3R)-4-[(3-benzyloxy-5-bromo-phenyl)methyl]morpholine-3-carbonyl]amino]ethyl]benzoate (424 mg, 0.74 mmol, 82% yield) as a white solid. (LC/MS Method B): m/z 568 [M+H]$^+$ (ES$^+$), at 2.59 min, UV active.

Step (ii): A mixture of methyl 4-[(1S)-1-[[(3R)-4-[(3-benzyloxy-5-bromo-phenyl)methyl]morpholine-3-carbonyl]amino]ethyl]benzoate (450 mg, 0.79 mmol), (4-Hydroxy-2-methylphenyl)boronic acid (145 mg, 0.95 mmol), potassium carbonate (219 mg, 1.59 mmol) and tetrakis(triphenylphosphine)palladium (0) (91.6 mg, 0.08 mmol), in 1,4-Dioxane (3.2 mL) and water (0.8 mL) was heated to 100° C. for 2 hrs in a microwave reactor. Additional tetrakis(triphenylphosphine)palladium (0) (45.8 mg, 0.04 mmol), potassium carbonate (55 mg, 0.4 mmol) and (4-Hydroxy-2-methylphenyl)boronic acid (72 mg, 0.48 mmol) were added and the mixture heated to 100° C. for a further 30 minutes. The mixture was partitioned between water and EtOAc and the organics were separated, washed with water and brine, dried via passage through a hydrophobic frit and concentrated. The crude material was purified by flash column chromatography (normal phase, silica) under a gradient of EtOAc (30% to 90%) in iso-hexane to afford methyl 4-[(1S)-1-[[(3R)-4-[[3-benzyloxy-5-(4-hydroxy-2-methyl-phenyl)phenyl]methyl]morpholine-3-carbonyl]amino]ethyl]benzoate (413 mg, 0.69 mmol, 88% yield) as an orange gum. (LC/MS Method B): m/z 595 [M+H]$^+$ (ES$^+$), at 2.45 min, UV active.

Step (iii): To a solution of methyl 4-[(1S)-1-[[(3R)-4-[[3-benzyloxy-5-(4-hydroxy-2-methyl-phenyl)phenyl]methyl]morpholine-3-carbonyl]amino]ethyl]benzoate (413 mg, 0.69 mmol) in water (4 mL) and 1,4-dioxane (4 mL), was added lithium hydroxide monohydrate (102 mg, 2.43 mmol). The mixture was stirred at RT for 3 hrs, after which it was concentrated under reduced pressure. The crude material was purified by flash column chromatography (normal phase, silica) under a gradient of EtOAc containing 0.1% v/v acetic acid (30% to 90%) in iso-hexane to afford 4-[(1S)-1-[[(3R)-4-[[3-benzyloxy-5-(4-hydroxy-2-methyl-phenyl)phenyl]methyl]morpholine-3-carbonyl]amino]ethyl]benzoic acid (67 mg, 0.12 mmol, 17% yield) as an off-white foam. (LC/MS Method B): m/z 581 [M+H]$^+$ (ES$^+$), at 1.66 min, UV active.

Step (iv): To a solution of 4-[(1S)-1-[[(3R)-4-[[3-benzyloxy-5-(4-hydroxy-2-methyl-phenyl)phenyl]methyl]morpholine-3-carbonyl]amino]ethyl]benzoic acid (67 mg, 0.12 mmol) in DMA (1 mL) was added sulfamoyl chloride (33.4 mg, 0.29 mmol). The mixture was stirred at RT for 18 hrs, after which additional sulfamoyl chloride (20 mg, 0.17 mmol) was added and the mixture was stirred for an additional 18 hrs. Water (0.75 mL) was added and the mixture was stirred for 30 minutes, after which it was partitioned between EtOAc and 1 M HCl (aq). The organics were separated, and the aqueous layer was further extracted with EtOAc (3×). The combined organics were concentrated and triturated from EtOAc to afford 4-[(1S)-1-[[(3R)-4-[[3-benzyloxy-5-(2-methyl-4-sulfamoyloxy-phenyl)phenyl]methyl]morpholine-3-carbonyl]amino]ethyl]benzoic acid (30 mg, 0.04 mmol, 37% yield) as a colourless glass. (LC/MS Method B): m/z 660 [M+H]$^+$ (ES$^+$), at 1.45 min, UV active.

Step (v): To a solution of 4-[(1S)-1-[[(3R)-4-[[3-benzyloxy-5-(2-methyl-4-sulfamoyloxy-phenyl)phenyl]methyl]morpholine-3-carbonyl]amino]ethyl]benzoic acid (30 mg, 0.05 mmol) in ethanol (0.45 mL), was added 10% palladium on carbon (1 mg). The mixture was stirred at RT under an atmosphere of hydrogen for 16 hrs, after which the suspension was passed through a plug of Celite, washing through with methanol. The filtrate was concentrated under reduced pressure and the crude residue was purified by prep HPLC [purification method D] to afford 4-[(1S)-1-[[(3R)-4-[[3-hydroxy-5-(2-methyl-4-sulfamoyloxy-phenyl)phenyl]methyl]morpholine-3-carbonyl]amino]ethyl]benzoic acid (18.5 mg, 0.033 mmol, 71% yield) as a colourless glass. $^1$H NMR (CD$_3$OD, 400 MHz): δ (ppm) 1.51 (d, J=7.0 Hz, 3H), 2.21 (s, 3H), 3.24-3.29 (m, 1H), 3.36-3.44 (m, 1H), 3.69-3.79 (m, 2H), 3.99-4.10 (m, 3H), 4.18-4.31 (m, 2H), 5.10 (q, J=7.0 Hz, 1H), 6.69-6.71 (m, 1H), 6.81-6.85 (m, 2H), 7.18-7.25 (m, 3H), 7.45-7.49 (m, 2H), 7.95-7.99 (m, 2H). Exchangeable protons not observed. (LC/MS Method D): m/z 570 [M+H]$^+$ (ES$^+$), at 2.76 min, UV active.

Example 18: 4-((S)-1-((R)-4-((4'-carbamoyl-5-hydroxy-2'-methyl-[1,1'-biphenyl]-3-yl)methyl)morpholine-3-carboxamido)ethyl)-2-hydroxybenzoic acid (Compound 18)

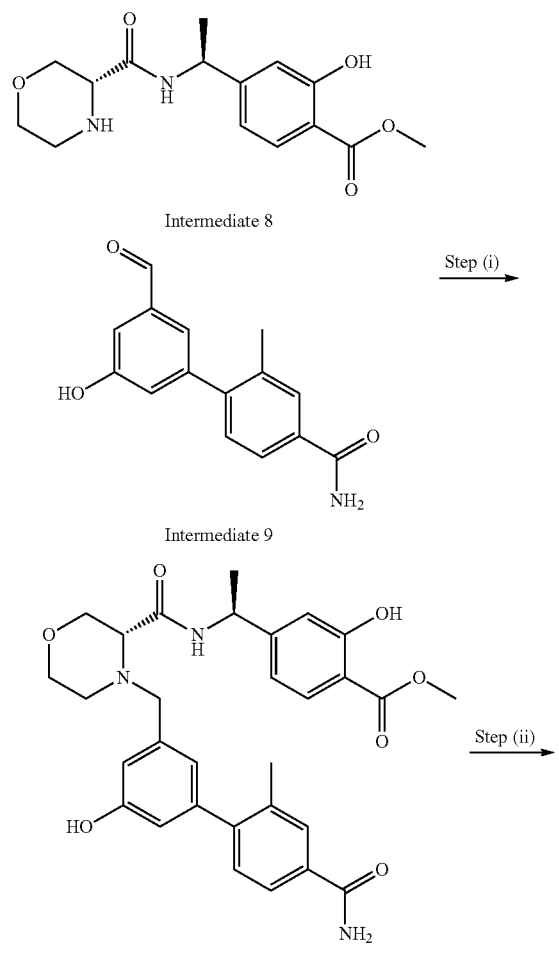

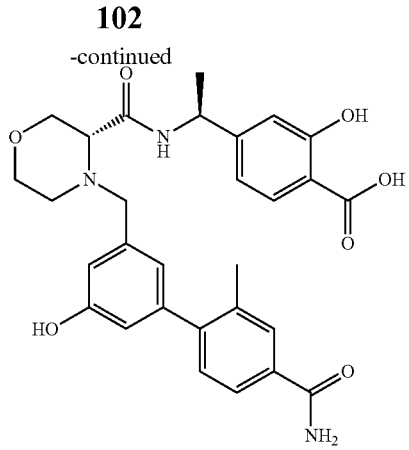

Step (i): Intermediate 8, methyl 2-hydroxy-4-((S)-1-((R)-morpholine-3-carboxamido)ethyl)benzoate (0.20 g, 0.65 mmol) and Intermediate 9, 3'-formyl-5'-hydroxy-2-methyl-[1,1'-biphenyl]-4-carboxamide (0.33 g, 1.30 mmol) were dissolved in methanol (2 mL) under an atmosphere of nitrogen. To it, 4 A molecular sieves (0.5 g) and glacial acetic acid (4 μL, 0.065 mmol) were added at RT and the mixture was stirred for 4 hrs. After this the reaction mixture was cooled to 0° C. and sodium cyanoborohydride (0.12 g, 1.95 mmol) was added portion-wise and the mixture was stirred at RT for 16 hrs. The reaction mixture was concentrated, and the residue was partitioned between sat. aq. NaHCO$_3$ and EtOAc. The aqueous layer was separated and was further extracted with EtOAc (3×). The combined organics were dried over Na$_2$SO$_4$ and concentrated. The residue was purified by flash column chromatography (reversed phase, C18) under a gradient of MeCN (0-44%) in water to afford methyl 4-((S)-1-((R)-4-((4'-carbamoyl-5-hydroxy-2'-methyl-[1,1'-biphenyl]-3-yl)methyl) morpholine-3-carboxamido)ethyl)-2-hydroxybenzoate (0.19 g, 0.34 mmol, 54% yield) as a white solid. (LC/MS Method E): m/z 548 [M+H]$^+$ (ES$^+$), at 1.37 min, UV active.

Step (ii): methyl 4-((S)-1-((R)-4-((4'-carbamoyl-5-hydroxy-2'-methyl-[1,1'-biphenyl]-3-yl)methyl)morpholine-3-carboxamido)ethyl)-2-hydroxybenzoate (0.19 g, 0.34 mmol) was dissolved in 1,4-dioxane (2 mL) and water (2 mL). Lithium hydroxide monohydrate (73 mg, 1.75 mmol) was added and the mixture was stirred at RT for 12 hrs. The solvent was removed under reduced pressure and the crude material was dissolved in 4 N aq HCl, adsorbed onto Celite and purified by flash column chromatography (reversed phase, C18) under a gradient of MeCN (0-24%) in water to afford 4-((S)-1-((R)-4-((4'-carbamoyl-5-hydroxy-2'-methyl-[1,1'-biphenyl]-3-yl)methyl)morpholine-3-carboxamido) ethyl)-2-hydroxybenzoic acid (0.11 g, 0.21 mmol, 60% yield) as white solid. $^1$H NMR (DMSO, 400 MHz): δ (ppm) 1.34 (d, J=7.0 Hz, 3H), 2.11-2.31 (m, 4H), 2.68-2.79 (m, 1H), 2.99-3.09 (m, 1H), 3.11-3.20 (m, 1H), 3.45-3.60 (m, 2H), 3.65-3.85 (m, 3H), 4.83-4.95 (m, 1H), 6.61 (s, 1H), 6.74-6.79 (m, 2H), 6.82-6.90 (m, 2H), 7.23 (d, J=7.9 Hz, 1H), 7.33 (s, 1H), 7.66-7.74 (m, 2H), 7.79 (d, J=1.8 Hz, 1H), 7.95 (s, 1H), 8.51 (br.s, 1H), 9.53 (br.s, 1H), 11.75 (br.s, 1H), 13.76 (br.s, 1H). (LC/MS Method E): m/z 534 [M+H]$^+$ (ES$^+$), at 1.22 min, UV active.

Example 19: 4-((S)-1-((R)-4-((4'-carbamoyl-2'-methyl-[1,1'-biphenyl]-3-yl)methyl)morpholine-3-carboxamido)ethyl)-2-hydroxybenzoic acid (Compound 19)
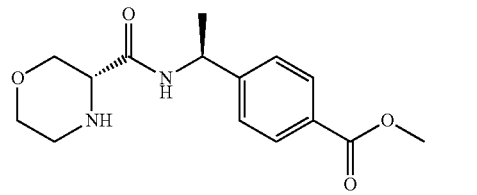
Intermediate 8                    Step (i)
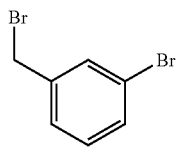
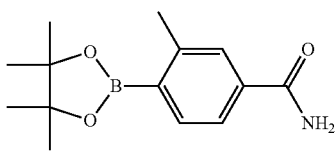
Intermediate 2
Step (ii)
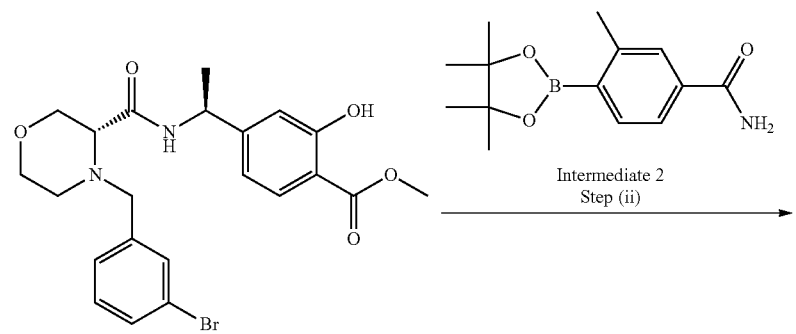
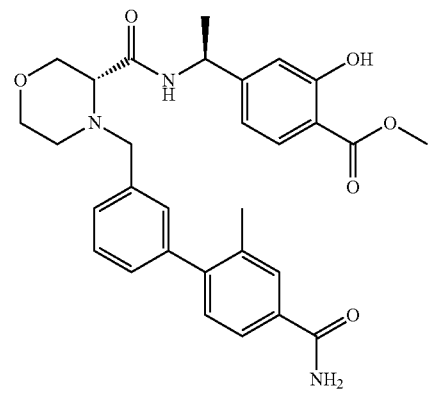
Step (iii)

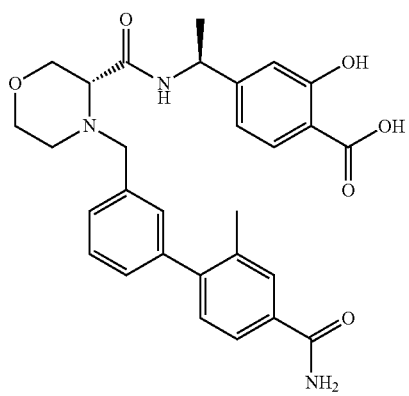

19

Step (i): To a solution of Intermediate 8, methyl 2-hydroxy-4-((S)-1-((R)-morpholine-3-carboxamido)ethyl)benzoate (500 mg, 1.62 mmol) and N,N-diisopropylethylamine (0.57 mL, 3.25 mmol) in MeCN (5 mL) was added 1-bromo-3-(bromomethyl)benzene (490 mg, 1.95 mmol) and the mixture was heated to 80° C. for 2 hrs. The mixture was cooled and partitioned between EtOAc and water. The organic layer was separated, and the aqueous layer was further extracted with EtOAc (×2). The combined organics were dried over $Na_2SO_4$ and concentrated. The crude material was purified by flash column chromatography (normal phase, silica) under a gradient of EtOAc (0% to 34%) in hexane to afford methyl 4-((S)-1-((R)-4-(3-bromobenzyl) morpholine-3-carboxamido)ethyl)-2-hydroxybenzoate (550 mg, 1.15 mmol, 71% yield) as a white solid. (LC/MS Method E): m/z 478 $[M+H]^+$ $(ES^+)$, at 1.94 min, UV active.

Step (ii): methyl 4-((S)-1-((R)-4-(3-bromobenzyl) morpholine-3-carboxamido)ethyl) benzoate (250 mg, 0.53 mmol), Intermediate 2, 3-methyl-4-(4,4,5,5-tetramethyl-1,3,2-dioxaborolan-2-yl)benzamide (692 mg, 2.65 mmol) and potassium carbonate (146 mg, 1.06 mmol) were dissolved in mixture of 1,4-dioxane:water (1:1, 6 mL) and the mixture was purged with nitrogen gas for 30 minutes at RT. After this, $PdCl_2(dppf)$. DCM (43 mg, 0.05 mmol) was added and the reaction mixture was heated to 80° C. for 2 hrs. The mixture was cooled and partitioned between EtOAc and water. The organics were separated, and the aqueous layer was further extracted with EtOAc. The combined organics were dried over $Na_2SO_4$ and concentrated.

The residue was purified by flash column chromatography (reversed phase, C18) under a gradient of MeCN (0-58%) in water to afford methyl 4-((S)-1-((R)-4-((4'-carbamoyl-2'-methyl-[1,1'-biphenyl]-3-yl)methyl)morpholine-3-carboxamido) ethyl)-2-hydroxybenzoate (170 mg, 0.32 mmol, 61%) as an off-white solid. (LC/MS Method E): m/z 532 $[M+H]^+$ $(ES^+)$, at 1.52 min, UV active.

Step (iii): To a solution of methyl 4-((S)-1-((R)-4-((4'-carbamoyl-5-hydroxy-2'-methyl-[1,1'-biphenyl]-3-yl)methyl)morpholine-3-carboxamido)ethyl)-2-hydroxybenzoate (170 mg, 0.32 mmol) in 1,4-dioxane (2 mL) and water (2 mL) was added lithium hydroxide monohydrate (73 mg, 1.60 mmol) and the mixture was stirred at RT for 3 hrs. The solvent was removed under reduced pressure and the residue was acidified with 4 N HCl, adsorbed directly onto Celite and purified by flash column chromatography (reversed phase, C18) under a gradient of MeCN (0-33%) in water to afford 4-((S)-1-((R)-4-((4'-carbamoyl-2'-methyl-[1,1'-biphenyl]-3-yl)methyl)morpholine-3-carboxamido)ethyl)-2-hydroxybenzoic acid (65 mg, 0.13 mmol, 39% yield) as an off-white solid. $^1$H NMR (400 MHz, DMSO) δ 1.34 (d, J=7.0 Hz, 3H), 2.11-2.28 (m, 4H), 2.68-2.77 (m, 1H), 3.00-3.08 (m, 1H), 3.24-3.29 (m, 1H), 3.47-3.58 (m, 2H), 3.64-3.88 (m, 3H), 4.85-4.96 (m, 1H), 6.80-6.95 (m, 2H), 7.18-7.30 (m, 2H), 7.30-7.48 (m, 4H), 7.69 (d, J=8.1 Hz, 1H), 7.72-7.76 (m, 1H), 7.81 (d, J=1.8 Hz, 1H), 7.97 (s, 1H), 8.53 (d, J=8.0 Hz, 1H), 12.47 (br.s, 2H). (LC/MS Method E): m/z 518 $[M+H]^+$ $(ES^+)$, at 1.35 min, UV active.

Example 20: 4-((S)-1-((R)-4-((2'-methyl-4'-(sulfamoyloxy)-[1,1'-biphenyl]-3-yl)methyl)morpholine-3-carboxamido) ethyl)benzoic acid (Compound 20)

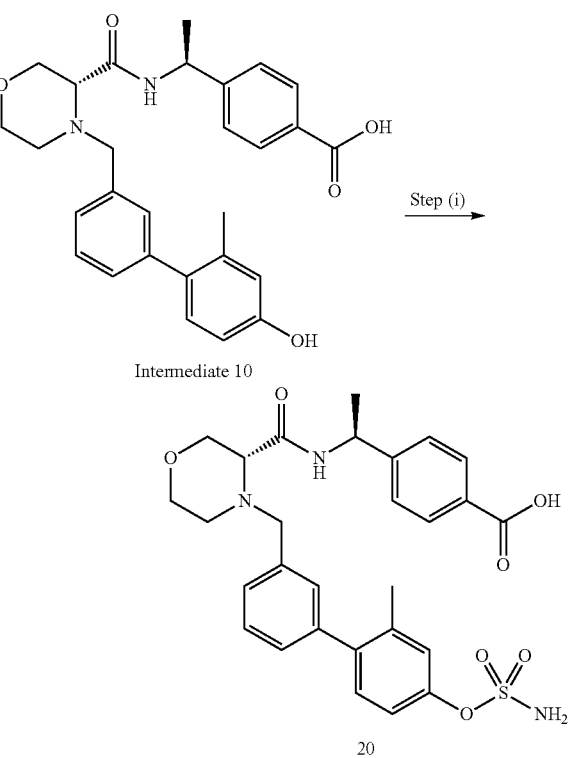

Step (i): To a solution of Intermediate 10, 4-((S)-1-((R)-4-((4'-hydroxy-2'-methyl-[1,1'-biphenyl]-3-yl)methyl)morpholine-3-carboxamido)ethyl)benzoic acid (65 mg, 0.13 mmol) in DMA (2 mL) at RT was added sulfamoyl chloride (157 mg, 1.37 mmol). The mixture was stirred at RT for 3 hrs, after which it was concentrated under reduced pressure. The residue was purified by flash column chromatography (reversed phase, C18) under a gradient of MeCN (0-48%) in water to afford 4-((S)-1-((R)-4-((2'-methyl-4'-(sulfamoyloxy)-[1,1'-biphenyl]-3-yl)methyl)morpholine-3-carboxamido) ethyl)benzoic acid (25 mg, 0.05 mmol, 33% yield) as an off-white solid. ¹H NMR (400 MHz, DMSO) δ 1.37 (d, J=7.0 Hz, 3H), 2.11-2.19 (m, 1H), 2.22 (s, 3H), 2.65-2.74 (m, 1H), 3.00 (dd, J=9.3, 3.5 Hz, 1H), 3.23 (d, J=13.2 Hz, 1H), 3.44-3.57 (m, 2H), 3.65-3.81 (m, 3H), 4.92-5.04 (m, 1H), 7.12-7.33 (m, 6H), 7.35-7.47 (m, 3H), 7.82-7.90 (m, 2H), 8.03 (br.s, 2H), 8.54 (d, J=8.1 Hz, 1H), 12.98 (br.s, 1H). (LC/MS Method E): m/z 554 [M+H]⁺ (ES⁺), at 1.51 min, UV active.

Example 23: 4-[(1S)-1-[[(3R)-4-[[3-(4-carbamoylphenyl)-4-hydroxy-phenyl]methyl]morpholine-3-carbonyl]amino]ethyl]benzoic acid (Compound 23)

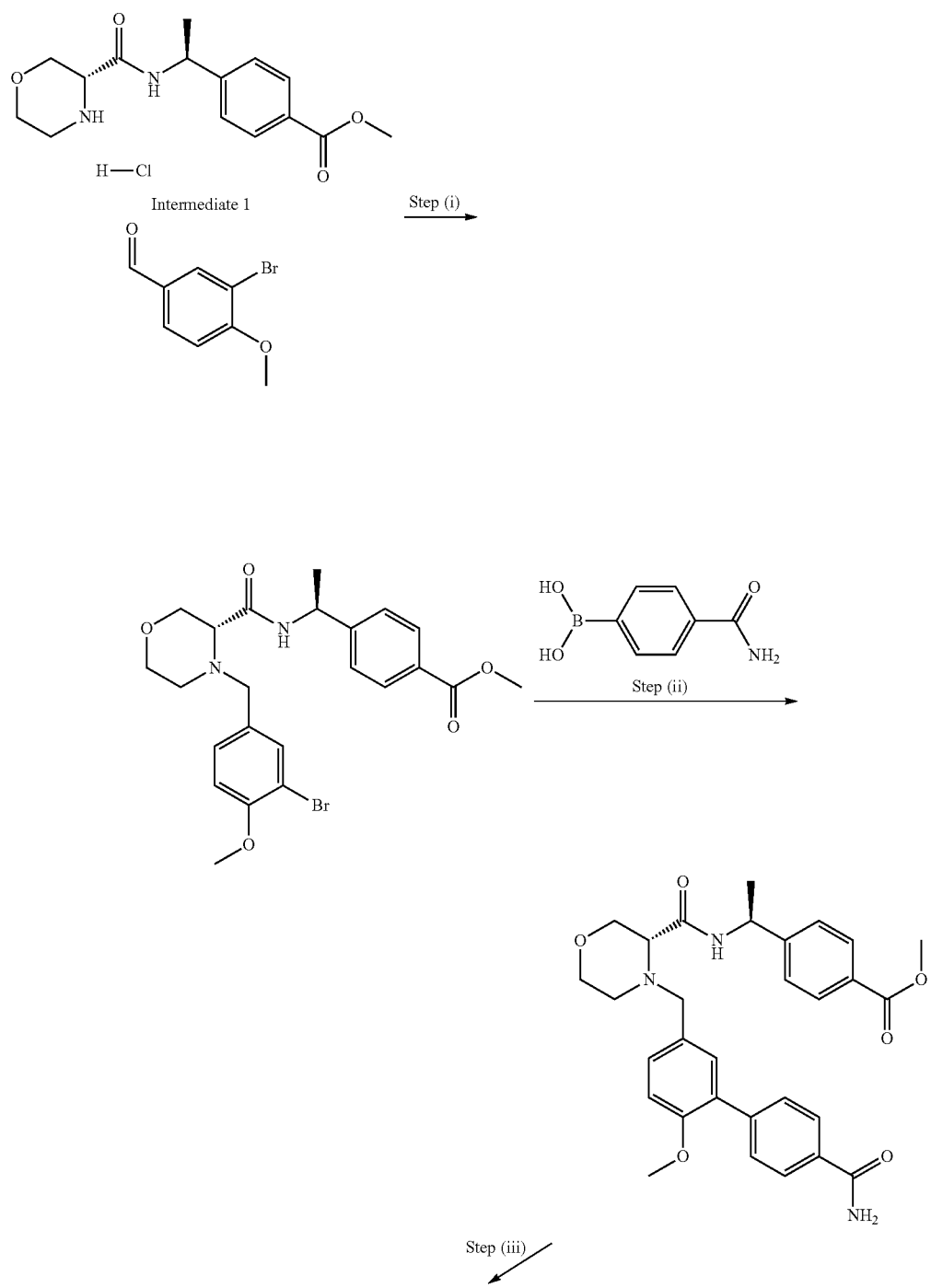

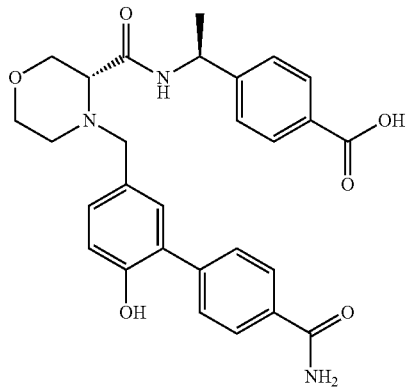

23

Step (i): A mixture of Intermediate 1, methyl 4-((S)-1-((R)-morpholine-3-carboxamido)ethyl)benzoate hydrochloride (600 mg, 1.82 mmol) and 3-Bromo-4-methoxybenzaldehyde (785 mg, 3.65 mmol) in DCM (8.5 mL) was stirred at RT for 1 hour, after which sodium triacetoxyborohydride (812 mg, 3.83 mmol) was added. The mixture was stirred at RT for 16 hrs, after which it was diluted with sat. aq. NaHCO$_3$. The organics were separated, washed with water and brine, dried via passage through a hydrophobic frit and concentrated. The residue was purified by flash column chromatography (normal phase, silica) under a gradient of EtOAc (30-100%) in iso-hexane to afford methyl 4-1(1S)-1-[[(3R)-4-[(3-bromo-4-methoxy-phenyl)methyl]morpholine-3-carbonyl]amino]ethyl]benzoate (619 mg, 1.26 mmol, 69% yield) as a white solid. (LC/MS Method B): m/z 492 [M+H]$^+$ (ES$^+$), at 2.27 min UV active.

Step (ii): A mixture of methyl 4-[(1S)-1-[[(3R)-4-[(3-bromo-4-methoxy-phenyl)methyl]morpholine-3-carbonyl]amino]ethyl]benzoate (250 mg, 0.51 mmol), 4-aminocarbonylphenylboronic acid (101 mg, 0.61 mmol), potassium carbonate (141 mg, 1.02 mmol) and tetrakis(triphenylphosphine)palladium (0) (59 mg, 0.05 mmol) in 1,4-dioxane (2.4 mL) and water (0.6 mL) was heated to 100° C. in a microwave reactor for 40 minutes. Additional tetrakis(triphenylphosphine)palladium (0) (29 mg, 0.03 mmol), 4-aminocarbonylphenylboronic acid (25 mg, 0.15 mmol) and potassium carbonate (35 mg, 0.25 mmol) were added and the mixture was heated to 100° C. in a microwave reactor for a further 70 minutes. The mixture was partitioned between water and EtOAc and the organics were separated, washed with water and brine, dried via passage through a hydrophobic frit and concentrated. The crude material was purified by flash column chromatography (normal phase, silica) under a gradient of MeOH (0% to 10%) in DCM to afford methyl 4-[(1S)-1-[[(3R)-4-[[3-(4-carbamoylphenyl)-4-methoxy-phenyl]methyl]morpholine-3-carbonyl]amino]ethyl]benzoate (328 mg, 0.61 mmol, quant. yield) as a pale orange solid. (LC/MS Method B): m/z 532 [M+H]+(ES$^+$), at 2.00 min, UV active.

Step (iii): To a solution of methyl 4-[(1S)-1-[[(3R)-4-[[3-(4-carbamoylphenyl)-4-methoxy-phenyl]methyl]morpholine-3-carbonyl]amino]ethyl]benzoate (270 mg, 0.51 mmol) in DCM (8 mL) at −78° C. under an atmosphere of nitrogen was added a 1 M solution of boron tribromide in DCM (2.54 mL, 2.54 mmol) dropwise. The mixture was warmed to RT gradually and was stirred at RT for 18 hrs. The mixture was cooled to 0° C. and MeOH/H$_2$O 1:1 (3.4 mL) was added dropwise. The mixture was stirred for 1 hour at RT after which time it was concentrated. The crude residue was purified by prep HPLC [purification method A, 10-40% Solvent B in Solvent A] to afford 4-[(1S)-1-[[(3R)-4-[[3-(4-carbamoylphenyl)-4-hydroxy-phenyl]methyl]morpholine-3-carbonyl]amino]ethyl]benzoic acid (54 mg, 0.11 mmol, 21% yield) as a white foam. 1H NMR (CD$_3$OD, 400 MHz): δ (ppm) 1.51 (d, J=7.0 Hz, 3H), 3.22-3.28 (m, 1H), 3.35-3.43 (m, 1H), 3.67-3.78 (m, 2H), 3.98-4.05 (m, 2H), 4.08 (d, J=12.9 Hz, 1H), 4.20-4.29 (m, 2H), 5.08-5.16 (m, 1H), 6.93 (d, J=8.3 Hz, 1H), 7.15 (dd, J=8.3, 2.2 Hz, 1H), 7.30 (d, J=2.2 Hz, 1H), 7.47-7.53 (m, 2H), 7.62-7.67 (m, 2H), 7.87-7.92 (m, 2H), 7.98-8.02 (m, 2H). Exchangeable protons not observed. (LC/MS Method H): m/z 504 [M+H]+(ES$^+$), at 1.64 min, UV active.

Example 26: 4-(1-((R)-4-((4'-carbamoyl-2'-methyl-[1,1'-biphenyl]-3-yl)methyl)morpholine-3-carboxamido)ethyl)-2,6-difluorobenzoic acid, single diastereomer of unknown stereochemistry (Compound 26)

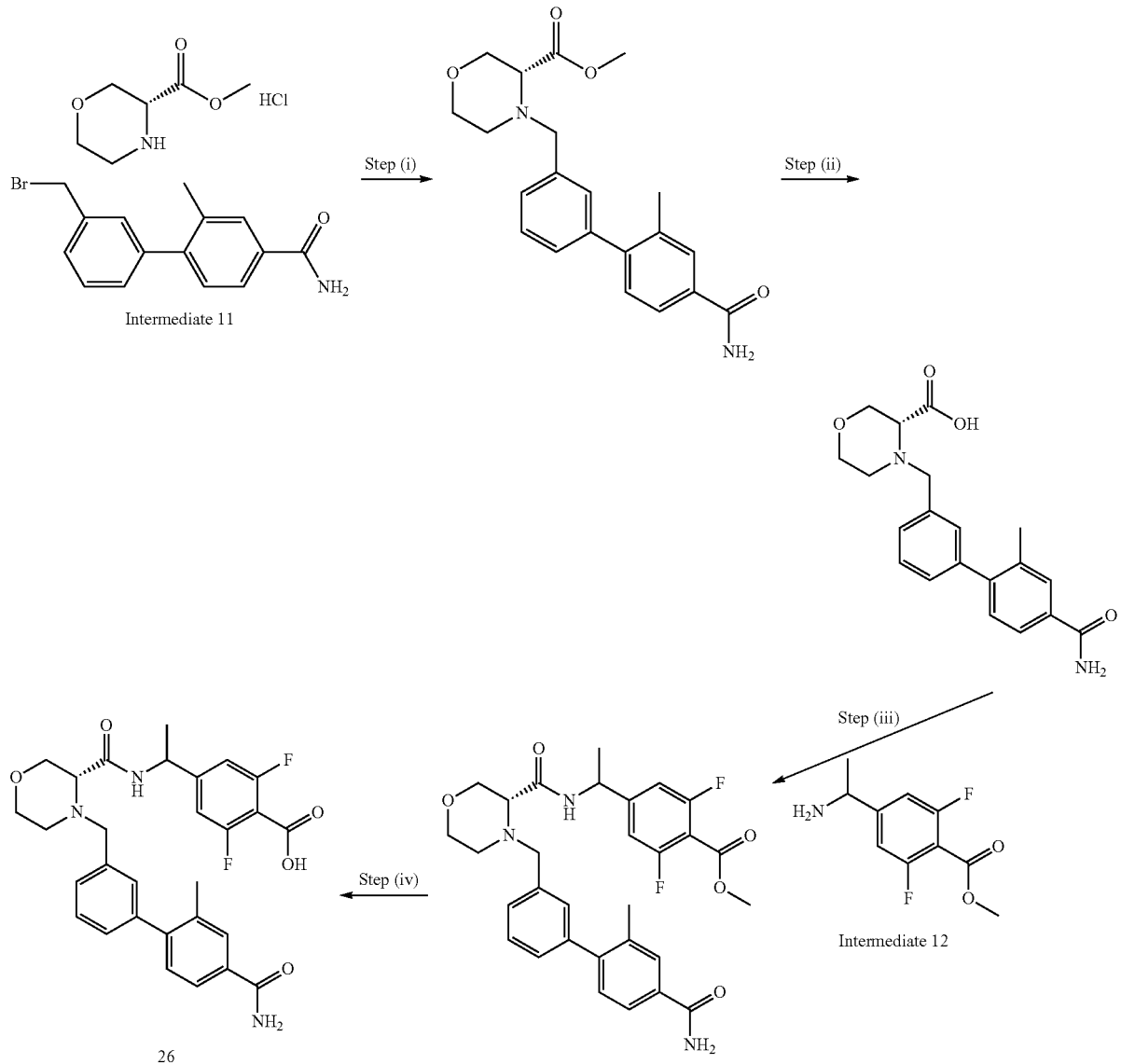

Step (i): A mixture of methyl (R)-morpholine-3-carboxylate hydrochloride (220 mg, 1.21 mmol), Intermediate 11, 3'-(bromomethyl)-2-methyl-[1,1'-biphenyl]-4-carboxamide (360 mg, 1.19 mmol) and $NaHCO_3$ (300 mg, 3.63 mmol) in MeCN was heated to 70° C. for 7 hrs. After this time, the mixture was concentrated under reduced pressure and the residue was purified by flash column chromatography (normal phase, silica), 10% MeOH in DCM, to afford methyl (R)-4-((4'-carbamoyl-2'-methyl-[1,1'-biphenyl]-3-yl) methyl)morpholine-3-carboxylate (420 mg, 1.14 mmol, 96% yield) as a yellow solid. (LC/MS Method I): m/z 369 [M+H]$^+$ (ES$^+$), at 3.00 min, UV active.

Step (ii): To a solution of methyl (R)-4-((4'-carbamoyl-2'-methyl-[1,1'-biphenyl]-3-yl)methyl)morpholine-3-carboxylate (420 mg, 1.14 mmol) in MeOH (9 mL) was added a 1 M aqueous solution of LiOH (3.42 mL, 3.42 mmol) and the mixture was heated to 50° C. for 3 hrs. After this time, the mixture was concentrated, the residue was dissolved in water and the pH was adjusted to 7 with 1 N HCl. The precipitate was filtered to afford (R)-4-((4'-carbamoyl-2'-methyl-[1,1'-biphenyl]-3-yl)methyl)morpholine-3-carboxylic acid (320 mg, 0.90 mmol, 79% yield) as a white solid. (LC/MS Method I): m/z 355 [M+H]$^+$ (ES$^+$), at 1.97 min, UV active.

Step (iii): To a suspension of (R)-4-((4'-carbamoyl-2'-methyl-[1,1'-biphenyl]-3-yl)methyl)morpholine-3-carboxylic acid (150 mg, 0.42 mmol) in DCM at 0° C. were added hydroxybenzotriazole (86 mg, 0.64 mmol) and N-(3-dimethylaminopropyl)-N'-ethylcarbodiimide hydrochloride (121 mg, 1.69 mmol). The mixture was stirred at RT for 1 hr, after which triethylamine (171 mg, 1.69 mmol) and Intermediate 12, methyl 4-(1-aminoethyl)-2,6-difluorobenzoate (107 mg, 0.42 mmol) were added at 0° C. The mixture was stirred at RT for 12 hrs, after which it was diluted with DCM, washed with 0.5 N HCl, dried over Na$_2$SO$_4$ and concentrated. The residue was purified by flash column chromatography (normal phase, silica), 3% MeOH in DCM, to afford methyl 4-(1-((R)-4-((4'-carbamoyl-2'-methyl-[1,1'-biphenyl]-3-yl)methyl)morpholine-3-carboxamido)ethyl)-2,6-difluorobenzoate (130 mg, 0.24 mmol, 56% yield) as a white solid. (LC/MS Method I): m/z 552 [M+H]$^+$ (ES$^+$), at 3.10 min, UV active.

Step (iv): To a solution of methyl 4-(1-((R)-4-((4'-carbamoyl-2'-methyl-[1,1'-biphenyl]-3-yl)methyl)morpholine-3-carboxamido)ethyl)-2,6-difluorobenzoate (130 mg, 0.24 mmol) in MeOH (10 mL) was added a 1 M aqueous solution of LiGH (0.71 mL, 0.71 mmol). The mixture was stirred at RT for 4 days after which it was concentrated and partitioned between EtOAc and water. The aqueous layer was isolated and adjusted to pH 4 with 1 N HCl, after which it was extracted with EtOAc (3×). These organics were combined, dried over Na$_2$SO$_4$ and concentrated. The crude material was purified by prep HPLC [purification method F] to afford 4-(1-((R)-4-((4'-carbamoyl-2'-methyl-[1,1'-biphenyl]-3-yl)methyl)morpholine-3-carboxamido)ethyl)-2,6-difluorobenzoic acid, single diastereomer of unknown stereochemistry 1 (50.0 mg, 0.09 mmol, 40% yield) as a white solid. $^1$H NMR (CD$_3$OD, 400 MHz): δ (ppm) 1.51 (d, J=7.0 Hz, 3H), 2.36 (s, 3H), 3.34-3.44 (m, 2H), 3.59-3.76 (m, 2H), 3.99-4.13 (m, 2H), 4.18-4.29 (m, 2H), 4.57-4.72 (m, 1H), 5.07 (q, J=7.0, 1H), 6.98-7.08 (m, 2H), 7.37 (d, J=8.0, 1H), 7.52-7.66 (m, 4H), 7.79 (dd, J=8.0, 1.8, 1H), 7.86 (d, J=1.8, 1H). Exchangeable protons not observed. (LC/MS Method I): m/z 538 [M+H]$^+$ (ES$^+$), at 0.50 min, UV active.

Example 29: 4-((S)-1-((R)-4-((2'-hydroxy-4'-sulfamoyl-[1,1'-biphenyl]-3-yl)methyl)morpholine-3-carboxamido)ethyl)benzoic acid (Compound 29)

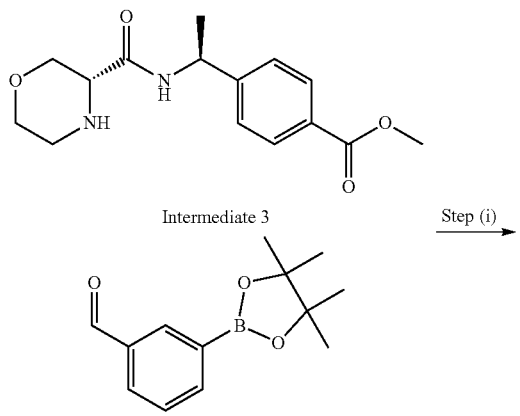

Intermediate 3       Step (i)

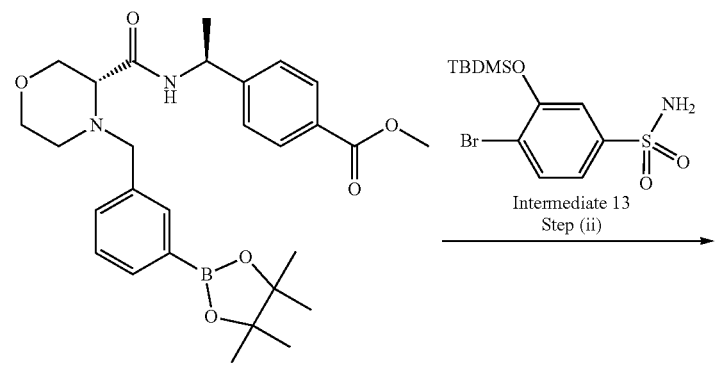

Intermediate 13
Step (ii)

-continued

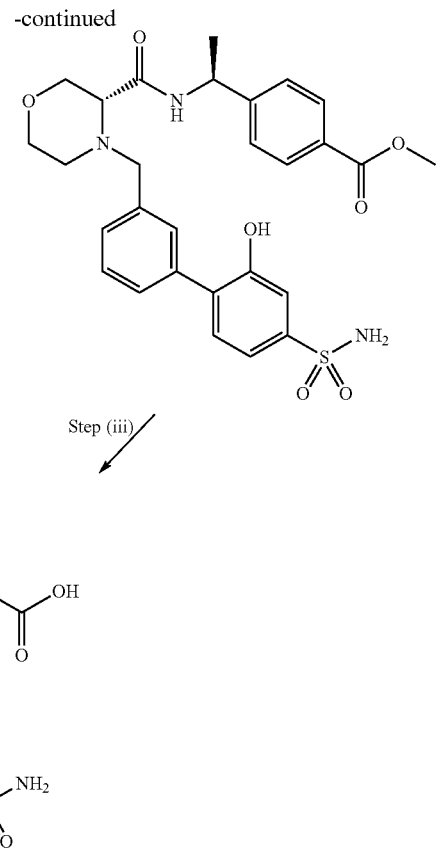

Step (iii)

29

Step (i): To a solution of Intermediate 3, methyl 4-((S)-1-((R)-morpholine-3-carboxamido)ethyl)benzoate (300 mg, 1.03 mmol) and 3-(4,4,5,5-tetramethyl-1,3,2-dioxaborolan-2-yl)benzaldehyde (390 mg, 1.54 mmol) in MeOH (3 mL) under an atmosphere of nitrogen were added 4 Å molecular sieves and glacial acetic acid (6 µL, 0.1 mmol). The mixture was stirred at RT for 4 hrs, after which it was cooled to 0° C. and sodium cyanoborohydride (190 mg, 3.08 mmol) was added portion-wise. The mixture was stirred at RT for 16 hrs, after which it was partitioned between sat aq. NaHCO$_3$ and EtOAc. The organics were separated, and the aqueous layer was further extracted with EtOAc. The combined organics were dried over Na$_2$SO$_4$ and concentrated. The residue was purified by flash column chromatography (reversed phase, C18) under a gradient of MeCN (0-52%) in water to afford methyl 4-((S)-1-((R)-4-(3-(4,4,5,5-tetramethyl-1,3,2-dioxaborolan-2-yl) benzyl)morpholine-3-carboxamido)ethyl) benzoate (108 mg, 0.21 mmol, 21% yield) as a white solid. (LC/MS Method E): m/z 427 [M+H-82]+(ES$^+$) (mass of boronic acid), at 1.50 min, UV active.

Step (ii): Methyl 4-((S)-1-((R)-4-(3-(4,4,5,5-tetramethyl-1,3,2-dioxaborolan-2-yl)benzyl)morpholine-3-carboxamido)ethyl)benzoate (90 mg, 0.17 mmol), Intermediate 13, 4-bromo-3-((tert-butyldimethylsilyl)oxy)benzenesulfonamide (78 mg, 0.21 mmol) and potassium carbonate (48 mg, 0.35 mmol) were dissolved in mixture of 1,4-dioxane (3 mL) and water (1 mL). The mixture was purged with nitrogen gas at RT for 20 minutes, after which PdCl$_2$(dppf). DCM (14 mg, 0.026 mmol) was added and the reaction mixture was heated to 80° C. for 2 hrs. The mixture was cooled and partitioned between water and EtOAc. The organics were separated, and the aqueous layer was further extracted with EtOAc. The combined organics were dried over Na$_2$SO$_4$ and concentrated and the residue was purified by flash column chromatography (reversed phase, C18) under a gradient of MeCN (0-53%) in water to afford methyl 4-((S)-1-((R)-4-((2'-hydroxy-4'-sulfamoyl-[1,1'-biphenyl]-3-yl)methyl)morpholine-3-carboxamido)ethyl)benzoate (45 mg, 0.081 mmol, 46% yield) as a white solid. (LC/MS Method E): m/z 554 [M+H]$^+$ (ES$^+$), at 1.28 min, UV active.

Step (iii): To a solution of methyl 4-((S)-1-((R)-4-((2'-hydroxy-4'-sulfamoyl-[1,1'-biphenyl]-3-yl)methyl)morpholine-3-carboxamido)ethyl)benzoate (45 g, 0.08 mmol) in 1,4-dioxane (2 mL) and water (1 mL) was added lithium hydroxide monohydrate (17 mg, 0.40 mmol) and the mixture was stirred at RT for 3 hrs. After this time, the mixture was concentrated under reduced pressure and the residue was purified by flash column chromatography (reversed phase, C18) under a gradient of MeCN (0-28%) in water to afford 4-((S)-1-((R)-4-((2'-hydroxy-4'-sulfamoyl-[1,1'-biphenyl]-3-yl)methyl)morpholine-3-carboxamido)ethyl)benzoic acid (19 mg, 0.035 mmol, 44% yield) as a white solid. $^1$H NMR (400 MHz, DMSO) δ 1.39 (d, J=7.0 Hz, 3H), 2.11-2.20 (m, 1H), 2.65-2.76 (m, 1H), 3.00 (dd, J=9.2, 3.6 Hz, 1H), 3.22 (d, J=13.1 Hz, 1H), 3.46-3.57 (m, 2H), 3.62-3.82 (m, 3H), 4.90-5.04 (m, 1H), 7.18-7.55 (m, 10H), 7.51 (s, 1H), 7.86 (d, J=8.0 Hz, 2H), 8.51 (d, J=8.0 Hz, 1H), 10.34 (br.s, 1H), 12.97 (br.s, 1H). (LC/MS Method E): m/z 540 [M+H]$^+$ (ES$^+$), at 1.44 min, UV active.

Example 30: 3-(4-carbamoyl-2-methylphenyl)-5-(((R)-3-(((S)-1-(4-carboxyphenyl)ethyl)carbamoyl)morpholino)methyl)pyridine 1-oxide (Compound 30)

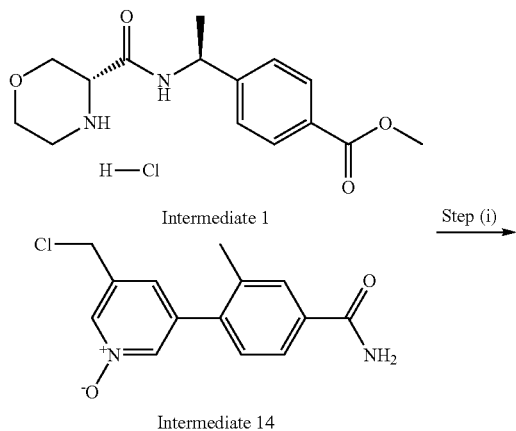

Intermediate 1

Intermediate 14

Step (i) →

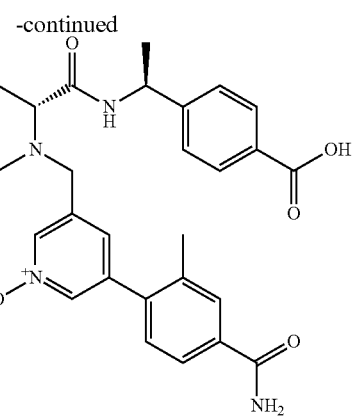

30

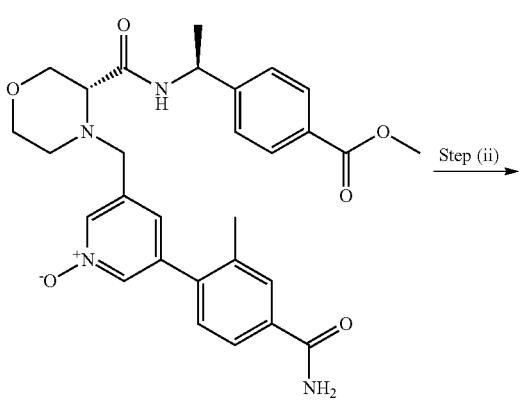

Step (ii) →

Step (i): To a solution of Intermediate 14, 3-(4-carbamoyl-2-methylphenyl)-5-(chloromethyl)pyridine 1-oxide (200 mg, 0.72 mmol) in MeCN (12 mL) and DMF (2 mL) was added Intermediate 1, methyl 4-((S)-1-((R)-morpholine-3-carboxamido)ethyl)benzoate hydrochloride (238 mg, 0.72 mmol), NaHCO$_3$ (182 mg, 2.17 mmol) and sodium iodide (108 mg, 0.72 mmol). The mixture was heated to 70° C. for 4 hrs after which it was cooled, filtered and concentrated under reduced pressure. The crude material was purified by flash column chromatography (normal phase, silica) under a gradient of MeOH (3% to 6%) in DCM to afford 3-(4-carbamoyl-2-methylphenyl)-5-(((R)-3-(((S)-1-(4-(methoxycarbonyl)phenyl)ethyl) carbamoyl)morpholino)methyl) pyridine 1-oxide (326 mg, 0.61 mmol, 85% yield) as a white solid. (LC/MS Method I): m/z 533 [M+H]$^+$ (ES$^+$), at 2.73 min, UV active.

Step (ii): To a solution of 3-(4-carbamoyl-2-methylphenyl)-5-(((R)-3-(((S)-1-(4-(methoxycarbonyl)phenyl)ethyl)carbamoyl)morpholino)methyl)pyridine 1-oxide (320 mg, 0.60 mmol) in MeOH (10 mL) was added a 1 M aq. solution of lithium hydroxide (1.8 mL, 1.8 mmol) and the mixture was stirred at RT for 48 hrs. After this time, the mixture was diluted with water and acidified to pH 5 with 1 N HCl. The solvent was removed under reduced pressure and the crude material was purified by prep HPLC [purification method F] to afford 3-(4-carbamoyl-2-methylphenyl)-5-(((R)-3-(((S)-1-(4-carboxyphenyl)ethyl)carbamoyl)morpholino)methyl) pyridine 1-oxide (90 mg, 0.17 mmol, 29% yield) as a white solid. $^1$H NMR (400 MHz, CD$_3$OD) δ 1.51 (d, J=7.0 Hz, 3H), 2.34 (s, 3H), 2.83-3.11 (m, 1H), 3.19-3.29 (m, 1H), 3.65-4.03 (m, 5H), 4.05-4.25 (m, 2H), 5.11 (q, J=7.0 Hz, 1H), 7.29-7.38 (m, 1H), 7.42-7.52 (m, 2H), 7.61 (s, 1H), 7.77-7.84 (m, 1H), 7.88 (s, 1H), 7.92-7.99 (m, 2H), 8.40 (s, 1H), 8.50 (s, 1H). Exchangeable protons not observed. (LC/MS Method I): m/z 519 [M+H]$^+$ (ES$^+$), at 2.73 min, UV active.

Example 35: 4-((S)-1-((R)-4-((4'-hydroxy-[1,1'-biphenyl]-3-yl)methyl)morpholine-3-carboxamido)ethyl)benzoic acid (Compound 35)

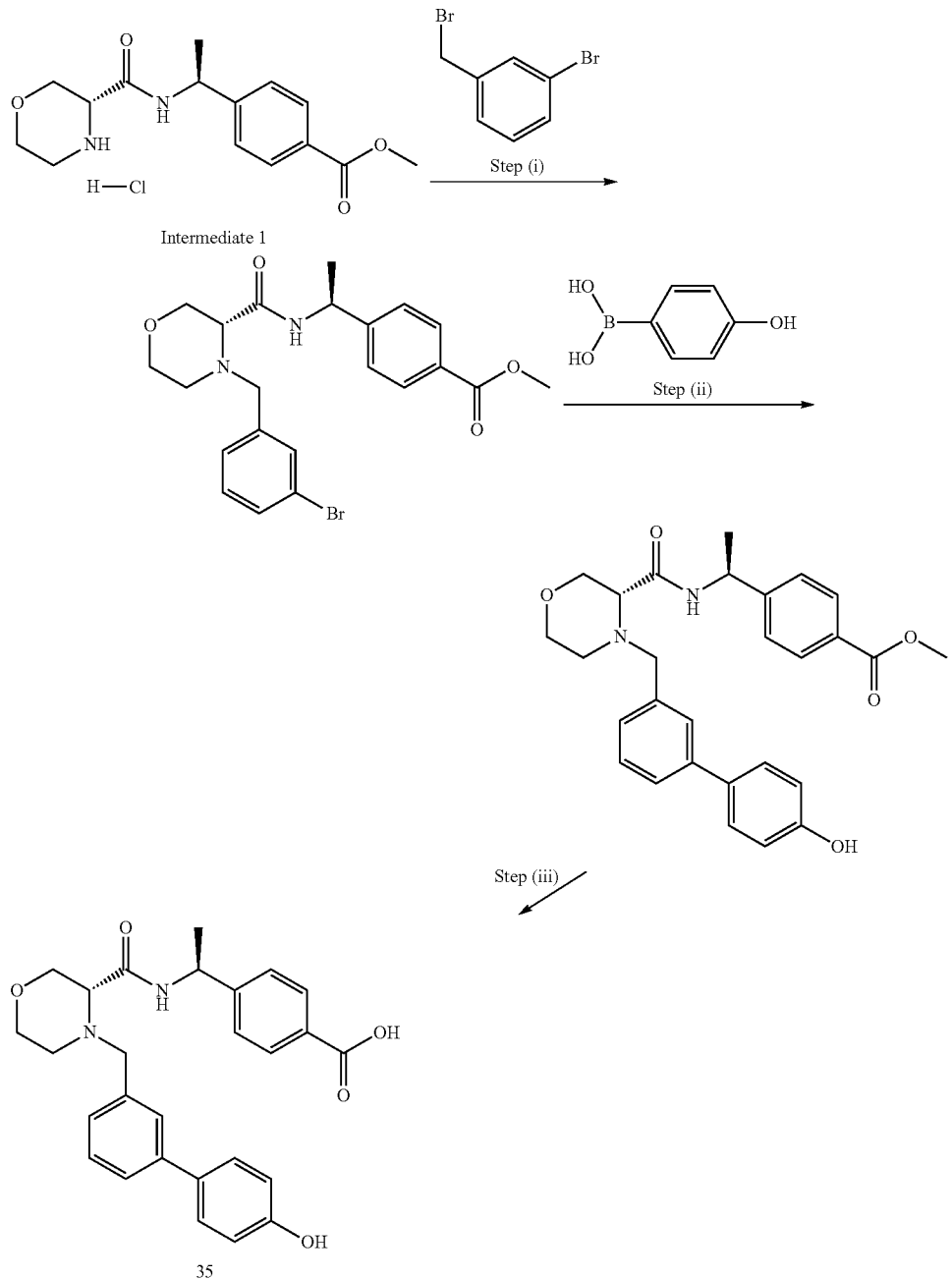

Step (i): To a solution of Intermediate 1, methyl 4-[(1S)-1-[[(3R)-morpholine-3-carbonyl]amino]ethyl]benzoate hydrochloride (500 mg, 1.52 mmol) in MeCN (12 mL) were added potassium carbonate (525 mg, 3.8 mmol) and 3-Bromobenzyl bromide (Intermediate 28, 760 mg, 3.0 mmol). The reaction mixture was heated to 70° C. for 18 hours, after which time the mixture was cooled and filtered through a phase separator. The solution was concentrated, and the residue was partitioned between EtOAc and water. The organics were separated, washed with brine, dried via passage through a hydrophobic frit and concentrated. The crude material was purified by flash column chromatography (normal phase, silica) under a gradient of EtOAc (30% to 70%) in iso-hexane to afford methyl 4-[(1S)-1-[[(3R)-4-[(3-bromophenyl)methyl]morpholine-3-carbonyl]amino]ethyl]benzoate (574 mg, 1.24 mmol, 82% yield) as as a white solid. (LC/MS Method B): m/z 462 [M+H]$^+$ (ES$^+$), at 2.29 min, UV active.

Step (ii): A solution of methyl 4-[(1S)-1-[[(3R)-4-[(3-bromophenyl)methyl]morpholine-3-carbonyl]amino]ethyl]

benzoate (150 mg, 0.33 mmol), tetrakis(triphenylphosphine) palladium (0) (37.6 mg, 0.03 mmol), potassium carbonate (89.9 mg, 0.65 mmol) and 4-hydroxybenzeneboronic acid (53.8 mg, 0.39 mmol) in 1,4-dioxane (1.3 mL) and water (0.3 mL) was heated to 100° C. in a microwave reactor for 1 hour. After this time, the mixture was diluted with EtOAc and water. The organics were separated, washed with brine, dried via passage through a hydrophobic frit and concentrated. The crude material was purified by flash column chromatography (normal phase, silica) under a gradient of EtOAc (30% to 100%) in iso-hexane to afford methyl 4-[(1S)-1-[[(3R)-4-[[3-(4-hydroxyphenyl)phenyl]methyl]morpholine-3-carbonyl]amino]ethyl]benzoate (90 mg, 0.19 mmol, 58.3% yield) as a white solid. (LC/MS Method B): m/z 475 [M+H]$^+$ (ES$^+$), at 2.15 min, UV active.

Step (iii): A mixture of lithium hydroxide monohydrate (31.8 mg, 0.76 mmol) and methyl 4-[(1S)-1-[[(3R)-4-[[3-(4-hydroxyphenyl)phenyl]methyl]morpholine-3-carbonyl]amino]ethyl]benzoate (90 mg, 0.19 mmol) in THF (1.5 mL) and water (1.5 mL) was stirred at RT for 16 hours. The mixture was concentrated and the crude residue purified by reversed phase preparative HPLC [purification method B] to afford 4-((S)-1-((R)-4-((4'-hydroxy-[1,1'-biphenyl]-3-yl)methyl)morpholine-3-carboxamido)ethyl)benzoic acid (25 mg, 0.054 mmol, 29% yield) as a gum that was scratched to give an amorphous white solid. $^1$H NMR (CD$_3$OD, 400 MHz): δ (ppm) 1.49 (d, J=7.0 Hz, 3H), 3.20-3.25 (m, 1H), 3.30-3.40 (m, 1H), 3.60-3.75 (m, 2H), 3.90-4.06 (m, 2H), 4.12 (d, J=12.8 Hz, 1H), 4.23 (dd, J=12.7, 3.9 Hz, 1H), 4.29 (d, J=12.8 Hz, 1H), 5.05-5.16 (m, 1H), 6.77-6.89 (m, 2H), 7.14-7.24 (m, 1H), 7.36-7.43 (m, 3H), 7.45-7.49 (m, 2H), 7.51-7.55 (m, 1H), 7.60-7.65 (m, 1H), 7.96-8.01 (m, 2H). Exchangeable protons not observed. (LC/MS Method D): m/z 461 [M+H]$^+$ (ES$^+$), at 2.23 min, UV active.

Example 36: (R)—N-((S)-1-(4-(1H-tetrazol-5-yl)phenyl)ethyl)-4-((4'-carbamoyl-5-hydroxy-2'-methyl-[1,1'-biphenyl]-3-yl)methyl)morpholine-3-carboxamide (Compound 36)

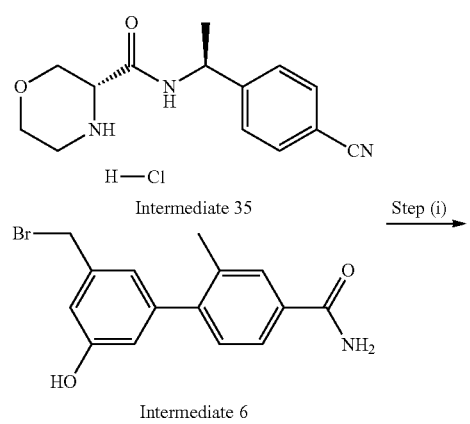

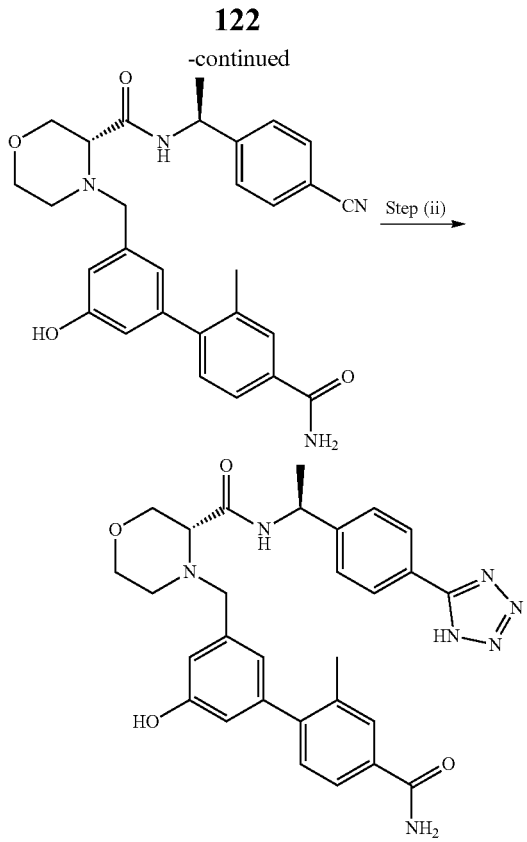

Example 36

Step (i): To a solution of (R)—N-((S)-1-(4-cyanophenyl)ethyl)morpholine-3-carboxamide hydrochloride (Intermediate 35, 0.080 g, 0.27 mmol) and DIPEA (0.11 mL, 0.67 mmol) in acetonitrile (3 mL) at room temperature was added 3'-(bromomethyl)-5'-hydroxy-2-methyl-[1,1'-biphenyl]-4-carboxamide (Intermediate 6, 0.086 g, 0.27 mmol) and the reaction mixture was stirred at 70° C. for 3 hrs. The reaction mixture was then partitioned between water (20 mL) and EtOAc (20 mL). Aqueous layer was extracted with EtOAc (3×15 mL). Organic layers were combined and dried over Na$_2$SO$_4$. Solvent was removed in vacuo and the crude product was purified by reverse phase gradient flash column chromatography (reverse phase, C18 silica), product eluted at 0% to 55% acetonitrile in water to afford (R)-4-((4'-carbamoyl-5-hydroxy-2'-methyl-[1,1'-biphenyl]-3-yl)methyl)-N-((S)-1-(4-cyanophenyl)ethyl)morpholine-3-carboxamide (0.085 g, 63%) as a brown solid. (LC/MS Method E): m/z 499 [M+H]$^+$ (ES$^+$), at 1.54 min, UV active.

Step (ii): To a solution of (R)-4-((4'-carbamoyl-5-hydroxy-2'-methyl-[1,1'-biphenyl]-3-yl)methyl)-N-((S)-1-(4-cyanophenyl)ethyl)morpholine-3-carboxamide (0.060 g, 0.12 mmol) in DMF (3 mL) was added sodium azide (0.156 g, 2.40 mmol) and ammonium chloride (0.128 g, 2.40 mmol) at room temperature and the reaction mixture was heated to 180° C. for 16 hrs. The reaction mixture was cooled to room temperature and then partitioned between water (20 mL) and dichloromethane (20 mL). The aqueous layer was further extracted with dichloromethane (3×20 mL). The organic layers were combined and dried (Na$_2$SO$_4$). Solvent was removed in vacuo to obtain crude product which was purified by reverse phase flash column chromatography (reverse phase, C18 silica) product eluted at 0% to 60% acetonitrile in water to afford (R)—N-((S)-1-(4-(1H-tetrazol-5-yl)phenyl)ethyl)-4-((4'-carbamoyl-5-hydroxy-2'- methyl-[1,1'-biphenyl]-3-yl)methyl) morpholine-3-carboxamide (0.017 g, 26%) as a white solid.

$^1$H NMR (400 Mz, DMSO) δ (ppm) 1HNMR: (400 Mz, DMSO) 1.37 (d, 3H, J=7.2 Hz), 2.13 (s, 1H), 2.26 (s, 3H), 2.54-2.46 (m, 1H), 2.74-2.71 (m, 1H), 2.99 (q, 1H, J=8.8 Hz), 3.14 (d, 1H, J=20.0 Hz), 3.53-3.47 (m, 2H), 3.76-3.67 (m, 3H), 4.98-4.94 (m, 1H), 6.59 (s, 1H), 6.76 (d, 2H, J=7.2 Hz), 7.22 (d, 1H, J=8.0 Hz), 7.35 (d, 3H, J=10.0 Hz), 7.70 (d, 1H, J=8.0 Hz), 7.77 (s, 1H), 7.88 (d, 2H, J=8.0 Hz), 8.01 (s, 1H), 8.38 (d, 1H, J=8.0 Hz), 9.55 (s, 1H). tetrazole NH not observed. (LC/MS Method E): m/z 542 [M+H]$^+$ (ES$^+$), at 1.52 min, UV active.

Example 37: 4-((S)-1-((S)-4-((4'-carbamoyl-5-hydroxy-2'-methyl-[1,1'-biphenyl]-3-yl)methyl)morpholine-3-carboxamido)ethyl)benzoic acid (Compound 37)

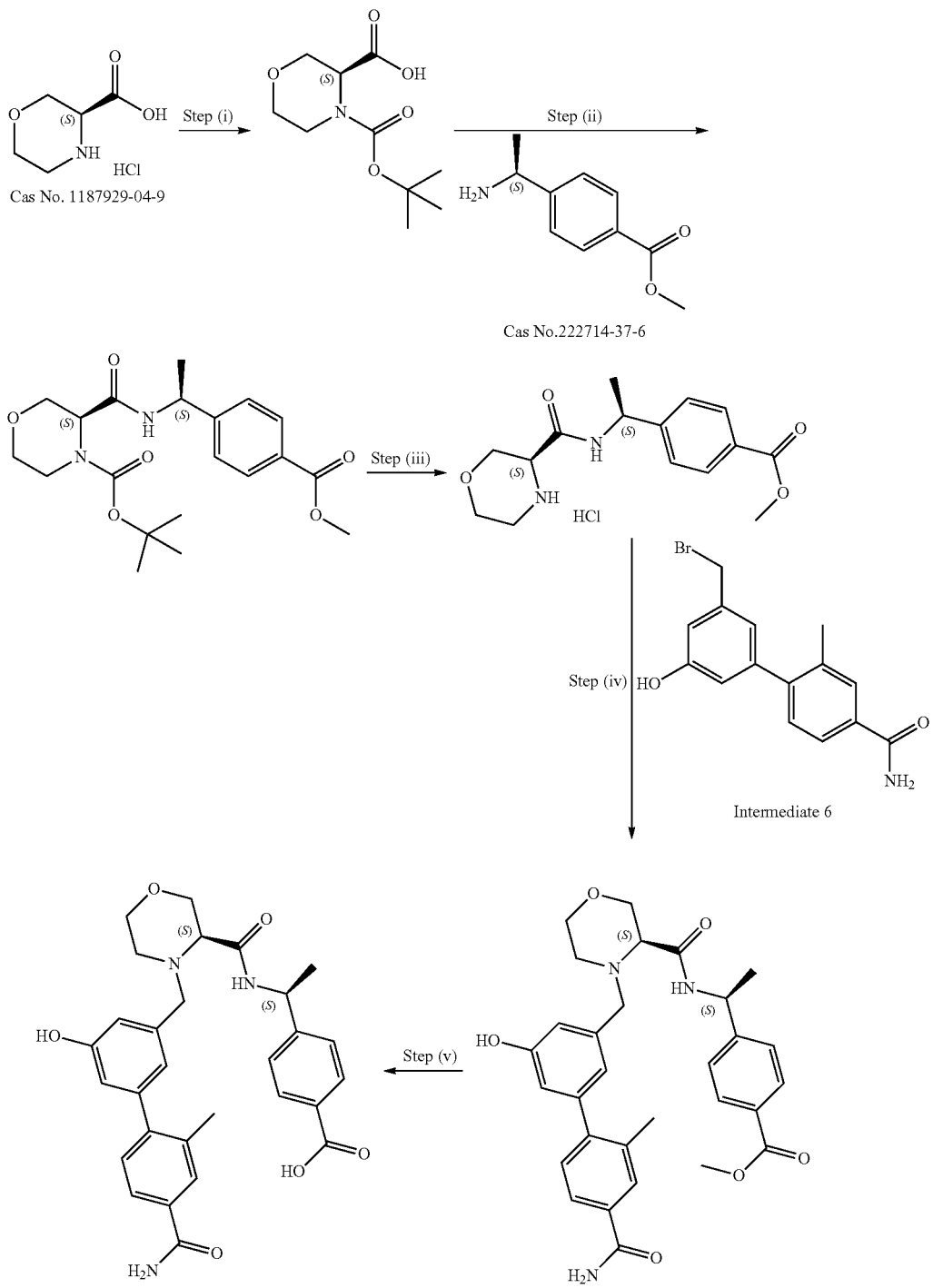

Step (i): (S)-Morpholine-3-carboxylic acid hydrochloride (2.50 g, 14.97 mmol) was dissolved in acetone (15 mL) and H₂O (15 mL). K₂CO₃ (10.40 g, 74.83 mmol) was added and reaction mixture was stirred at 0° C. for 30 min. BOC anhydride (5.22 g, 23.95 mmol) was added and reaction mixture was allowed to stir at room temperature for 5 hrs. The reaction mixture was concentrated in vacuo and the subsequent residue was partitioned between water (200 mL) and DCM (100 mL). The aqueous layer was further extracted with DCM (2×70 mL) and the combined organic layers dried (Na₂SO₄). Solvent was removed in vacuo to afford (S)-4-(tert-butoxycarbonyl)morpholine-3-carboxylic acid (2.80 g, 88%) as white solid. (LC/MS Method E): m/z 132 [M(−100)+H]⁺ (ES⁺), at 1.32 min, UV active.

Step (ii): (S)-4-(tert-butoxycarbonyl)morpholine-3-carboxylic acid (2.8 g, 12.12 mmol) was dissolved in DMF (20 mL) and methyl (S)-4-(1-aminoethyl)benzoate (2.60 g, 14.53 mmol) was added to reaction mixture at room temperature. HATU (6.90 g, 18.17 mmol) was then added and reaction mixture was allowed to stir at room temperature for 30 min. After this, N, N-Diisopropylethylamine (6.27 mL, 36.34 mmol) was added and reaction mixture was allowed to stir at room temperature for 2 hrs. The reaction mixture was then partitioned between water (250 mL) and EtOAc (100 mL) and the aqueous layer was further extracted with EtOAc (2×70 mL). Organic layers were combined and dried (Na₂SO₄). The crude material was purified by reverse phase gradient flash column chromatography (reverse phase, C18 silica), product was eluted at 0% to 70% acetonitrile in water to afford tert-butyl (S)-3-(((S)-1-(4-(methoxycarbonyl) phenyl)ethyl)carbamoyl)morpholine-4-carboxylate (3.50 g, 79.4%) as a white solid. (LC/MS Method E): m/z 293 [M(−100)+H]⁺ (ES⁺), at 1.82 min, UV active.

Step (iii): tert-butyl (S)-3-(((S)-1-(4-(methoxycarbonyl) phenyl)ethyl)carbamoyl)-morpholine-4-carboxylate (3.50 g, 8.92 mmol) was dissolved in dioxane (10 mL) under nitrogen atmosphere. After this, 4N HCl in dioxane (10 mL) was added at room temperature and reaction mixture was allowed to stir at room temperature for 4 hrs. Solvent was removed in vacuo and crude material was purified by trituration with diethyl ether (15 mL) to afford methyl 4-((S)-1-((S)-morpholine-3-carboxamido)ethyl)benzoate hydrochloride (2.60 g, 89.0%) as a white solid. (LC/MS Method E): m/z 293 [M+H]⁺ (ES⁺), at 0.96 min, UV active.

Step (iv): methyl 4-((S)-1-((S)-morpholine-3-carboxamido)ethyl)benzoate hydrochloride (0.35 g, 1.06 mmol) and DIPEA (0.55 mL, 3.20 mmol) were dissolved in acetonitrile (7 mL) at room temperature. After this, 3'-(bromomethyl)-5'-hydroxy-2-methyl-[1,1'-biphenyl]-4-carboxamide (Intermediate 6, 0.40 g, 1.28 mmol) was added and reaction mixture was stirred at 80° C. for 2 hrs. The reaction mixture was concentrated in vacuo and the crude was purified by reverse phase gradient flash column chromatography (reverse phase, C18 silica), product was eluted at 0% to 70% acetonitrile in water to afford methyl 4-((S)-1-((S)-4-((4'-carbamoyl-5-hydroxy-2'-methyl-[1,1'-biphenyl]-3-yl) methyl)morpholine-3-carboxamido)ethyl)benzoate (0.25 g, 44.6%) as off-white solid. (LC/MS Method E): m/z 532 [M+H]⁺ (ES⁺), at 1.31 min, UV active.

Step (v): methyl 4-((S)-1-((S)-4-((4'-carbamoyl-5-hydroxy-2'-methyl-[1,1'-biphenyl]-3-yl)methyl)morpholine-3-carboxamido)ethyl) benzoate (0.210 g, 0.395 mmol) was dissolved in dioxane (3 mL) and water (2 mL). Lithium hydroxide monohydrate (0.082 g, 1.98 mmol) was added at room temperature and allowed to stir at room temperature for 4 hrs. Th reaction mixture was acidified with glacial acetic acid (1.5 mL) to adjust the pH ~4 and concentrated in vacuo. Crude product was purified by reverse phase gradient flash column chromatography (reverse phase, C18 silica), product was eluted at 0% to 35% acetontrile in water to afford 4-((S)-1-((S)-4-((4'-carbamoyl-5-hydroxy-2'-methyl-[1,1'-biphenyl]-3-yl)methyl)morpholine-3-carboxamido) ethyl)benzoic acid (0.150 g, 73.4%) as white solid.

1H NMR: (400 MHz, DMSO): δ (ppm) 1.36 (d, 3H, J=6.8 Hz), 2.15-2.11 (m, 1H), 2.25 (s, 3H), 2.74 (d, 1H, J=12.0 Hz), 2.99 (dd, 1H, J=3.2 Hz and J=9.2 Hz), 3.14 (d, 1H, J=13.6 Hz), 3.53-3.47 (m, 2H), 3.70-3.66 (m, 2H), 3.78-3.76 (m, 1H), 5.01 (t, 1H, J=7.4 Hz), 6.61 (s, 1H), 6.76 (d, 2H, J=10.4 Hz), 7.23 (d, 1H, J=8 Hz), 7.37 (t, 3H, J=8.4 Hz), 7.73 (d, 1H, J=8.0 Hz), 7.80 (d, 3H, J=8.4 Hz), 7.96 (s, 1H), 8.50 (d, 1H, J=8.4 Hz), 9.52 (s, 1H). Carboxylic acid proton not observed. (LC/MS Method E): m/z 518 [M+H]⁺ (ES⁺), at 1.14 min, UV active.

Example 38: 4-((R)-1-((S)-4-((4'-carbamoyl-5-hydroxy-2'-methyl-[1,1'-biphenyl]-3-yl)methyl)morpholine-3-carboxamido)ethyl)benzoic acid (compound 38)

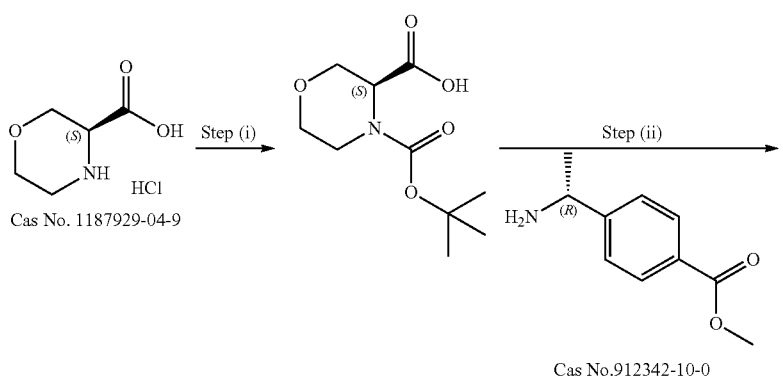

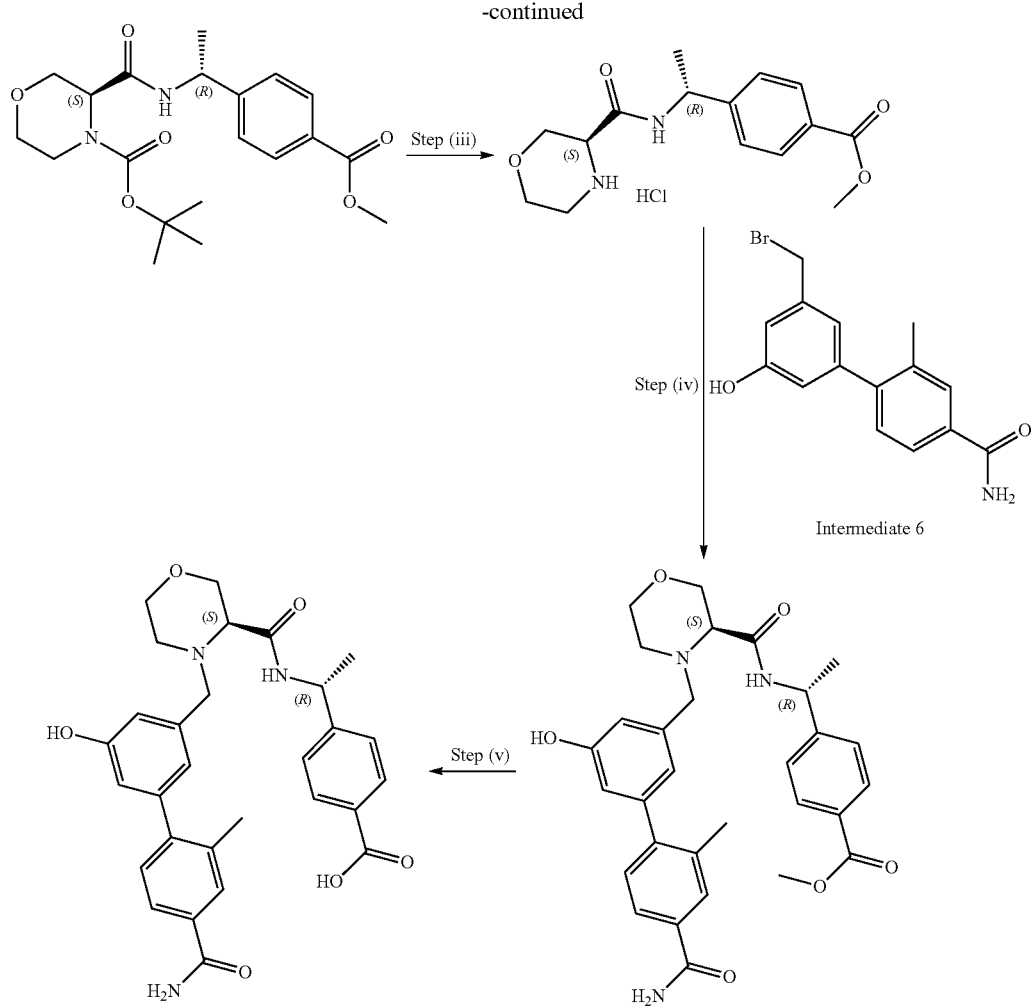

Intermediate 6

Step (i): (S)-morpholine-3-carboxylic acid hydrochloride (2.50 g, 14.96 mmol) was dissolved in acetone (15 mL) and H$_2$O (15 mL). Potassium carbonate (10.40 g, 74.83 mmol) was added and reaction mixture was stirred at room temperature for 30 min. After this, reaction mixture was cooled to 0° C. and BOC anhydride (5.22 g, 23.95 mmol) was added at 0° C. The reaction mixture was allowed to stir at room temperature for 5 hrs and concentrated in vacuo. The residue was partitioned between water (100 mL) and DCM (50 mL) and the aqueous layer was further extracted with DCM (2×50 mL). Organic layers were combined and dried (Na$_2$SO$_4$). Solvent was removed in vacuo to afford (S)-4-(tert-butoxycarbonyl)morpholine-3-carboxylic acid (2.80 g, 81.2%) as a white solid. (LC/MS Method E): m/z 132 [M(−100)+H]+(ES$^+$), at 1.32 min, UV active.

Step (ii): (S)-4-(tert-butoxycarbonyl)morpholine-3-carboxylic acid (2.10 g, 9.09 mmol) was dissolved in DMF (20 mL) and methyl (R)-4-(1-aminoethyl)benzoate (1.95 g, 10.90 mmol) and HATU (5.18 g, 13.64 mmol) were added and reaction mixture was allowed to stir at room temperature for 30 min. After this, N, N-Diisopropylethylamine (4.70 mL, 27.25 mmol) was added at room temperature and reaction mixture was allowed to stir at room temperature for 3 hrs. Reaction mixture was partitioned between water (100 mL) and EtOAc (30 mL) and the aqueous layer was further extracted with EtOAc (2×50 mL). Organic layers were combined and dried (Na$_2$SO$_4$) and resulting crude was purified by reverse phase gradient flash column chromatography (reverse phase, C18 silica), product was eluted at 0% to 60% acetonitrile in water to afford tert-butyl (S)-3-(((R)-1-(4-(methoxycarbonyl)phenyl)ethyl)carbamoyl)morpholine-4-carboxylate (3.00 g, 84.3%) as a white solid. (LC/MS Method E): m/z 293 [M(−100)+H]$^+$ (ES$^+$), at 1.74 min, UV active.

Step (iii): tert-butyl (S)-3-(((R)-1-(4-(methoxycarbonyl)phenyl)ethyl)carbamoyl)morpholine-4-carboxylate (3.00 g, 7.64 mmol) was dissolved in dioxane (10 mL) under nitrogen atmosphere. After this, 4N HCl in dioxane (10 mL) was added at room temperature and reaction mixture was allowed to stir at room temperature for 3 hrs. Solvent was removed in vacuo and crude was purified by trituration with diethyl ether (15 mL) to afford methyl 4-((R)-1-((S)-morpholine-3-carboxamido)ethyl)benzoate hydrochloride (2.50 g, 100%) as a white solid. (LC/MS Method E): m/z 293 [M+H]$^+$ (ES$^+$), at 0.95 min, UV active.

Step (iv): Methyl 4-((R)-1-((S)-morpholine-3-carboxamido)ethyl)benzoate hydrochloride (0.35 g, 1.06 mmol) and DIPEA (0.55 mL, 3.20 mmol) were dissolved in acetonitrile (7 mL) at room temperature. After this, 3'-(bromomethyl)-5'-hydroxy-2-methyl-[1,1'-biphenyl]-4-carboxamide (Intermediate 6, 0.33 g, 1.28 mmol) was added and reaction mixture was stirred at 80° C. for 2 hrs. Reaction mixture was concentrated in vacuo and crude was purified by reverse phase gradient flash column chromatography (reverse phase, C18 silica), product eluted at 0% to 70% acetontrile in water to afford methyl 4-((R)-1-((S)-4-((4'-carbamoyl-5-hydroxy-2'-methyl-[1,1'-biphenyl]-3-yl)methyl)morpholine-3-carboxamido)ethyl)benzoate (0.35 g, 62.50%) as an off-white solid. (LC/MS Method E): m/z 532 [M+H]$^+$ (ES$^+$), at 1.23 min, UV active.

Step (v): Methyl 4-((R)-1-((S)-4-((4'-carbamoyl-5-hydroxy-2'-methyl-[1,1'-biphenyl]-3-yl)methyl)morpholine-3-carboxamido)ethyl)benzoate (0.35 g, 0.66 mmol) was dissolved in Dioxane (1 mL) and water (2 mL). Lithium hydroxide monohydrate (0.13 g, 3.29 mmol) was added at room temperature and reaction mixture was allowed to stir at room temperature for 4 hrs. Reaction mixture was acidified with glacial acetic acid (2 mL) to adjust the pH ~4 and concentrated in vacuo. Crude product was purified by reverse phase gradient flash column chromatography (reverse phase, C18 silica), product was eluted at 0% to 35% acetonitrile in water to afford 4-((R)-1-((S)-4-((4'-carbamoyl-5-hydroxy-2'-methyl-[1,1'-biphenyl]-3-yl)methyl)morpholine-3-carboxamido)ethyl)benzoic acid (0.175 g, 51.5%) as a white solid.

1H NMR: (400 MHz, DMSO): δ (ppm) 1.37 (d, 3H, J=6.8 Hz), 2.16-2.08 (m, 1H), 2.25 (s, 3H), 2.73 (d, 1H, J=11.6 Hz), 2.99 (dd, 1H, J=3.2 Hz and J=9.2 Hz), 3.13 (d, 1H, J=12.8 Hz), 3.56-3.48 (m, 2H), 3.76-3.69 (m, 3H), 4.98 (t, 1H, J=7.4 Hz), 6.60 (s, 1H), 6.74-6.77 (m, 2H), 7.23 (d, 1H, J=8.0 Hz), 7.34 (s, 1H), 7.42 (d, 2H, J=8.4 Hz), 7.72 (d, 1H, J=7.6 Hz), 7.79 (s, 1H), 7.86 (d, 2H, J=8.4 Hz), 7.96 (s, 1H), 8.49 (d, 1H, J=8 Hz), 9.52 (s, 1H), 12.87 (s, 1H). (LC/MS Method E): m/z 518 [M+H]$^+$ (ES$^+$), at 1.00 min, UV active.

Example 39: 4-((R)-1-((R)-4-((4'-carbamoyl-5-hydroxy-2'-methyl-[1,1'-biphenyl]-3-yl)methyl)morpholine-3-carboxamido)ethyl)benzoic acid (Compound 39)

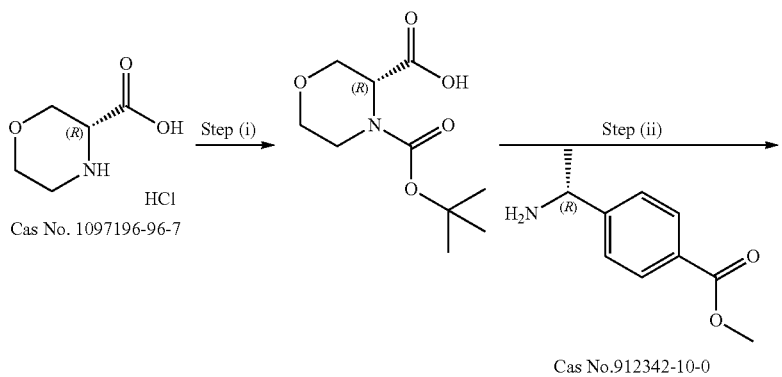

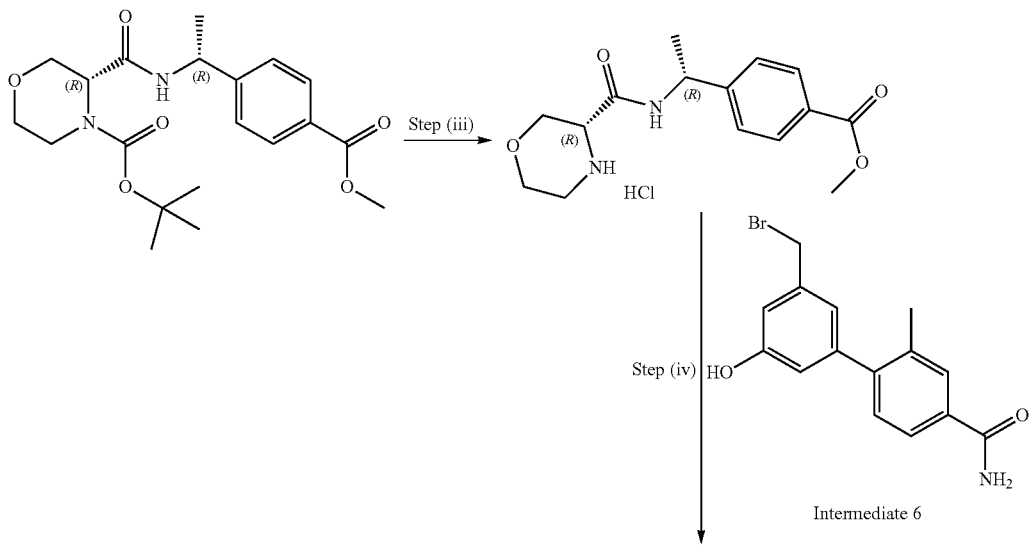

Intermediate 6

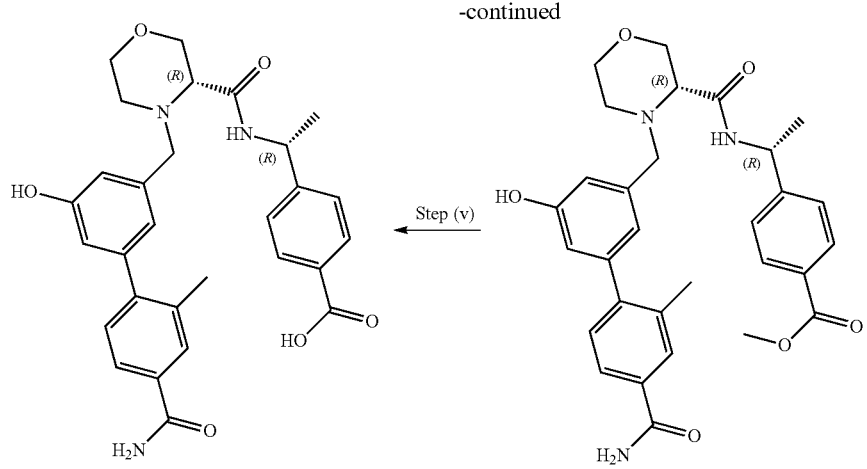

Example 39

Step (i): (R)-morpholine-3-carboxylic acid hydrochloride (10.00 g, 59.87 mmol) was dissolved in acetone (50 mL) and H₂O (50 mL). Potassium carbonate (41.37 g, 299.31 mmol) was added and reaction mixture was stirred at 0° C. for 30 min. After this, BOC anhydride (20.63 g, 89.79 mmol) was added and reaction mixture was allowed to stir at room temperature for 6 hr and concentrated in vacuo. The crude was partitioned between water (500 mL) and EtOAc (200 mL) and aqueous layer was further extracted with EtOAc (2×100 mL). Organic layers were combined and dried (Na₂SO₄). Solvent was removed in vacuo to afford (R)-4-(tert-butoxycarbonyl)morpholine-3-carboxylic acid (12.00 g, 72.3%) as a white solid. (LC/MS Method E): m/z 132 [M(-100)+H]⁺ (ES⁺), at 1.50 min, UV active.

Step (ii): (R)-4-(tert-butoxycarbonyl)morpholine-3-carboxylic acid (0.5 g, 2.16 mmol) was dissolved in DMF (7 mL) and methyl (R)-4-(1-aminoethyl)benzoate (0.46 g, 2.59 mmol) was added to reaction mixture at room temperature. After this, HATU (1.23 g, 3.24 mmol) was added and reaction mixture was allowed to stir at room temperature for 30 min. After this, N, N-Diisopropylethylamine (1.12 mL, 6.49 mmol) was added at room temperature and allowed to stir at room temperature for 4 hrs. The reaction mixture was concentrated in vacuo and crude product was purified by reverse phase gradient flash column chromatography (reverse phase, C18 silica), product was eluted at 0% to 65% acetontrile in water to afford tert butyl (R)-3-(((R)-1-(4-(methoxycarbonyl)phenyl) ethyl) carbamoyl)morpholine-4-carboxylate (0.6 g, 70.71%) as a white solid. (LC/MS Method E): m/z 293 [M(-100)+H]⁺ (ES⁺), at 1.81 min, UV active.

Step (iii): tert butyl (R)-3-(((R)-1-(4-(methoxycarbonyl) phenyl)ethyl)carbamoyl)morpholine-4-carboxylate (0.5 g, 7.64 mmol) was dissolved in dioxane (3 mL) and reaction was cooled to 0° C. After this, 4N HCl in dioxane (5 mL) was added at room temperature and reaction mixture was allowed to stir at room temperature for 4 hrs. Solvent was removed in vacuo and crude material was purified by trituration with diethyl ether (5 mL) to afford 4-((R)-1-((R)-morpholine-3-carboxamido)ethyl)benzoate hydrochloride (0.4 g, 99.2%) as a white solid. (LC/MS Method E): m/z 293 [M+H]⁺ (ES⁺), at 0.87 min, UV active.

Step (iv): Methyl 4-((R)-1-((R)-morpholine-3-carboxamido)ethyl)benzoate hydrochloride (0.3 g, 0.914 mmol) and DIPEA (0.47 mL, 2.70 mmol) were dissolved in acetonitrile (5 mL) at room temperature. After this, 3'-(bromomethyl)-5'-hydroxy-2-methyl-[1,1'-biphenyl]-4-carboxamide (Intermediate 6, 0.35 g, 1.095 mmol) was added and reaction mixture was stirred at 80° C. for 4 hrs. Reaction mixture was concentrated in vacuo and crude product was purified by reverse phase gradient flash column chromatography (reverse phase, C18 silica), product was eluted at 0% to 70% acetontrile in water to afford methyl 4-((R)-1-((R)-4-((4'-carbamoyl-5-hydroxy-2'-methyl-[1,1'-biphenyl]-3-yl)methyl)morpholine-3-carboxamido)ethyl)benzoate (0.2 g, 41.2%) as an off-white solid. (LC/MS Method E): m/z 532 [M+H]⁺ (ES⁺), at 1.23 min, UV active.

Step (v): Methyl 4-((R)-1-((R)-4-((4'-carbamoyl-5-hydroxy-2'-methyl-[1,1'-biphenyl]-3-yl)methyl)morpholine-3-carboxamido) ethyl) benzoate (0.2 g, 0.376 mmol) was dissolved in Dioxane (2 mL) and water (2 mL). Lithium hydroxide monohydrate (0.078 g, 1.88 mmol) was added and reaction mixture was allowed to stir at room temperature for 4 hrs. Reaction mixture was acidified with glacial acetic acid (1 mL) to adjust the pH ~4 and concentrated in vacuo.

Crude product was purified by reverse phase gradient flash column chromatography (reverse phase, C18 silica), product was eluted at 0% to 30% acetontrile in water to afford 4-((R)-1-((R)-4-((4'-carbamoyl-5-hydroxy-2'-methyl-[1,1'-biphenyl]-3-yl)methyl)morpholine-3-carboxamido) ethyl)benzoic acid (0.110 g, 56.5%) as a white solid.

1H NMR: (400 MHz, DMSO): δ (ppm) 1.36 (d, J=6.8 Hz, 3H), 2.15-2.10 (m, 1H), 2.24 (s, 3H), 2.74 (d, 1H, J=12 Hz), 2.99 (dd, 1H, J=2.8 Hz and J=8.8 Hz), 3.13 (d, 1H, J=13.2 Hz), 3.53-3.35 (m, 3H), 3.69-3.66 (m, 2H), 3.76 (d, 1H, J=8.4 Hz), 2.99 (t, 1H, J=7.2 Hz), 6.61 (s, 1H), 6.76 (d, 2H, J=15.2 Hz), 7.22 (d, 1H, J=8.0 Hz), 7.35 (d, 3H, J=8.0 Hz), 7.73 (d, 1H, J=8.0 Hz), 7.80-7.78 (m, 3H), 8.00 (s, 1H), 8.47 (d, 1H, J=8.0 Hz), 9.67 (s, 1H). (LC/MS Method E): m/z 518 [M+H]⁺ (ES⁺), at 1.14 min, UV active.

The following compounds are prepared by following the procedures described in the foregoing examples but using the different intermediates.

Example 2: 4-[(1S)-1-[[(3R)-4-[[6-(4-carbamoyl-2-methyl-phenyl)-2-pyridyl]methyl]-morpholine-3-carbonyl]amino]ethyl]benzoic acid (Compound 2)

Following the procedure described in Example 23 but using Intermediates 1, 2, 15, the title compound is obtained.

Note: Step (ii): additional catalyst, boronic ester and base added, followed by further 1 hr microwave irradiation.

HPLC method A Gradient 4%-70% Solvent B in Solvent A. (LC/MS Method C): m/z 503 [M+H]+ (ES+), at 1.74 min, UV active. $^1$H NMR (DMSO, 400 MHz): δ (ppm) 1.22 (d, J=7.0 Hz, 3H), 2.27-2.35 (m, 4H), 2.68-2.76 (m, 1H), 3.10 (dd, J=9.3, 3.6 Hz, 1H), 3.38-3.52 (m, 3H), 3.65-3.73 (m, 1H), 3.78 (dd, J=11.0, 3.6 Hz, 1H), 3.84 (d, J=13.9 Hz, 1H), 4.88-4.97 (m, 1H), 7.21-7.28 (m, 2H), 7.33 (br.s, 1H), 7.38-7.48 (m, 3H), 7.73-7.81 (m, 4H), 7.81-7.90 (m, 1H), 8.02 (br.s, 1H), 8.48-8.55 (m, 1H).

Example 3: 4-[(1S)-1-[[(3R)-4-[[2-(4-carbamoyl-2-methyl-phenyl)-4-pyridyl]methyl]morpholine-3-carbonyl]amino]ethyl]benzoic acid (Compound 3)

Following the procedure described in Example 1 but using Intermediates 1, 2, 16, the title compound is obtained. Note: Step (ii): additional catalyst, boronic ester and base added, followed by further 1 hr microwave irradiation.

HPLC method B. (LC/MS Method C): m/z 503 [M+H]+ (ES+), at 1.31 min, UV active. $^1$H NMR (DMSO, 400 MHz): δ (ppm) 1.32 (d, J=7.0 Hz, 3H), 2.16-2.24 (m, 1H), 2.32 (s, 3H), 2.69-2.77 (m, 1H), 3.04 (dd, J=8.8, 3.5 Hz, 1H), 3.34 (d, J=14.3 Hz, 1H), 3.47-3.61 (m, 2H), 3.63-3.71 (m, 1H), 3.72-3.81 (m, 2H), 4.89-4.98 (m, 1H), 7.24-7.31 (m, 2H), 7.31-7.37 (m, 2H), 7.37-7.44 (m, 1H), 7.52 (br s, 1H), 7.73-7.83 (m, 4H), 8.04 (br s, 1H), 8.43 (d, J=8.1 Hz, 1H), 8.55-8.59 (m, 1H).

Example 4: 4-[(1S)-1-[[(3R)-4-[[4-(4-carbamoyl-2-methyl-phenyl)-2-pyridyl]methyl]morpholine-3-carbonyl]amino]ethyl]benzoic acid (Compound 4)

Following the procedure described in Example 1 but using Intermediates 1, 2, 17, the title compound is obtained.

HPLC method B. (LC/MS Method C): m/z 503 [M+H]+ (ES+), at 1.51 min, UV active. $^1$H NMR (DMSO, 400 MHz): δ (ppm) 1.32 (d, J=6.9 Hz, 3H), 2.24 (s, 3H), 2.26-2.34 (m, 1H), 2.69-2.75 (m, 1H), 3.10 (dd, J=9.3, 3.6 Hz, 1H), 3.42-3.50 (m, 3H), 3.64-3.70 (m, 1H), 3.77 (dd, J=10.9, 3.6 Hz, 1H), 3.85 (d, J=14.1 Hz, 1H), 4.89-4.97 (m, 1H), 7.19-7.24 (m, 2H), 7.26-7.31 (m, 2H), 7.36 (br s, 1H), 7.47-7.49 (m, 1H), 7.74-7.81 (m, 3H), 7.81-7.84 (m, 1H), 8.12 (br s, 1H), 8.51 (d, J=8.1 Hz, 1H), 8.54-8.58 (m, 1H).

Example 6: 6-[[[(3R)-4-[[3-(4-carbamoyl-2-methyl-phenyl)phenyl]methyl]morpholine-3-carbonyl]amino]methyl]pyridine-3-carboxylic acid (Compound 6)

Following the procedure described in Example 1 but using Intermediates 2, 18, 19, the title compound is obtained.

HPLC method C. (LC/MS Method C): m/z 487 [M−H]− (ES−), at 1.79 min, UV active. $^1$H NMR (CD$_3$OD, 400 MHz): δ (ppm) 2.25-2.32 (m, 4H), 2.76-2.85 (m, 1H), 3.12 (dd, J=9.5, 3.7 Hz, 1H), 3.32-3.33 (m, 1H), 3.54-3.68 (m, 2H), 3.75-3.83 (m, 1H), 3.95 (dd, J=11.3, 3.7 Hz, 1H), 4.02 (d, J=13.0 Hz, 1H), 4.48 (d, J=16.2 Hz, 1H), 4.65 (d, J=16.2 Hz, 1H), 7.20-7.26 (m, 2H), 7.32-7.43 (m, 4H), 7.67-7.75 (m, 1H), 7.75-7.80 (m, 1H), 8.16-8.24 (m, 1H), 8.88-8.94 (m, 1H).

Example 7: 4-((S)-1-((R)-4-((4'-carbamoyl-2'-methyl-[1,1'-biphenyl]-3-yl)methyl)morpholine-3-carboxamido)ethyl)benzoic acid (Compound 7)

Following the procedure described in Example 5 but using Intermediates 2 and 3, the title compound is obtained.

The product is purified by flash chromatography (reversed phase). (LC/MS Method E): m/z 502 [M+H]+ (ES+), at 1.42 min, UV active. $^1$H NMR (DMSO, 400 MHz): δ (ppm) 1.38 (d, J=7.0 Hz, 3H), 2.10-2.21 (m, 1H), 2.26 (s, 3H), 2.67-2.75 (m, 1H), 2.91-3.06 (m, 1H), 3.25 (d, J=13.3 Hz, 1H), 3.47-3.59 (m, 2H), 3.65-3.85 (m, 3H), 4.92-5.06 (m, 1H), 7.22-7.30 (m, 2H), 7.30-7.49 (m, 6H), 7.73-7.78 (m, 1H), 7.82 (s, 1H), 7.85-7.90 (m, 2H), 7.99 (br.s, 1H), 8.56 (d, J=8.0 Hz, 1H), 12.83 (br.s, 1H).

Example 8: 4-[[[(3R)-4-[[3-(4-carbamoyl-2-methyl-phenyl)phenyl]methyl]morpholine-3-carbonyl]amino]methyl]-2,6-difluoro-benzoic acid (Compound 8)

Following the procedure described in Example 1 but using Intermediates 2, 19, 20, the title compound is obtained. Note: Step (ii): additional catalyst, boronic ester and base added, followed by further 2.5 hrs microwave irradiation.

HPLC method D. (LC/MS Method C): m/z 524 [M+H]+ (ES+), at 1.83 min, UV active. $^1$H NMR (CD$_3$OD, 400 MHz): δ (ppm) 2.31 (s, 3H), 3.28-3.36 (m, 1H), 3.37-3.43 (m, 1H), 3.68-3.78 (m, 2H), 3.99-4.06 (m, 1H), 4.12 (dd, J=10.4, 4.0 Hz, 1H), 4.18-4.27 (m, 2H), 4.45 (d, J=15.5 Hz, 1H), 4.51 (d, J=15.5 Hz, 1H), 4.56 (d, J=12.8 Hz, 1H), 7.00-7.06 (m, 2H), 7.30-7.33 (m, 1H), 7.47-7.54 (m, 3H), 7.55-7.60 (m, 1H), 7.73-7.78 (m, 1H), 7.81-7.84 (m, 1H).

Example 12: 4-[(1S)-1-[[(3R)-4-[[5-(2-methyl-4-sulfamoyl-phenyl)-3-pyridyl]methyl]morpholine-3-carbonyl]amino]ethyl]benzoic acid (Compound 12)

Following the procedure described in Example 1 but using Intermediates 1, 4, 21, the title compound is obtained.

HPLC method D. (LC/MS Method D): m/z 539 [M+H]+ (ES+), at 1.78 min, UV active. $^1$H NMR (CD$_3$OD, 400 MHz): δ (ppm) 1.49 (d, J=7.0 Hz, 3H), 2.31 (s, 3H), 2.90-3.02 (m, 1H), 3.11-3.19 (m, 1H), 3.62-3.75 (m, 2H), 3.78 (dd, J=10.1, 3.3 Hz, 1H), 3.91-3.98 (m, 2H), 4.10-4.19 (m, 2H), 5.03-5.13 (m, 1H), 7.39-7.48 (m, 3H), 7.79-7.87 (m, 1H), 7.86-7.92 (m, 1H), 7.89-7.98 (m, 2H), 8.08-8.14 (m, 1H), 8.69 (d, J=2.0 Hz, 1H), 8.72 (d, J=2.0 Hz, 1H).

Example 13: 4-[[[(3R)-4-[[3-(4-carbamoyl-2-methyl-phenyl)phenyl]methyl]morpholine-3-carbonyl]amino]methyl]-2-fluoro-benzoic acid (Compound 13)

Following the procedure described in Example 1 but using Intermediates 2, 19, 22, the title compound is obtained.

HPLC method C. (LC/MS Method D): m/z 506 [M+H]+ (ES+), at 2.31 min, UV active. $^1$H NMR (CD$_3$OD, 400 MHz): δ (ppm) 2.22-2.32 (m, 4H), 2.76-2.83 (m, 1H), 3.08 (dd, J=9.5, 3.6 Hz, 1H), 3.24-3.31 (m, 1H), 3.54-3.65 (m, 2H), 3.73-3.80 (m, 1H), 3.85-3.93 (m, 2H), 4.32 (d, J=15.1 Hz, 1H), 4.48 (d, J=15.1 Hz, 1H), 6.98-7.03 (m, 1H), 7.03-7.08 (m, 1H), 7.19-7.27 (m, 2H), 7.29-7.34 (m, 2H), 7.36-7.41 (m, 1H), 7.57-7.64 (m, 1H), 7.71-7.75 (m, 1H), 7.77-7.80 (m, 1H).

Example 14: 4-((S)-1-((R)-4-((4'-carbamoyl-2'-hydroxy-[1,1'-biphenyl]-3-yl)methyl)morpholine-3-carboxamido)ethyl)benzoic acid (Compound 14)

Following the procedure described in Example 5 but using Intermediates 3 and 24, the title compound is obtained. Note: Step (iii): compound sufficiently pure after workup; no chromatography required.

The product is purified by acid/base extraction. (LC/MS Method E): m/z 504 [M+H]+(ES+), at 1.16 min, UV active. ¹H NMR (DMSO, 400 MHz): δ (ppm) 1.39 (d, J=7.0 Hz, 3H), 2.06-2.21 (m, 1H), 2.69-2.77 (m, 1H), 2.99 (dd, J=9.2, 3.5 Hz, 1H), 3.21 (d, J=13.0 Hz, 1H), 3.44-3.60 (m, 2H), 3.63-3.84 (m, 3H), 4.91-5.08 (m, 1H), 7.23-7.32 (m, 3H), 7.32-7.39 (m, 2H), 7.40-7.50 (m, 4H), 7.52 (s, 1H), 7.82-7.99 (m, 3H), 8.51 (d, J=8.0 Hz, 1H), 9.84 (br.s, 1H), 12.86 (s, 1H).

Example 16: 4-[(1S)-1-[[(3R)-4-[[2-(2-methyl-4-sulfamoyl-phenyl)-4-pyridyl]methyl]morpholine-3-carbonyl]amino]ethyl]benzoic acid (Compound 16)

Following the procedure described in Example 1 but using Intermediates 1, 4, 16, the title compound is obtained. Note: Step (ii): additional catalyst and boronic ester added, followed by further 1 hr microwave irradiation.

HPLC method D. (LC/MS Method D): m/z 539 [M+H]+ (ES+), at 1.98 min, UV active. ¹H NMR (DMSO, 400 MHz): δ (ppm) 1.37 (d, J=7.0 Hz, 3H), 2.35 (s, 3H), 2.70-2.83 (m, 1H), 2.92-3.03 (m, 1H), 3.54-3.69 (m, 3H), 3.75-3.91 (m, 2H), 3.98-4.10 (m, 2H), 4.95-5.04 (m, 1H), 7.33-7.48 (m, 5H), 7.54-7.58 (m, 1H), 7.65 (br.s, 1H), 7.71-7.75 (m, 1H), 7.75-7.78 (m, 1H), 7.85-7.90 (m, 2H), 8.67-8.71 (m, 1H), 8.95-9.03 (m, 1H).

Example 17: 4-[(1S)-1-[[(3R)-4-[[4-(2-methyl-4-sulfamoyl-phenyl)-2-pyridyl]methyl]morpholine-3-carbonyl]amino]ethyl]benzoic acid (Compound 17)

Following the procedure described in Example 1 but using Intermediates 1, 4, 17, the title compound is obtained.

HPLC method D. (LC/MS Method D): m/z 539 [M+H]+ (ES+), at 1.73 min, UV active. ¹H NMR (DMSO, 400 MHz): δ (ppm) 1.38 (d, J=6.9 Hz, 3H), 2.29 (s, 3H), 2.92-3.02 (m, 1H), 3.17-3.22 (m, 1H), 3.63-3.75 (m, 2H), 3.80-3.93 (m, 2H), 4.03-4.10 (m, 1H), 4.13 (d, J=13.9 Hz, 1H), 4.24 (d, J=13.9 Hz, 1H), 4.96-5.05 (m, 1H), 7.37-7.45 (m, 3H), 7.45-7.48 (m, 2H), 7.51-7.54 (m, 1H), 7.54-7.58 (m, 1H), 7.72-7.76 (m, 1H), 7.78-7.81 (m, 1H), 7.84-7.89 (m, 2H), 8.72 (d, J=5.1 Hz, 1H), 9.11 (d, J=7.7 Hz, 1H).

Example 21: 2-hydroxy-4-((S)-1-((R)-4-((5-(2-methyl-4-sulfamoylphenyl)pyridin-3-yl)methyl)morpholine-3-carboxamido)ethyl)benzoic acid (Compound 21)

Following the procedure described in Example 18 but using Intermediates 8 and 26, the title compound is obtained.

The product is purified by flash chromatography (reversed phase). (LC/MS Method E): m/z 555 [M+H]+ (ES+), at 1.26 min, UV active. ¹H NMR (DMSO, 400 MHz): δ (ppm) 1.33 (d, J=7.0 Hz, 3H), 2.14-2.24 (m, 1H), 2.29 (s, 3H), 2.63-2.72 (m, 1H), 3.04 (dd, J=9.2, 3.5 Hz, 1H), 3.48-3.58 (m, 4H), 3.72-3.88 (m, 2H), 4.84-4.96 (m, 1H), 6.80 (d, J=8.0 Hz, 1H), 6.83 (s, 1H), 7.40 (s, 2H), 7.44 (d, J=8.0 Hz, 1H), 7.66 (d, J=8.0 Hz, 1H), 7.72 (dd, J=8.0, 2.0 Hz, 1H), 7.78 (d, J=2.0 Hz, 1H), 7.82-7.89 (m, 1H), 8.49 (d, J=2.2 Hz, 1H), 8.51-8.60 (m, 2H).

Example 22: 2-hydroxy-4-((S)-1-((R)-4-((5-hydroxy-2'-methyl-4'-sulfamoyl-[1,1'-biphenyl]-3-yl)methyl)morpholine-3-carboxamido)ethyl)benzoic acid (Compound 22)

Following the procedure described in Example 18 but using Intermediates 8 and 27, the title compound is obtained.

The product is purified by flash chromatography (reversed phase). (LC/MS Method E): m/z 570 [M+H]+ (ES+), at 1.29 min, UV active. ¹H NMR (DMSO, 400 MHz): δ (ppm) 1.33 (d, J=7.0 Hz, 3H), 2.10-2.20 (m, 1H), 2.27 (s, 3H), 2.67-2.76 (m, 1H), 3.02 (br.s, 1H), 3.11-3.21 (m, 1H), 3.48-3.58 (m, 2H), 3.66-3.81 (m, 3H), 4.84-4.94 (m, 1H), 6.57-6.64 (m, 1H), 6.75-6.88 (m, 4H), 7.31-7.36 (m, 3H), 7.63-7.70 (m, 2H), 7.70-7.74 (m, 1H), 8.47 (d, J=7.9 Hz, 1H), 9.58 (br.s, 1H).

Example 24: 4-[(1S)-1-[[(3R)-4-[[4-hydroxy-3-(4-sulfamoylphenyl)phenyl]methyl]morpholine-3-carbonyl]amino]ethyl]benzoic acid (Compound 24)

Following the procedure described in Example 26 but using Intermediates 1 and 29, the title compound is obtained.

HPLC method D. (LC/MS Method H): m/z 540 [M+H]+ (ES+), at 1.76 min, UV active. ¹H NMR (CD₃OD, 400 MHz): δ (ppm) 1.51 (d, J=7.0 Hz, 3H), 3.25 (dd, J=12.2, 3.9 Hz, 1H), 3.36-3.44 (m, 1H), 3.68-3.78 (m, 2H), 3.99-4.05 (m, 2H), 4.10 (d, J=12.8 Hz, 1H), 4.19-4.29 (m, 2H), 5.09-5.14 (m, 1H), 6.94 (d, J=8.2 Hz, 1H), 7.17 (dd, J=8.2, 2.3 Hz, 1H), 7.29 (d, J=2.3 Hz, 1H), 7.47-7.51 (m, 2H), 7.68-7.73 (m, 2H), 7.89-7.94 (m, 2H), 7.98-8.01 (m, 2H).

Example 25: 2-hydroxy-4-((S)-1-((R)-4-((2'-methyl-4'-sulfamoyl-[1,1'-biphenyl]-3-yl)methyl) morpholine-3-carboxamido)ethyl)benzoic acid (Compound 25)

Following the procedure described in Example 19 but using Intermediates 8 and 4, the title compound is obtained. Note: Step (ii): 1.2 equivalents boronic ester used. Step (iii): Reaction mixture partitioned between EtOAc and 4 N HCl; Organic layer isolated, concentrated and residue purified by prep HPLC.

HPLC method G. (LC/MS Method E): m/z 554 [M+H]+ (ES+), at 1.68 min, UV active. ¹H NMR (400 MHz, DMSO) δ 1.32 (d, J=7.0 Hz, 3H), 2.10-2.21 (m, 1H), 2.27 (s, 3H), 2.63-2.76 (m, 1H), 3.01 (dd, J=9.2, 3.5 Hz, 1H), 3.27 (d, J=13.2 Hz, 1H), 3.45-3.58 (m, 2H), 3.65-3.82 (m, 3H), 4.81-4.95 (m, 1H), 6.67-6.71 (m, 1H), 6.74 (s, 1H), 7.23-7.28 (m, 1H), 7.33-7.45 (m, 6H), 7.59 (d, J=8.0 Hz, 1H), 7.69 (dd, J=8.0, 2.0 Hz, 1H), 7.75 (d, J=2.0 Hz, 1H), 8.40 (d, J=8.2 Hz, 1H).

Example 27: 4-(1-((R)-4-((4'-carbamoyl-2'-methyl-[1,1'-biphenyl]-3-yl)methyl)morpholine-3-carboxamido)ethyl)-2,6-difluorobenzoic acid (Single Diastereomer of Unknown Stereochemistry 2, Compound 27)

Following the procedure described in Example 29 but using Intermediates 11 and 30, the title compound is obtained.

HPLC method F. (LC/MS Method I): m/z 538 [M+H]+ (ES+), at 0.57 min, UV active. ¹H NMR (CD₃OD, 400 MHz): δ (ppm) 1.50 (d, J=7.0 Hz, 3H), 2.29 (s, 3H), 3.22-3.27 (m, 1H), 3.35-3.41 (m, 1H), 3.69-3.77 (m, 2H), 3.97-4.07 (m, 2H), 4.15 (d, J=12.8 Hz, 1H), 4.26 (dd, J=12.7, 3.9 Hz, 1H), 4.36 (d, J=12.8 Hz, 1H), 5.07 (q, J=7.0 Hz, 1H), 7.08-7.14 (m, 2H), 7.30 (d, J=8.0 Hz, 1H), 7.39-7.44 (m, 2H), 7.45-7.49 (m, 1H), 7.51-7.56 (m, 1H), 7.75 (dd, J=8.0, 1.8 Hz, 1H), 7.82 (d, J=1.8 Hz, 1H).

Example 28: 4-((S)-1-((R)-4-((5-(4-carbamoyl-2-methylphenyl)pyridin-3-yl)methyl)morpholine-3-carboxamido)ethyl)-2-hydroxy benzoic acid (Compound 28)

Following the procedure described in Example 18 but using Intermediates 8 and 31, the title compound is obtained.

HPLC method E. (LC/MS Method E): m/z 519 [M+H]$^+$ (ES$^+$), at 1.36 min, UV active. $^1$H NMR (DMSO, 400 MHz): δ (ppm) 1.34 (d, J=7.0 Hz, 3H), 2.13-2.24 (m, 1H), 2.26 (s, 3H), 2.63-2.76 (m, 1H), 3.04 (dd, J=9.3, 3.5 Hz, 1H), 3.33 (d, J=13.5 Hz, 1H), 3.44-3.60 (m, 2H), 3.65-3.73 (m, 1H), 3.73-3.88 (m, 2H), 4.83-4.96 (m, 1H), 6.78-6.87 (m, 2H), 7.32 (d, J=8.1 Hz, 1H), 7.39 (br.s, 1H), 7.67 (d, J=8.1 Hz, 1H), 7.76-7.80 (m, 1H), 7.82-7.88 (m, 2H), 8.01 (s, 1H), 8.45-8.50 (m, 1H), 8.51-8.59 (m, 2H).

Example 31: (R)-4-(1-(4-((4'-carbamoyl-2'-methyl-[1,1'-biphenyl]-3-yl)methyl)morpholine-3-carboxamido)cyclopropyl)benzoic acid (Compound 31)

Following the procedure described in Example 19 but using Intermediates 2 and 32, the title compound is obtained. Note: Step (i): 3 equivalents of base used. Step (ii): 1.5 equivalents boronic ester used.

The product is purified by flash chromatography (reversed phase). (LC/MS Method E): m/z 514 [M+H]$^+$ (ES$^+$), at 1.46 min, UV active. $^1$H NMR (400 MHz, DMSO) δ 1.08-1.22 (m, 2H), 1.22-1.32 (m, 2H), 2.10-2.19 (m, 1H), 2.26 (s, 3H), 2.65-2.76 (m, 1H), 2.98 (dd, J=9.3, 3.4 Hz, 1H), 3.27 (d, J=13.4 Hz, 1H), 3.47-3.54 (m, 1H), 3.55-3.62 (m, 1H), 3.67-3.73 (m, 1H), 3.79 (d, J=13.4 Hz, 1H), 3.85 (dd, J=11.2, 3.4 Hz, 1H), 7.15-7.22 (m, 2H), 7.23-7.29 (m, 2H), 7.33-7.46 (m, 4H), 7.73-7.84 (m, 4H), 7.97 (s, 1H), 8.89 (s, 1H), 12.79 (s, 1H).

Example 32: (R)-4-(1-(4-((4'-carbamoyl-2'-hydroxy-[1,1'-biphenyl]-3-yl)methyl)morpholine-3-carboxamido) cyclopropyl)benzoic acid (Compound 32)

Following the procedure described in Example 19 but using Intermediates 24 and 32, the title compound is obtained. Note: Step (i): 3 equivalents of base used. Step (ii): 1.5 equivalents boronic ester used.

The product is purified by flash chromatography (reversed phase). (LC/MS Method E): m/z 516 [M+H]$^+$ (ES$^+$), at 1.45 min, UV active. $^1$H NMR (400 MHz, DMSO) δ 1.29-1.49 (m, 4H), 3.06-3.19 (m, 1H), 3.55-3.73 (m, 2H), 3.80-4.00 (m, 2H), 4.13-4.49 (m, 4H), 7.21-7.26 (m, 2H), 7.31-7.42 (m, 4H), 7.46-7.53 (m, 2H), 7.63-7.73 (m, 2H), 7.83-7.89 (m, 2H), 7.93 (s, 1H), 9.95 (s, 1H), 10.53 (br.s, 1H), 12.85 (br.s, 1H).

Example 33: (R)-4-(1-(4-((4'-carbamoyl-5-hydroxy-2'-methyl-[1,1'-biphenyl]-3-yl)methyl)morpholine-3-carboxamido)cyclopropyl)benzoic acid (Compound 33)

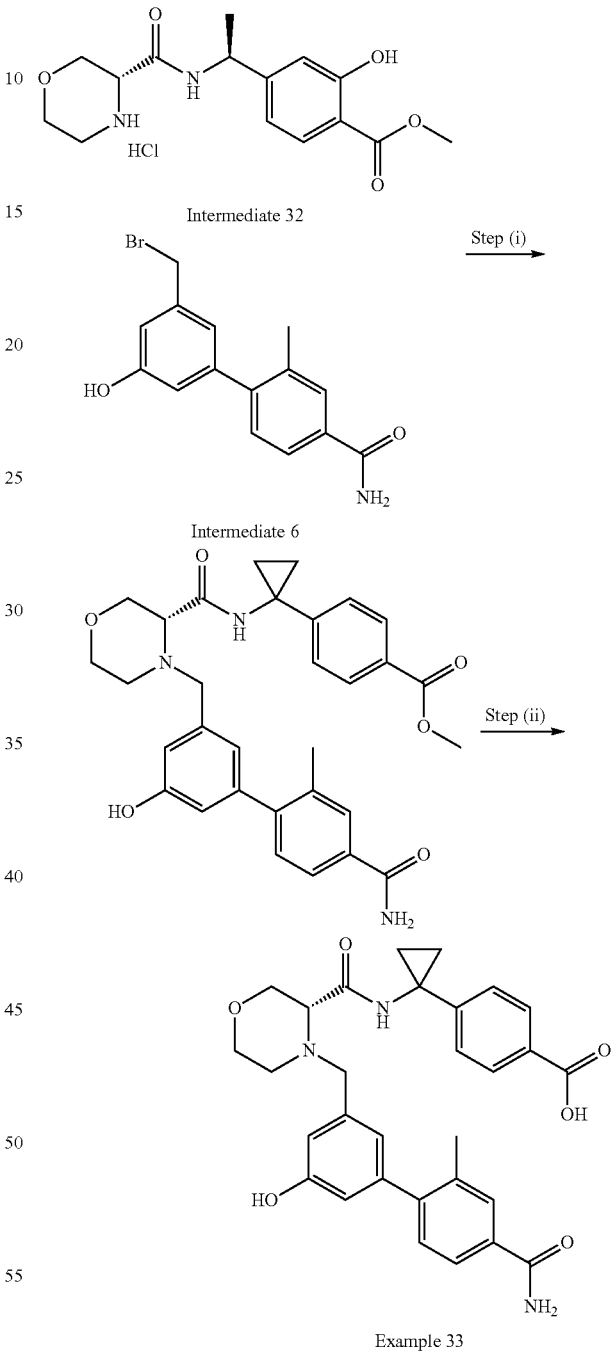

Step (i) Methyl (R)-4-(1-(morpholine-3-carboxamido)cyclopropyl)benzoate, HCl salt (Intermediate 32, 0.25 g, 0.75 mmol) and DIPEA (0.4 mL, 2.26 mmol) were dissolved in acetonitrile (3 mL) at room temperature. 3'-(bromomethyl)-5'-hydroxy-2-methyl-[1,1'-biphenyl]-4-carboxamide (Intermediate 6, 0.24 g, 0.75 mmol) was added and the reaction mixture was stirred at 70° C. for 2 hrs. Reaction mixture was then partitioned between water (70 mL) and EtOAc (70 mL).

The aqueous layer was further extracted with EtOAc (2×25 mL and organic layers were combined and dried (Na$_2$SO$_4$). Solvent was removed in vacuo and crude was purified by reverse phase gradient flash column chromatography (Reverse phase, C18 silica), product eluted at 0% to 56% acetonitrile in water to afford pure methyl (R)-4-(1-(4-((4'-carbamoyl-5-hydroxy-2'-methyl-[1,1'-biphenyl]-3-yl)methyl)morpholine-3-carboxamido)cyclopropyl)benzoate (0.20 g, 49%) as white solid. (LC/MS Method E): m/z 544 [M+H]$^+$ (ES$^+$), at 1.56 min, UV active.

Step (ii) methyl (R)-4-(1-(4-((4'-carbamoyl-5-hydroxy-2'-methyl-[1,1'-biphenyl]-3-yl)methyl)morpholine-3-carboxamido)cyclopropyl)benzoate (0.20 g, 0.36 mmol) was dissolved in Dioxane (2 mL) and water (1 mL). Lithium hydroxide (77 mg, 1.84 mmol) was added at room temperature and reaction mixture was allowed to stir at room temperature for 16 hrs. Reaction mixture was acidified with glacial acetic acid (0.3 mL) to pH-3 and reaction mixture was concentrated in vacuo. Crude product was purified by reverse phase gradient flash column chromatography (reverse phase, C18 silica), product eluted at 0% to 22% acetonitrile in water to afford pure (R)-4-(1-(4-((4'-carbamoyl-5-hydroxy-2'-methyl-[1,1'-biphenyl]-3-yl)methyl)morpholine-3-carboxamido)cyclopropyl)benzoic acid (0.13 g, 66.7%) as off-white solid. (LC/MS Method E): m/z 530 [M+H]$^+$ (ES$^+$), at 1.31 min, UV active. $^1$H NMR (DMSO, 400 MHz): δ (ppm) 1.05-1.21 (m, 2H), 1.20-1.33 (m, 2H), 2.11-2.18 (m, 1H), 2.25 (s, 3H), 2.70-2.78 (m, 1H), 2.97 (dd, J=9.2, 3.5 Hz, 1H), 3.17 (d, J=13.3 Hz, 1H), 3.46-3.55 (m, 1H), 3.55-3.63 (m, 1H), 3.65-3.75 (m, 2H), 3.83 (dd, J=10.9, 3.5 Hz, 1H), 6.59-6.62 (m, 1H), 6.76-6.81 (m, 2H), 7.15-7.20 (m, 2H), 7.23 (d, J=7.9 Hz, 1H), 7.33 (s, 1H), 7.72 (dd, J=7.9, 1.8 Hz, 1H), 7.77-7.82 (m, 3H), 7.95 (s, 1H), 8.83 (s, 1H), 9.53 (br.s, 1H), 12.74 (br.s, 1H).

Example 34: (R)-4-(1-(4-((4'-carbamoyl-6-hydroxy-[1,1'-biphenyl]-3-yl)methyl)morpholine-3-carboxamido)cyclopropyl)benzoic acid (Compound 34)

Following the procedure described in Example 5 but using Intermediates 33 and 34, the title compound is obtained. Note: steps (ii) and (iii) only.

The product is purified by flash chromatography (reversed phase). (LC/MS Method E): m/z 516 [M+H]$^+$ (ES$^+$), at 1.07 min, UV active. $^1$H NMR (400 MHz, DMSO) δ 1.10-1.33 (m, 4H), 2.06-2.17 (m, 1H), 2.64-2.76 (m, 1H), 2.93 (dd, J=9.2, 3.5 Hz, 1H), 3.15 (d, J=12.8 Hz, 1H), 3.45-3.59 (m, 2H), 3.62-3.73 (m, 2H), 3.83 (dd, J=10.9, 3.5 Hz, 1H), 6.91 (d, J=8.2 Hz, 1H), 7.14 (dd, J=8.2, 2.2 Hz, 1H), 7.17-7.21 (m, 2H), 7.23 (d, J=2.2 Hz, 1H), 7.36 (s, 1H), 7.56-7.65 (m, 2H), 7.78-7.85 (m, 2H), 7.86-7.92 (m, 2H), 7.99 (s, 1H), 8.86 (s, 1H), 9.67 (br.s, 1H), 12.52 (br.s, 1H).

TABLE 2

| Intermediate | Route | Name | Data |
| --- | --- | --- | --- |
| 1 | 1 | methyl 4-((S)-1-((R)-morpholine-3-carboxamido)ethyl)benzoate hydrochloride | (LC/MS Method A): m/z 293 [M + H − HCl]$^+$ (ES$^+$), at 2.17 min, UV active. |
| 2 | 2 | 3-methyl-4-(4,4,5,5-tetramethyl-1,3,2-dioxaborolan-2-yl)benzamide | (LC/MS Method I): m/z 262 [M + H]$^+$ (ES$^+$), at 4.84 min, UV active. |
| 3 | 3 | methyl 4-((S)-1-((R)-morpholine-3-carboxamido)ethyl)benzoate | (LC/MS Method A): m/z 293 [M + H]$^+$ (ES$^+$), at 1.33 min, UV active |
| 4 | 4 | 3-methyl-4-(4,4,5,5-tetramethyl-1,3,2-dioxaborolan-2-yl)benzenesulfonamide | (LC/MS Method I): m/z 298 [M + H]$^+$ (ES$^+$), at 3.64 min, UV active |
| 5 | 5 | methyl 5-[[[(3R)-morpholine-3-carbonyl]amino]methyl]pyridine-2-carboxylate hydrochloride | (LC/MS Method B): m/z 280 [M + H − HCl]$^+$ (ES$^+$), at 0.37 min, UV active |
| 6 | 6 | 3'-(bromomethyl)-5'-hydroxy-2-methyl-[1,1'-biphenyl]-4-carboxamide | (LC/MS Method F): m/z 321 [M + H]$^+$ (ES$^+$), at 1.23 min, UV active |
| 7 | 7 | 3-benzyloxy-5-bromo-benzaldehyde | (LC/MS Method B): m/z 292 [M + H]$^+$ (ES$^+$), at 2.43 min, UV active |
| 8 | 8 | methyl 2-hydroxy-4-((S)-1-((R)-morpholine-3-carboxamido)ethyl)benzoate | (LC/MS Method E): m/z 309 [M + H]$^+$ (ES$^+$), at 1.34 min, UV active |
| 9 | 6 | 3'-formyl-5'-hydroxy-2-methyl-[1,1'-biphenyl]-4-carboxamide | (LC/MS Method F): m/z 256 [M + H]$^+$ (ES$^+$), at 1.09 min, UV active |
| 10 | Example 5; Intermediates 3 and 25 | 4-((S)-1-((R)-4-((4'-hydroxy-2'-methyl-[1,1'-biphenyl]-3-yl)methyl)morpholine-3-carboxamido)ethyl)benzoic acid | (LC/MS Method E): m/z 475 [M + H]$^+$ (ES$^+$), at 1.45 min, UV active |
| 11 | 9 | 3'-(bromomethyl)-2-methyl-[1,1'-biphenyl]-4-carboxamide | (LC/MS Method I): m/z 305 [M + H]$^+$ (ES$^+$), at 3.60 min, UV active. |
| 12 | 10 | methyl 4-(1-aminoethyl)-2,6-difluorobenzoate hydrochloride, single enantiomer of unknown stereochemistry 1 | (LC/MS Method I): m/z 216 [M + H − HCl]$^+$ (ES$^+$), at 1.66 min, UV active. |

TABLE 2-continued

| Intermediate | Route | Name | Data |
|---|---|---|---|
| 13 | 11 | 4-bromo-3-((tert-butyldimethylsilyl)oxy)benzenesulfonamide | $^1$H NMR (400 MHZ, DMSO) δ 0.27 (s, 6H), 1.02 (s, 9H), 7.30-7.35 (m, 2H), 7.50 (br.s, 2H), 7.78-7.83 (m, 1H). |
| 14 | 12 | 3-(4-carbamoyl-2-methylphenyl)-5-(chloromethyl)pyridine 1-oxide | (LC/MS Method I): m/z 277 [M + H]$^+$ (ES$^+$), at 2.30 min, UV active |
| 15 | | 2-Bromo-6-(bromomethyl)pyridine | Commercially available CAS: 83004-10-8 |
| 16 | | 2-Bromoisonicotinaldehyde | Commercially available CAS: 118289-17-1 |
| 17 | | 4-Bromo-2-pyridinecarboxaldehyde | Commercially available CAS: 131747-63-2 |
| 18 | 13 | ethyl 6-[[[(3R)-morpholine-3-carbonyl]amino]methyl]pyridine-3-carboxylate hydrochloride | (LC/MS Method B): m/z 294 [M + H − HCl]$^+$ (ES$^+$), at 1.38 min, UV active. |
| 19 | | 3-Bromobenzaldehyde | Commercially available CAS: 3132-99-8 |
| 20 | 14 | methyl 2,6-difluoro-4-[[[(3R)-morpholine-3-carbonyl]amino]methyl]benzoate hydrochloride | (LC/MS Method B): m/z 294 [M + H − HCl]$^+$ (ES$^+$), at 1.38 min, UV active. |
| 21 | | 5-Bromonicotinaldehyde | Commercially available CAS: 113118-81-3 |
| 22 | Route 13; Intermediates 23 | methyl 2-fluoro-4-[[[(3R)-morpholine-3-carbonyl]amino methyl]benzoate hydrochloride | (LC/MS Method B): m/z 297 [M + H − HCl]$^+$ (ES$^+$), at 1.43 min, UV active. |
| 23 | | methyl 4-(aminomethyl)-2-fluoro-benzoate | Commercially available CAS: 847730-68-1 |
| 24 | 15 | (4-carbamoyl-2-hydroxyphenyl)boronic acid | (LC/MS Method E): m/z 181 [M + H]$^+$ (ES$^+$), at 0.75 min, UV active |
| 25 | | 3-methyl-4-(4,4,5,5-tetramethyl-1,3,2-dioxaborolan-2-yl)phenol | Commercially available CAS: 269409-70-3 |
| 26 | Route 6, step (i) only, Intermediates 4 and 21 | 4-(5-formylpyridin-3-yl)-3-methylbenzenesulfonamide | (LC/MS Method E): m/z 277 [M + H]$^+$ (ES$^+$), at 1.29 min, UV active |
| 27 | Route 6, step (i) only, Intermediates 4 | 3'-formyl-5'-hydroxy-2-methyl-[1,1'-biphenyl]-4-sulfonamide | (LC/MS Method E): m/z 290 [M + H]$^+$ (ES$^+$), at 1.52 min, UV active |
| 28 | | 3-Bromobenzyl bromide | Commercially available CAS: 823-78-9 |
| 29 | | 4-Sulfamoylbenzeneboronic acid | Commercially available CAS: 613660-87-0 |
| 30 | 10 | methyl 4-(1-aminoethyl)-2,6-difluorobenzoate hydrochloride, single enantiomer of unknown stereochemistry 2 | (LC/MS Method I): m/z 315 [M + H − HCl]$^+$ (ES$^+$), at 1.49 min, UV active. |
| 31 | Route 6, step (i) only, Intermediates 2 and 21 | 4-(5-formylpyridin-3-yl)-3-methylbenzamide | (LC/MS Method E): m/z 241 [M + H]$^+$ (ES$^+$), at 1.63 min, UV active |
| 32 | 16 | methyl (R)-4-(1-(morpholine-3-carboxamido)cyclopropyl)benzoate hydrochloride | (LC/MS Method E): m/z 305 [M + H − HCl]$^+$ (ES$^+$), at 1.07 min, UV active |
| 33 | 16 | methyl (R)-4-(1-(4-(3-bromo-4-hydroxybenzyl)morpholine-3-carboxamido)cyclopropyl)benzoate | (LC/MS Method E): m/z 490 [M + H]$^+$ (ES$^+$), at 1.46 min, UV active |
| 34 | | 4-(4,4,5,5-tetramethyl-1,3,2-dioxaborolan-2-yl)benzamide | Commercially available CAS: 179117-44-3 |
| 35 | 17 | (R)-N-((S)-1-(4-cyanophenyl)ethyl)morpholine-3-carboxamide hydrochloride | (LC/MS Method A): m/z 260 [M + H − HCl]$^+$ (ES$^+$), at 0.81 min, UV active |

Biological Activity

Cloning, Baculovirus generation, large scale infection of HEK293 cells and membrane preparation: Human prostaglandin E2 receptor 4 ($EP_4$) was cloned into pBacMam expression vector (GeneScript, UK). Transposition of $EP_4$ DNA was performed using Invitrogen's Bac-to-Bac Baculovirus Expression Systems. P0 baculovirus was generated by transfecting SF9 Cells with bacmid DNA using Cellfectin II transfection reagent (ThermoFisher Scientific, UK). Following P0 generation P1 virus was then generated ready for large scale infection and membrane preparation. HEK293 cells were grown in DMEM (ThermoFisher Scientific, UK), supplemented with 10% heat inactivated fetal bovine serum (FBS). Cells were infected at a seeding density of 3.5 million cells/mL in 500 cm$^3$ flasks at 5% v/v $EP_4$ Bacman. Expression was carried out over a 36 hr period at 37° C. with 5% $CO_2$. The cells were removed using PBS and a cell scrapper. The cell culture was centrifuged at 2500 RPM for 10 mins at 4° C. The supernatant was then poured off and the pellet stored at −80° C. The pellet was defrosted and re-suspended in 15 mL of homogenising buffer (20 mM HEPES, 10 mM EDTA, pH 7.4). Then homogenised in mechanical homogeniser (VMR) for 10 seconds. The membrane was centrifuged in centrifuge tubes at 40,000 g for 15 mins at 4° C. The supernatant was poured away and re-suspended in 15 mL of homogenising buffer. Homogenised for 20 seconds. The membrane was centrifuged at 40,000 g for 45 mins at 4° C. The membrane was re-suspended in 3 mL of storage buffer (20 mM HEPES, 0.1 mM EDTA, pH 7.4) mixing well. The resulting membranes were then stored at −80° C.

cAMP Gs Functional Assay: cAMP production following $EP_4$ receptor activation was determined using the Homogeneous Time-Resolved Fluorescence (HTRF) cAMP dynamic-2 assay (Cisbio, France). HEK293 cells were transfected using a 0.5% EP4 Bacmam virus for 36 hours, before dissociating the cells, and freezing at −150° C.

On the day of testing, increasing concentration of test compounds, alongside positive controls (10 uM $PGE_2$ (Tocris, Abingdon, UK)) and negative control (DMSO (Sigma-Aldrich, UK) were added to a ProxiPlate-384 Plus, White 384-shallow well Mircoplate, (PerkinElmer, USA) using the ECHO dispense.

Cells were defrosted in a water bath and resuspended in DMEM supplemented with 10% FBS before centrifuging at 1200 RPM for 5 mins to form a pellet. The pellet was resuspended in assay buffer (DMEM+0.5 mM IBMX (Tocris, Abingdon, UK)) to 0.5×10$^6$ cells/mL. Cell suspension, for a final assay concentration of 5000 cell/well was added using the multidrop to the pre-dispensed assay plate. The plate was then incubated at 37° C. for 30 mins, with 5% $CO_2$. The cAMP production was determined as manufacturer's instructions, before plates were read on a PheraStar fluorescence plate reader (BMG LabTech, Germany).

The p$EC_{50}$ values (−Log of the molarity (M) in mol/liter) were calculated from the mid-point of the curve using dotmatics as shown in Table 3.

TABLE 3

$EP_4$ p$EC_{50}$ and Emax values

| Example | cAMP human $EP_4$ p$EC_{50}$ | cAMP human $EP_4$ Emax |
|---|---|---|
| 1 | 8.0 | 96 |
| 2 | 6.0 | 89 |
| 3 | 7.2 | 96 |
| 4 | 7.2 | 95 |
| 5 | 9.1 | 100 |
| 6 | 6.6 | 95 |
| 7 | 8.8 | 99 |
| 8 | 6.8 | 96 |
| 9 | 7.4 | 97 |
| 10 | 9.7 | 98 |
| 11 | 9.4 | 98 |
| 12 | 7.8 | 99 |
| 13 | 7.9 | 96 |
| 14 | 7.1 | 95 |
| 15 | 9.4 | 98 |
| 16 | 6.9 | 97 |
| 17 | 7.0 | 98 |
| 18 | 9.4 | 99 |
| 19 | 8.0 | 99 |
| 20 | 9.3 | 101 |
| 21 | 7.8 | 99 |
| 22 | 9.6 | 99 |
| 23 | 8.0 | 93 |
| 24 | 7.6 | 96 |
| 25 | 8.2 | 97 |
| 26 | 7.0 | 97 |
| 27 | 6.6 | 95 |
| 28 | 7.0 | 100 |
| 29 | 7.0 | 97 |
| 30 | 6.8 | 93 |
| 31 | 9.9 | 98 |
| 32 | 9.2 | 91 |
| 33 | 11.5 | 93 |
| 34 | 9.4 | 97 |
| 36 | 9.6 | 96 |
| 37 | <7 | NA |
| 38 | 7.7 | 94 |
| 39 | 10.1 | 99 |

Unidirectional Caco-2 Cell Permeability Assay

Caco-2 cells (ECACC) were seeded onto 24-well Transwell plates at 2×10$^5$ cells per well and used in confluent monolayers after a 21 day culture at 37° C. under 5% $CO_2$. Test compounds were incubated at 10 µM, 0.2% DMSO final, n=2 in assay buffer (Hanks balanced salt solution supplemented with 25 mM HEPES, adjusted to pH 6.5). Hanks balanced salt solution supplemented with 25 mM HEPES, adjusted to pH 7.4 (0.2% DMSO final) was used for the basolateral chamber (as receiver).

Incubations were performed at 37° C., with samples removed from both donor and acceptor chambers at T=0 and 1 hour and compound analysed by mass spectrometry (LC-MS/MS) including an analytical internal standard (0.5 µM carbamazepine).

Apparent permeability ($P_{app}$) values are shown in Table 4 and were determined from the relationship:

$$P_{app} = \frac{\text{Compound}_{Acceptor\ T=end} / (\text{Compound}_{Donor} \times V_{Donor})}{\text{Incubation Time}} \times \frac{V_{Donor}}{\text{Area} \times 60 \times 10^{-6}}\ \text{cm/s}$$

Where V is the volume of each Transwell compartment (apical 125 µL, basolateral 600 µL), and concentrations are the relative MS responses for compound (normalized to internal standard) in the donor chamber before incubation and acceptor chamber at the end of the incubation Area=area of cells exposed for drug transfer (0.33 cm$^2$).

Lucifer Yellow (LY) was added to the apical buffer in all wells to assess viability of the cell layer. As LY cannot freely permeate lipophilic barriers, a high degree of LY transport indicates poor integrity of the cell layer and wells with a LY $P_{app}>10\times10^{-6}$ cm/s were rejected.

Compound recovery from the wells was determined from MS responses (normalized to internal standard) in donor and acceptor chambers at the end of incubation compared to response in the donor chamber pre-incubation.

TABLE 4

Mean apparent permeability ($P_{app}$) values

| Example | Caco-2 Mean $P_{app}$ A-B ($10^{-6}$ cm/s) |
|---|---|
| 1 | 0.24 |
| 3 | 0.57 |
| 4 | 0.5 |
| 5 | 0.59 |
| 6 | 0.22 |
| 7 | 0.66 |
| 8 | <0.1 |
| 9 | 0.24 |
| 10 | <0.1 |
| 11 | <0.1 |
| 12 | 0.12 |
| 13 | 0.32 |
| 14 | 0.15 |
| 15 | <0.1 |
| 16 | <0.1 |
| 17 | 0.12 |
| 18 | 0.78 |
| 19 | <0.1 |
| 21 | <0.1 |
| 22 | <0.2 |
| 23 | 0.48 |
| 24 | 0.26 |
| 25 | <0.1 |
| 28 | 0.23 |
| 31 | 0.66 |
| 32 | 0.15 |
| 33 | 0.14 |
| 34 | 0.39 |
| 36 | 0.11 |
| 37 | <0.1 |
| 38 | <0.1 |
| 39 | 0.35 |

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Numbered Embodiments

1. A compound of the Formula I:

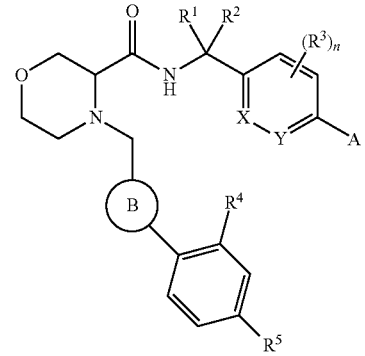

or a pharmaceutically acceptable salt or tautomer thereof, wherein;

A is OR', C(O)R', $CO_2R'$, C(O)N(R')$_2$, C(O)N(R')S(O)$_2$R', S(O)$_2$R', S(O)$_2$OR', SO$_2$N(R')$_2$, $C_{1-8}$ alkyl, cycloalkyl, heterocycloalkyl, aryl, or heteroaryl;

Ring B is aryl or heteroaryl;

X and Y are each independently CR" or N, wherein at least one of X and Y is CH;

$R^1$ and $R^2$ are each independently H, $C_{1-6}$ alkyl, $C_{1-6}$ alkoxy, or $R^1$ and $R^2$, together with the carbon atom to which they are attached, form a $C_{3-6}$ cycloalkane-1,1-diyl ring;

each $R^3$ is independently selected from H, OR', COOR', C(O)R', halo, or $C_{1-6}$ alkyl;

$R^4$ is H, $C_{1-6}$ alkyl, halo, CN, $NO_2$, OR', $CO_2R'$, or C(O)R';

$R^5$ is OR', OC(O)R', OC(O)OR', $CO_2R'$, CON(R')$_2$, SO$_2$N(R')$_2$, SO$_2$R', OSO$_2$R', or OSO$_2$N(R')$_2$;

each R' is independently H, $C_{1-6}$ alkyl, or $C_{3-6}$ cycloalkyl;

each R" is H, $C_{1-6}$ alkyl, halo, or OR'; and n is 0, 1, 2, or 3;

wherein at each occurrence, alkyl and cycloalkyl are each optionally and independently substituted with up to 3 instances of OH, SH, CN, $NO_2$, $CO_2H$, halo, or COOC$_{1-4}$ alkyl;

wherein heterocycloalkyl, aryl, and heteroaryl are each optionally and independently substituted with up to 3 instances of OR', SR', CN, $NO_2$, $CO_2R'$, halo, $C_{1-4}$ alkyl, or oxo.

2. The compound according to embodiment 1, wherein Ring B is a 5-6 membered aryl or a 5-6 membered heteroaryl, each optionally and independently substituted with up to 3 instances of OR', SR', CN, $NO_2$, $CO_2R'$, halo, $C_{1-4}$ alkyl, or oxo.

3. The compound according to embodiment 1, wherein Ring B is phenyl, which is optionally substituted with up to three instances of OH, or a 6 membered heteroaryl comprising one or two nitrogen atoms, wherein each nitrogen atom is optionally oxidized.

4. The compound of Formula I which is a compound of Formula (1):

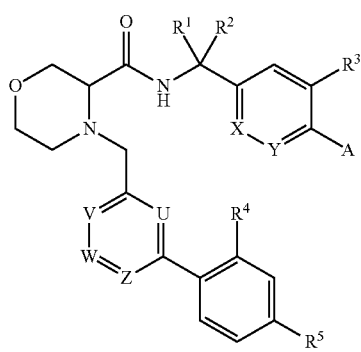

(1)

or pharmaceutically acceptable salt or tautomer thereof, wherein;

A is selected from the group consisting of:

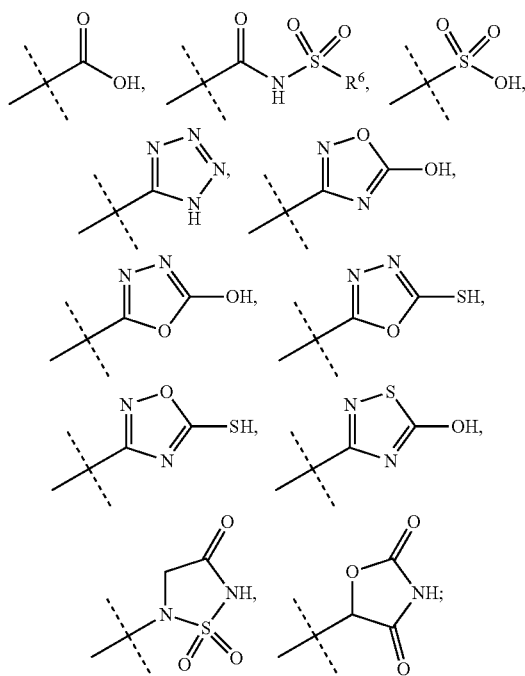

U, V, W, and Z are each independently selected from the group consisting of CH, COH,
N or $N^+$—$O^-$, wherein at least three of U, V, W and Z are CH; and
X and Y are each independently selected from the group consisting of CH, CF, COH or N;
$R^1$ and $R^2$ are independently H, $C_{1-3}$ alkyl optionally substituted with 1-3 fluorine atoms or is joined to $R^2$ to form a $C_{3-6}$ cycloalkyl ring which is optionally substituted with 1-3 fluorine atoms;
$R^3$ is H, OH or F;
$R^4$ is H, OH, CN, halo, $C_{1-3}$ alkoxy optionally substituted with 1-3 fluorine atoms or $C_{1-3}$ alkyl optionally substituted with 1-3 fluorine atoms;
$R^5$ is OH, $CO_2H$, $CONH_2$, $SO_2NH_2$ or $OSO_2NH_2$; and
$R^6$ is $C_{1-3}$ alkyl or a $C_{3-6}$ cycloalkyl ring.

5. The compound according to embodiment 4, wherein A is:

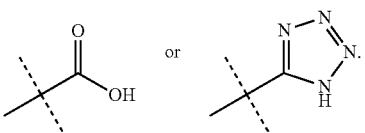

6. The compound of embodiment 4, which is a compound of Formula (2a) or (2b):

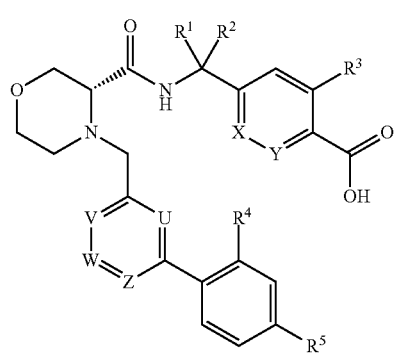

(2a)

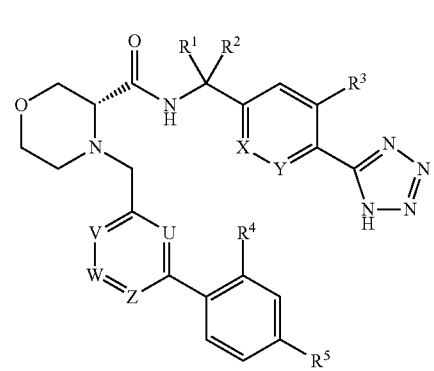

(2b)

or a pharmaceutically acceptable salt thereof, wherein U, V, W, X, Y, Z, $R^1$, $R^2$, $R^3$, $R^4$, and $R^5$ are the same as defined in embodiment 4.

7. The compound according to any one of embodiments 1-6, wherein $R^1$ is H or methyl or is joined to $R^2$ to form a cyclopropane-1,1-diyl ring.

8. The compound according to embodiment 7, wherein $R^1$ is methyl.

9. The compound according to any one of embodiments 1-6, wherein $R^2$ is H.

10. The compound according to embodiment 4, which is a compound of Formula (3a) or (3b):

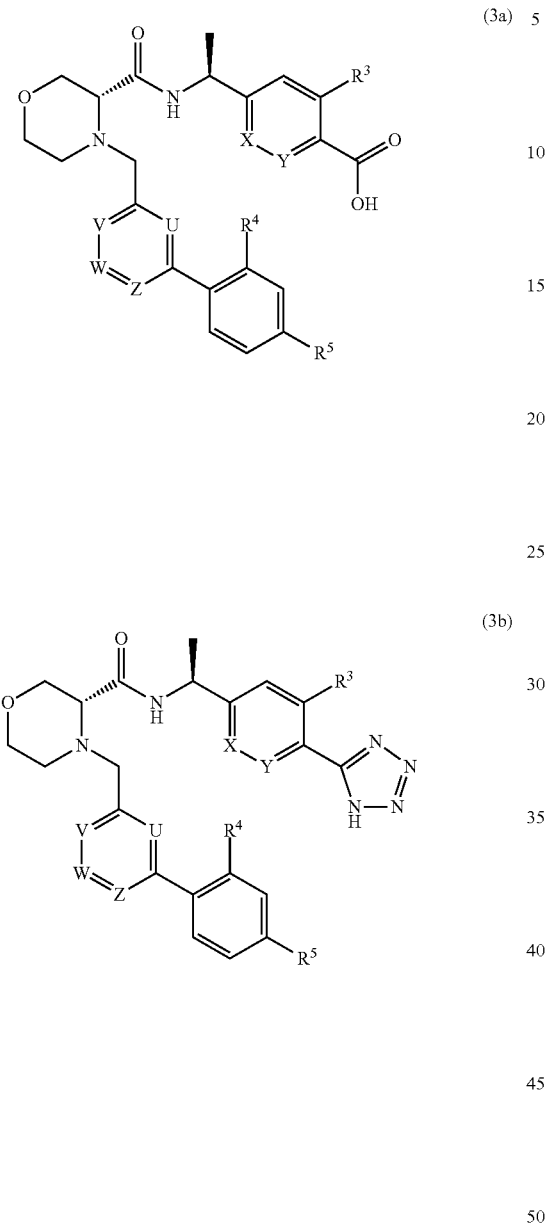

or a pharmaceutically acceptable salt thereof, wherein U, V, W, X, Y, Z, $R^1$, $R^2$, $R^3$, $R^4$, and $R^5$ are the same as defined in embodiment 4.

11. The compound according to any one of embodiments 1-10, wherein $R^3$ is H.

12. The compound according to any one of embodiments 1-11, wherein $R^4$ is H, OH or methyl.

13. The compound according to embodiment 12, wherein $R^4$ is methyl.

14. The compound according to any one of embodiments 1-13, wherein $R^5$ is $CONH_2$ or $SO_2NH_2$.

15. The compound according to any one of embodiments 4-14, wherein X and Y are both CH.

16. The compound according to any one of embodiments 4-15, wherein U, V, W and Z are CH.

17. The compound according to any one of embodiments 4-15, wherein U, V and Z are CH and W is COH.

18. The compound according to embodiment 1, which is selected from:

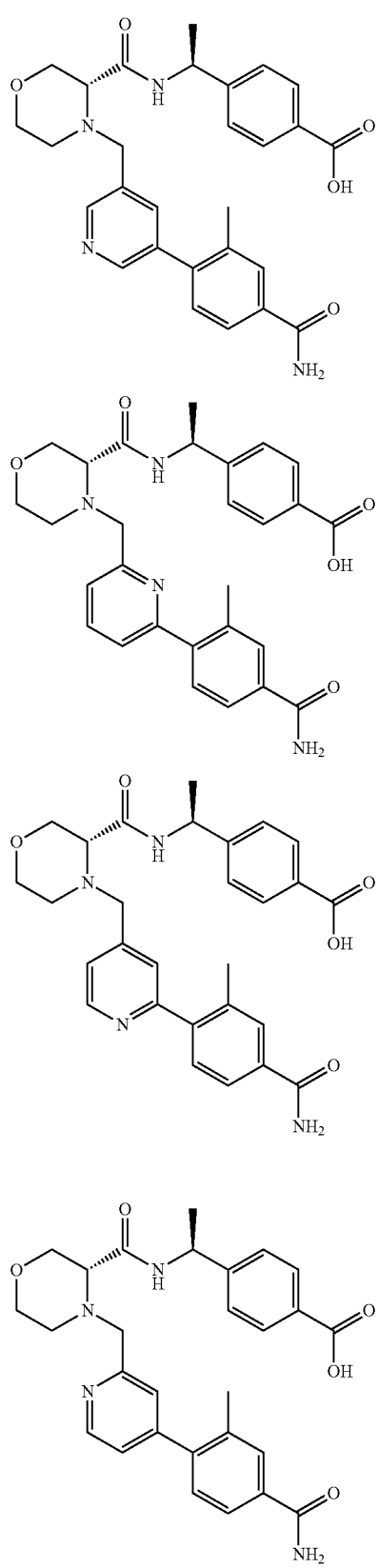

151
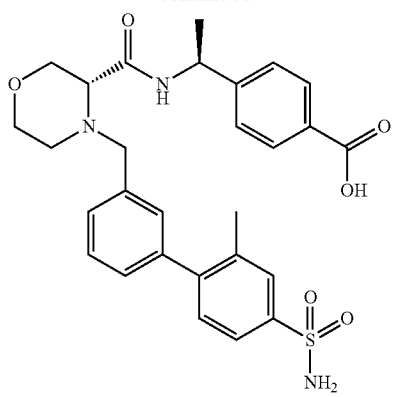
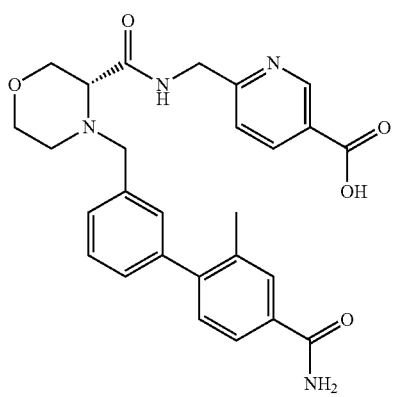
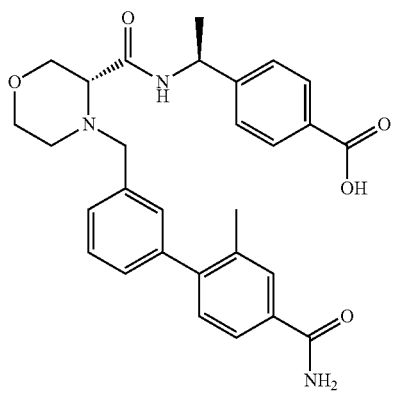
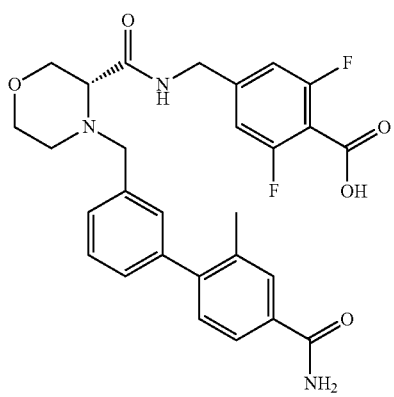
152
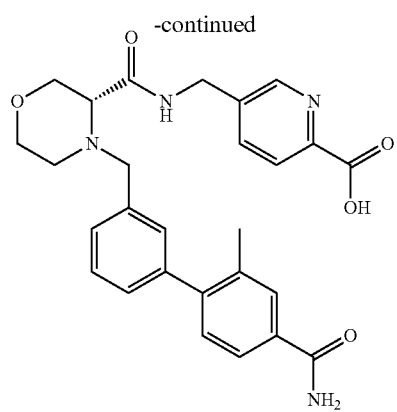
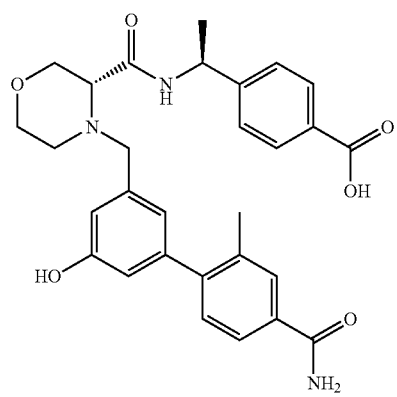
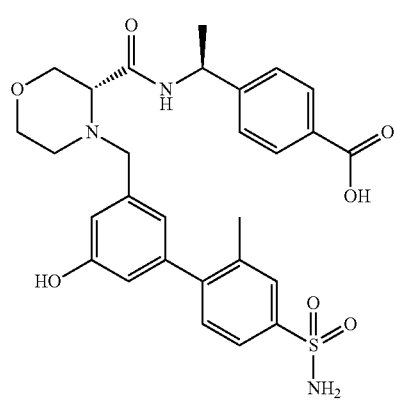
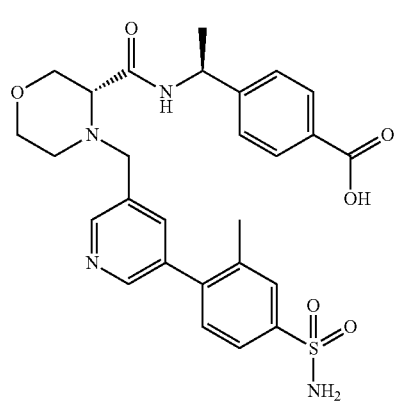

153
-continued
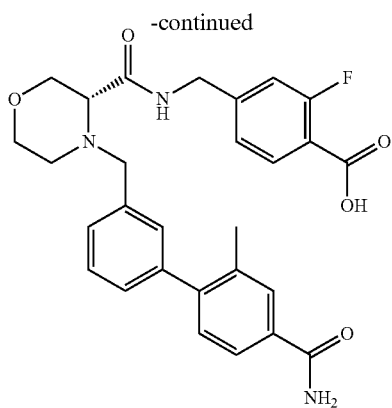
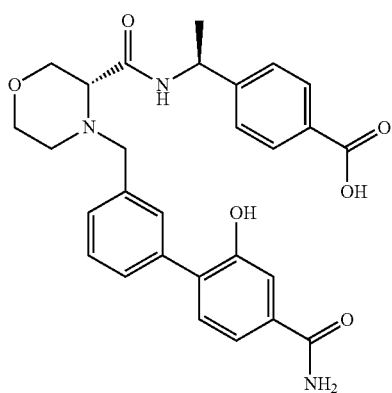
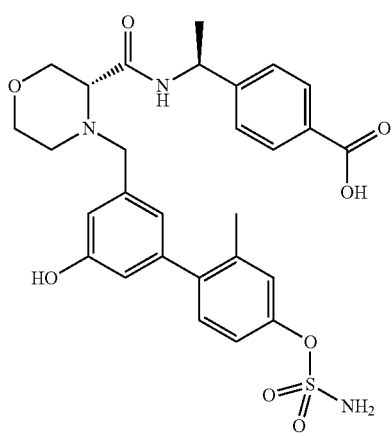
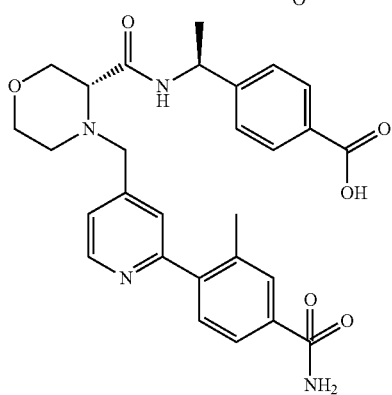
154
-continued
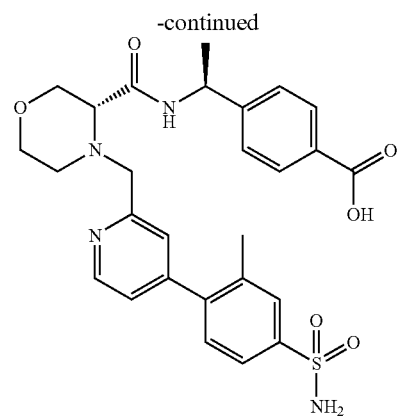
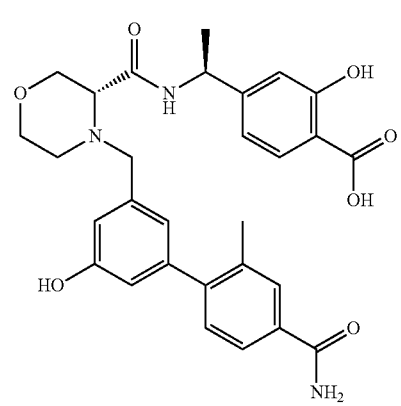
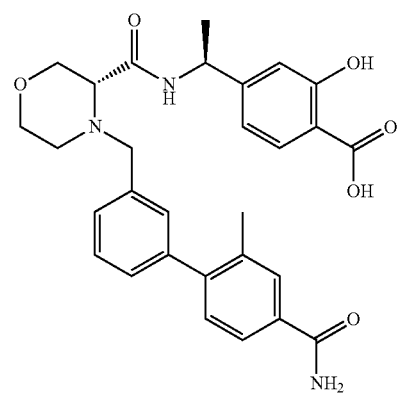
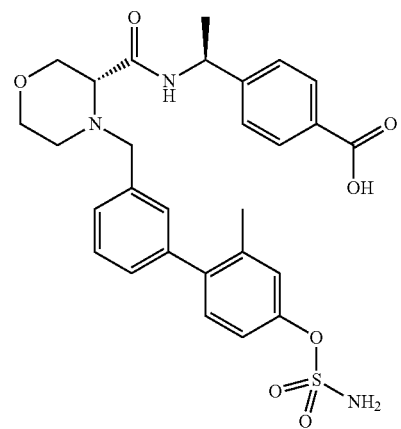

155
-continued
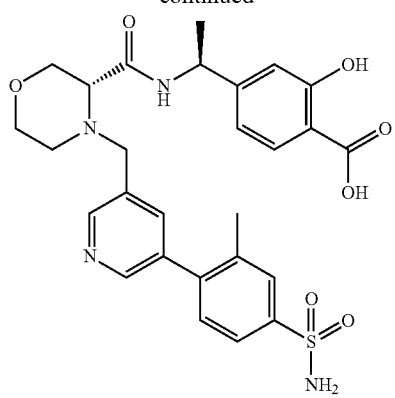
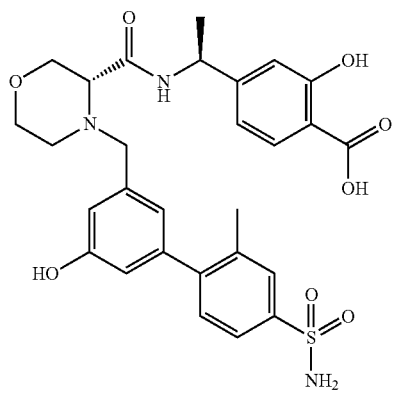
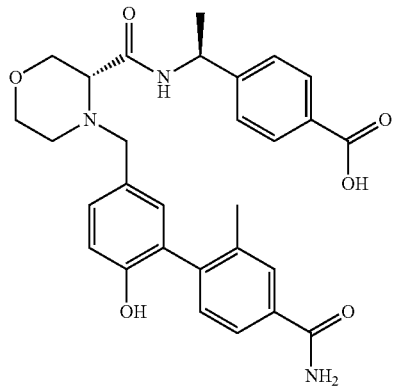
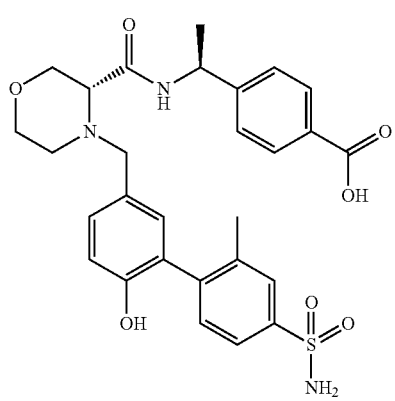
156
-continued
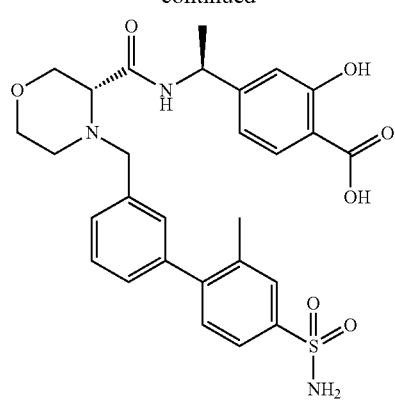
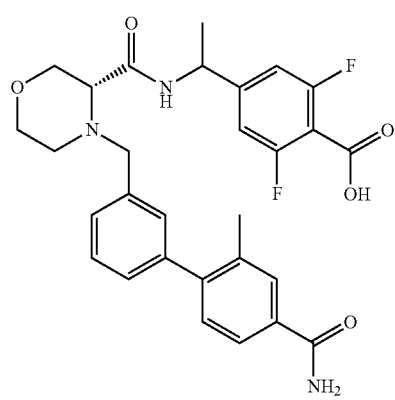
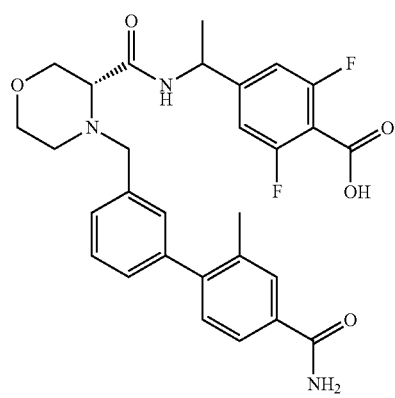
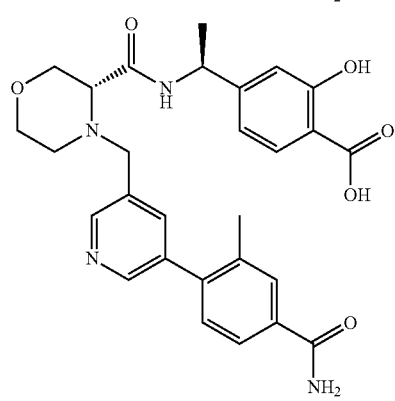

157
-continued
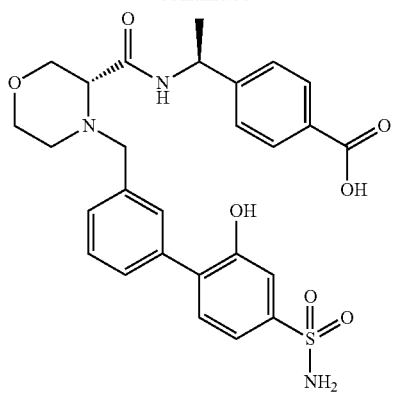
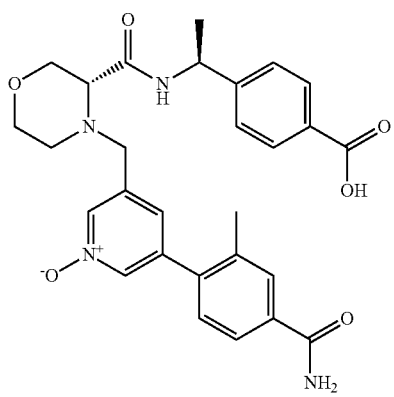
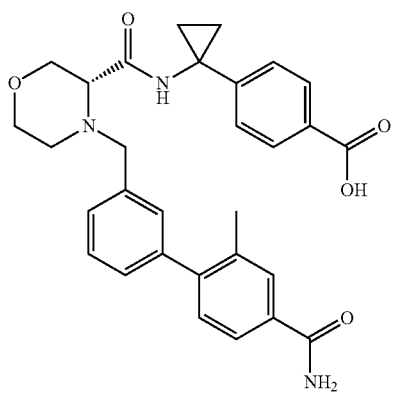
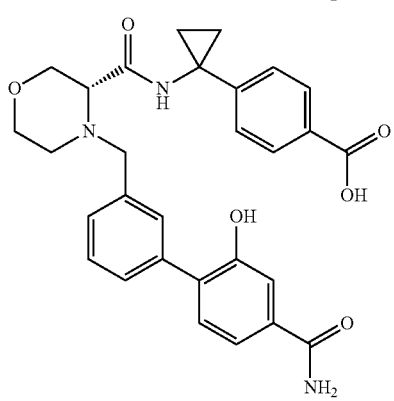 [SMILES: NC(=O)c1ccc(-c2cccc(CN3CCOC[C@@H]3C(=O)NC3(c4ccc(C(=O)O)cc4)CC3)c2)c(O)c1]
158
-continued
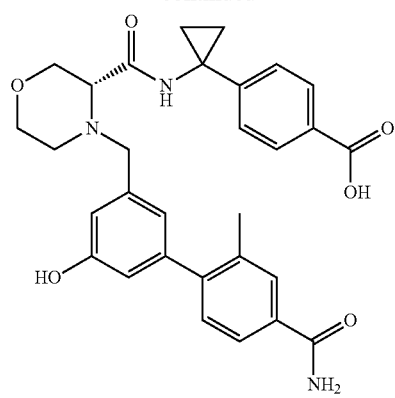 [SMILES: Cc1cc(C(N)=O)ccc1-c1cc(O)cc(CN2CCOC[C@@H]2C(=O)NC2(c3ccc(C(=O)O)cc3)CC2)c1]
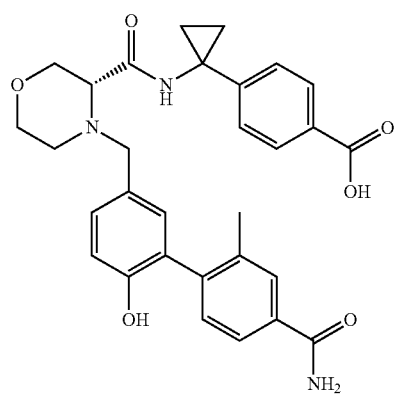 [SMILES: NC(=O)c1ccc(-c2cc(CN3CCOC[C@@H]3C(=O)NC3(c4ccc(C(=O)O)cc4)CC3)ccc2O)cc1]
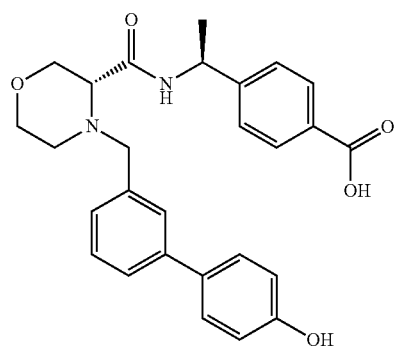 [SMILES: C[C@H](NC(=O)[C@H]1COCCN1Cc1cccc(-c2ccc(O)cc2)c1)c1ccc(C(=O)O)cc1]
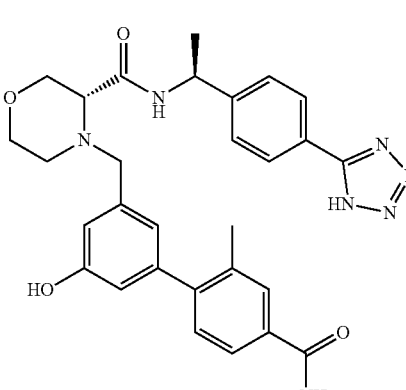

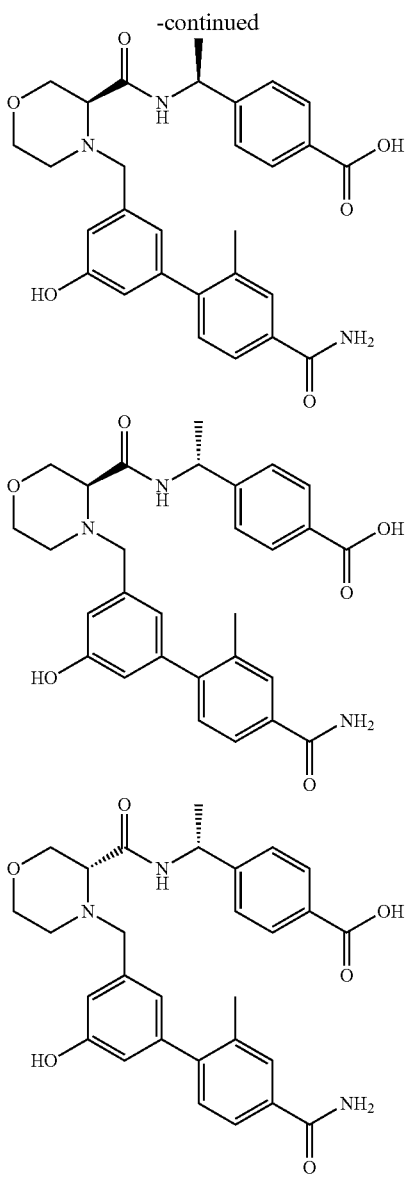

or a pharmaceutically acceptable salt thereof.

19. A pharmaceutical composition comprising a compound according to any one of embodiments 1-18 and a pharmaceutically acceptable excipient.

20. The compound according to any one of embodiments 1 to 18 or composition according to embodiment 19, for use in the treatment of an EP4 receptor mediated disease.

21. The compound or composition for use according to embodiment 20, wherein the EP4 receptor mediated disease is a gastrointestinal disorder.

22. The compound or composition for use according to embodiment 21, wherein the gastrointestinal disorder is selected from the group consisting of constipation disorders, constipation-predominant irritable bowel syndrome, mixed type irritable bowel syndrome, chronic idiopathic constipation, gastrointestinal symptoms associated with Parkinson's disease, gastrointestinal symptoms associated with cystic fibrosis, intestinal dysmotility, postoperative ileus, food allergy or food intolerance, celiac disease, gastrointestinal motility disorders, functional gastrointestinal disorders, drug induced enteropathy, NSAID induced gastric and intestinal injury, chemotherapy induced mucositis, gastroesophageal reflux disease (GERD), duodenogastric reflux, diarrhoeal diseases, immune mediated gastrointestinal diseases, Crohn's disease, ulcerative colitis, inflammatory bowel disease, and ischemic colitis.

23. The compound or composition for use according to embodiment 20, wherein the EP4 receptor mediated disease is pulmonary diseases and conditions.

24. The compound or composition for use according to embodiment 23, wherein the pulmonary disease or condition is selected from chronic obstructive pulmonary diseases, asthma, chronic bronchitis, cystic fibrosis, emphysema, chronic idiopathic cough, hyperactive airway disorder, and idiopathic pulmonary fibrosis.

What is claimed is:
1. A compound of the Formula I:

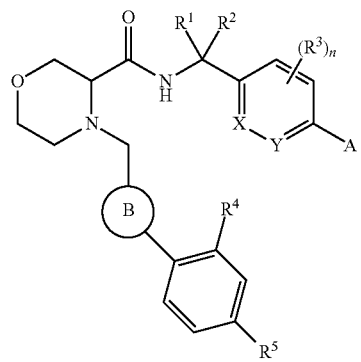

or a pharmaceutically acceptable salt, solvate, hydrate, tautomer or optical isomer thereof, wherein;
A is OR', C(O)R', $CO_2R'$, C(O)N(R')$_2$, C(O)N(R')S(O)$_2$R', S(O)$_2$R', S(O)$_2$OR', SO$_2$N(R')$_2$, $C_{1-8}$ alkyl, cycloalkyl, heterocycloalkyl, aryl, or heteroaryl;
Ring B is aryl or heteroaryl;
X and Y are each independently CR" or N, wherein at least one of X and Y is CH;
$R^1$ and $R^2$ are each independently H, $C_{1-6}$ alkyl, $C_{1-6}$ alkoxy, or $R^1$ and $R^2$, together with the carbon atom to which they are attached, form a $C_{3-6}$ cycloalkane-1,1-diyl ring;
each $R^3$ is independently selected from H, OR', COOR', C(O)R', halo, or $C_{1-6}$-alkyl;
$R^4$ is H, $C_{1-6}$ alkyl, $C_{1-3}$ alkoxy optionally substituted with 1-3 fluorine atoms, halo, CN, NO$_2$, OR', CO$_2$R', or C(O)R$^1$;
$R^5$ is OR', OC(O)R', OC(O)OR', CO$_2$R', CON(R')$_2$, SO$_2$N(R')$_2$, SO$_2$R', OSO$_2$R', or OSO$_2$N(R')$_2$;
each R' is independently H, $C_{1-6}$ alkyl, or $C_{3-6}$ cycloalkyl;
each R" is H, $C_{1-6}$-alkyl, halo, or OR'; and
n is 0, 1, 2, or 3;
wherein at each occurrence, alkyl and cycloalkyl are each optionally and independently substituted with up to 3 instances of OH, SH, CN, NO$_2$, CO$_2$H, halo, or COOC$_{1-4}$ alkyl;
wherein heterocycloalkyl, aryl, and heteroaryl are each optionally and independently substituted with up to 3 instances of OR', SR', CN, NO$_2$, CO$_2$R', halo, $C_{1-4}$ alkyl, or oxo.

2. The compound according to claim 1, wherein Ring B is a 5-6 membered aryl or a 5-6 membered heteroaryl, each optionally and independently substituted with up to 3 instances of OR', SR', CN, NO$_2$, CO$_2$R', halo, C$_{1-4}$ alkyl, or oxo.

3. The compound according to claim 1, wherein Ring B is phenyl, which is optionally substituted with up to three instances of OH, or a 6 membered heteroaryl comprising one or two nitrogen atoms, wherein each nitrogen atom is optionally oxidized.

4. The compound according to claim 1, wherein n is 0, 1 or 2.

5. The compound according to claim 1, which is a compound of Formula (1):

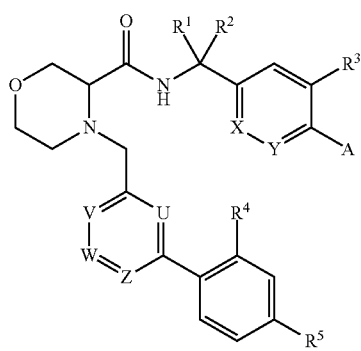

(1)

or pharmaceutically acceptable salt, solvate, hydrate, tautomer or optical isomer thereof, wherein;
U, V, W, and Z are each independently selected from the group consisting of CH, COH, N or N$^+$—O$^-$, wherein at least three of U, V, W and Z are CH.

6. The compound according to claim 1, wherein A is selected from the group consisting of:

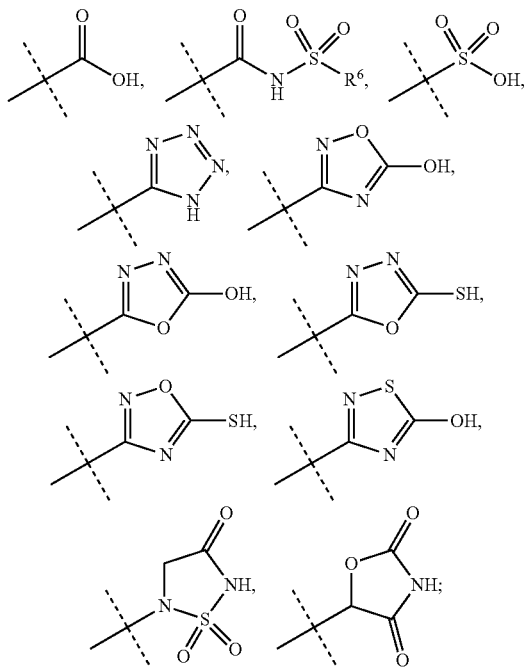

and R$^6$ is C$_{1-3}$ alkyl or a C$_{3-6}$ cycloalkyl ring.

7. The compound according to claim 5, which is a compound of Formula (2a) or (2b):

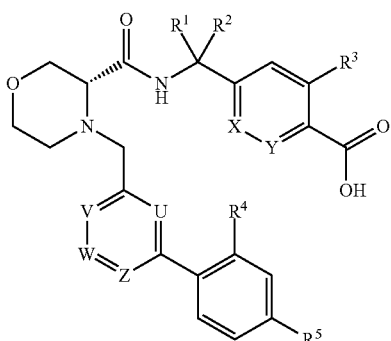

(2a)

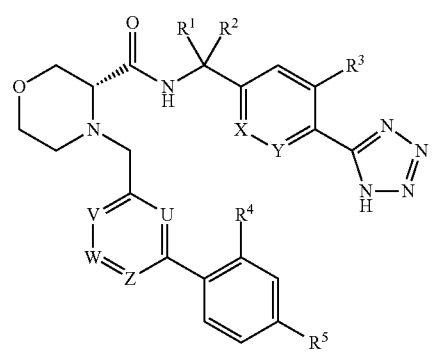

(2b)

or a pharmaceutically acceptable salt, solvate, hydrate, tautomer or optical isomer thereof, wherein U, V, W, X, Y, Z, R$^1$, R$^2$, R$^3$, R$^4$, and R$^5$ are the same as defined in claim 5.

8. The compound according to claim 1, wherein R$^1$ and R$^2$ are each independently selected from the group consisting of H and C$_{1-3}$ alkyl, optionally substituted with 1-3 fluorine atoms.

9. The compound according to claim 1, wherein R$^1$ is H or methyl or R$^1$ is joined to R$^2$ to form a cyclopropane-1,1-diyl ring.

10. The compound according to claim 1, wherein R$^2$ is H.

11. The compound according to claim 5, which is a compound of Formula (3a) or (3b):

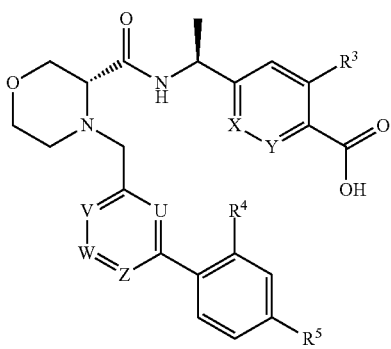

(3a)

(3b)

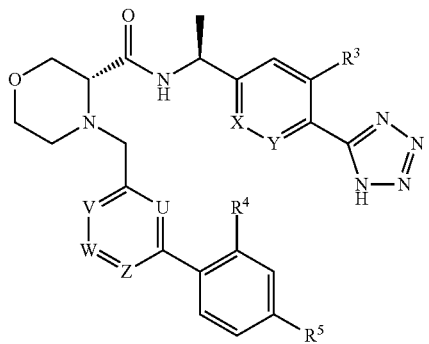

or a pharmaceutically acceptable salt, solvate, hydrate, tautomer or optical isomer thereof, wherein U, V, W, X, Y, Z, $R^3$, $R^4$, and $R^5$ are the same as defined in claim 5.

12. The compound according to claim 1, wherein $R^3$ is selected from the group consisting of H, OH or F.

13. The compound according to claim 1, wherein $R^4$ is selected from the group consisting of H, OH, CN, halo, $C_{1-3}$ alkoxy optionally substituted with 1-3 fluorine atoms or $C_{1-3}$ alkyl optionally substituted with 1-3 fluorine atoms.

14. The compound according to claim 1, wherein $R^5$ is selected from the group consisting of OH, $CO_2H$, $CONH_2$, $SO_2NH_2$ or $OSO_2NH_2$.

15. The compound according to claim 1, wherein X and Y are each independently selected from the group consisting of CH, CF, COH, or N.

16. The compound according to claim 5, wherein
 (i) U is CH or N; or
 (ii) V is CH or N; or
 (iii) W is selected from the group consisting of CH, COH, N or $N^+$—$O^-$; or
 (iv) Z is selected from the group consisting of CH, COH or N; or
 (v) a combination of two or more of (i), (ii), (iii), and (iv).

17. The compound according to claim 5, wherein U, V, W and Z are CH, or wherein U, V and Z are CH and W is COH.

18. A compound selected from the group consisting of:

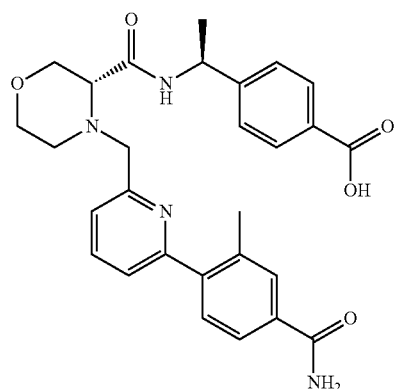

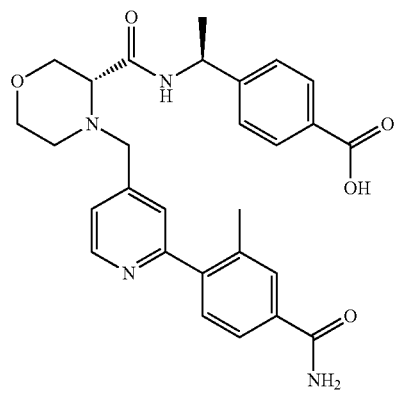

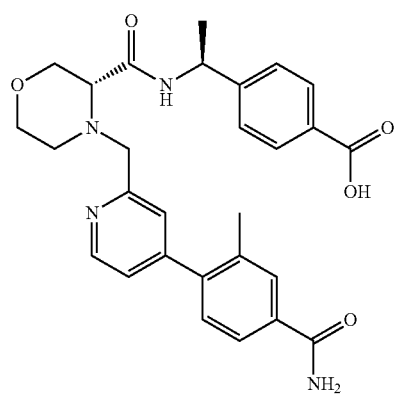

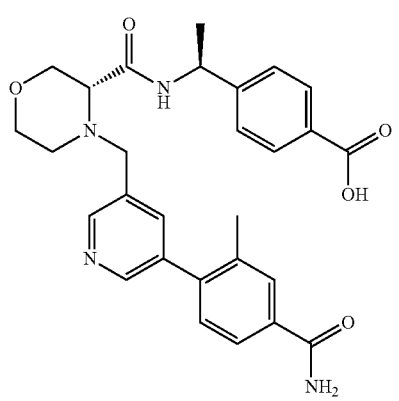

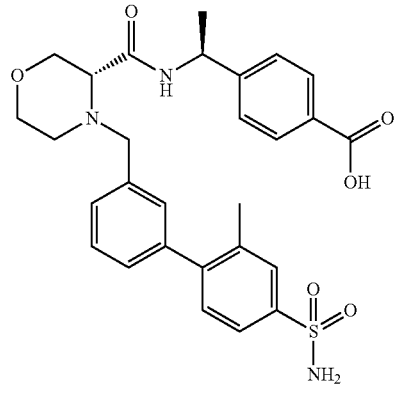

165
-continued
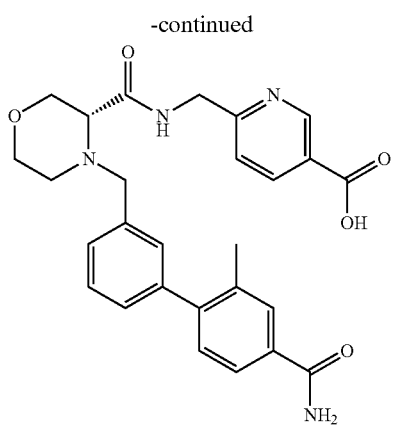
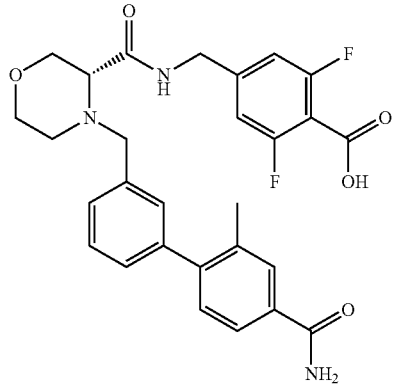
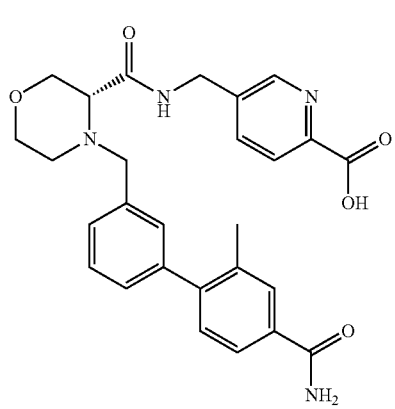
166
-continued
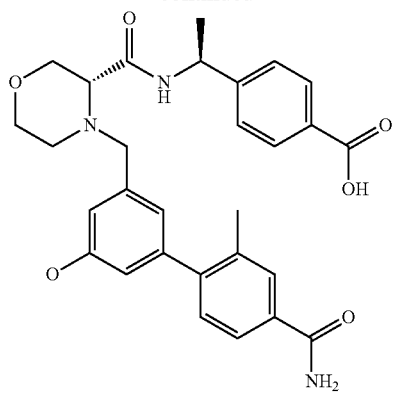
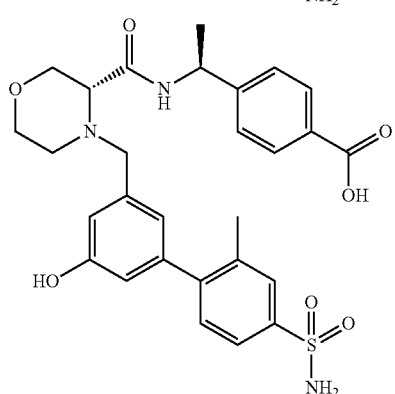
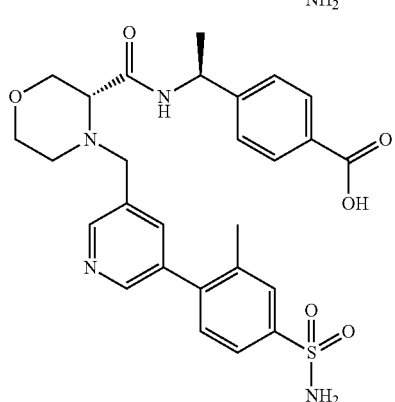
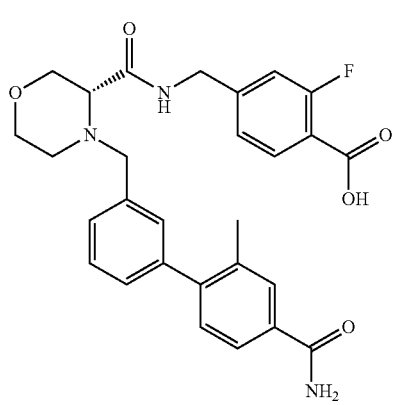

167
-continued
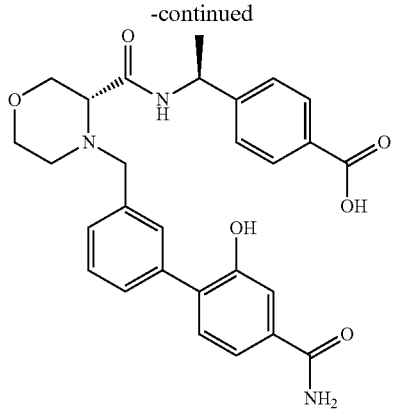
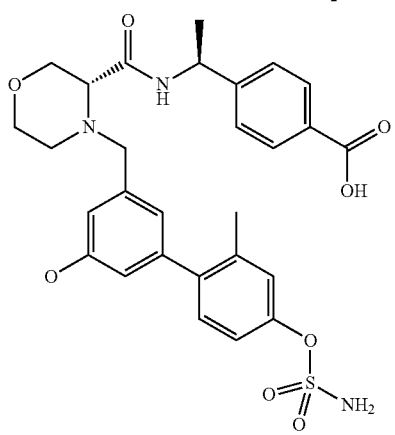
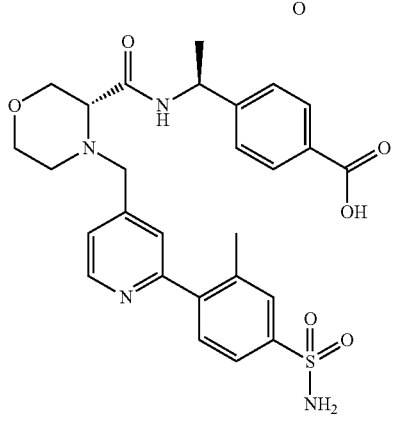
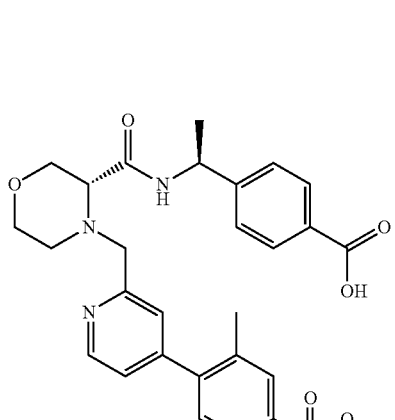
168
-continued
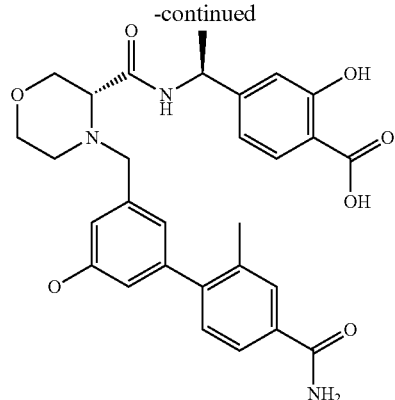
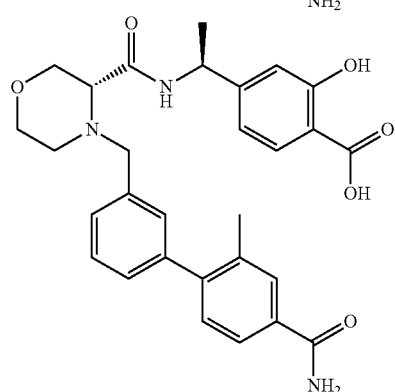
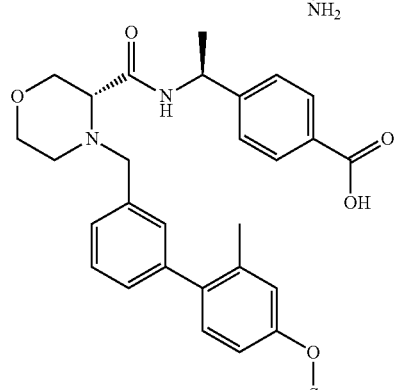
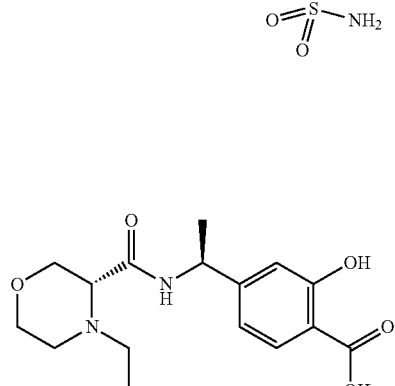

169
-continued

170
-continued

171
-continued
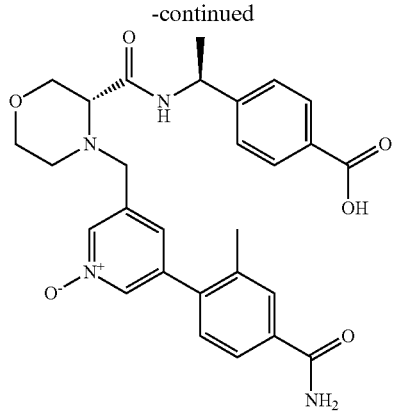
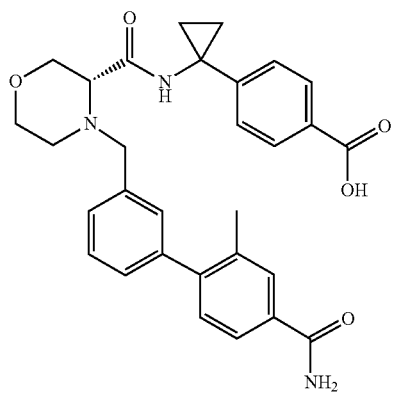
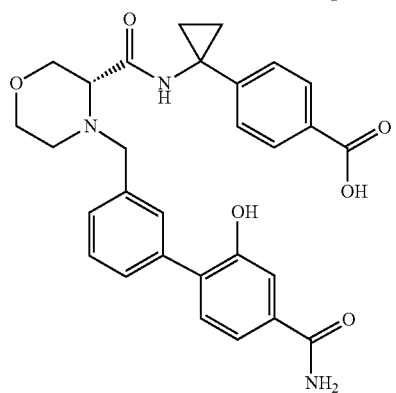
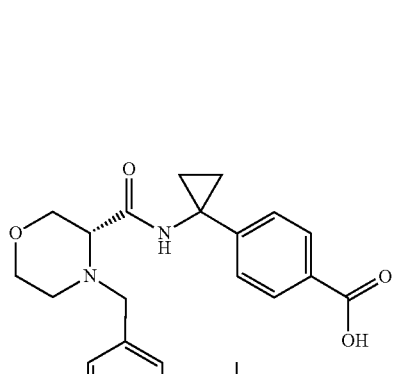
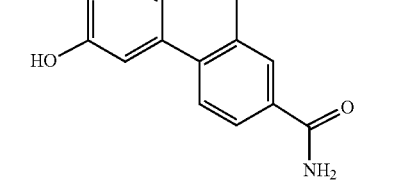
172
-continued
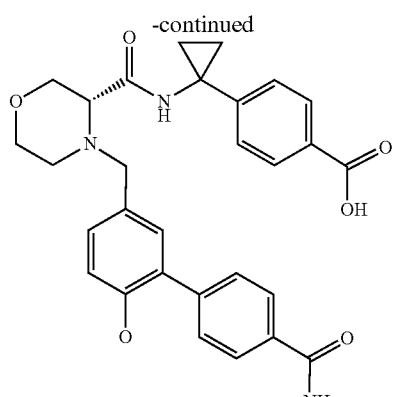
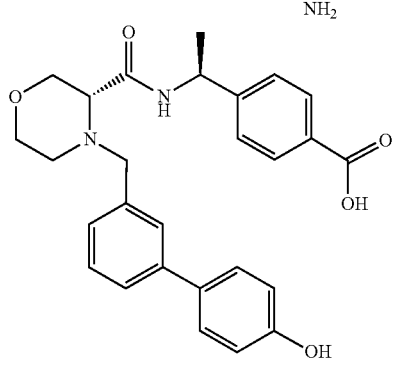
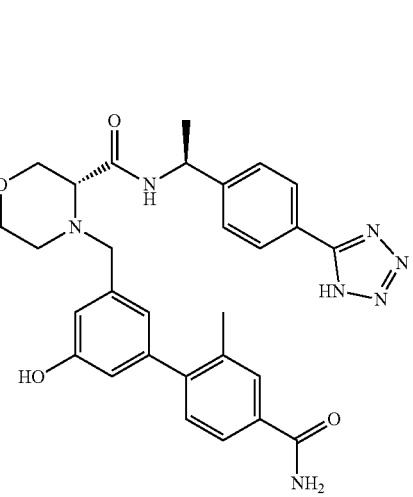

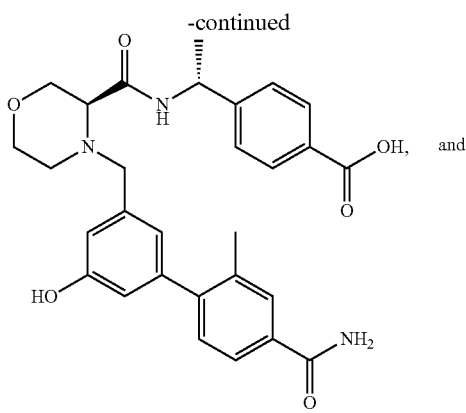

and

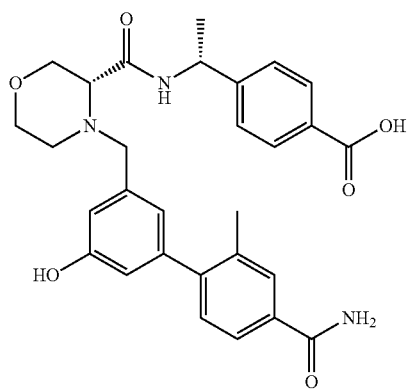 [SMILES: Cc1cc(C(N)=O)ccc1-c1cc(O)cc(CN2CCOC[C@@H]2C(=O)N[C@H](C)c2ccc(C(=O)O)cc2)c1]

or a pharmaceutically acceptable salt, solvate, hydrate, or tautomer thereof.

19. A pharmaceutical composition comprising a compound, pharmaceutically acceptable salt, solvate, hydrate, tautomer or optical isomer according to claim 1 and a pharmaceutically acceptable excipient.

20. The pharmaceutical composition according to claim 19, wherein the composition further comprises at least one additional therapeutic agent selected from the group consisting of aminosalicylates, corticosteroids, immunomodulators and combinations thereof.

21. A kit comprising a compound, pharmaceutically acceptable salt, solvate, hydrate, tautomer or optical isomer according to claim 1 and at least one additional therapeutic agent selected from the group consisting of aminosalicylates, corticosteroids, immunomodulators and combinations thereof.

22. A method for the treatment of an EP4 receptor mediated disease for a patient in need thereof, comprising administering a therapeutically effective amount of a compound of the Formula I:

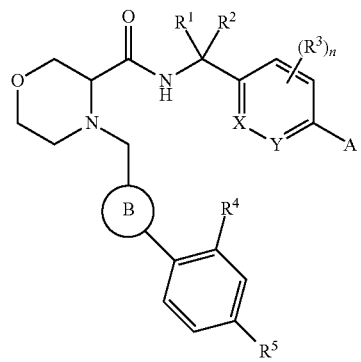

or a pharmaceutically acceptable salt, solvate, hydrate, tautomer or optical isomer thereof, wherein;

A is OR', C(O)R', $CO_2R'$, $C(O)N(R')_2$, $C(O)N(R')S(O)_2R'$, $S(O)_2R'$, $S(O)_2OR'$, $SO_2N(R')_2$, $C_{1-8}$ alkyl, cycloalkyl, heterocycloalkyl, aryl, or heteroaryl;

Ring B is aryl or heteroaryl;

X and Y are each independently CR" or N, wherein at least one of X and Y is CH;

$R^1$ and $R^2$ are each independently H, $C_{1-6}$ alkyl, $C_{1-6}$ alkoxy, or $R^1$ and $R^2$, together with the carbon atom to which they are attached, form a $C_{3-6}$ cycloalkane-1,1-diyl ring;

each $R^3$ is independently selected from H, OR', COOR', C(O)R', halo, or $C_{1-6}$-alkyl;

$R^4$ is H, $C_{1-6}$ alkyl, $C_{1-3}$ alkoxy optionally substituted with 1-3 fluorine atoms, halo, CN, $NO_2$, OR', $CO_2R'$, or $C(O)R^1$;

$R^5$ is OR', OC(O)R', OC(O)OR', $CO_2R'$, $CON(R')_2$, $SO_2N(R')_2$, $SO_2R'$, $OSO_2R'$, or $OSO_2N(R')_2$;

each R' is independently H, $C_{1-6}$ alkyl, or $C_{3-6}$ cycloalkyl;

each R" is H, C16-alkyl, halo, or OR'; and n is 0, 1, 2, or 3;

wherein at each occurrence, alkyl and cycloalkyl are each optionally and independently substituted with up to 3 instances of OH, SH, CN, $NO_2$, $CO_2H$, halo, or $COOC_{1-4}$ alkyl;

wherein heterocycloalkyl, aryl, and heteroaryl are each optionally and independently substituted with up to 3 instances of OR', SR', CN, $NO_2$, $CO_2R'$, halo, $C_{1-4}$ alkyl, or oxo.

23. The method according to claim 22, wherein the EP4 receptor mediated disease is a gastrointestinal disorder.

24. The method according to claim 23, wherein the gastrointestinal disorder is selected from the group consisting of constipation disorders, constipation-predominant irritable bowel syndrome, mixed type irritable bowel syndrome, chronic idiopathic constipation, gastrointestinal symptoms associated with Parkinson's disease, gastrointestinal symptoms associated with cystic fibrosis, intestinal dysmotility, postoperative ileus, food allergy or food intolerance, celiac disease, gastrointestinal motility disorders, functional gastrointestinal disorders, drug induced enteropathy, NSAID induced gastric and intestinal injury, chemotherapy induced mucositis, gastroesophageal reflux disease (GERD), duodenogastric reflux, diarrhoeal diseases, immune mediated gastrointestinal diseases, Crohn's disease, ulcerative colitis, inflammatory bowel disease, and ischemic colitis.

25. The method according to claim 22, wherein the EP4 receptor mediated disease is a pulmonary disease or condition.

26. The method according to claim 25, wherein the pulmonary disease or condition is selected from the group consisting of chronic obstructive pulmonary diseases, asthma, chronic bronchitis, cystic fibrosis, emphysema, chronic idiopathic cough, hyperactive airway disorder, and idiopathic pulmonary fibrosis.

27. A method for the treatment of an EP4 receptor mediated disease for a patient in need thereof comprising administering a therapeutically effective amount of a compound selected from the group consisting of:

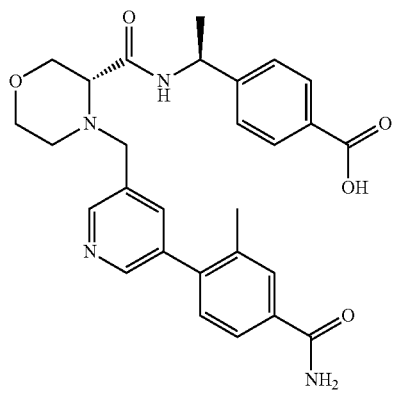

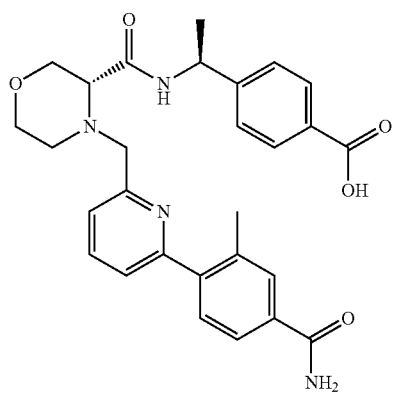

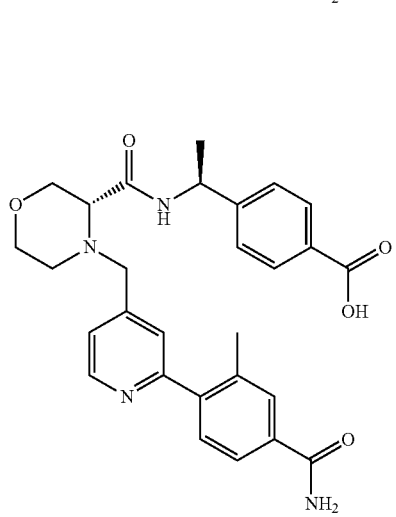

-continued

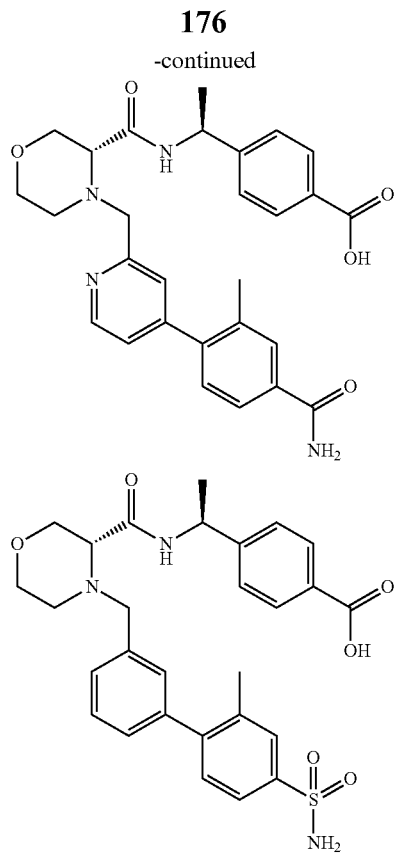

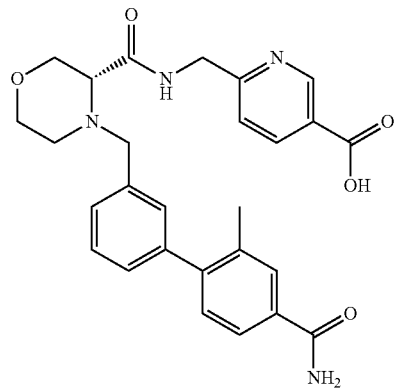

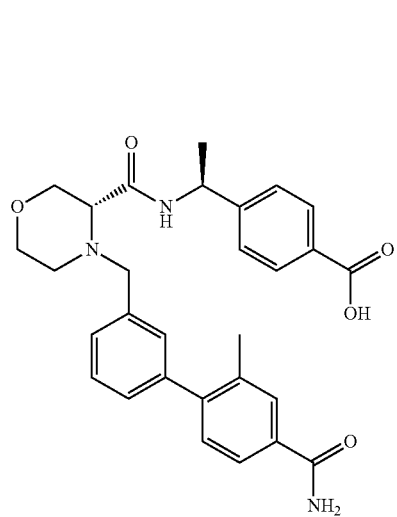

177
-continued
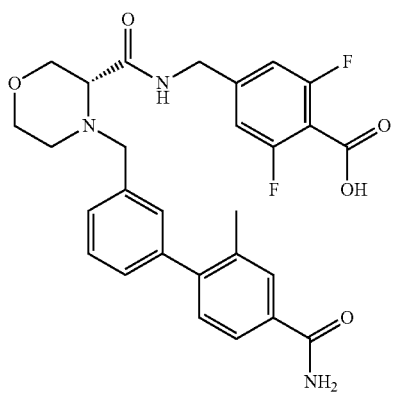
178
-continued
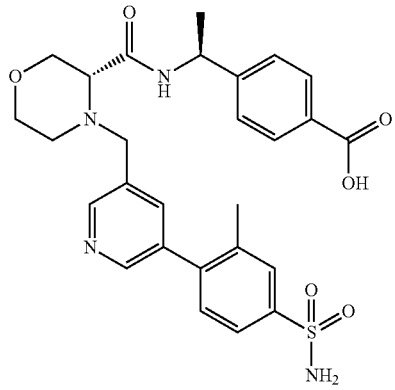
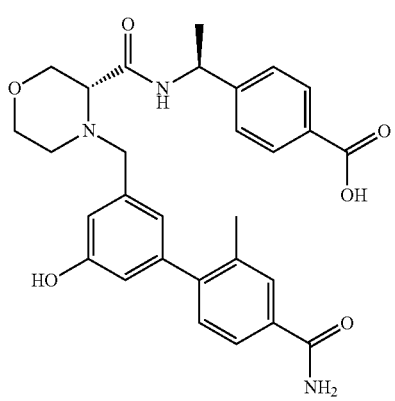
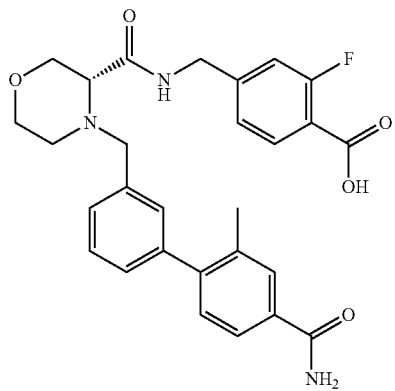
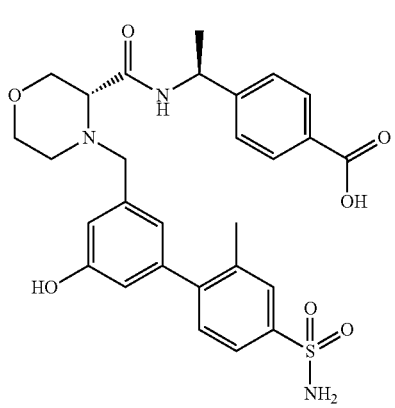
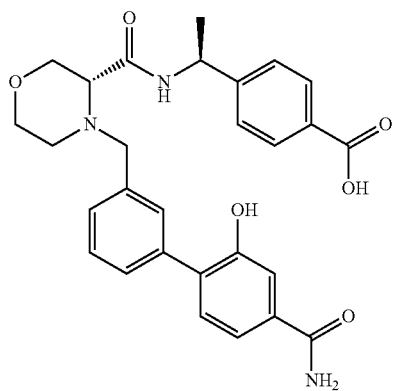

179
-continued
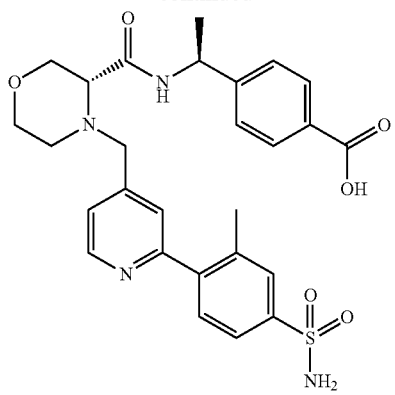
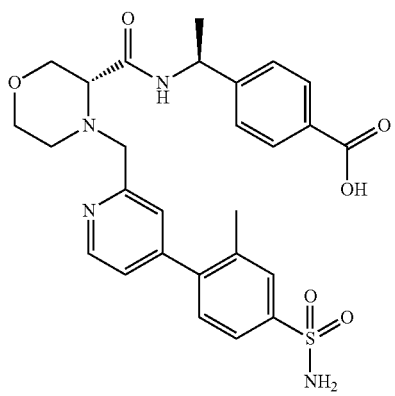
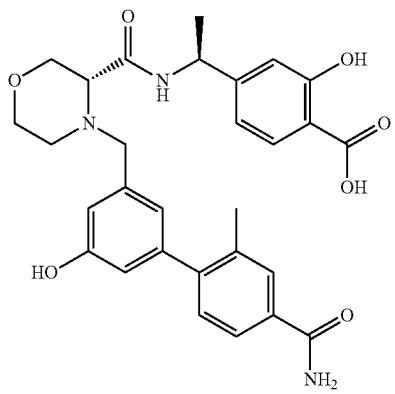
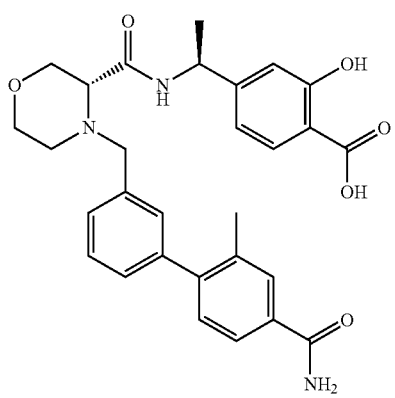
180
-continued
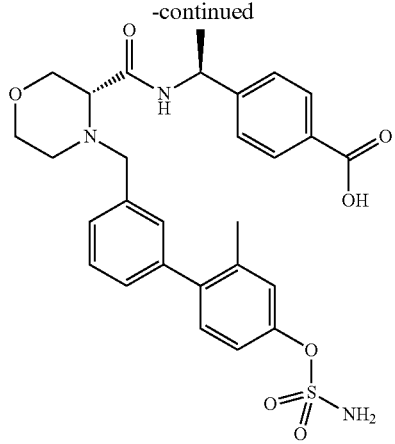
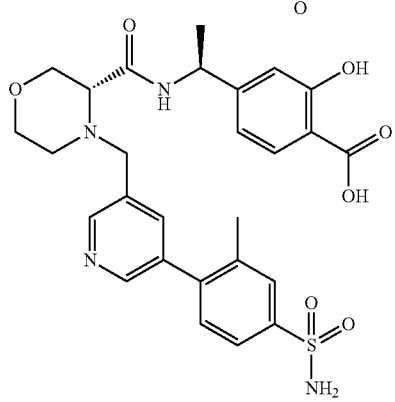
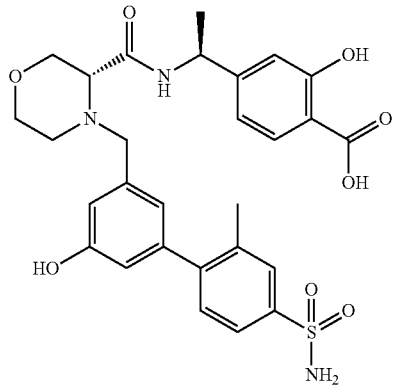
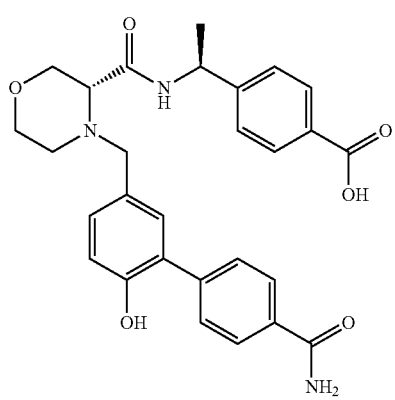

181
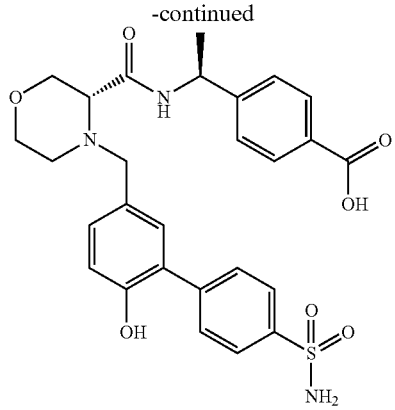
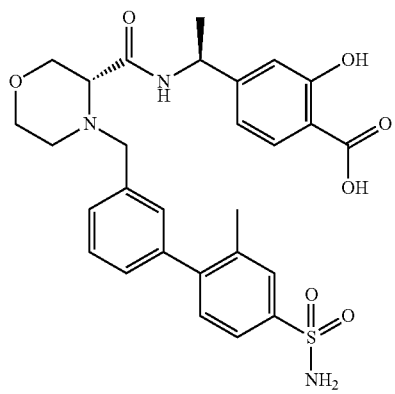
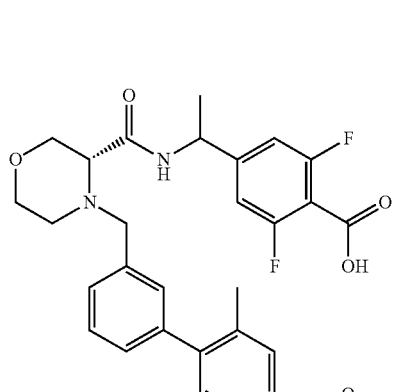
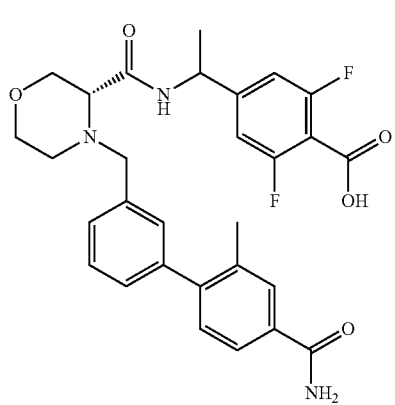
182
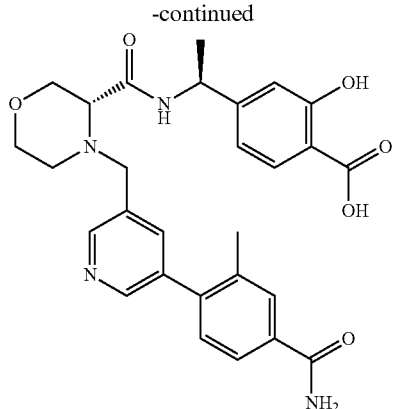
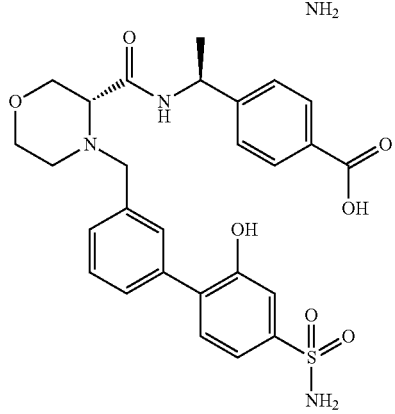
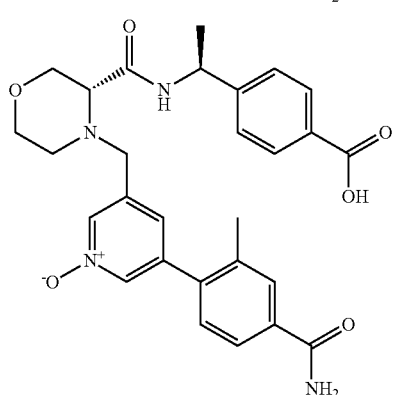
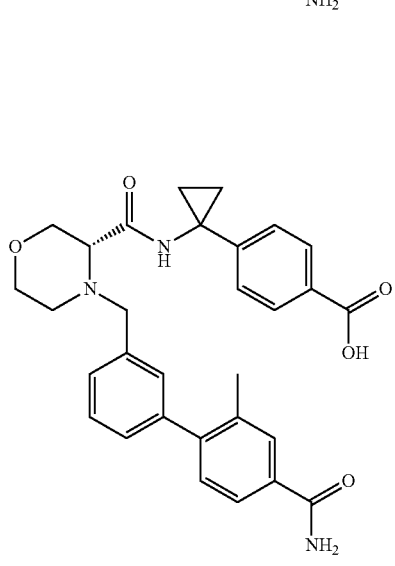

183
-continued
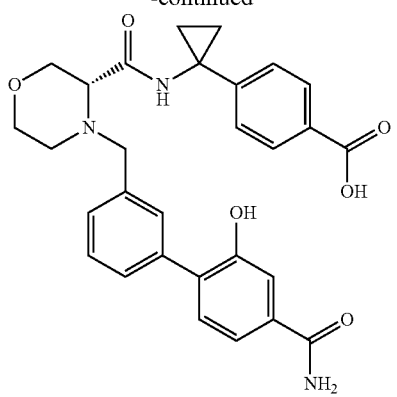
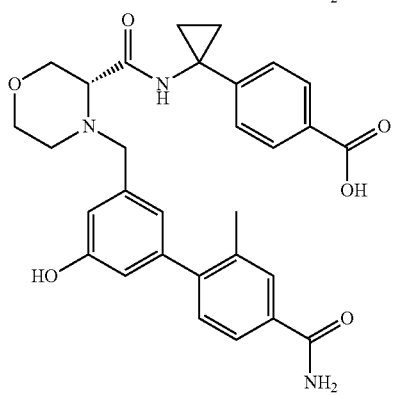
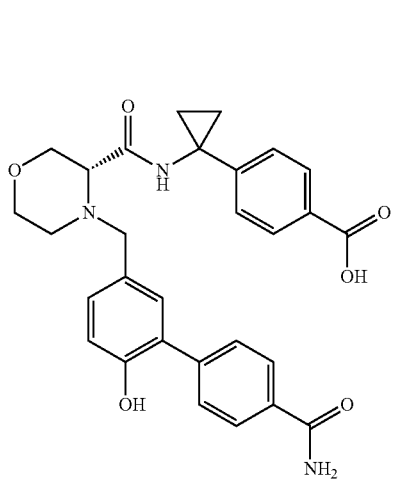
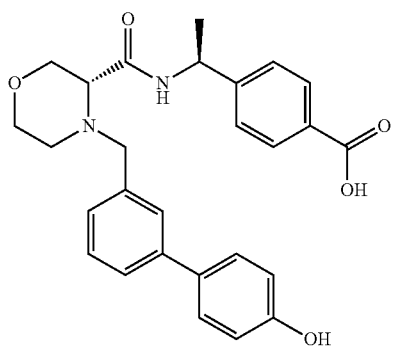
184
-continued
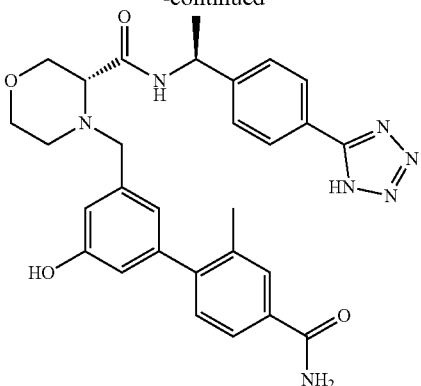
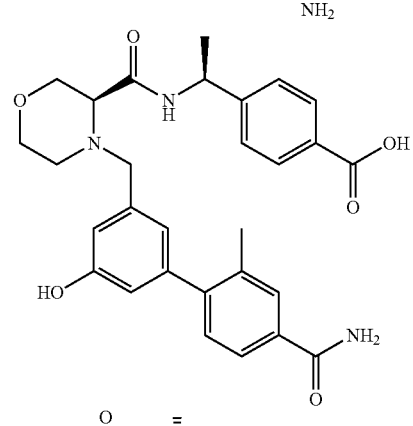
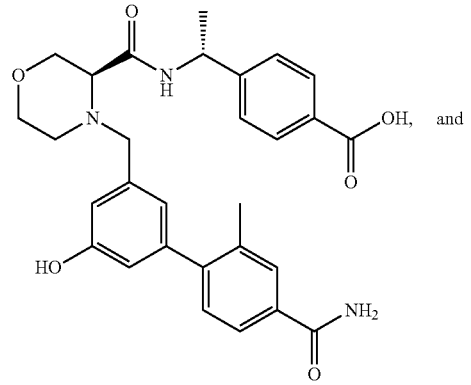
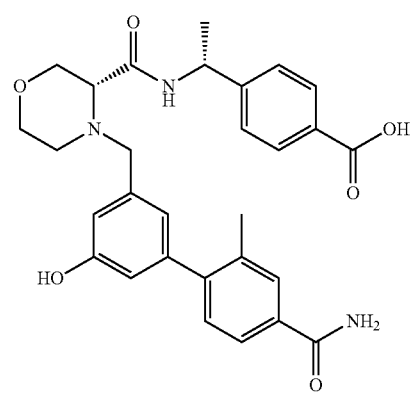
or a pharmaceutically acceptable salt, solvate, hydrate, or tautomer thereof.

28. The compound of claim 1, wherein
a) n is 0 or 1;
b) A is
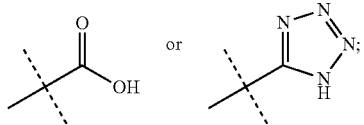 or 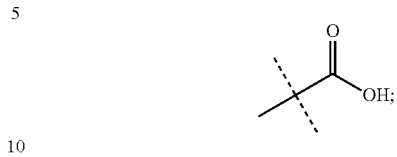
c) $R^1$ is methyl;
d) $R^3$ is H or F;
e) $R^4$ is H, OH, or methyl;
f) $R^5$ is OH, $CONH_2$, $SO_2NH_2$, or $OSO_2NH_2$;
g) X is CH or N; and
h) Y is CH, CF, COH, or N.
29. The compound of claim 1, wherein
a) n is 0 or 1;
b) A is
c) $R^1$ is methyl;
d) $R^3$ is H;
e) $R^4$ is methyl;
f) $R^5$ is $CONH_2$, or $SO_2NH_2$;
g) X is CH or N; and
h) Y is CH, CF, COH, or N.
* * * * *